US011825364B2

(12) United States Patent
Cirik et al.

(10) Patent No.: US 11,825,364 B2
(45) Date of Patent: *Nov. 21, 2023

(54) BEAM CONFIGURATION FOR SECONDARY CELLS

(71) Applicant: Comcast Cable Communications, LLC, Philadelphia, PA (US)

(72) Inventors: Ali Cagatay Cirik, Chantilly, VA (US); Esmael Hejazi Dinan, McLean, VA (US); Hua Zhou, Vienna, VA (US); Alireza Babaei, Fairfax, VA (US); Hyoungsuk Jeon, Centreville, VA (US); Kyungmin Park, Vienna, VA (US); Kai Xu, Herndon, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/721,991

(22) Filed: Apr. 15, 2022

(65) Prior Publication Data
US 2022/0240144 A1    Jul. 28, 2022

Related U.S. Application Data

(63) Continuation of application No. 16/581,986, filed on Sep. 25, 2019, now Pat. No. 11,343,735.
(Continued)

(51) Int. Cl.
*H04W 36/06* (2009.01)
*H04W 36/30* (2009.01)
(Continued)

(52) U.S. Cl.
CPC ....... *H04W 36/06* (2013.01); *H04W 36/0072* (2013.01); *H04W 36/305* (2018.08); *H04W 72/20* (2023.01)

(58) Field of Classification Search
CPC ............ H04W 36/06; H04W 36/0072; H04W 36/305; H04W 72/20; H04B 7/088; H04B 7/0695
See application file for complete search history.

(56) References Cited

U.S. PATENT DOCUMENTS 9,125,218 B2  9/2015  Chang
9,736,795 B2  8/2017  Dinan
(Continued)

FOREIGN PATENT DOCUMENTS

CN  108809580 A  11/2018
EP    3397015 A1  10/2018
(Continued)

OTHER PUBLICATIONS

R1-1704478 3GPP TSG RAN WG1 Meeting #88bis, Spokane, USA, Apr. 3-7, 2017, Source: Fujitsu, Title: Discussion on beam failure recovery procedure.
(Continued)

*Primary Examiner* — Wutchung Chu
(74) *Attorney, Agent, or Firm* — Banner & Witcoff, Ltd.

(57) ABSTRACT

Procedures for using a transmission configuration indication (TCI) state in wireless communications are described. A base station may send one or more configuration parameters indicating a plurality of cells to be updated with a same TCI state. A wireless device may perform, via the plurality of cells and using one or more parameters associated with the TCI state, at least one of transmission or reception.

50 Claims, 32 Drawing Sheets

Related U.S. Application Data

(60) Provisional application No. 62/736,233, filed on Sep. 25, 2018.

(51) Int. Cl.
*H04W 36/00* (2009.01)
*H04W 72/20* (2023.01)

(56) References Cited

U.S. PATENT DOCUMENTS

| | | | |
|---|---|---|---|
| 9,949,298 B1 | 4/2018 | Akoum et al. | |
| 10,602,549 B2* | 3/2020 | Tsai | H04B 7/0626 |
| 10,820,271 B2* | 10/2020 | Tseng | H04W 76/19 |
| 10,986,622 B2* | 4/2021 | Zhang | H04L 5/0094 |
| 11,025,456 B2* | 6/2021 | Chatterjee | H04W 72/1273 |
| 2010/0279700 A1 | 11/2010 | Kim et al. | |
| 2013/0039345 A1 | 2/2013 | Kim et al. | |
| 2013/0188580 A1 | 7/2013 | Dinan | |
| 2013/0250828 A1 | 9/2013 | Chou et al. | |
| 2015/0029910 A1* | 1/2015 | He | H04B 7/0695 370/280 |
| 2015/0189574 A1 | 7/2015 | Ng et al. | |
| 2015/0208462 A1 | 7/2015 | Lee et al. | |
| 2015/0365921 A1 | 12/2015 | Wu | |
| 2017/0195998 A1 | 7/2017 | Zhang et al. | |
| 2017/0207843 A1 | 7/2017 | Jung et al. | |
| 2017/0332406 A1 | 11/2017 | Islam et al. | |
| 2017/0339662 A1 | 11/2017 | Lin et al. | |
| 2017/0373731 A1 | 12/2017 | Guo et al. | |
| 2018/0006770 A1 | 1/2018 | Guo et al. | |
| 2018/0054348 A1 | 2/2018 | Luo et al. | |
| 2018/0054382 A1 | 2/2018 | Luo et al. | |
| 2018/0054783 A1 | 2/2018 | Luo et al. | |
| 2018/0054811 A1 | 2/2018 | Luo et al. | |
| 2018/0054812 A1 | 2/2018 | Luo et al. | |
| 2018/0054832 A1 | 2/2018 | Luo et al. | |
| 2018/0083753 A1 | 3/2018 | Nagaraja et al. | |
| 2018/0098334 A1 | 4/2018 | Tie et al. | |
| 2018/0110066 A1 | 4/2018 | Luo et al. | |
| 2018/0115940 A1 | 4/2018 | Abedini et al. | |
| 2018/0115990 A1 | 4/2018 | Abedini et al. | |
| 2018/0124687 A1 | 5/2018 | Park et al. | |
| 2018/0132266 A1 | 5/2018 | Chen et al. | |
| 2018/0138962 A1 | 5/2018 | Islam et al. | |
| 2018/0176958 A1 | 6/2018 | Islam et al. | |
| 2018/0191422 A1 | 7/2018 | Xia et al. | |
| 2018/0219604 A1 | 8/2018 | Lu et al. | |
| 2018/0220448 A1 | 8/2018 | Akkarakaran et al. | |
| 2018/0227899 A1 | 8/2018 | Yu et al. | |
| 2018/0234960 A1 | 8/2018 | Nagaraja et al. | |
| 2018/0241452 A1 | 8/2018 | Akkarakaran et al. | |
| 2018/0249453 A1 | 8/2018 | Nagaraja et al. | |
| 2018/0270698 A1 | 9/2018 | Babaei et al. | |
| 2018/0270699 A1 | 9/2018 | Babaei et al. | |
| 2018/0270700 A1 | 9/2018 | Babaei et al. | |
| 2018/0278310 A1 | 9/2018 | Lee et al. | |
| 2018/0279150 A1 | 9/2018 | He et al. | |
| 2018/0279193 A1 | 9/2018 | Park et al. | |
| 2018/0279229 A1 | 9/2018 | Dinan et al. | |
| 2018/0288756 A1 | 10/2018 | Xia et al. | |
| 2018/0302889 A1 | 10/2018 | Guo et al. | |
| 2018/0310321 A1 | 10/2018 | Basu Mallick et al. | |
| 2018/0317123 A1 | 11/2018 | Chen et al. | |
| 2018/0323856 A1 | 11/2018 | Xiong et al. | |
| 2018/0324723 A1 | 11/2018 | Akkarakaran et al. | |
| 2018/0324867 A1 | 11/2018 | Basu Mallick et al. | |
| 2018/0343653 A1 | 11/2018 | Guo | |
| 2018/0351611 A1 | 12/2018 | Nagaraja et al. | |
| 2018/0367374 A1 | 12/2018 | Liu et al. | |
| 2018/0368126 A1 | 12/2018 | Islam et al. | |
| 2018/0368142 A1 | 12/2018 | Liou | |
| 2019/0028174 A1 | 1/2019 | Chakraborty et al. | |
| 2019/0037423 A1 | 1/2019 | Yu et al. | |
| 2019/0037498 A1 | 1/2019 | Tseng et al. | |
| 2019/0059129 A1 | 2/2019 | Luo et al. | |
| 2019/0074882 A1 | 3/2019 | Zhou et al. | |
| 2019/0149365 A1* | 5/2019 | Chatterjee | H04L 25/0226 370/329 |
| 2019/0150161 A1* | 5/2019 | Cheng | H04W 80/02 370/330 |
| 2019/0159135 A1* | 5/2019 | MolavianJazi | H04W 52/362 |
| 2019/0173740 A1 | 6/2019 | Zhang et al. | |
| 2019/0190582 A1* | 6/2019 | Guo | H04L 1/0061 |
| 2019/0230545 A1* | 7/2019 | Liou | H04W 24/10 |
| 2019/0261281 A1* | 8/2019 | Jung | H04W 52/16 |
| 2019/0268893 A1 | 8/2019 | Tsai et al. | |
| 2019/0281587 A1* | 9/2019 | Zhang | H04W 72/23 |
| 2019/0296805 A1* | 9/2019 | Son | H04W 76/27 |
| 2019/0297640 A1* | 9/2019 | Liou | H04L 5/001 |
| 2019/0306924 A1* | 10/2019 | Zhang | H04B 7/063 |
| 2019/0342907 A1* | 11/2019 | Huang | H04W 72/23 |
| 2019/0356444 A1* | 11/2019 | Noh | H04L 5/0023 |
| 2019/0394662 A1* | 12/2019 | Josan | H04W 24/10 |
| 2020/0007194 A1* | 1/2020 | John Wilson | H04B 7/024 |
| 2020/0007292 A1* | 1/2020 | Huang | H04W 72/046 |
| 2020/0029383 A1* | 1/2020 | Venugopal | H04B 7/088 |
| 2020/0092814 A1* | 3/2020 | Zhou | H04W 52/0235 |
| 2020/0100248 A1* | 3/2020 | Kim | H04L 5/0094 |
| 2020/0120584 A1* | 4/2020 | Yi | H04W 74/0866 |
| 2020/0127799 A1* | 4/2020 | Orsino | H04L 25/0226 |
| 2020/0221428 A1* | 7/2020 | Moon | H04L 1/1854 |
| 2020/0229257 A1* | 7/2020 | Venugopal | H04W 72/1268 |
| 2020/0252108 A1* | 8/2020 | John Wilson | H04L 5/0048 |
| 2020/0274750 A1* | 8/2020 | Yi | H04L 27/2613 |
| 2020/0322031 A1* | 10/2020 | You | H04L 5/001 |
| 2020/0358582 A1* | 11/2020 | Takeda | H04B 7/0695 |
| 2020/0374960 A1* | 11/2020 | Deenoo | H04W 74/0833 |
| 2020/0403682 A1* | 12/2020 | Koskela | H04B 7/0695 |
| 2020/0404690 A1* | 12/2020 | Lee | H04W 72/1273 |
| 2020/0413469 A1* | 12/2020 | Wu | H04W 16/28 |
| 2021/0013951 A1* | 1/2021 | Chen | H04B 7/088 |
| 2021/0021320 A1* | 1/2021 | Koskela | H04W 56/001 |
| 2021/0058998 A1* | 2/2021 | Yuan | H04B 7/0695 |
| 2021/0067231 A1* | 3/2021 | Yang | H04W 72/0453 |
| 2021/0091844 A1* | 3/2021 | Koskela | H04W 36/305 |
| 2021/0135818 A1* | 5/2021 | Chen | H04B 7/0695 |

FOREIGN PATENT DOCUMENTS

| | | |
|---|---|---|
| EP | 3424152 A1 | 1/2019 |
| WO | 2013025142 A1 | 2/2013 |
| WO | 2017024516 A1 | 2/2017 |
| WO | 2017123060 A1 | 7/2017 |
| WO | 2017135803 A1 | 8/2017 |
| WO | 2017151876 A1 | 9/2017 |
| WO | 2017196612 A1 | 11/2017 |
| WO | 2017217898 A1 | 12/2017 |
| WO | 2018017840 A1 | 1/2018 |
| WO | 2018031327 A1 | 2/2018 |
| WO | 2018031799 A1 | 2/2018 |
| WO | 2018038859 A1 | 3/2018 |
| WO | 2018038860 A1 | 3/2018 |
| WO | 2018038861 A1 | 3/2018 |
| WO | 2018038862 A1 | 3/2018 |
| WO | 2018038864 A1 | 3/2018 |
| WO | 2018075985 A1 | 4/2018 |
| WO | 2018084544 A1 | 5/2018 |
| WO | 2018128426 A1 | 7/2018 |
| WO | 2018129300 A1 | 7/2018 |
| WO | 2018136300 A1 | 7/2018 |
| WO | 2018141303 A1 | 8/2018 |
| WO | 2018144592 A1 | 8/2018 |
| WO | 2018148552 A1 | 8/2018 |
| WO | 2018156299 A1 | 8/2018 |
| WO | 2018156696 A1 | 8/2018 |
| WO | 2018169848 A1 | 9/2018 |
| WO | 2018170481 A1 | 9/2018 |
| WO | 2018171476 A1 | 9/2018 |
| WO | 2018174667 A1 | 9/2018 |
| WO | 2018174800 A1 | 9/2018 |
| WO | 2018175303 A1 | 9/2018 |
| WO | 2018190617 A1 | 10/2018 |
| WO | 2018195975 A1 | 11/2018 |
| WO | 2018196520 A1 | 11/2018 |

(56) References Cited

FOREIGN PATENT DOCUMENTS

| | | | |
|---|---|---|---|
| WO | 2018199074 A1 | 11/2018 | |
| WO | 2018199079 A1 | 11/2018 | |
| WO | 2018199100 A1 | 11/2018 | |
| WO | 2018199162 A1 | 11/2018 | |
| WO | 2018199243 A1 | 11/2018 | |
| WO | 2018200579 A1 | 11/2018 | |
| WO | 2018201450 A1 | 11/2018 | |
| WO | 2018201990 A1 | 11/2018 | |
| WO | 2018203719 A1 | 11/2018 | |
| WO | 2018203785 A1 | 11/2018 | |
| WO | 2018204255 A1 | 11/2018 | |
| WO | 2018204718 A1 | 11/2018 | |
| WO | 2018204922 A1 | 11/2018 | |
| WO | 2018222276 A1 | 12/2018 | |
| WO | 2018227464 A1 | 12/2018 | |
| WO | 2018227551 A1 | 12/2018 | |
| WO | 2018228187 A1 | 12/2018 | |
| WO | 2018230862 A1 | 12/2018 | |
| WO | 2018231655 A1 | 12/2018 | |
| WO | 2018232090 A1 | 12/2018 | |
| WO | 2018232259 A1 | 12/2018 | |
| WO | 2018237400 A1 | 12/2018 | |
| WO | 2019004694 A1 | 1/2019 | |
| WO | 2019032882 A1 | 2/2019 | |

OTHER PUBLICATIONS

R1-1704723 3GPP TSG RAN WG1 Meeting #88bis, Spokane, USA, Apr. 3-7, 2017, Source: Intel Corporation, Title: Details for UL Beam Management.

R1-1704725 3GPP TSG RAN WG1 Meeting #88bis, Spokane, USA, Apr. 3-7, 2017, Source: Intel Corporation, Title: On UE Initiated Beam Recovery.

R1-1705582 3GPP TSG RAN WG1 Meeting #88bis, Spokane, USA, Apr. 3-7, 2017, Source: Qualcomm Incorporated, Title: Beam recovery procedures.

R1-1705893 3GPP TSG RAN WG1 Meeting #88bis, Spokane, USA, Apr. 3-7, 2017, Source: Ericsson, Title: Beam failure detection and beam recovery actions.

R1-1705961 3GPP TSG RAN WG1 Meeting #88bis, Spokane, USA, Apr. 3-7, 2017, Source: Nokia, Alcatel-Lucent Shanghai Bell, Title: Beam Recovery in NR.

R1-1706928 3GPP TSG RAN WG1 Meeting #89, Hangzhou, China, May 15-19, 2017, Source: Huawei, HiSilicon, Title: Beam management across multiple carriers.

R1-1707255 3GPP TSG RAN WG1 Meeting #89, Hangzhou, China, May 15-19, 2017, Source: Fujitsu, Title: Discussion on beam failure recovery procedure.

R1-1707356 3GPP TSG RAN WG1 Meeting #89, Hangzhou, China, May 15-19, 2017, Source: Intel Corporation, Title: Discussion for Mechanism to Recover from Beam Failure.

R1-1707477 3GPP TSG RAN WG1 Meeting #89, Hangzhou, China, May 15-19, 2017, Source: CATT, Title: Discussion on DL beam recovery.

R1-1707698 3GPP TSG RAN WG1 Meeting #89, Hangzhou, China, May 15-19, 2017, Source: Guangdong OPPO Mobile Telecom, Title: On Beam Recovery Mechanism.

R1-1707782 3GPP TSG RAN WG1 Meeting #89, Hangzhou, China, May 15-19, 2017, Source: Spreadtrum Communications, Title: Discussion on UE initiated recovery from beam failure.

R1-1707814 3GPP TSG RAN WG1 Meeting #89, Hangzhou, China, May 15-19, 2017, Source: NEC, Title: Low latency beam failure recovery by PRACH/PRACH-like.

R1-1707954 3GPP TSG RAN WG1 Meeting #89, Hangzhou, China, May 15-19, 2017, Source: Samsung, Title: Discussion on beam recovery procedure.

R1-1708678 3GPP TSG RAN WG1 Meeting #89, Hangzhou, China, May 15-19, 2017, Source: Ericsson, Title: Beam failure recovery mechanism.

R1-1708905 3GPP TSG RAN WG1 Meeting #89, Hangzhou, China, May 15-19, 2017, Source: Nokia, Alcatel-Lucent Shanghai Bell, Title: Beam Recovery.

R1-1710144 3GPP TSG RAN WG1 NR Ad-Hoc #2, Qingdao, China, Jun. 27-30, 2017, Source: Guangdong OPPO Mobile Telecom, Title: On Beam Recovery Mechanism.

R1-1710185 3GPP TSG RAN WG1 NR Ad-Hoc #2, Qingdao, China, Jun. 27-30, 2017, Source: ZTE, Title: Discussion on beam recovery mechanism.

R1-1710527 3GPP TSG RAN WG1 NR Ad-Hoc #2, Qingdao, China, Jun. 27-30, 2017, Source: Intel Corporation, Title: Discussion for mechanism to recover from beam failure.

R1-1710655 3GPP TSG RAN WG1 NR Ad-Hoc #2, Qingdao, China, Jun. 27-30, 2017, Source: Samsung, Title: Beam failure recovery.

R1-1714251 3GPP TSG RAN WG1 Meeting #90, Prague, Czech Republic, Aug. 21-25, 2017, Source: Nokia, Nokia Shanghai Bell, Title: Beam recovery in NR.

R1-1715468 3GPP TSG RAN WG1 Meeting NR#3, Nagoya, Japan, Sep. 18-21, 2017, Source: Huawei, HiSilicon, Title: Beam Failure Recovery Design Details.

R1-1715860 3GPP TSG RAN WG1 Meeting NR#3, Nagoya, Japan, Sep. 18-21, 2017, Source: LG Electronics, Title: Discussion on beam failure recovery.

R1-1800362 3GPP TSG RAN WG1 Meeting AH 1801, Vancouver, Canada, Jan. 22-26, 2018, Source: LG Electronics, Title: Clarification on PDCCH beam indication by higher-layers.

R1-1800363 3GPP TSG RAN WG1 Meeting AH 1801, Vancouver, Canada, Jan. 22-26, 2018, Source: LG Electronics, Title: Text proposals on UL beam management.

R1-1800364 3GPP TSG RAN WG1 Meeting AH 1801, Vancouver, Canada, Jan. 22-26, 2018, Source: LG Electronics, Title: Discussion on PHY and MAC operation for beam failure recovery.

R1-1800401 3GPP TSG RAN WG1 Meeting AH 1801, Vancouver, Canada, Jan. 22-26, 2018, Source: Lenovo, Motorola Mobility, Title: Corrections on beam management.

R1-1800402 3GPP TSG RAN WG1 Meeting AH 1801, Vancouver, Canada, Jan. 22-26, 2018, Source: Lenovo, Motorola Mobility, Title: Corrections on beam failure recovery.

R1-1800432 3GPP TSG RAN WG1 Meeting AH 1801, Vancouver, Canada, Jan. 22-26, 2018, Source: Samsung, Title: Issues on beam management.

R1-1800433 3GPP TSG RAN WG1 Meeting AH 1801, Vancouver, Canada, Jan. 22-26, 2018, Source: Samsung, Title: Aperiodic beam reporting.

R1-1800434 3GPP TSG RAN WG1 Meeting AH 1801, Vancouver, Canada, Jan. 22-26, 2018, Source: Samsung, Title: Issues on beam failure recovery.

R1-1800472 3GPP TSG RAN WG1 Meeting AH 1801, Vancouver, Canada, Jan. 22-26, 2018, Source: Samsung, Title: PHR for CA.

R1-1800498 3GPP TSG RAN WG1 Meeting AH 1801, Vancouver, Canada, Jan. 22-26, 2018, Source: OPPO, Title: Text Proposal for Beam Management.

R1-1800499 3GPP TSG RAN WG1 Meeting AH 1801, Vancouver, Canada, Jan. 22-26, 2018, Source: OPPO, Title: Text Proposal for Beam Failure Recovery.

R1-1715941 3GPP TSG RAN WG1 Meeting NR#3, Nagoya Japan, Sep. 18-21, 2017, Source: Samsung, Title: Beam Failure recovery.

R1-1716295 3GPP TSG RAN WG1 Meeting NR#3, Nagoya, Japan, Sep. 18-21, 2017, Source: Intel Corporation, Title: Remaining Issues on Beam Failure Recovery.

R1-1716397 3GPP TSG RAN WG1 Meeting NR#3, Nagoya, Japan, Sep. 18-21, 2017, Source: Qualcomm Incorporated, Title: Beam recovery procedure.

R1-1716500 3GPP TSG RAN WG1 Meeting NR#3, Nagoya, Japan, 18-21, Sep. 2017, Source: Nokia, Nokia Shanghai Bell, Title Beam Recovery in NR.

R1-1716469 3GPP TSG RAN WG1 Meeting NR#3, Nagoya, Japan, Sep. 18-21, 2017: Source: InterDigital, Inc., Title: Remaining issues on beam recovery.

R1-1717302 3GPP TSG RAN WG1 Meeting #90bis, Prague, Czech Republic, Oct. 9-13, 2017, Source: Huawei, HiSilicon Title: Beam failure recovery design details.

(56) References Cited

OTHER PUBLICATIONS

R1-1717369 3GPP TSG RAN WG1 Meeting #90bis, Prague, Czech Republic, Oct. 9-13, 2017, Source: Intel Corporation, Title: Remaining Issues on Beam Failure Recovery.
R1-1717473 3GPP TSG RAN WG1 Meeting #90bis, Prague, Czech Republic, Oct. 9-13, 2017, Source: vivo, Title: Discussion on beam failure recovery.
R1-1717606 3GPP TSG RAN WG1 Meeting #90bis, Prague, Czech Republic, Oct. 9-13, 2017, Source: Samsung, Title: Beam failure recovery.
R1-1717942 3GPP TSG RAN WG1 Meeting #90bis, Prague, Czech Republic, Oct. 9-13, 2017, Source: LG lectronics, Title: Discussion on beam failure recovery.
R1-1718010 3GPP TSG RAN WG1 Meeting #90bis, Prague, Czech Republic, Oct. 9-13, 2017, Source: NEC, Title: Discussion on Beam Failure Recovery.
R1-1718055 3GPP TSG RAN WG1 Meeting #90bis, Prague, Czech Republic, Oct. 9-13, 2017, Source: OPPO, Title: Discussion on Beam Recovery Mechanism.
R1-1718193 3GPP TSG RAN WG1 Meeting #90bis, Prague, Czech Republic, Oct. 9-13, 2017, Source: NTT DOCOMO, Title: Views on beam recovery.
R1-1718389 3GPP TSG RAN WG1 Meeting #90bis, Prague, Czech Republic, Oct. 9-13, 2017, Source: AT&T, Title: Beam Recovery for Full and Partial Control Channel Failure.
R1-1718512 3GPP TSG RAN WG1 Meeting #90bis, Prague, Czech Republic, Oct. 9-13, 2017, Source: Nokia, Nokia Shanghai Bell, Title: Beam Recovery in NR.
R1-1718542 3GPP TSG RAN WG1 Meeting #90bis, Prague Czech Republic, Oct. 9-13, 2017, Source: Qualcomm Incorpated, Title: Beam recovery procedure.
R1-1801454 3GPP TSG RAN WG1 Meeting #92, Athens, Greece, Feb. 26-Mar. 2, 2018, Source: Huawei, diSilicon, Title: Remaining issues on beam failure recovery.
R1-1801722 3GPP TSG RAN WG1 Meeting #92, Athens, Greece, Feb. 26-Mar. 2, 2018, Source: CATT, Title: Remaining issues on DL beam failure recovery.
R1-1802393 3GPP TSG RAN WG1 Meeting #92, Athens, Greece, Feb. 26-Mar. 2, 2018, Source: Intel Corporation, Title: On beam management issues for mutli-CC operation.
R1-1802397 3GPP TSG RAN WG1 Meeting #92, Athens, Greece, Feb. 26-Mar. 2, 2018, Source: Intel Corporation, Title: Remaining Issues on Beam Failure Recovery.
R1-1802472 3GPP TSG RAN WG1 Meeting #92, Athens, Greece, Feb. 26-Mar. 2, 2018, Source: NTT DOCOMO, Title: Remaining issues on beam recovery.
R1-1802557 3GPP TSG RAN WG1 Meeting #92, Athens, Greece, Feb. 26-Mar. 2, 2018, Source: Nokia, Nokia Shanghai Bell, Title: Remaining Details on Beam Recovery.
R1-1802593 3GPP TSG RAN WG1 Meeting #92, Athens, Greece, Feb. 26-Mar. 2, 2018, Source: AT&T, Title: In support of partial beam failure.
R1-1802744 3GPP TSG RAN WG1 Meeting #92, Athens, Greece, Feb. 26-Mar. 2, 2018, Source: Ericsson, Title: Remaining details on beam recovery.
R1-1802824 3GPP TSG RAN WG1 Meeting #92, Athens, Greece, Feb. 26-Mar. 2, 2018, Source: Qualcomm Incorporated, Title: Beam recovery procedures.
R1-1803362 3GPP TSG RAN WG1 Meeting #92, Athens, Greece, Feb. 26-Mar. 2, 2018, Source: MediaTek Inc., Title: Summary on Remaining issues on Beam Failure Recovery.
R1-1803397 3GPP TSG RAN WG1 Meeting #92, Athens, Greece, Feb. 26-Mar. 2, 2018, Source: CATT, Title: Summary of Email Discussion on Beam Failure Recovery on Scell.
R1-1803745 3GPP TSG-RAN WG1 Meeting #92bis, Sanya, China, Apr. 16-20, 2018, Source: CATT, Title: Remaining Details on Beam Failure Recovery.
R1-1804210 3GPP TSG-RAN WG1 Meeting #92bis, Sanya, China, Apr. 16-20, 2018, Source: Lenovo, Motorola Mobility, Title: Discussion of Beam Measurement for Carrier Aggregation.
R1-1804363 3GPP TSG-RAN WG1 Meeting #92bis, Sanya, China, Apr. 16-20, 2018, Source: Samsung, Title: Simultaneous Reception of Physical Channels and Reference Signals.
R1-1804789 3GPP TSG-RAN WG1 Meeting #92bis, Sanya, China, Apr. 16-20, 2018, Source: Qualcomm Incorporated, Title: Details on Simultaneous Reception/Transmission of PHY Channels and RS in FR2.
R1-1804975 3GPP TSG-RAN WG1 Meeting #92bis, Sanya, China, Apr. 16-20, 2018, Source: Ericsson, Title: Remaining Issues on Beam Recovery.
R1-1804977 3GPP TSG-RAN WG1 Meeting #92bis, Sanya, China, Apr. 16-20, 2018, Source: Ericsson, Title: On Simultaneous Reception of Physical and Reference Signals Across CCs.
R1-1805538 3GPP TSG-RAN WG1 Meeting #92bis, Sanya, China, Apr. 16-20, 2018, Source: NTT DOCOMO, Inc., Title: Offline Summary for AI 7.1.3.1.2 Search Space.
R1-1806616 3GPP TSG-RAN WG1 #93, Busan, Korea, May 21-25, 2018, Source: LG Electronics, Title: Remaining Issues on Search Space.
R1-1806729 3GPP TSG-RAN WG1 #93, Busan, Korea, May 21-25, 2018, Source: Samsung, Title: Corrections on Search Space Design.
R2-1707999 3GPP TSG-RAN WG2 #99, Berlin, Germany, Aug. 21-25, 2017, Source: MediaTek Inc., Title: Beam Management and Beam Recovery in MAC.
R2-1708677 3GPP TSG RAN WG2 #99, Berlin, Germany, Aug. 21-25, 2017, Source: Nokia, Nokia Shanghai Bell, Title: Beam Recovery in NR.
R2-1708697 3GPP TSG RAN WG2 #99, Berlin, Germany, Aug. 21-25, 2017, Source: Huawei, HiSilicon, Title: Handling of Resources for Beam Failure Recovery.
R2-1709085 3GPP TSG-RAN WG2 #99, Berlin, Germany, Aug. 21-25, 2017, Source: Qualcomm Incorporated, Title: Beam Recovery Request.
R2-1709320 3GPP TSG-RAN WG2 #99, Berlin, Germany, Aug. 21-25, 2017, Source: ASUSTek, Title: Discussion on Beam Recover Request in NR.
R2-1800042 3GPP TSG-RAN WG2 AH, Vancouver, Canada, Jan. 22-26, 2018, Source: ASUSTek, Title: Discussion on Beam Failure Recovery Request in NR.
R2-1800049 3GPP TSG-RAN WG2 AH, Vancouver, Canada, Jan. 22-26, 2018, Source: ASUSTek, Title: UE Behaviours Upon Beam Failure and Recovery.
R2-1800168 3GPP TSG-RAN WG2 AH, Vancouver, Canada, Jan. 22-26, 2018, Source: CATT, Title: Solution for PH Type Inconsistency Between RAN1 and RAN2.
R2-1800169 3GPP TSG-RAN WG2 AH, Vancouver, Canada, Jan. 22-26, 2018, Source: CATT, Title: PHR MAC CE for EN-DC.
R2-1800231 3GPP TSG-RAN WG2 #100, Reno, USA, Nov. 27-Dec. 1, 2017, Source: Xiaomi, Title: Consideration on PHR Trigger Condition for Supporting SUL.
R2-1800253 3GPP TSG-RAN WG2 AH, Vancouver, Canada, Jan. 22-26, 2018, Source: ASUSTek, Title: Pathloss Change for Triggering PHR.
R2-1800254 3GPP TSG-RAN WG2 AH, Vancouver, Canada, Jan. 22-26, 2018, Source: CATT, Title: RA Procedure and Parameters for BFR.
R2-1800343 3GPP TSG-RAN WG2 AH, Vancouver, Canada, Jan. 22-26, 2018, Source: Ericsson, Title: PHR Format for SUL.
R2-1800614 3GPP TSG-RAN WG2 AH, Vancouver, Canada, Jan. 22-26, 2018, Source: Samsung, Title: Support for Type 2 PH in NR.
R2-1800619 3GPP TSG-RAN WG2 AH, Vancouver, Canada, Jan. 22-26, 2018, Source: Samsung, Title: SUL and PHR.
R2-1800642 3GPP TSG-RAN WG2 AH, Vancouver, Canada, Jan. 22-26, 2018, Source: Huawei, HiSilicon, Title: PHR Alignment Between RAN1 and RAN2.
R2-1800680 3GPP TSG-RAN WG2 AH, Vancouver, Canada, Jan. 22-26, 2018, Source: Lenovo, Motorola Mobility, Title: PHR for NR CA.
R2-1800822 3GPP TSG-RAN WG2 AH, Vancouver, Canada, Jan. 22-26, 2018, Source: Spreadtrum Communications, Title: Beam Failure Recovery Clarification.

(56) References Cited

OTHER PUBLICATIONS

R2-1801008 3GPP TSG-RAN WG2 AH, Vancouver, Canada, Jan. 22-26, 2018, Source: Huawei, HiSilicon, Title: Discussion on Power Sharing and its Impact on PHR for EN-DC.
R2-1801009 3GPP TSG-RAN WG2 AH, Vancouver, Canada, Jan. 22-26, 2018, Source: Huawei, HiSilicon, Title: General Consideration on RA Procedure for Beam Failure Recovery.
R2-1801041 3GPP TSG-RAN WG2 AH, Vancouver, Canada, Jan. 22-26, 2018, Source: Huawei, HiSilicon, Title: Remaining Issue of Power Management in NR.
R2-1801043 3GPP TSG-RAN WG2 AH, Vancouver, Canada, Jan. 22-26, 2018, Source: Huawei, HiSilicon, Title: Consideration of PHR with Multi-Beam Operation.
R2-1801404 3GPP TSG-RAN WG2 AH, Vancouver, Canada, Jan. 22-26, 2018, Source: NTT DOCOMO, Inc., Title: Discussion on Beam Failure Recovery.
R2-1801406 3GPP TSG-RAN WG2 AH, Vancouver, Canada, Jan. 22-26, 2018, Source: NTT DOCOMO, Inc., Title: Remaining Issue on PHR.
R2-1801539 3GPP TSG-RAN WG2 AH, Vancouver, Canada, Jan. 22-26, 2018, Source: CATT, Title: PHR MAC CE for EN-DC.
R2-1801540 3GPP TSG-RAN WG2 AH, Vancouver, Canada, Jan. 22-26, 2018, Source: CATT, Title: Correction on PHR MAC CE in EN-DC in TS38.321.
R2-1801564 3GPP TSG-RAN WG2 AH, Vancouver, Canada, Jan. 22-26, 2018, Source: NTT DOCOMO, Inc., Title: LS on PHR.
R2-1801568 3GPP TSG-RAN WG2 AH, Vancouver, Canada, Jan. 22-26, 2018, Source: RAN WG2, Title: LS on PHR.
R2-1801814 3GPP TSG-RAN WG2 #101, Athens, Greece, Feb. 26-Mar. 2, 2018, Source: Huawei, HiSilicon, Title: Beam Failure Recovery on SCell.
R2-1802490 3GPP TSG-RAN WG2 #101, Athens, Greece, Feb. 26-Mar. 2, 2018, Source: CATT, Huawei, HiSilicon, Title: Discussion on Beam Failure Recovery for CA.
R2-1806120 3GPP TSG-RAN WG2 Meeting #101, Sanya, China, Apr. 16-20, 2018, Source: ITL, Title: Beam Failure Recovery on SCell.
R2-1806166 3GPP TSG-RAN WG2 Meeting #101, Sanya, China, Apr. 16-20, 2018, Source: MediaTek, Inc., Title: On switching between CFRA and CBRA.
R2-1806774 3GPP TSG-RAN WG2 Meeting #102, Sanya, China, Apr. 16-20, 2018, Source: Nokia, Nokia Shanghai Bell, Title: Finalization of dormant SCell state.
R2-1806819 3GPP TSG-RAN WG2 Meeting #102, Busan, Korea, May 21-25, 2018, Source: Samsung, Title: MAC Impacts: Beam Failure Recovery for SCell.
R2-1806924 3GPP TSG-RAN WG2 Meeting #102, Busan, Korea, May 21-25, 2018, Source: Qualcomm, Inc., Title: SCell Dormant State Transitions based on New Timers & MAC-CEs.
R2-1806998 3GPP TSG-RAN WG2 Meeting #102, Busan, Korea, May 21-25, 2018, Source: CATT, Title: The validity of CFRA resources for BFR.
R2-1807160 3GPP TSG-RAN WG2 Meeting #102, Busan, Korea, May 21-25, 2018, Source: Panasonic, Title: Timer associated with the dedicated BFR PRACH resource.
R2-1807405 3GPP TSG-RAN WG2 Meeting #102, Busan, Korea, May 21-25, 2018, Source: ZTE, Title: Discussion on the beam failure recovery timer.
R2-1807415 3GPP TSG-RAN WG2 Meeting #102, Busan, Korea, May 21-25, 2018, Source: OPPO, Title: MAC Impacts on supporting BFR procedure on SCell.
R2-1807444 3GPP TSG-RAN WG2 Meeting #102, Busan, Korea, May 21-25, 2018, Source: Huawei, HiSilicon, Title: BWP switch for BFR.
R2-1807481 3GPP TSG RAN WG2 Meeting #102, Busan, Korea, May 21-25, 2018, Source: Huawei, HiSilicon, Title: Remaining issues of temporary CQI reporting.
R2-1807584 3GPP TSG RAN WG2 Meeting #102, Busan, Korea, May 21-25, 2018, Source: vivo, Title: Discussion on the SCell BFR.
R2-1807961 3GPP TSG-RAN WG2 Meeting #102, Busan, Korea, May 21-25, 2018, Source: Huawei, HiSilicon, Title: Discussion on BFR-config for SCell BFR.
R2-1807975 3GPP TSG-RAN WG2 Meeting #102, Busan, Korea, May 21-25, 2018, Source: Huawei, HiSilicon, Title: Discussion on beam failure recovery for SCell.
R2-1808024 3GPP TSG-RAN WG2 Meeting #102, Busan, Korea, May 21-25, 2018, Source: Nokia, Nokia Shanghai Bell, Title: SCell Beam Failure Recovery.
R2-1808570 3GPP TSG RAN WG2 Meeting #102, Busan, Korea, May 21-25, 2018, Source: Qualcomm Incorporated, Title: Dormant BWP for fast SCell activation.
R2-1808658 3GPP TSG-RAN WG2 Meeting #102, Busan, Korea, May 21-25, 2018, Source: ITL, Title: Beam failure recovery on SCell.
R2-1808809 3GPP TSG-RAN WG2 Meeting #102, Busan, Korea, May 21-25, 2018, Source: Ericsson, Title: CR on Dormat SCell state transition MAC CE.
R2-1809515 3GPP TSG RAN WG2 AH-1807, Montreal, Canada, Jul. 2-6, 2018, Source: CATT, Title: Further issues with DL BWP switching for CFRA.
R2-1809523 3GPP TSG RAN WG2 AH-1807, Montreal, Canada, Jul. 2-6, 2018, Source: CATT, Title: Further discussion on BFR termination criterion.
R2-1809721 3GPP TSG RAN WG2 AH-1807, Montreal, Canada, Jul. 2-6, 2018, Source: InterDigital, Title: BWP switching for RA-BFR.
R2-1809872 3GPP TSG RAN WG2 AH-1807, Montreal, Canada, Jul. 2-6, 2018, Source: vivo, Title: Remaining configuration issues for BFR.
R2-1809894 3GPP TSG RAN WG2 AH-1807, Montreal, Canada, Jul. 2-6, 2018, Source: vivo, Title: Preamble Selection when CFRA Resource Available.
R2-1809925 3GPP TSG RAN WG2 AH-1807, Montreal, Canada, Jul. 2-6, 2018, Source: OPPO, Title: The issue of BWP switching for BFR RACH.
R2-1810008 3GPP TSG RAN WG2 AH-1807, Montreal, Canada, Jul. 2-6, 2018, Source: Sharp, Title: Remaining issues on DL BWP switching upon RACH procedure initiation.
R2-1810063 3GPP TSG RAN WG2 AH-1807, Montreal, Canada, Jul. 2-6, 2018, Source: Ericsson, Title: Dormant SCell state in NR.
R2-1810091 3GPP TSG RAN WG2 AH-1807, Montreal, Canada, Jul. 2-6, 2018, Source: Huawei, HiSilicon, Title: BWP switch for BFR.
R2-1810424 3GPP TSG RAN WG2 AH-1807, Montreal, Canada, Jul. 2-6, 2018, Source: Qualcomm Inc., Title: BFD procedure in DRX mode.
R2-1810513 3GPP TSG RAN WG2 AH-1807, Montreal, Canada, Jul. 2-6, 2018, Source: Huawei, HiSilicon, Title: Clarification on RA procedure for BFR on BWPs without CBRA occasions.
R2-1810641 3GPP TSG RAN WG2 AH-1807, Montreal, Canada, Jul. 2-6, 2018, Source: Huawei, HiSilicon, Title: Issues on BWP switch and search space configuration for BFR.
R2-1810643 3GPP TSG RAN WG2 AH-1807, Montreal, Canada, Jul. 2-6, 2018, Source: Huawei, HiSilicon, Title: RACH configuration on BWPs.
R2-1810797 3GPP TSG RAN WG2 AH-1807, Montreal, Canada, Jul. 2-6, 2018, Source: CATT, Title: Offline discussion #100 on DL-UL linking for CFRA.
R2-1811482 3GPP TSG-RAN WG2 Meeting #103, Gothenburg, Sweden, Aug. 20-24, 2018, Source: ZTE, Sanechips, Title: Consideration on implicit configuration of RS for BFD.
R2-1811896 3GPP TSG-RAN WG2 Meeting #103, Gothenburg, Sweden, Aug. 20-24, 2018, Source: Huawei, HiSilicon, Title: BWP switch for BFR.
R2-1812639 3GPP TSG-RAN WG2 Meeting #103, Gothenburg, Sweden, Aug. 20-24, 2018, Source: LG Electronics Inc., Title: BWP operation for BFR RA.
R2-1814198 3GPP TSG-RAN WG2 Meeting #103bis, Chengdu, China, Oct. 8-12, 2018, Source: vivo, Title: Clarification on the beam change during BFR.

(56) References Cited

OTHER PUBLICATIONS

RP-181344 3GPP TSG RAN Meeting #80, La Jolla, USA, Jun. 11-14, 2018, Source: Ericsson, Nokia, Nokia Shanghai Bell, Huawei, Title: New WID on MR-DC enhancements (NR_MRDC_Enh).
Dec. 16, 2019—European Extended Search Report—EP 19191018.1.
Dec. 20, 2019—European Extended Search Report—EP 19199208.0.
R2-1811208 3GPP TSG-RAN WG2 Meeting #103, Gothenburg, Sweden, Aug. 20-24, 2018, Source: CATT, Title: UL/DL BWP linkage for PDCCH order initiated CFRA.
R1-1807210 3GPP TSG RAN WG1 Meeting #93, Busan, Korea, May 21-25, 2018, Source: ASUSTek, Title: Remaining issues on beam management.
R1-1804788 3GPP TSG RAN WG1 Meeting #92b, Sanya, China, Apr. 16-20, 2018, Source: Qualcomm, Title: Beam failure recovery procedure.
Jan. 24, 2020—European Extended Search Report—EP 19199658.6.
R2-1802554 3GPP TSG-RAN WG2 #101, Athens, Greece, Feb. 26-Mar. 2, 2018, Source: ASUSTek, Title: Discussion on Beam Failure Recovery Request in NR.
R2-1803195 3GPP TSG-RAN WG2 #101, Athens, Greece, Feb. 26-Mar. 2, 2018, Source: Ericsson, Title: Beam Failure Recovery in Scell.
R2-1804877 3GPP TSG-RAN WG2 Meeting #101bis, Sanya, China, Apr. 16-20, 2018, Source: Xiaomi, Title: Consideration on SR Transmission Occasion Overlap with a UL-SCH Resource.
R2-18006164 3GPP TSG-RAN WG2 Meeting #101bis, Sanya, China, Apr. 16-20, 2018, Source: Media Tek Inc., Title: On Parallel SR and RACH Procedure in NR.
R1-170xxxx 3GPP TSG RAN WG1 Meeting #88b, Spokane, USA, Apr. 3-7, 2017, Source: Huawei, HiSilicon, Title: WF on Beam Failure Recovery.
R1-171xxxx 3GPP TSG RAN WG1 Meeting #90, Prague, Czech Republic, Aug. 21-25, 2017, Source: MediaTek Inc. Title: Offline Discussion on Beam Recovery Mechanism.
R1-1704230 3GPP TSG RAN WG1 Meeting #88b, Spokane, USA, Apr. 3-7, 2017, Source: Huawei, HiSilicon, Title: ink recovery procedure for beam failure.
3GPP TS 36.212 V14.3.0 (Jun. 2017); Technical Specification; 3rd Generation Partnership Project; Technical Specification Group Radio Access Network; Evolved Universal Terrestrial Radio Access (E-UTRA); Multiplexing and channel coding (Release 14).
3GPP TSG RAN WG1 Meeting #90, Prague, Czech Republic, Aug. 21-25, 2017, Title: RAN1 Chairman's Notes.
R1-1705719 3GPP TSG RAN WG1 Meeting #88bis, Spokane, USA, Apr. 3-7, 2017, Source: NTT DOCOMO, Inc., Title: Further views on mechanism to recover from beam failure.
R1-1711016 3GPP TSG RAN WG1 #89AH-NR, Qingdao, China, Jun. 27-30, 2017, Source: Ericsson, Title: UL beam management details.
R1-1712223 3GPP TSG RAN WG1 Meeting #90, Prague, Czech Republic, Aug. 21-25, 2017, Source: Huawei, HiSilicon, Title: UL beam management.
R1-1712224 3GPP TSG RAN WG1 Meeting #90, Prague, Czech Republic, Aug. 21-25, 2017, Source: Huawei, HiSilicon, Title: Procedure details for beam failure recovery.
R1-1712268 3GPP TSG RAN WG1 Meeting #90, Prague, Czech Republic, Aug. 21-25, 2017, Source: Xinwei, Title: Discussion on beam failure recovery.
R1-1712299 3GPP TSG RAN WG1 Meeting #90, Prague, Czech Republic, Aug. 21-25, 2017, Source: ZTE, Title: UL beam management for NR MIMO.
R1-1712378 3GPP TSG RAN WG1 Meeting #90, Prague, Czech Republic, Aug. 21-25, 2017, Source: CATT, Title: Considerations on UL beam management.
R1-1712379 3GPP TSG RAN WG1 Meeting #90, Prague, Czech Republic, Aug. 21-25, 2017, Source: CATT, Title: Beam failure detection and recovery.
R1-1712551 3GPP TSG RAN WG1 Meeting #90, Prague, Czech Republic, Aug. 21-25, 2017, Source: Intel Corporation, Title: Details for UL beam management.
R1-1712552 3GPP TSG RAN WG1 Meeting #90, Prague, Czech Republic, Aug. 21-25, 2017, Source: Intel Corporation, Title: Discussion for mechanism to recover from beam failure.
R1-1721672 3GPP TSG RAN WG1 Meeting #90, Prague, Czech Republic, Aug. 21-25, 2017, Source: Lenovo, Motorola Mobility, Title: Discussion of beam failure recovery.
R1-1712713 3GPP TSG RAN WG1 Meeting #90, Prague, Czech Republic, Aug. 21-25, 2017, Source: AT&T, Title: Mechanisms to recover from beam failure.
R1-1712838 3GPP TSG RAN WG1 Meeting #90, Prague, Czech Republic, Aug. 21-25, 2017, Source: Vivo, Title: Discussion on uplink beam management.
R1-1712966 3GPP TSG RAN WG1 Meeting #90, Prague, Czech Republic, Aug. 21-25, 2017, Source: Sony, Title: Considerations on UL beam management.
R1-1713287 3GPP TSG RAN WG1 Meeting #90, Prague, Czech Republic, Aug. 21-25, 2017, Source: Guangdong OPPO Mobile Telecom, Title: Discussion on the UL beam management.
R1-1713596 3GPP TSG RAN WG1 Meeting #90, Prague, Czech Republic, Aug. 21-25, 2017, Source: Samsung, Title: Discussion on UL beam management.
R1-1714143 3GPP TSG RAN WG1 Meeting #90, Prague, Czech Republic, Aug. 21-25, 2017, Source: InterDigital, Inc., Title: On efficient UL beam management.
R1-1714250 3GPP TSG RAN WG1 Meeting #90, Prague, Czech Republic, Aug. 21-25, 2017, Source: Nokia, Nokia Shanghai Bell, Title: SRS transmission for beam management.
R1-1714292 3GPP TSG RAN WG1 Meeting #90, Prague, Czech Republic, Aug. 21-25, 2017, Source: Ericsson, Title: On UL beam management.
R1-1714383 3GPP TSG RAN WG1 Meeting #90, Prague, Czech Republic, Aug. 21-25, 2017, Source: ASUSTek, Title: Considerations on UE Beamforming Management.
3GPP TSG RAN WG1 Meeting NR#3, Nagoya, Japan, Sep. 18-21, 2017, Title: RAN1 Chairman's Notes.
R1-1715441 3GPP TSG RAN WG1 Meeting NR#3, Nagoya, Japan, Sep. 18-21, 2017, Source: ZTE, Sanechips, Title: Discussion on beam recovery.
R1-1715620 3GPP TSG RAN WG1 Meeting NR#3, Nagoya, Japan, Sep. 18-21, 2017, Source: Vivo, Title: Discussion on beam failure recovery procedure.
R1-1715802 3GPP TSG RAN WG1 Meeting NR#3, Nagoya, Japan, Sep. 18-21, 2017, Source: CATT, Title: Beam failure detection and recovery.
R2-1708696 3GPP TSG RAN WG2 #99, Berlin, Germany, Aug. 21-25, 2017, Source: Huawei, HiSilicon, Title: Consideration on DRX with beam management.
R2-1708755 3GPP TSG RAN WG2 #99, Berlin, Germany, Aug. 21-25, 2017, Source: LG Electronics, Title: DRX related timers in NR (Revision of R2-1706750).
R2-1708791 3GPP TSG RAN WG2 #99, Berlin, Germany, Aug. 21-25, 2017, Source: Intel Corporation, Title: C-DRX enhancement in NR (Revision of R2-1707026).
R2-1709223 3GPP TSG RAN WG2 #99, Berlin, Germany, Aug. 21-25, 2017, Source: Qualcomm Incorporated, Title: Beam management in C-DRX.
R2-1709588 3GPP TSG RAN WG2 #99, Berlin, Germany, Aug. 21-25, 2017, Source: Samsung, Title: NR beamformed C-DRX operation (updated resubmission of R2-1705734).
R2-1709652 3GPP TSG RAN WG2 #99, Berlin, Germany, Aug. 21-25, 2017, Source: Qualcomm Incorporated, Apple, OPPO, Title: Wake-Up Signaling for C-DRX Mode.
R2-1709916 3GPP TSG RAN WG2 #99, Berlin, Germany, Aug. 21-25, 2017, Source: Ericsson, Title: Reply LS to SA2 on 5QIs for URLLC.
Aug. 27, 2019—European Extended Search Report—EP 19173892.1.
3GPP TSG-RAN WG1 #89: "Beam failure recovery mechanism", May 15, 2017.

(56) References Cited

OTHER PUBLICATIONS

3GPP TSG-RAN WG2 Meeting#AH: "Random access procedure for beam recovery request", Jun. 27, 2017.
Sep. 25, 2019—European Extended Search Report—EP 19166863.1.
R1-1803368 3GPP TSG RAN WG1 Meeting #92, Athens, Greece, Feb. 26-Mar. 2, 2018, Source: [RAN1], Title: Draft LS reply to RAN2 on beam failure recovery.
R1-1803441 3GPP TSG RAN WG1 Meeting #92, Athens, Greece, Feb. 26-Mar. 2, 2018, Source: MediaTek Inc., Title: Summary 2 on Remaing issues on Beam Failure Recovery.
R2-1811483 3GPP TSG-RAN WG2 Meeting #103, Gothenburg, Sweden, Aug. 20-24, 2018, Source: ZTE, Sanechips, Title: CR for the reset of BFD in 38.321.
R2-1812108 3GPP TSG-RAN WG2 Meeting #103, Gothenburg, Sweden, Aug. 20-24, 2018, Source: Nokia, Nokia Shanghai Bell, Title: Reset of BFD.
3GPP TS 38.213 V15.2.0 (Jun. 2018), Technical Specification, 3rd Generation Partnership Project; Technical Specification Group Radio Access Network; NR; Physical layer procedures for control (Release 15).
R2-1806229 3GPP TSG-RAN WG2 Meeting #101bis, Sanya, China, Apr. 16-20, 2018, Source: Samsung, Title: Miscellaneous corrections.
R1-1719423 3GPP TSG RAN WG1 Meeting #91, Reno, USA, Nov. 27-Dec. 1, 2017, Source: Huawei, HiSilicon, Title: Remaining details on beam failure recovery.
R1-1719619 3GPP TSG RAN WG1 Meeting #91, Reno, USA, Nov. 27-Dec. 1, 2017, Source: Fujitsu, Title: Discussion on beam failure recovery.
R1-1719633 3GPP TSG RAN WG1 Meeting #91, Reno, USA, Nov. 27-Dec. 1, 2017, Source: AT&T, Title: Remaining Details on Mechanisms to Recover from Beam Failure.
R1-1719695 3GPP TSG RAN WG1 Meeting #91, Reno, USA, Nov. 27-Dec. 1, 2017, Source: Spreadtrum Communications, Title: Remaining issues on beam failure recovery mechanism.
R1-1719770 3GPP TSG RAN WG1 Meeting #91, Reno, USA, Nov. 27-Dec. 1, 2017, Source: vivo, Title: Remaining details on mechanism to recover from beam failure.
R1-1719809 3GPP TSG RAN WG1 Meeting #91, Reno, USA, Nov. 27-Dec. 1, 2017, Source: Huawei, HiSilicon, Title: Design of PUCCH-based Beam Failure Recovery.
R1-1719908 3GPP TSG RAN WG1 Meeting #91, Reno, USA, Nov. 27-Dec. 1, 2017, Source: LG Electronics, Title: Discussion on beam failure recovery.
R1-1719988 3GPP TSG RAN WG1 Meeting #91, Reno, USA, Nov. 27-Dec. 1, 2017, Source: Discussion on Beam Recovery Mechanism.
R1-1720072 3GPP TSG RAN WG1 Meeting #91, Reno, USA, Nov. 27-Dec. 1, 2017, Source: Intel Corporation, Title: Remaining Issues on Beam Failure Recovery.
R1-1720291 3GPP TSG RAN WG1 Meeting #91, Reno, USA, Nov. 27-Dec. 1, 2017, Source Samsung, Title: Beam failure recovery.
R1-1720305 3GPP TSG RAN WG1 Meeting #91, Reno, USA, Nov. 27-Dec. 1, 2017, Source: Samsung, Title: Discussion on cross-carrier beam management.
R1-1720574 3GPP TSG RAN WG1 Meeting #91, Reno, USA, Nov. 27-Dec. 1, 2017, Source: NEC, Title: On Partial Beam Failure Recovery.
R1-1720631 3GPP TSG RAN WG1 Meeting #91, Reno, USA, Nov. 27-Dec. 1, 2017, Source: InterDigital, Inc., Title: Remaining issues on beam recovery.
R1-1720804 3GPP TSG RAN WG1 Meeting #91, Reno, USA, Nov. 27-Dec. 1, 2017, Source: NTT DOCOMO, Title: Remaining issue on beam recovery.
R1-1720891 3GPP TSG RAN WG1 Meeting #91, Reno, USA, Nov. 27-Dec. 1, 2017, Source: Nokia, Nokia Shanghai Bell, Title: Beam Recovery in NR.
R1-1721523 3GPP TSG RAN WG1 Meeting #91, Reno, USA, Nov. 27-Dec. 1, 2017, Source: NTT DOCOMO, Samsung, Mediatek, AT&T, ZTE, Intel, Huawei, CATT, Qualcomm, Fujitsu, Spreadtrum, Title: WF for handling partial beam failure.
R1-1721673 3GPP TSG RAN WG1 Meeting #91, Reno, USA, Nov. 27-Dec. 1, 2017, Source: NTT DOCOMO, Intel, Huawei, NEC, Spreadtrum, Mediatek, China Telecom, AT&T, Samsung, ZTE, CATT, Qualcomm, Fujitsu, Nokia, Title: WF for handling partial beam failure.
R1-1800100 3GPP TSG RAN WG1 Meeting Ad Hoc, Vancouver, Canada, Jan. 22-26, 2018, Source: Huawei, HiSilicon, Title: Summary of remaining issues of beam measurement, reporting and indication.
R1-1800101 3GPP TSG RAN WG1 Meeting Ad Hoc, Vancouver, Canada, Jan. 22-26, 2018, Source: Huawei, HiSilicon, Title: Summary of remaining issues on beam failure recovery.
R1-1800110 3GPP TSG RAN WG1 Meeting Ad Hoc, Vancouver, Canada, Jan. 22-26, 2018, Source: ZTE, Sanechips, Title: Remaining details on bean management.
R1-1800111 3GPP TSG RAN WG1 Meeting Ad Hoc, Vancouver, Canada, Jan. 22-26, 2018, Source: ZTE, Sanechips, Title: Remaining details on mean management.
R1-1800312 3GPP TSG RAN WG1 Meeting Ad Hoc, Vancouver, Canada, Jan. 22-26, 2018, Source: Intel Corporation, Title: Remaining Issues on Beam Failure Recovery.
R1-1800526 3GPP TSG RAN WG1 Meeting Ad Hoc, Vancouver, Canada, Jan. 22-26, 2018, Source: Huawei, HiSilicon, Title: Remaining details of PHR.
R1-1800542 3GPP TSG RAN WG1 Meeting Ad Hoc, Vancouver, Canada, Jan. 22-26, 2018, Source: CMCC, Title: Discussion on remaining issues for beam indication.
R1-1800543 3GPP TSG RAN WG1 Meeting Ad Hoc, Vancouver, Canada, Jan. 22-26, 2018, Source: CMCC, Title: Discussion on beam recovery mechanism.
R1-1800582 3GPP TSG RAN WG1 Meeting Ad Hoc, Vancouver, Canada, Jan. 22-26, 2018, Source: AT&T, Title: TCI states configuration design to support dynamic BWP switching.
R1-1800583 3GPP TSG RAN WG1 Meeting Ad Hoc, Vancouver, Canada, Jan. 22-26, 2018, Source: AT&T, Title: In support of partial beam failure.
R1-1800622 3GPP TSG RAN WG1 Meeting Ad Hoc, Vancouver, Canada, Jan. 22-26, 2018, Source: ASUSTek, Title: Remaining Issues for Beam Failure Recovery Procedure.
R1-1800629 3GPP TSG RAN WG1 Meeting Ad Hoc, Vancouver, Canada, Jan. 22-26, 2018, Source: InterDigital, Inc., Title: Remaining details on beam failure recovery.
R1-1800642 3GPP TSG RAN WG1 Meeting Ad Hoc, Vancouver, Canada, Jan. 22-26, 2018, Source: ITRI, Title: Discussion on timer for beam failure recovery.
R1-1800660 3GPP TSG RAN WG1 Meeting Ad Hoc, Vancouver, Canada, Jan. 22-26, 2018, Source: NTT DOCOMO, Title: Remaining Issue on Beam Indication.
R1-1800661 3GPP TSG RAN WG1 Meeting Ad Hoc, Vancouver, Canada, Jan. 22-26, 2018, Source: NTT DOCOMO, Title: Remaining issue on beam recovery.
R1-1800682 3GPP TSG RAN WG1 Meeting Ad Hoc, Vancouver, Canada, Jan. 22-26, 2018, Source: NTT DOCOMO, Inc., Title: Remaining issues on PHR.
R1-1800699 3GPP TSG RAN WG1 Meeting Ad Hoc, Vancouver, Canada, Jan. 22-26, 2018, Source: Ericsson, Title: Remaining details on beam management.
R1-1800700 3GPP TSG RAN WG1 Meeting Ad Hoc, Vancouver, Canada, Jan. 22-26, 2018, Source: Ericsson, Title: Remaining details and corrections for beam recovery.
R1-1800734 3GPP TSG RAN WG1 Meeting Ad Hoc, Vancouver, Canada, Jan. 22-26, 2018, Source: InterDigital, Inc., Title: Remaining issues on beam management.
R1-1800751 3GPP TSG RAN WG1 Meeting Ad Hoc, Vancouver, Canada, Jan. 22-26, 2018, Source: Nokia, Nokia Shanghai Bell, Title: Remaining details on beam indication, measurement and reporting.
R1-1800752 3GPP TSG RAN WG1 Meeting Ad Hoc, Vancouver, Canada, Jan. 22-26, 2018, Source: Nokia, Nokia Shanghai Bell, Title: Remaining Details on Beam Recovery.

(56) References Cited

OTHER PUBLICATIONS

R1-1800859 3GPP TSG RAN WG1 Meeting Ad Hoc, Vancouver, Canada, Jan. 22-26, 2018, Source: Qualcomm, Title: Beam management for NR.
R1-1800860 3GPP TSG RAN WG1 Meeting Ad Hoc, Vancouver, Canada, Jan. 22-26, 2018, Source: Qualcomm Incorporated, Title: Remaining details on beam recovery procedure.
R1-1801006 3GPP TSG RAN WG1 Meeting Ad Hoc, Vancouver, Canada, Jan. 22-26, 2018, Source: Ericsson, Title; Feature lead summary 1 of beam measurement and reporting.
R1-1801089 3GPP TSG RAN WG1 Meeting Ad Hoc, Vancouver, Canada, Jan. 22-26, 2018, Source: Media Tec Inc., Title: Summary for Remaining issue on Beam Failure Recovery.
R1-1801143 3GPP TSG RAN WG1 Meeting Ad Hoc, Vancouver, Canada, Jan. 22-26, 2018, Source: Ericsson, Title: Feature lead summary 2 of beam measurement and reporting.
R1-1801160 3GPP TSG RAN WG1 Meeting Ad Hoc, Vancouver, Canada, Jan. 22-26, 2018, Source: NTT DOCOMO, Qualcomm, Huawei, HiSilicon, ZTE, Sanechips, Fujitsu, Title: Updated offline proposal on PHR.
R1-1801187 3GPP TSG RAN WG1 Meeting Ad Hoc, Vancouver, Canada, Jan. 22-26, 2018, Source: Ericsson, Title: Feature lead summary 3 of beam measurement and reporting.
R1-1801197 3GPP TSG RAN WG1 Meeting Ad Hoc, Vancouver, Canada, Jan. 22-26, 2018, Source: MediaTek Inc., Title: Offline Summary for Remaining issues on Beam Failure Recovery.
R1-1801223 3GPP TSG RAN WG1 Meeting Ad Hoc, Vancouver, Canada, Jan. 22-26, 2018, Source: MediaTek Inc., Title: Offline Discussion Summary for Beam Failure Recovery.
R1-1801228 3GPP TSG RAN WG1 Meeting Ad Hoc, Vancouver, Canada, Jan. 22-26, 2018, Source: Ericsson, Title: Text proposal on source QCL for semi-persistent CSI-RS.
R1-1801229 3GPP TSG RAN WG1 Meeting Ad Hoc, Vancouver, Canada, Jan. 22-26, 2018, Source: Ericsson, Title: Text proposal for source spatial relation for semi-persistent SRS.
R1-1801230 3GPP TSG RAN WG1 Meeting Ad Hoc, Vancouver, Canada, Jan. 22-26, 2018, Source: Ericsson, Title: Text proposal on priority rules for PUCCH carrying RSRP reports and SRS.
Dec. 14, 2022—EP Office Action—EP App. No. 19199658.6.
Huawei et al: "RRC configuration enhancement for B5C", 3GPP Draft; R2-152251 RRC Configuration Enhancement for B5C, 3rd Generation Partnership Project (3GPP), Mobile Competence Centre ; 650, Route Des Lucioles ; F-06921 Sophia-Antipolis Cedex ; France, vol. RAN WG2, No. Fukuoka, Japan; May 25-29, 2015 May 24, 2015 (May 24, 2015).
R2-1707001 3GPP TSG-RAN WG2 Meeting #AH, Qingdao, China, Jun. 27-29, 2017, Source: Lenovo, Motorola Mobility, Title: Random access procedure for beam recovery request.
R1-17111617 3GPP TSG RAN WG1 NR AH#2, Qingdao, China, Jun. 27-30, 2017, Source: CATT, Title: RACH power control and power ramping procedure (revision of R1-1710034).
R1-1711161 3GPP TSG RAN WG1 NR#2, Qingdao, China, Jun. 27-30, 2017, Source: Qualcomm Incorporated, Title: Beam recovery procedures.
International Search Report and Written Opinion for PCT/US2018/046368 dated Dec. 13, 2018.
Apr. 15, 2019—Extented European Search Report—EP 19150964.5.
R1-1708678 3GPP TSG-RAN WG1 #89, Hangzhou, China, May 15-19, 2017, Source: Ericsson, Title: Beam failure recovery mechanism.
May 22, 2019—Extended European Search Report—19156175.2.
R2-1800560 3GPP TSG-RAN WG2 NR, Vancouver, Canada, Jan. 22-26, 2018, Source: Sharp, Title: Remaining issues on beam failure recovery.
R2-1800632 3GPP TSG-RAN WG2 AH, Vancouver, Canada, Jan. 22-26, 2018, Source: Huawei, HiSilicon, Title: Remaining issue for beam failure recovery.
R2-1801049 3GPP TSG-RAN WG2 AH, Vancouver, Canada, Jan. 22-26, 2018, Source: Huawei, HiSilicon, Title: Non-contention based random access for beam failure recovery in CA.
3GPP TS 38.321 V15.0.0 (Dec. 2017); Technical Specification; 3rd Generation Partnership Project; Technical Specification Group Radio Access Network; NR; Medium Access Control (MAC) protocol specification (Release 15).
3GPP TS 38.213 V15.0.1 (Feb. 2018); Technical Specification; 3rd Generation Partnership Project; Technical Specification Group Radio Access Network; NR; Physical layer procedures for control (Release 15).
R2-1804475 3GPP TSG-RAN WG2 Meeting #101bis, Sanya, China, Apr. 16-20, 2018, Source: Spreadtrum Communications, Title: Beam Failure recovery on SCell.
May 14, 2019—European Extended Search Report—19157460.7.
R2-1710562 3GPP TSG-RAN WG2 #99bis, Prague, Czech Republic, Oct. 9-13, 2017, Source: Huawei, HiSilicon, Title: RAN2 aspects of DL beam management (revision of R2-1708695).
3GPP TS 36.211 V14.3.0 (Jun. 2017); Technical Specification; 3rd Generation Partnership Project; Technical Specification Group Radio Access Network; Evolved Universal Terrestrial Radio Access (E-UTRA); Physical channels and modulation (Release 14).
3GPP TS 36.213 V14.3.0 (Jun. 2017); Technical Specification; 3rd Generation Partnership Project; Technical Specification Group Radio Access Network; Evolved Universal Terrestrial Radio Access (E-UTRA); Physical layer procedures (Release 14).
3GPP TS 36.321 V.14.3.0 (Jun. 2017); Technical Specification; 3rd Generation Partnership Project; Technical Specification Group Radio Access Network; Evolved Universal Terrestrial Radio Access (E-UTRA); Medium Access Control (MAC) protocol specification (Release 14).
3GPP TS 36.331 V.14.3.0 (Jun. 2017); Technical Specification; 3rd Generation Partnership Project; Technical Specification Group Radio Access Network; Evolved Universal Terrestrial Radio Access (E-UTRA); Radio Resource Control (RRC); Protocol specification (Release 14).
3GPP TR 38.802 V14.1.0 (Jun. 2017), Technical Report, 3rd Generation Partnership Project; Technical Specification Group Radio Access Network; Study on New Radio Access Technology Physical Layer Aspects (Release 14).
3GPP TR 38.912 V14.0.0 (Mar. 2017), Technical Report, 3rd Generation Partnership Project; Technical Specification Group Radio Access Network; Study on New Radio (NR) Access Technology (Release 14).
R1-171xxxx 3GPP TSG RAN WG1 Meeting #90, Prague, Czech Republic, Aug. 21-25, 2017, Source: MCC Support, Title: Draft Report of 3GPP TSG RAN WG1 #89 v0.2.0 (Hangzhou, China, May 15-19, 2017).
R1-171xxxx 3GPP TSG RAN WG1 Meeting #90, Prague, Czech Republic, Aug. 21-25, 2017, Source: MCC Support, Title: Draft Report of 3GPP TSG RAN WG1 #AH NR2 v0.1.0 (Qingdao, China, Jun. 27-30, 2017).
R1-1708890 3GPP TSG RAN WG1 Meeting #89, Hangzhou, China, May 15-19, 2017, Source: MCC Support, Title: Final Report of 3GPP TSG RAN WG1 #88bis v1.0.0 (Spokane, Washington, Apr. 3-7, 2017).
R1-1709907 3GPP TSG RAN WG1 NR Ad-Hoc#2, Qingdao, China, Jun. 27-30, 2017, Source: Xinwei, Title: Discussion on Beam Failure Recovery.
R1-1709929 3GPP TSG RAN WG1 NR Ad Hoc Meeting, Qingdao, China, Jun. 27-30, 2017, Source: Huawei, HiSilicon, Title: General views on beam failure recovery.
R1-1710058 3GPP TSG RAN WG1 NR Ad-Hoc#2, Qingdao, China, Jun. 27-30, 2017, Source: CATT, Title: Considerations on DL beam failure and recovery.
R1-1710283 3GPP TSG RAN WG1 NR Ad-Hoc#2, Qingdao, China, Jun. 27-30, 2017, Source: LG Electronics, Title: Discussion on beam failure recovery.
R1-1710400 3GPP TSG RAN WG1 NR Ad-Hoc#2, Qingdao, China, Jun. 27-30, 2017, Source: Vivo, Title: Beam failure recovery procedure.

(56) References Cited

OTHER PUBLICATIONS

R1-1710596 3GPP TSG RAN WG1 NR Ad-Hoc#2, Qingdao, China, Jun. 27-30, 2017, Source: Lenovo, Motorola Mobility, Title: Discussion of beam recovery procedure.
R1-1710810 3GPP TSG RAN WG1 AH_NR Meeting, Qingdao, China, Jun. 27-30, 2017, Source: MediaTek Inc., Title: Mechanism for flexible beam failure recovery.
R1-1710926 3GPP TSG RAN WG1 NR Ad-Hoc#2, Qingdao, China, Jun. 27-30, 2017, Source: InterDigital, Inc., Title: On Remaining Details of Beam Failure Recovery.
R1-1711017 3GPP TSG RAN WG1 #89ah-NR, Qingdao, China, Jun. 27-30, 2017, Source: Ericsson, Title: Mechanism to recover from beam failure.
R1-1711291 3GPP TSG RAN WG1 NR Ad-Hoc##2, Qingdao, China, Jun. 27-30, 2017, Source: Nokia, Alcatel-Lucent Shanghai Bell, Title: Beam Recovery.
R2-1706680 3GPP TSG-RAN WG2 NR-Adhoc, Qingdao, China, Jun. 27-29, 2017, Source: AT&T, Title: Beam Failure Recovery Mechanism and RLF.
3GPP TSG-RAN WG2 NR Ad Hoc, Qingdao, China, Jun. 27-29, 2017, Source: RAN2 Chairman (Intel), Object: Chairman Notes.
PRACH—Preamble Detection and Timing Advance Estimation for multi-UE in 3GPP LTE, 3GPP LTE Solutions, from www.mymowireless.com.
Jul. 16, 2019—European Extended Search Report—EP 19166184.2.
R1-1702078 3GPP TSG RAN WG1 Meeting #88, Athens, Greece, Feb. 13-17, 2017, Source: CATT, Title: Considerations on beam recovery mechanism.
R1-1707121 3GPP TSG RAN WG1 Meeting #89, Hangzhou, China, May 15-19, 2017, Source: ZTE, Title: Discussion on beam recovery mechanism.
3GPP TS 38.213 V15.0.0 (Dec. 2017); Technical Specification; 3rd Generation Partnership Project; Technical Specification Group Radio Access Network; NR; Physical layer procedures for control (Release 15).
3GPP TS 38.213 V15.1.0 (Mar. 2018); Technical Specification; 3rd Generation Partnership Project; Technical Specification Group Radio Access Network; NR; Physical layer procedures for control (Release 15).
3GPP TS 38.321 V15.1.0 (Mar. 2018); Technical Specification; 3rd Generation Partnership Project; Technical Specification Group Radio Access Network; NR; Medium Access Control (MAC) protocol specification (Release 15).
3GPP TS 38.331 V15.1.0 (Mar. 2018); Technical Specification; 3rd Generation Partnership Project; Technical Specification Group Radio Access Network; NR; Radio Resource Control (RRC) protocol specification (Release 15).
R1-180xxxx 3GPP TSG RAN WG1 Meeting #93 Busan, South Korea, May 21-25, 2018, Source: Ericsson, Title: Feature lead summary for beam measurement and reporting.
R1-180xxxx 3GPP TSG RAN WG1 Meeting #92bis, Sanya, China, Apr. 16-20, 2018, Source: MediaTek, Inc., Title: Summary 1 on Remaining issues on Beam Failure Recovery.
R1-180xxxx 3GPP TSG RAN WG1 Meeting #93 Busan, South Korea, May 21-25, 2018, Source: MediaTek Inc., Title: Summary on Remaining issues on Beam Failure Recovery.
R1-1704400 3GPP TSG RAN WG1 Meeting #88bis, Spokane, USA, Apr. 3-7, 2017, Source: ZTE, ZTE Microelectronics, Title: Discussion on beam recovery mechanism.
R1-1704465 3GPP TSG RAN WG1 Meeting #88bis, Spokane, USA, Apr. 3-7, 2017, Source: MediaTek, Inc., Title: Discussion on beam recovery mechanism.
R2-1815644 3GPP TSG-RAN WG2 Meeting #103bis, Chengdu, PR China, Oct. 8-12, 2018, Source: Ericsson, Samsung, Title: Correction for Reconfiguration of CFRA during ongoing RA.
R2-1811325 3GPP TSG-RAN WG2 Meeting #103, Gothenburg, Sweden, Aug. 20-24, 2018, Source: Samsung Electronics, Title: Handling Beam Failure Recovery Configuration Update.

3GPP TS 38.321 V15.2.0 (Jun. 2018), Technical Specification, 3rd Generation Partnership Project; Technical Specification Group Radio Access Network; NR; Medium Access Control (MAC) protocol specification (Release 15).
R2-1811149 3GPP TSG-RAN WG2 Meeting #103, Gothenburg, Sweden, Aug. 20-24, 2018, Source: OPPO, Title: CR on beam failure recovery configuration.
R2-1811593 3GPP TSG-RAN WG2 Meeting #103, Gothenburg, Sweden, Aug. 20-24, 2018, Source: ZTE Corporation, Sanechips, Title: CR for the configuration of BeamFailureRecoveryConfig.
3GPP TS 38.331 V15.2.1 (Jun. 2018), Technical Specification, 3rd Generation Partnership Project; Technical Specification Group Radio Access Network; NR; Radio Resource Control (RRC) protocol specification (Release 15).
R1-180XXXX 3GPP TSG-RAN WG1 Meeting #94, Gothenburg, Sweden, Aug. 20-24, 2018, Source: Ericsson, Title: Feature lead summary beam management v2.
R2-1804763 3GPP TSG-RAN WG2 Meeting #101bis, Sanya, China, Apr. 16-20, 2018, Source: Nokia, Nokia Shanghai Bell, Title: Running MAC CR for euCA.
R1-180XXXX 3GPP TSG-RAN WG1 Meeting #94, Gothenburg, Sweden, Aug. 20-24, 2018, Source: NTT DOCOMO, Inc., Title: Offline summary for PDCCH structure and search space.
R1-180XXXX 3GPP TSG-RAN WG1 Meeting #94, Gothenburg, Sweden, Aug. 20-24, 2018, Source: MediaTek Inc., Title: Summary #1 on Remaining Issues on Beam Failure Recovery.
R1-1712153 3GPP TSG RAN WG1 Meeting #90, Prague, Czech Republic, Aug. 21-25, 2017, Source: Huawei, HiSilicon, Title: Overview of bandwidth part.
R1-1713204 3GPP TSG RAN WG1 Meeting #90, Prague, Czech Republic, Aug. 21-25, 2017, Source: LG Electronics, Title: Further remaining details on wider bandwidth operation.
R1-1713978 3GPP TSG RAN WG1 Meeting #90, Prague, Czech Republic, Aug. 21-25, 2017, Source: MediaTek Inc., Title: Further Details on Bandwidth Part Operation in NR.
R1-1719650 3GPP TSG RAN WG1 Meeting #91, Reno, USA, Nov. 27-Dec. 1, 2017, Source: AT&T, Title: Remaining details on bandwidth parts.
R1-1719651 3GPP TSG RAN WG1 Meeting #91, Reno, USA, Nov. 27-Dec. 1, 2017, Source: AT&T, Title: Remaining details on carrier aggregation.
R1-1721027 3GPP TSG RAN WG1 Meeting #91, Reno, USA, Nov. 27-Dec. 1, 2017, Source: Ericsson, Title: On Carrier aggregation related aspects.
R1-1800879 3GPP TSG RAN WG1 NR Ad Hoc, Vancouver, Canada, Jan. 22-26, 2018, Source: Qualcomm Incorporated, Title: Remaining Issues on BWP.
R1-1803622 3GPP TSG RAN WG1 Meeting #92, Sanya, China, Apr. 16-20, 2018, Source: NEC, Title: Remaining issues on beam failure recovery.
R1-1804211 3GPP TSG RAN WG1 Meeting #92bis, Sanya, China, Apr. 16-20, 2018, Source: Lenovo, Motorola Mobility, Title: Discussion of beam failure recovery for Carrier Aggregation.
R1-1806281 3GPP TSG-RAN WG1 #93, Busan, Korea, May 21-25, 2018, Source: CATT, Title: Remaining issues on beam failure recovery.
R1-1806508 3GPP TSG-RAN WG1 #93, Busan, Korea, May 21-25, 2018, Source: Intel Corporation, Title: Remaining issues on beam failure recovery.
R1-1806789 3GPP TSG-RAN WG1 #93, Busan, Korea, May 21-25, 2018, Source: MediaTek Inc., Title: Remaining issues on beam failure recovery.
R1-1807796 3GPP TSG-RAN WG1 #93, Busan, Korea, May 21-25, 2018, Source: MediaTek Inc., Title: Summary 2 on Remaining issues on beam failure recovery.
R1-1808720 3GPP TSG-RAN WG1 Meeting #94, Gothenburg, Sweden, Aug. 20-24, 2018, Source: Intel Corporation, Title: On SCell Beam Failure Recovery.
R1-1810020 3GPP TSG-RAN WG1 Meeting #94, Gothenburg, Sweden, Aug. 20-24, 2018, Source: Samsung, Title: CR to 38.213 capturing the RAN1#94 meeting agreements.

(56) References Cited

OTHER PUBLICATIONS

R2-1713170 3GPP TSG RAN WG2 Meeting #100, Reno, USA, Nov. 27-Dec. 1, 2017, Source: Nokia (rapporteur), Title: Report of [99bis#32][LTE/euCA] Faster activation for Scells (Nokia).
R2-1714289 3GPP TSG RAN WG2 Meeting #100, Reno, USA, Nov. 27-Dec. 1, 2017, Source: Nokia, Nokia Shanghai Bell, Title: Running CR for euCA Stage-2.
R2-1800866 3GPP TSG-RAN WG2 AH, Vancouver, Canada, Jan. 22-26, 2018, Source: vivo, Title: RACH configuration for beam recovery.
R2-1800895 3GPP TSG-RAN WG2 AH, Vancouver, Canada, Jan. 22-26, 2018, Source: vivo, Title: Discussion on the impact on beam failure recovery.
R2-1801432 3GPP TSG RAN WG2 NR Ad Hoc, Vancouver, Canada, Jan. 22-26, 2018, Source: Qualcomm Incorporated, Title: Dormant BWP for fast SCell activation.
R2-1801926 3GPP TSG-RAN WG2 #101, Athens, Greece, Feb. 26-Mar. 2, 2018, Source: ZTE, Sanechips, Title: Remaining considerations on RACH procedure for BFR.
R2-1802143 3GPP TSG-RAN WG2 #101, Athens, Greece, Feb. 26-Mar. 2, 2018, Source: CATT, Title: RACH reattempt considering beam selection.
R2-1802151 3GPP TSG-RAN WG2 #101, Athens, Greece, Feb. 26-Mar. 2, 2018, Source: CATT, Title: Beam failure recovery.
R2-1802756 3GPP TSG RAN WG2 Meeting #101, Athens, Greece, Feb. 26-Mar. 2, 2018, Source: Nokia, Nokia Shanghai Bell, Title: Remaining details on temporary CQI reporting during activation.
R2-1803229 3GPP TSG-RAN WG2 #101, Athens, Greece, Feb. 26-Mar. 2, 2018, Source: Nokia, Nokia Shanghai Bell, Title: BWP switch interaction with contention free BFR preamble.
R2-1803564 3GPP TSG RAN WG2 Meeting #101, Athens, Greece, Feb. 26-Mar. 2, 2018, Source: Qualcomm Incorporated, Title: Dormant BWP for fast SCell activation.
R2-1804279 3GPP TSG-RAN WG2 Meeting #101, Sanya, China, Apr. 16-20, 2018, Source: ASUSTek, Title: UE behaviours upon beam failure and recovery.
R2-1804303 3GPP TSG-RAN WG2 Meeting #101, Sanya, China, Apr. 16-20, 2018, Source: Samsung, Title: MAC Impacts: Beam Failure Recovery for SCell.
R2-1804407 3GPP TSG-RAN WG2 Meeting #101, Sanya, China, Apr. 16-20, 2018, Source: ZTE, Sanechips, Title: Consideration on beam failure recovery for SCell.
R2-1804410 3GPP TSG-RAN WG2 Meeting #101, Sanya, China, Apr. 16-20, 2018, Source: Huawei, HiSilicon, Title: Beam failure recovery using MAC CE.
R2-1804411 3GPP TSG-RAN WG2 Meeting #101, Sanya, China, Apr. 16-20, 2018, Source: Huawei, HiSilicon, Title: BWP issues for BFR.
R2-1804434 3GPP TSG-RAN WG2 Meeting #101, Sanya, China, Apr. 16-20, 2018, Source: OPPO, Title: Issues on supporting SCell BFR RACH.
R2-1804481 3GPP TSG-RAN WG2 Meeting #101, Sanya, China, Apr. 16-20, 2018, Source: CATT, Title: Leftover issues for BFR.
R2-1804482 3GPP TSG-RAN WG2 Meeting #101, Sanya, China, Apr. 16-20, 2018, Source: CATT, Title: BFR configurations and fallback options.
R2-1804483 3GPP TSG-RAN WG2 Meeting #101, Sanya, China, Apr. 16-20, 2018, Source: CATT, Title: BFR on SCell.
R2-1804696 3GPP TSG-RAN WG2 Meeting #101, Sanya, China, Apr. 16-20, 2018, Source: vivo, Title: Discussion on the SCell BFR.
R2-1805204 3GPP TSG-RAN WG2 Meeting #101, Sanya, China, Apr. 16-20, 2018, Source: Lenovo, Motorola Mobility, Title: Dedicated PRACH resource for beam failure recovery.
R2-1805414 3GPP TSG-RAN WG2 Meeting #101, Sanya, China, Apr. 16-20, 2018, Source: Ericsson, Title: Beam Failure Recovery in SCell and contention-based BFR on SpCell.
R2-1805896 3GPP TSG-RAN WG2 Meeting #101, Sanya, China, Apr. 16-20, 2018, Source: Huawei, HiSilicon, Title: ASN.1 for Beam Failure Recovery.
R2-1805905 3GPP TSG-RAN WG2 Meeting #101, Sanya, China, Apr. 16-20, 2018, Source: Huawei, HiSilicon, Title: Discussions on RA for SCells BFR.

\* cited by examiner

BEAM CONFIGURATION FOR SECONDARY CELLS

CROSS-REFERENCE TO RELATED APPLICATIONS

This application is a continuation of U.S. application Ser. No. 16/581,986, filed on Sep. 25, 2019, which claims the benefit of U.S. Provisional Application No. 62/736,233, filed on Sep. 25, 2018. The above-referenced applications are hereby incorporated by reference in their entirety.

BACKGROUND

Wireless communications may use multiple serving beams and/or other wireless resources. A base station and/or a wireless device may use the same serving beam for a plurality of cells. A beam failure in a first cell may result in a beam failure in one or more second cells based on each of the second cell(s) using the same serving beam as the first cell.

SUMMARY

The following summary presents a simplified summary of certain features. The summary is not an extensive overview and is not intended to identify key or critical elements.

Wireless communications using multiple serving beams are described. A wireless device may be configured (e.g., by a base station) to use a first serving beam in a plurality of cells comprising a first cell and one or more second cells. A beam failure associated with the first cell may occur. A beam failure associated with the one or more second cells may also occur, for example, based on the wireless device using the first serving beam in both the first cell and in the one or more second cells. The wireless device may receive (e.g., from a base station) a reconfiguration message for the first cell, based on the beam failure associated with the first cell. The reconfiguration message may comprise an indication for the wireless device to switch to a second serving beam in the first cell. The wireless device may switch to the second serving beam in the one or more second cells, for example, without receiving a separate reconfiguration message for the one or more second cells, and/or based on the beam failure associated with the one or more second cells. The wireless device may switch to the second serving beam in the one or more second cells, for example, based on a cell group parameter provided in one or more beam failure recovery (BFR) parameters for the first cell, and/or based on the cell group parameter provided in the reconfiguration message for the first cell. Signaling overhead may be reduced, battery consumption may be reduced, and/or communications may be re-established more expeditiously without a separate reconfiguration message for the one or more second cells.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

DETAILED DESCRIPTION

Figure 1:
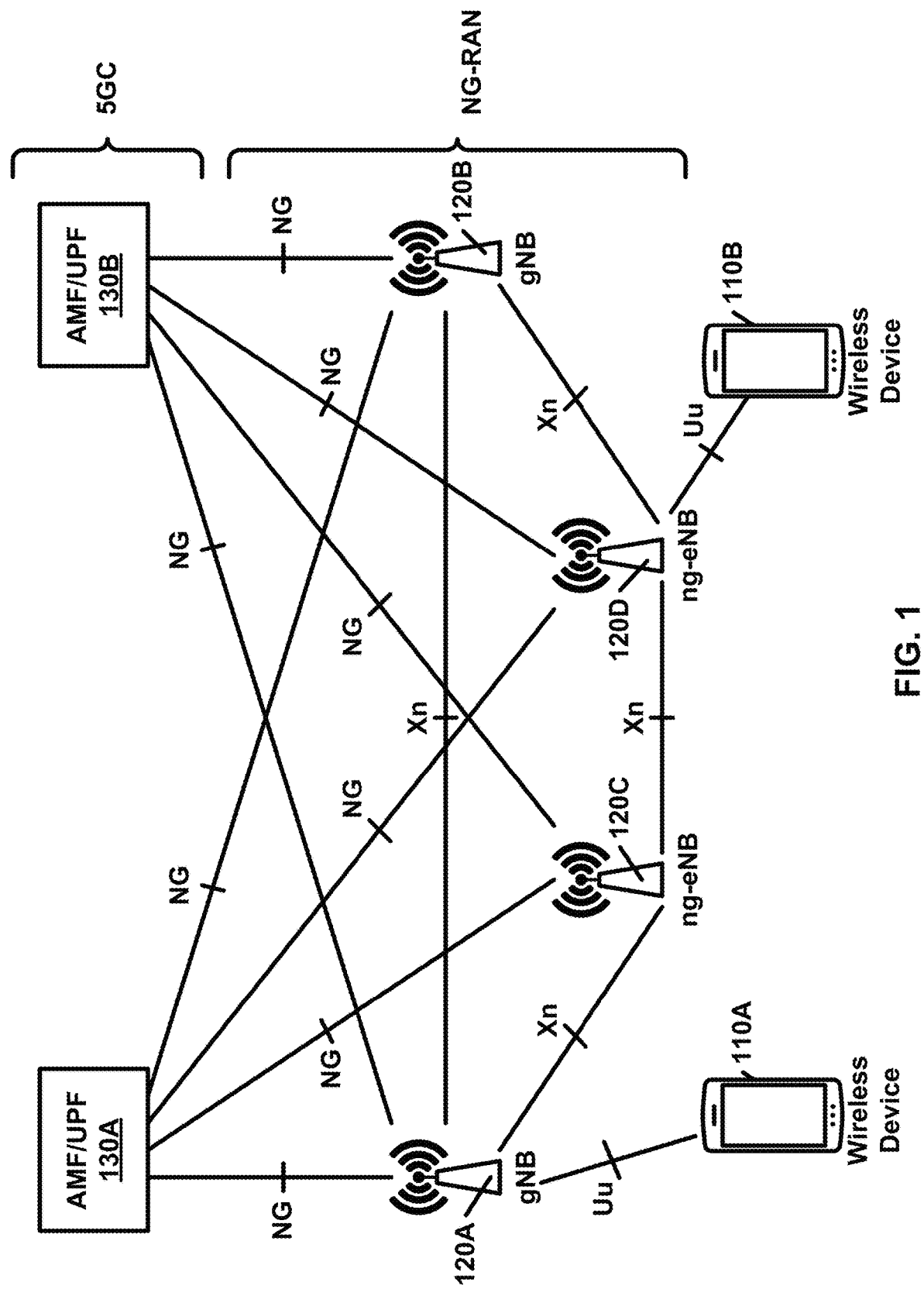
FIG. 1 shows an example radio access network (RAN) architecture.

The accompanying drawings and descriptions provide examples. It is to be understood that the examples shown in the drawings and/or described are non-exclusive and that there are other examples of how features shown and described may be practiced.

Examples are provided for operation of wireless communication systems which may be used in the technical field of multicarrier communication systems. More particularly, the technology described herein may relate to beam failure recovery procedures in multicarrier communication systems.

The following acronyms are used throughout the drawings and/or descriptions, and are provided below for convenience although other acronyms may be introduced in the detailed description:

3GPP 3rd Generation Partnership Project
    5GC 5G Core Network
    ACK Acknowledgement
    AMF Access and Mobility Management Function
    ARQ Automatic Repeat Request
    AS Access Stratum
    ASIC Application-Specific Integrated Circuit
    BA Bandwidth Adaptation
    BCCH Broadcast Control Channel
    BCH Broadcast Channel
    BFR Beam Failure Recovery
    BLER Block Error Rate
    BPSK Binary Phase Shift Keying
    BSR Buffer Status Report
    BWP Bandwidth Part
    CA Carrier Aggregation
    CC Component Carrier
    CCCH Common Control CHannel
    CDMA Code Division Multiple Access
    CN Core Network
    CORESET Control Resource Set
    CP Cyclic Prefix
    CP-OFDM Cyclic Prefix-Orthogonal Frequency Division Multiplex
    C-RNTI Cell-Radio Network Temporary Identifier
    CS Configured Scheduling
    CSI Channel State Information
    CSI-RS Channel State Information-Reference Signal
    CQI Channel Quality Indicator
    CSS Common Search Space
    CU Central Unit
    DC Dual Connectivity
    DCCH Dedicated Control Channel
    DCI Downlink Control Information
    DL Downlink
    DL-SCH Downlink Shared CHannel
    DM-RS DeModulation Reference Signal
    DRB Data Radio Bearer
    DRX Discontinuous Reception
    DTCH Dedicated Traffic Channel
    DU Distributed Unit
    EPC Evolved Packet Core
    E-UTRA Evolved UMTS Terrestrial Radio Access
    E-UTRAN Evolved-Universal Terrestrial Radio Access Network
    FDD Frequency Division Duplex
    FPGA Field Programmable Gate Arrays
    F1-C F1-Control plane
    F1-U F1-User plane
    gNB next generation Node B
    HARQ Hybrid Automatic Repeat reQuest
    HDL Hardware Description Languages
    IE Information Element
    IP Internet Protocol
    LCH Logical Channel
    LCID Logical Channel Identifier
    LTE Long Term Evolution
    MAC Medium Access Control
    MCG Master Cell Group
    MCS Modulation and Coding Scheme
    MeNB Master evolved Node B
    MIB Master Information Block
    MME Mobility Management Entity
    MN Master Node
    NACK Negative Acknowledgement
    NAS Non-Access Stratum
    NG CP Next Generation Control Plane
    NGC Next Generation Core
    NG-C NG-Control plane
    ng-eNB next generation evolved Node B
    NG-U NG-User plane
    NR New Radio
    NR MAC New Radio MAC
    NR PDCP New Radio PDCP
    NR PHY New Radio PHYsical
    NR RLC New Radio RLC
    NR RRC New Radio RRC
    NSSAI Network Slice Selection Assistance Information
    O&M Operation and Maintenance
    OFDM Orthogonal Frequency Division Multiplexing
    PBCH Physical Broadcast CHannel
    PCC Primary Component Carrier
    PCCH Paging Control CHannel
    PCell Primary Cell
    PCH Paging CHannel
    PDCCH Physical Downlink Control CHannel
    PDCP Packet Data Convergence Protocol
    PDSCH Physical Downlink Shared CHannel
    PDU Protocol Data Unit
    PHICH Physical HARQ Indicator CHannel
    PHY PHYsical
    PLMN Public Land Mobile Network
    PMI Precoding Matrix Indicator
    PRACH Physical Random Access CHannel
    PRB Physical Resource Block
    PSCell Primary Secondary Cell
    PSS Primary Synchronization Signal
    pTAG primary Timing Advance Group
    PT-RS Phase Tracking Reference Signal
    PUCCH Physical Uplink Control CHannel
    PUSCH Physical Uplink Shared CHannel
    QAM Quadrature Amplitude Modulation
    QCLed Quasi-Co-Located
    QCL Quasi-Co-Location
    QFI Quality of Service Indicator
    QoS Quality of Service
    QPSK Quadrature Phase Shift Keying
    RA Random Access
    RACH Random Access CHannel
    RAN Radio Access Network
    RAT Radio Access Technology
    RA-RNTI Random Access-Radio Network Temporary Identifier
    RB Resource Blocks
    RBG Resource Block Groups
    RI Rank indicator
    RLC Radio Link Control
    RLM Radio Link Monitoring
    RRC Radio Resource Control
    RS Reference Signal
    RSRP Reference Signal Received Power SCC Secondary Component Carrier
SCell Secondary Cell
SCG Secondary Cell Group
SC-FDMA Single Carrier-Frequency Division Multiple Access
SDAP Service Data Adaptation Protocol
SDU Service Data Unit
SeNB Secondary evolved Node B
SFN System Frame Number
S-GW Serving GateWay
SI System Information
SIB System Information Block
SINR Signal-to-Interference-plus-Noise Ratio
SMF Session Management Function
SN Secondary Node
SpCell Special Cell
SR Scheduling Request
SRB Signaling Radio Bearer
SRS Sounding Reference Signal
SS Synchronization Signal
SSB Synchronization Signal Block
SSS Secondary Synchronization Signal
sTAG secondary Timing Advance Group
TA Timing Advance
TAG Timing Advance Group
TAI Tracking Area Identifier
TAT Time Alignment Timer
TB Transport Block
TC-RNTI Temporary Cell-Radio Network Temporary Identifier
TCI Transmission Configuration Indication
TDD Time Division Duplex
TDMA Time Division Multiple Access
TRP Transmission and Receiving Point
TTI Transmission Time Interval
UCI Uplink Control Information
UE User Equipment
UL Uplink
UL-SCH Uplink Shared CHannel
UPF User Plane Function
UPGW User Plane Gateway
VHDL VHSIC Hardware Description Language
Xn-C Xn-Control plane
Xn-U Xn-User plane Examples described herein may be implemented using various physical layer modulation and transmission mechanisms. Example transmission mechanisms may include, but are not limited to: Code Division Multiple Access (CDMA), Orthogonal Frequency Division Multiple Access (OFDMA), Time Division Multiple Access (TDMA), Wavelet technologies, and/or the like. Hybrid transmission mechanisms such as TDMA/CDMA, and/or OFDM/CDMA may be used. Various modulation schemes may be used for signal transmission in the physical layer. Examples of modulation schemes include, but are not limited to: phase, amplitude, code, a combination of these, and/or the like. An example radio transmission method may implement Quadrature Amplitude Modulation (QAM) using Binary Phase Shift Keying (BPSK), Quadrature Phase Shift Keying (QPSK), 16-QAM, 64-QAM, 256-QAM, 1024-QAM and/or the like. Physical radio transmission may be enhanced by dynamically or semi-dynamically changing the modulation and coding scheme, for example, depending on transmission requirements and/or radio conditions.

FIG. 1 shows an example Radio Access Network (RAN) architecture. A RAN node may comprise a next generation Node B (gNB) (e.g., 120A, 120B) providing New Radio (NR) user plane and control plane protocol terminations towards a first wireless device (e.g., 110A). A RAN node may comprise a base station such as a next generation evolved Node B (ng-eNB) (e.g., 120C, 120D), providing Evolved UMTS Terrestrial Radio Access (E-UTRA) user plane and control plane protocol terminations towards a second wireless device (e.g., 110B). A first wireless device 110A may communicate with a base station, such as a gNB 120A, over a Uu interface. A second wireless device 110B may communicate with a base station, such as an ng-eNB 120D, over a Uu interface. The wireless devices 110A and/or 110B may be structurally similar to wireless devices shown in and/or described in connection with other drawing figures. The Node B 120A, the Node B 120B, the Node B 120C, and/or the Node B 120D may be structurally similar to Nodes B and/or base stations shown in and/or described in connection with other drawing figures.

A base station, such as a gNB (e.g., 120A, 120B, etc.) and/or an ng-eNB (e.g., 120C, 120D, etc.) may host functions such as radio resource management and scheduling, IP header compression, encryption and integrity protection of data, selection of Access and Mobility Management Function (AMF) at wireless device (e.g., User Equipment (UE)) attachment, routing of user plane and control plane data, connection setup and release, scheduling and transmission of paging messages (e.g., originated from the AMF), scheduling and transmission of system broadcast information (e.g., originated from the AMF or Operation and Maintenance (O&M)), measurement and measurement reporting configuration, transport level packet marking in the uplink, session management, support of network slicing, Quality of Service (QoS) flow management and mapping to data radio bearers, support of wireless devices in an inactive state (e.g., RRC_INACTIVE state), distribution function for Non-Access Stratum (NAS) messages, RAN sharing, dual connectivity, and/or tight interworking between NR and E-UTRA.

One or more first base stations (e.g., gNBs 120A and 120B) and/or one or more second base stations (e.g., ng-eNBs 120C and 120D) may be interconnected with each other via Xn interface. A first base station (e.g., gNB 120A, 120B, etc.) or a second base station (e.g., ng-eNB 120C, 120D, etc.) may be connected via NG interfaces to a network, such as a 5G Core Network (5GC). A 5GC may comprise one or more AMF/User Plan Function (UPF) functions (e.g., 130A and/or 130B). A base station (e.g., a gNB and/or an ng-eNB) may be connected to a UPF via an NG-User plane (NG-U) interface. The NG-U interface may provide delivery (e.g., non-guaranteed delivery) of user plane Protocol Data Units (PDUs) between a RAN node and the UPF. A base station (e.g., a gNB and/or an ng-eNB) may be connected to an AMF via an NG-Control plane (NG-C) interface. The NG-C interface may provide functions such as NG interface management, wireless device (e.g., UE) context management, wireless device (e.g., UE) mobility management, transport of NAS messages, paging, PDU session management, configuration transfer, and/or warning message transmission.

A UPF may host functions such as anchor point for intra-/inter-Radio Access Technology (RAT) mobility (e.g., if applicable), external PDU session point of interconnect to data network, packet routing and forwarding, packet inspection and user plane part of policy rule enforcement, traffic usage reporting, uplink classifier to support routing traffic flows to a data network, branching point to support multi-homed PDU session, quality of service (QoS) handling for user plane, packet filtering, gating, Uplink (UL)/Downlink (DL) rate enforcement, uplink traffic verification (e.g., Service Data Flow (SDF) to QoS flow mapping), downlink packet buffering, and/or downlink data notification triggering.

An AMF may host functions such as NAS signaling termination, NAS signaling security, Access Stratum (AS) security control, inter Core Network (CN) node signaling (e.g., for mobility between 3rd Generation Partnership Project (3GPP) access networks), idle mode wireless device reachability (e.g., control and execution of paging retransmission), registration area management, support of intra-system and inter-system mobility, access authentication, access authorization including check of roaming rights, mobility management control (e.g., subscription and/or policies), support of network slicing, and/or Session Management Function (SMF) selection.

Figure 2A:
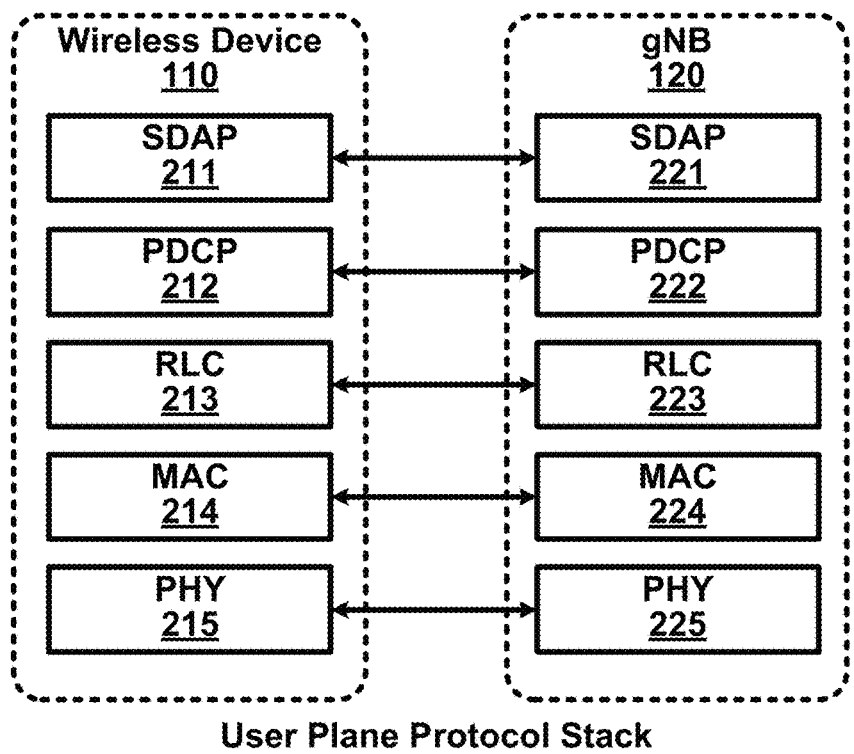
FIG. 2A shows an example user plane protocol stack.

FIG. 2A shows an example user plane protocol stack. A Service Data Adaptation Protocol (SDAP) (e.g., 211 and 221), Packet Data Convergence Protocol (PDCP) (e.g., 212 and 222), Radio Link Control (RLC) (e.g., 213 and 223), and Medium Access Control (MAC) (e.g., 214 and 224) sublayers, and a Physical (PHY) (e.g., 215 and 225) layer, may be terminated in a wireless device (e.g., 110) and in a base station (e.g., 120) on a network side. A PHY layer may provide transport services to higher layers (e.g., MAC, RRC, etc.). Services and/or functions of a MAC sublayer may comprise mapping between logical channels and transport channels, multiplexing and/or demultiplexing of MAC Service Data Units (SDUs) belonging to the same or different logical channels into and/or from Transport Blocks (TBs) delivered to and/or from the PHY layer, scheduling information reporting, error correction through Hybrid Automatic Repeat request (HARQ) (e.g., one HARQ entity per carrier for Carrier Aggregation (CA)), priority handling between wireless devices such as by using dynamic scheduling, priority handling between logical channels of a wireless device such as by using logical channel prioritization, and/or padding. A MAC entity may support one or multiple numerologies and/or transmission timings. Mapping restrictions in a logical channel prioritization may control which numerology and/or transmission timing a logical channel may use. An RLC sublayer may support transparent mode (TM), unacknowledged mode (UM), and/or acknowledged mode (AM) transmission modes. The RLC configuration may be per logical channel with no dependency on numerologies and/or Transmission Time Interval (TTI) durations. Automatic Repeat Request (ARQ) may operate on any of the numerologies and/or TTI durations with which the logical channel is configured. Services and functions of the PDCP layer for the user plane may comprise, for example, sequence numbering, header compression and decompression, transfer of user data, reordering and duplicate detection, PDCP PDU routing (e.g., such as for split bearers), retransmission of PDCP SDUs, ciphering, deciphering and integrity protection, PDCP SDU discard, PDCP re-establishment and data recovery for RLC AM, and/or duplication of PDCP PDUs. Services and/or functions of SDAP may comprise, for example, mapping between a QoS flow and a data radio bearer. Services and/or functions of SDAP may comprise mapping a Quality of Service Indicator (QFI) in DL and UL packets. A protocol entity of SDAP may be configured for an individual PDU session.

Figure 2B:
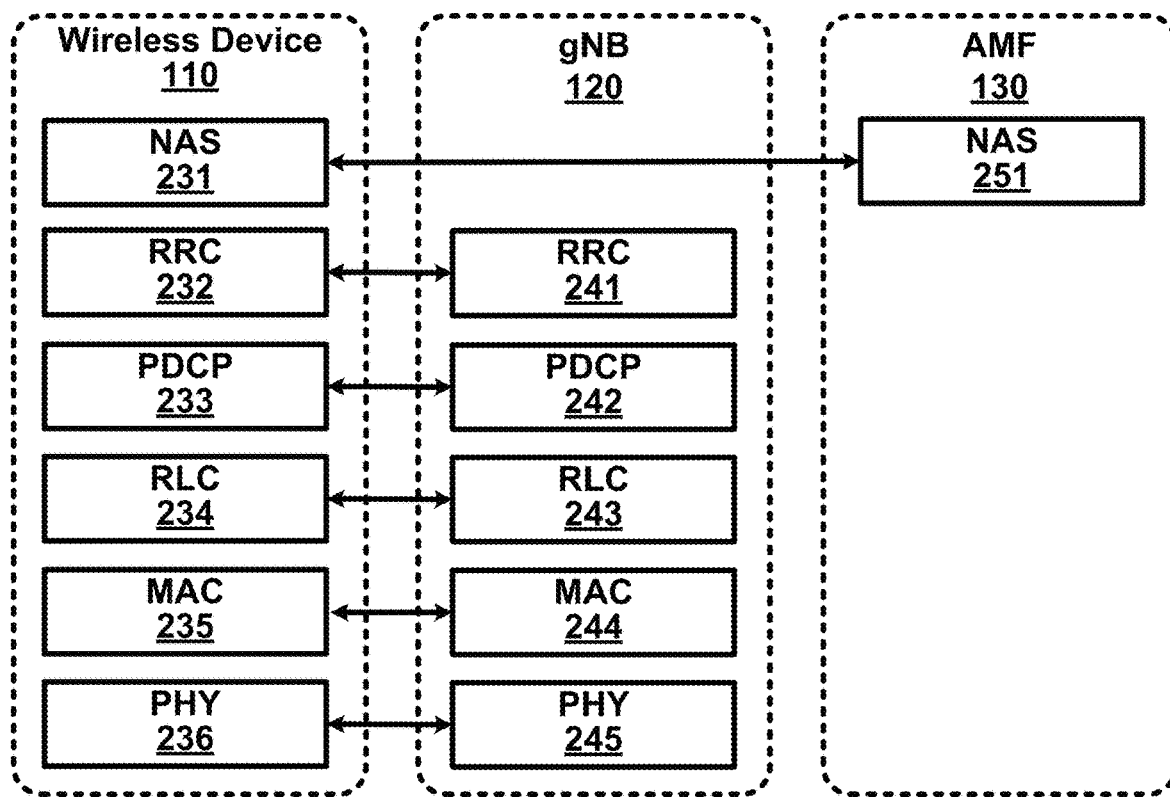
FIG. 2B shows an example control plane protocol stack.

FIG. 2B shows an example control plane protocol stack. A PDCP (e.g., 233 and 242), RLC (e.g., 234 and 243), and MAC (e.g., 235 and 244) sublayers, and a PHY (e.g., 236 and 245) layer, may be terminated in a wireless device (e.g., 110), and in a base station (e.g., 120) on a network side, and perform service and/or functions described above. RRC (e.g., 232 and 241) may be terminated in a wireless device and a base station on a network side. Services and/or functions of RRC may comprise broadcast of system information related to AS and/or NAS; paging (e.g., initiated by a 5GC or a RAN); establishment, maintenance, and/or release of an RRC connection between the wireless device and RAN; security functions such as key management, establishment, configuration, maintenance, and/or release of Signaling Radio Bearers (SRBs) and Data Radio Bearers (DRBs); mobility functions; QoS management functions; wireless device measurement reporting and control of the reporting; detection of and recovery from radio link failure; and/or NAS message transfer to/from NAS from/to a wireless device. NAS control protocol (e.g., 231 and 251) may be terminated in the wireless device and AMF (e.g., 130) on a network side. NAS control protocol may perform functions such as authentication, mobility management between a wireless device and an AMF (e.g., for 3GPP access and non-3GPP access), and/or session management between a wireless device and an SMF (e.g., for 3GPP access and non-3GPP access).

A base station may configure a plurality of logical channels for a wireless device. A logical channel of the plurality of logical channels may correspond to a radio bearer. The radio bearer may be associated with a QoS requirement. A base station may configure a logical channel to be mapped to one or more TTIs and/or numerologies in a plurality of TTIs and/or numerologies. The wireless device may receive Downlink Control Information (DCI) via a Physical Downlink Control CHannel (PDCCH) indicating an uplink grant. The uplink grant may be for a first TTI and/or a first numerology and may indicate uplink resources for transmission of a transport block. The base station may configure each logical channel in the plurality of logical channels with one or more parameters to be used by a logical channel prioritization procedure at the MAC layer of the wireless device. The one or more parameters may comprise, for example, priority, prioritized bit rate, etc. A logical channel in the plurality of logical channels may correspond to one or more buffers comprising data associated with the logical channel. The logical channel prioritization procedure may allocate the uplink resources to one or more first logical channels in the plurality of logical channels and/or to one or more MAC Control Elements (CEs). The one or more first logical channels may be mapped to the first TTI and/or the first numerology. The MAC layer at the wireless device may multiplex one or more MAC CEs and/or one or more MAC SDUs (e.g., logical channel) in a MAC PDU (e.g., transport block). The MAC PDU may comprise a MAC header comprising a plurality of MAC sub-headers. A MAC sub-header in the plurality of MAC sub-headers may correspond to a MAC CE or a MAC SUD (e.g., logical channel) in the one or more MAC CEs and/or in the one or more MAC SDUs. A MAC CE and/or a logical channel may be configured with a Logical Channel IDentifier (LCID). An LCID for a logical channel and/or a MAC CE may be fixed and/or pre-configured. An LCID for a logical channel and/or MAC CE may be configured for the wireless device by the base station. The MAC sub-header corresponding to a MAC CE and/or a MAC SDU may comprise an LCID associated with the MAC CE and/or the MAC SDU.

A base station may activate, deactivate, and/or impact one or more processes (e.g., set values of one or more parameters of the one or more processes or start and/or stop one or more timers of the one or more processes) at the wireless device, for example, by using one or more MAC commands. The one or more MAC commands may comprise one or more MAC control elements. The one or more processes may comprise activation and/or deactivation of PDCP packet duplication for one or more radio bearers. The base station may send (e.g., transmit) a MAC CE comprising one or more fields. The values of the fields may indicate activation and/or deactivation of PDCP duplication for the one or more radio bearers. The one or more processes may comprise Channel State Information (CSI) transmission of on one or more cells. The base station may send (e.g., transmit) one or more MAC CEs indicating activation and/or deactivation of the CSI transmission on the one or more cells. The one or more processes may comprise activation and/or deactivation of one or more secondary cells. The base station may send (e.g., transmit) a MAC CE indicating activation and/or deactivation of one or more secondary cells. The base station may send (e.g., transmit) one or more MAC CEs indicating starting and/or stopping of one or more Discontinuous Reception (DRX) timers at the wireless device. The base station may send (e.g., transmit) one or more MAC CEs that indicate one or more timing advance values for one or more Timing Advance Groups (TAGs).

Figure 3:
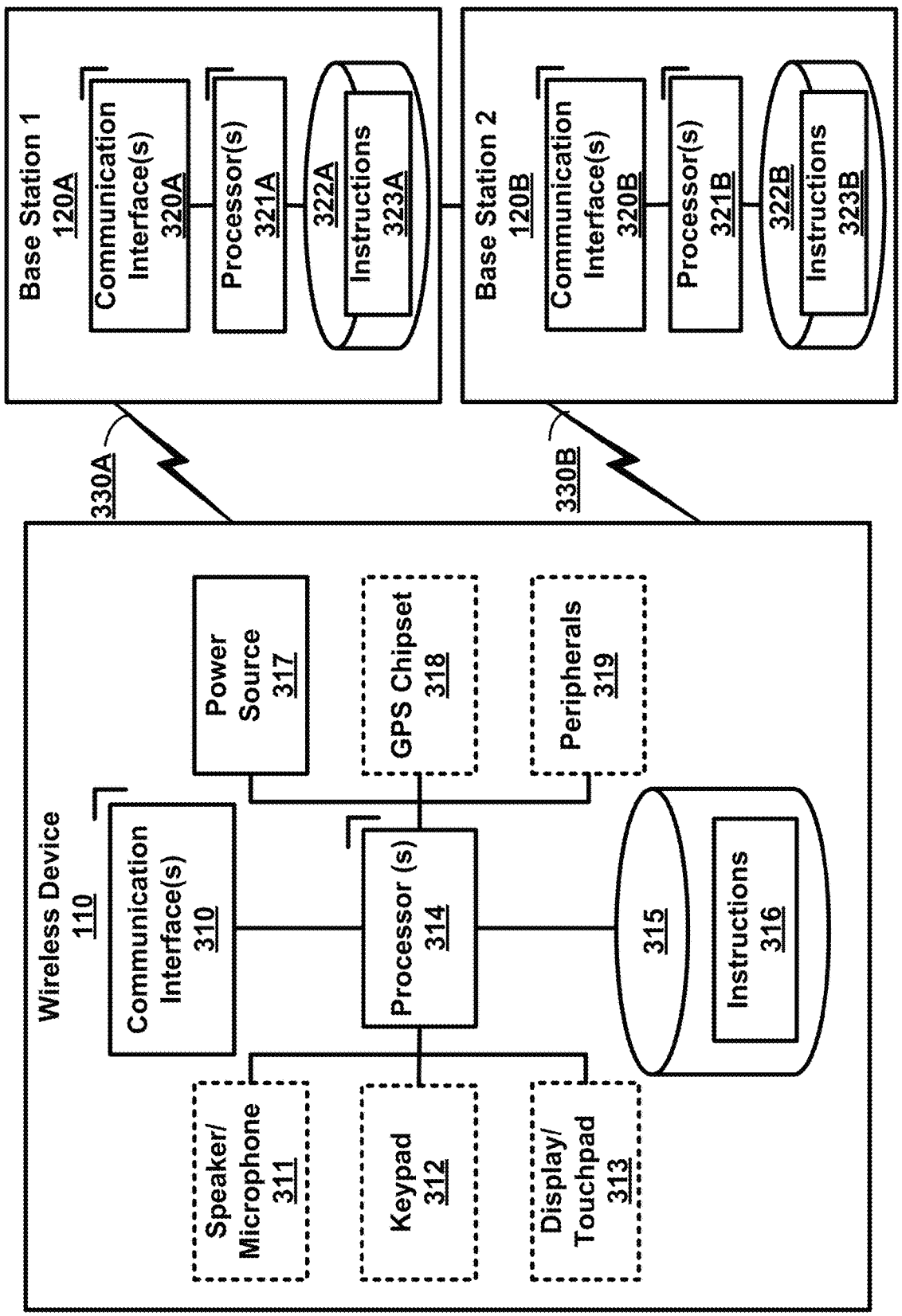
FIG. 3 shows an example wireless device and two base stations.

FIG. 3 shows an example of base stations (base station 1, 120A, and base station 2, 120B) and a wireless device 110. The wireless device 110 may comprise a UE or any other wireless device. The base station (e.g., 120A, 120B) may comprise a Node B, eNB, gNB, ng-eNB, or any other base station. A wireless device and/or a base station may perform one or more functions of a relay node. The base station 1, 120A, may comprise at least one communication interface 320A (e.g., a wireless modem, an antenna, a wired modem, and/or the like), at least one processor 321A, and at least one set of program code instructions 323A that may be stored in non-transitory memory 322A and executable by the at least one processor 321A. The base station 2, 120B, may comprise at least one communication interface 320B, at least one processor 321B, and at least one set of program code instructions 323B that may be stored in non-transitory memory 322B and executable by the at least one processor 321B.

A base station may comprise any number of sectors, for example: 1, 2, 3, 4, or 6 sectors. A base station may comprise any number of cells, for example, ranging from 1 to 50 cells or more. A cell may be categorized, for example, as a primary cell or secondary cell. At Radio Resource Control (RRC) connection establishment, re-establishment, handover, etc., a serving cell may provide NAS (non-access stratum) mobility information (e.g., Tracking Area Identifier (TAI)). At RRC connection re-establishment and/or handover, a serving cell may provide security input. This serving cell may be referred to as the Primary Cell (PCell). In the downlink, a carrier corresponding to the PCell may be a DL Primary Component Carrier (PCC). In the uplink, a carrier may be an UL PCC. Secondary Cells (SCells) may be configured to form together with a PCell a set of serving cells, for example, depending on wireless device capabilities. In a downlink, a carrier corresponding to an SCell may be a downlink secondary component carrier (DL SCC). In an uplink, a carrier may be an uplink secondary component carrier (UL SCC). An SCell may or may not have an uplink carrier.

A cell, comprising a downlink carrier and optionally an uplink carrier, may be assigned a physical cell ID and/or a cell index. A carrier (downlink and/or uplink) may belong to one cell. The cell ID and/or cell index may identify the downlink carrier and/or uplink carrier of the cell (e.g., depending on the context it is used). A cell ID may be equally referred to as a carrier ID, and a cell index may be referred to as a carrier index. A physical cell ID and/or a cell index may be assigned to a cell. A cell ID may be determined using a synchronization signal transmitted via a downlink carrier. A cell index may be determined using RRC messages. A first physical cell ID for a first downlink carrier may indicate that the first physical cell ID is for a cell comprising the first downlink carrier. The same concept may be used, for example, with carrier activation and/or deactivation (e.g., secondary cell activation and/or deactivation). A first carrier that is activated may indicate that a cell comprising the first carrier is activated.

A base station may send (e.g., transmit) to a wireless device one or more messages (e.g., RRC messages) comprising a plurality of configuration parameters for one or more cells. One or more cells may comprise at least one primary cell and at least one secondary cell. An RRC message may be broadcasted and/or unicasted to the wireless device. Configuration parameters may comprise common parameters and dedicated parameters.

Services and/or functions of an RRC sublayer may comprise at least one of: broadcast of system information related to AS and/or NAS; paging initiated by a 5GC and/or an NG-RAN; establishment, maintenance, and/or release of an RRC connection between a wireless device and an NG-RAN, which may comprise at least one of addition, modification, and/or release of carrier aggregation; and/or addition, modification, and/or release of dual connectivity in NR or between E-UTRA and NR. Services and/or functions of an RRC sublayer may comprise at least one of security functions comprising key management; establishment, configuration, maintenance, and/or release of Signaling Radio Bearers (SRBs) and/or Data Radio Bearers (DRBs); mobility functions which may comprise at least one of a handover (e.g., intra NR mobility or inter-RAT mobility) and/or a context transfer; and/or a wireless device cell selection and/or reselection and/or control of cell selection and reselection. Services and/or functions of an RRC sublayer may comprise at least one of QoS management functions; a wireless device measurement configuration/reporting; detection of and/or recovery from radio link failure; and/or NAS message transfer to and/or from a core network entity (e.g., AMF, Mobility Management Entity (MME)) from and/or to the wireless device.

An RRC sublayer may support an RRC_Idle state, an RRC_Inactive state, and/or an RRC_Connected state for a wireless device. In an RRC_Idle state, a wireless device may perform at least one of: Public Land Mobile Network (PLMN) selection; receiving broadcasted system information; cell selection and/or re-selection; monitoring and/or receiving a paging for mobile terminated data initiated by 5GC; paging for mobile terminated data area managed by 5GC; and/or DRX for CN paging configured via NAS. In an RRC_Inactive state, a wireless device may perform at least one of: receiving broadcasted system information; cell selection and/or re-selection; monitoring and/or receiving a RAN and/or CN paging initiated by an NG-RAN and/or a 5GC; RAN-based notification area (RNA) managed by an NG-RAN; and/or DRX for a RAN and/or CN paging configured by NG-RAN/NAS. In an RRC_Idle state of a wireless device, a base station (e.g., NG-RAN) may keep a 5GC-NG-RAN connection (e.g., both C/U-planes) for the wireless device; and/or store a wireless device AS context for the wireless device. In an RRC_Connected state of a wireless device, a base station (e.g., NG-RAN) may perform at least one of: establishment of 5GC-NG-RAN connection (both C/U-planes) for the wireless device; storing a UE AS context for the wireless device; send (e.g., transmit) and/or receive of unicast data to and/or from the wireless device; and/or network-controlled mobility based on measurement results received from the wireless device. In an RRC_Connected state of a wireless device, an NG-RAN may know a cell to which the wireless device belongs.

System information (SI) may be divided into minimum SI and other SI. The minimum SI may be periodically broadcast. The minimum SI may comprise basic information required for initial access and/or information for acquiring any other SI broadcast periodically and/or provisioned on-demand (e.g., scheduling information). The other SI may either be broadcast, and/or be provisioned in a dedicated manner, such as either triggered by a network and/or upon request from a wireless device. A minimum SI may be transmitted via two different downlink channels using different messages (e.g., MasterInformationBlock and SystemInformationBlockType1). Another SI may be transmitted via SystemInformationBlockType2. For a wireless device in an RRC_Connected state, dedicated RRC signaling may be used for the request and delivery of the other SI. For the wireless device in the RRC_Idle state and/or in the RRC_Inactive state, the request may trigger a random access procedure.

A wireless device may report its radio access capability information, which may be static. A base station may request one or more indications of capabilities for a wireless device to report based on band information. A temporary capability restriction request may be sent by the wireless device (e.g., if allowed by a network) to signal the limited availability of some capabilities (e.g., due to hardware sharing, interference, and/or overheating) to the base station. The base station may confirm or reject the request. The temporary capability restriction may be transparent to 5GC (e.g., static capabilities may be stored in 5GC).

A wireless device may have an RRC connection with a network, for example, if CA is configured. At RRC connection establishment, re-establishment, and/or handover procedures, a serving cell may provide NAS mobility information. At RRC connection re-establishment and/or handover, a serving cell may provide a security input. This serving cell may be referred to as the PCell. SCells may be configured to form together with the PCell a set of serving cells, for example, depending on the capabilities of the wireless device. The configured set of serving cells for the wireless device may comprise a PCell and one or more SCells.

The reconfiguration, addition, and/or removal of SCells may be performed by RRC messaging. At intra-NR handover, RRC may add, remove, and/or reconfigure SCells for usage with the target PCell. Dedicated RRC signaling may be used (e.g., if adding a new SCell) to send all required system information of the SCell (e.g., if in connected mode, wireless devices may not acquire broadcasted system information directly from the SCells).

The purpose of an RRC connection reconfiguration procedure may be to modify an RRC connection, (e.g., to establish, modify, and/or release RBs; to perform handover; to setup, modify, and/or release measurements, for example, to add, modify, and/or release SCells and cell groups). NAS dedicated information may be transferred from the network to the wireless device, for example, as part of the RRC connection reconfiguration procedure. The RRCConnectionReconfiguration message may be a command to modify an RRC connection. One or more RRC messages may convey information for measurement configuration, mobility control, and/or radio resource configuration (e.g., RBs, MAC main configuration, and/or physical channel configuration), which may comprise any associated dedicated NAS information and/or security configuration. The wireless device may perform an SCell release, for example, if the received RRC Connection Reconfiguration message includes the sCellToReleaseList. The wireless device may perform SCell additions or modification, for example, if the received RRC Connection Reconfiguration message includes the sCellToAddModList.

An RRC connection establishment, reestablishment, and/or resume procedure may be to establish, reestablish, and/or resume an RRC connection, respectively. An RRC connection establishment procedure may comprise SRB 1 establishment. The RRC connection establishment procedure may be used to transfer the initial NAS dedicated information and/or message from a wireless device to an E-UTRAN. The RRCConnectionReestablishment message may be used to re-establish SRB1.

A measurement report procedure may be used to transfer measurement results from a wireless device to an NG-RAN. The wireless device may initiate a measurement report procedure, for example, after successful security activation. A measurement report message may be used to send (e.g., transmit) measurement results.

The wireless device 110 may comprise at least one communication interface 310 (e.g., a wireless modem, an antenna, and/or the like), at least one processor 314, and at least one set of program code instructions 316 that may be stored in non-transitory memory 315 and executable by the at least one processor 314. The wireless device 110 may further comprise at least one of at least one speaker and/or microphone 311, at least one keypad 312, at least one display and/or touchpad 313, at least one power source 317, at least one global positioning system (GPS) chipset 318, and/or other peripherals 319.

The processor 314 of the wireless device 110, the processor 321A of the base station 1 120A, and/or the processor 321B of the base station 2 120B may comprise at least one of a general-purpose processor, a digital signal processor (DSP), a controller, a microcontroller, an application specific integrated circuit (ASIC), a field programmable gate array (FPGA) and/or other programmable logic device, discrete gate and/or transistor logic, discrete hardware components, and/or the like. The processor 314 of the wireless device 110, the processor 321A in base station 1 120A, and/or the processor 321B in base station 2 120B may perform at least one of signal coding and/or processing, data processing, power control, input/output processing, and/or any other functionality that may enable the wireless device 110, the base station 1 120A and/or the base station 2 120B to operate in a wireless environment.

The processor 314 of the wireless device 110 may be connected to and/or in communication with the speaker and/or microphone 311, the keypad 312, and/or the display and/or touchpad 313. The processor 314 may receive user input data from and/or provide user output data to the speaker and/or microphone 311, the keypad 312, and/or the display and/or touchpad 313. The processor 314 in the wireless device 110 may receive power from the power source 317 and/or may be configured to distribute the power to the other components in the wireless device 110. The power source 317 may comprise at least one of one or more dry cell batteries, solar cells, fuel cells, and/or the like. The processor 314 may be connected to the GPS chipset 318. The GPS chipset 318 may be configured to provide geographic location information of the wireless device 110.

The processor 314 of the wireless device 110 may further be connected to and/or in communication with other peripherals 319, which may comprise one or more software and/or hardware modules that may provide additional features and/or functionalities. For example, the peripherals 319 may comprise at least one of an accelerometer, a satellite transceiver, a digital camera, a universal serial bus (USB) port, a hands-free headset, a frequency modulated (FM) radio unit, a media player, an Internet browser, and/or the like.

The communication interface 320A of the base station 1, 120A, and/or the communication interface 320B of the base station 2, 120B, may be configured to communicate with the communication interface 310 of the wireless device 110, for example, via a wireless link 330A and/or via a wireless link 330B, respectively. The communication interface 320A of the base station 1, 120A, may communicate with the communication interface 320B of the base station 2 and/or other RAN and/or core network nodes.

The wireless link 330A and/or the wireless link 330B may comprise at least one of a bi-directional link and/or a directional link. The communication interface 310 of the wireless device 110 may be configured to communicate with the communication interface 320A of the base station 1 120A and/or with the communication interface 320B of the base station 2 120B. The base station 1 120A and the wireless device 110, and/or the base station 2 120B and the wireless device 110, may be configured to send and receive transport blocks, for example, via the wireless link 330A and/or via the wireless link 330B, respectively. The wireless link 330A and/or the wireless link 330B may use at least one frequency carrier. Transceiver(s) may be used. A transceiver may be a device that comprises both a transmitter and a receiver. Transceivers may be used in devices such as wireless devices, base stations, relay nodes, computing devices, and/or the like. Radio technology may be implemented in the communication interface 310, 320A, and/or 320B, and the wireless link 330A and/or 330B. The radio technology may comprise one or more elements shown in FIG. 4A, FIG. 4B, FIG. 4C, FIG. 4D, FIG. 6, FIG. 7A, FIG. 7B, FIG. 8, and associated text, described below.

Other nodes in a wireless network (e.g., AMF, UPF, SMF, etc.) may comprise one or more communication interfaces, one or more processors, and memory storing instructions. A node (e.g., wireless device, base station, AMF, SMF, UPF, servers, switches, antennas, and/or the like) may comprise one or more processors, and memory storing instructions that when executed by the one or more processors causes the node to perform certain processes and/or functions. Single-carrier and/or multi-carrier communication operation may be performed. A non-transitory tangible computer readable media may comprise instructions executable by one or more processors to cause operation of single-carrier and/or multi-carrier communications. An article of manufacture may comprise a non-transitory tangible computer readable machine-accessible medium having instructions encoded thereon for enabling programmable hardware to cause a node to enable operation of single-carrier and/or multi-carrier communications. The node may include processors, memory, interfaces, and/or the like.

An interface may comprise at least one of a hardware interface, a firmware interface, a software interface, and/or a combination thereof. The hardware interface may comprise connectors, wires, and/or electronic devices such as drivers, amplifiers, and/or the like. The software interface may comprise code stored in a memory device to implement protocol(s), protocol layers, communication drivers, device drivers, combinations thereof, and/or the like. The firmware interface may comprise a combination of embedded hardware and/or code stored in (and/or in communication with) a memory device to implement connections, electronic device operations, protocol(s), protocol layers, communication drivers, device drivers, hardware operations, combinations thereof, and/or the like.

A communication network may comprise the wireless device 110, the base station 1, 120A, the base station 2, 120B, and/or any other device. The communication network may comprise any number and/or type of devices, such as, for example, computing devices, wireless devices, mobile devices, handsets, tablets, laptops, internet of things (IoT) devices, hotspots, cellular repeaters, computing devices, and/or, more generally, user equipment (e.g., UE). Although one or more of the above types of devices may be referenced herein (e.g., UE, wireless device, computing device, etc.), it should be understood that any device herein may comprise any one or more of the above types of devices or similar devices. The communication network, and any other network referenced herein, may comprise an LTE network, a 5G network, or any other network for wireless communications. Apparatuses, systems, and/or methods described herein may generally be described as implemented on one or more devices (e.g., wireless device, base station, eNB, gNB, computing device, etc.), in one or more networks, but it will be understood that one or more features and steps may be implemented on any device and/or in any network. As used throughout, the term "base station" may comprise one or more of: a base station, a node, a Node B, a gNB, an eNB, an ng-eNB, a relay node (e.g., an integrated access and backhaul (IAB) node), a donor node (e.g., a donor eNB, a donor gNB, etc.), an access point (e.g., a WiFi access point), a computing device, a device capable of wirelessly communicating, or any other device capable of sending and/or receiving signals. As used throughout, the term "wireless device" may comprise one or more of: a UE, a handset, a mobile device, a computing device, a node, a device capable of wirelessly communicating, or any other device capable of sending and/or receiving signals. Any reference to one or more of these terms/devices also considers use of any other term/device mentioned above.

Figure 4A:
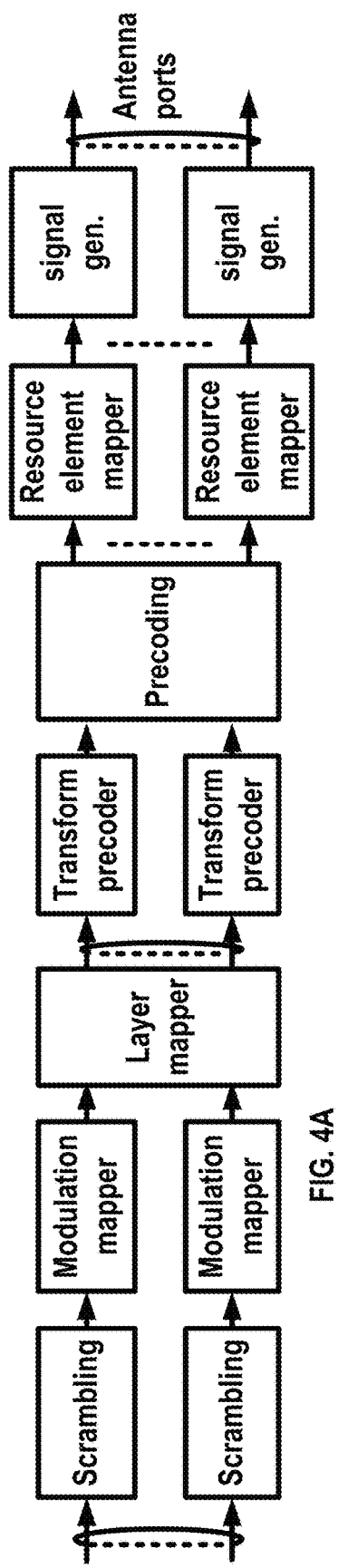
FIG. 4A, FIG. 4B, FIG. 4C, and FIG. 4D show examples of uplink and downlink signal transmission.

FIG. 4A, FIG. 4B, FIG. 4C and FIG. 4D show examples of uplink and downlink signal transmission. FIG. 4A shows an example uplink transmitter for at least one physical channel A baseband signal representing a physical uplink shared channel may perform one or more functions. The one or more functions may comprise at least one of: scrambling (e.g., by Scrambling); modulation of scrambled bits to generate complex-valued symbols (e.g., by a Modulation mapper); mapping of the complex-valued modulation symbols onto one or several transmission layers (e.g., by a Layer mapper); transform precoding to generate complex-valued symbols (e.g., by a Transform precoder); precoding of the complex-valued symbols (e.g., by a Precoder); mapping of precoded complex-valued symbols to resource elements (e.g., by a Resource element mapper); generation of complex-valued time-domain Single Carrier-Frequency Division Multiple Access (SC-FDMA) or CP-OFDM signal for an antenna port (e.g., by a signal gen.); and/or the like. A SC-FDMA signal for uplink transmission may be generated, for example, if transform precoding is enabled. A CP-OFDM signal for uplink transmission may be generated by FIG. 4A, for example, if transform precoding is not enabled. These functions are shown as examples and other mechanisms may be implemented.

Figure 4B:
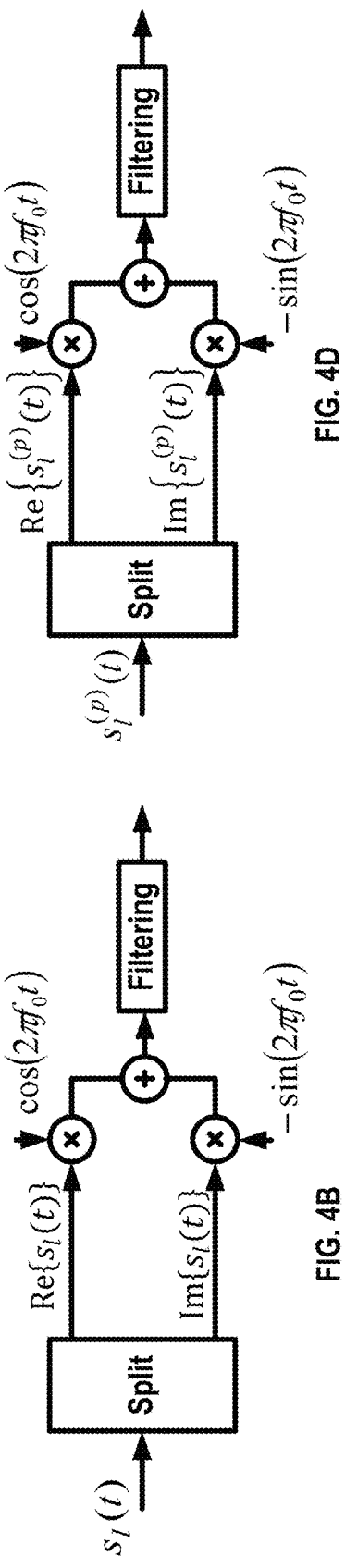

FIG. 4B shows an example of modulation and up-conversion to the carrier frequency of a complex-valued SC-FDMA or CP-OFDM baseband signal for an antenna port and/or for the complex-valued Physical Random Access CHannel (PRACH) baseband signal. Filtering may be performed prior to transmission.

Figure 4D:
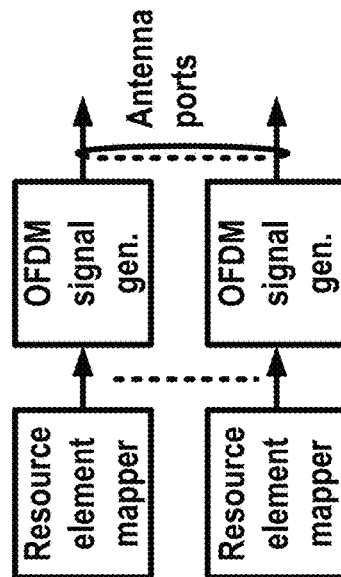
Figure 4C:
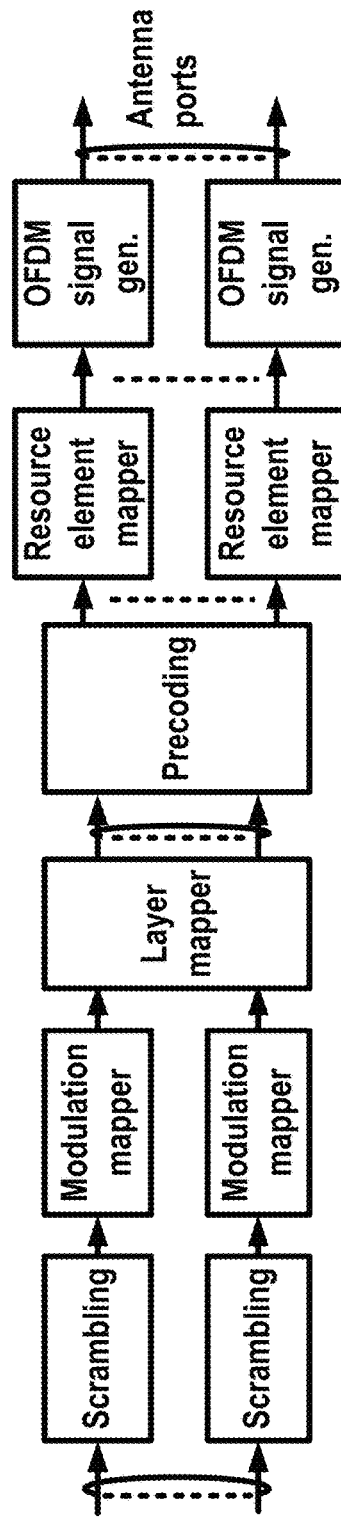

FIG. 4C shows an example of downlink transmissions. The baseband signal representing a downlink physical channel may perform one or more functions. The one or more functions may comprise: scrambling of coded bits in a codeword to be transmitted on a physical channel (e.g., by Scrambling); modulation of scrambled bits to generate complex-valued modulation symbols (e.g., by a Modulation mapper); mapping of the complex-valued modulation symbols onto one or several transmission layers (e.g., by a Layer mapper); precoding of the complex-valued modulation symbols on a layer for transmission on the antenna ports (e.g., by Precoding); mapping of complex-valued modulation symbols for an antenna port to resource elements (e.g., by a Resource element mapper); generation of complex-valued time-domain OFDM signal for an antenna port (e.g., by an OFDM signal gen.); and/or the like. These functions are shown as examples and other mechanisms may be implemented.

A base station may send (e.g., transmit) a first symbol and a second symbol on an antenna port, to a wireless device. The wireless device may infer the channel (e.g., fading gain, multipath delay, etc.) for conveying the second symbol on the antenna port, from the channel for conveying the first symbol on the antenna port. A first antenna port and a second antenna port may be quasi co-located, for example, if one or more large-scale properties of the channel over which a first symbol on the first antenna port is conveyed may be inferred from the channel over which a second symbol on a second antenna port is conveyed. The one or more large-scale properties may comprise at least one of: delay spread; Doppler spread; Doppler shift; average gain; average delay; and/or spatial receiving (Rx) parameters.

FIG. 4D shows an example modulation and up-conversion to the carrier frequency of the complex-valued OFDM baseband signal for an antenna port. Filtering may be performed prior to transmission.

Figure 5A:
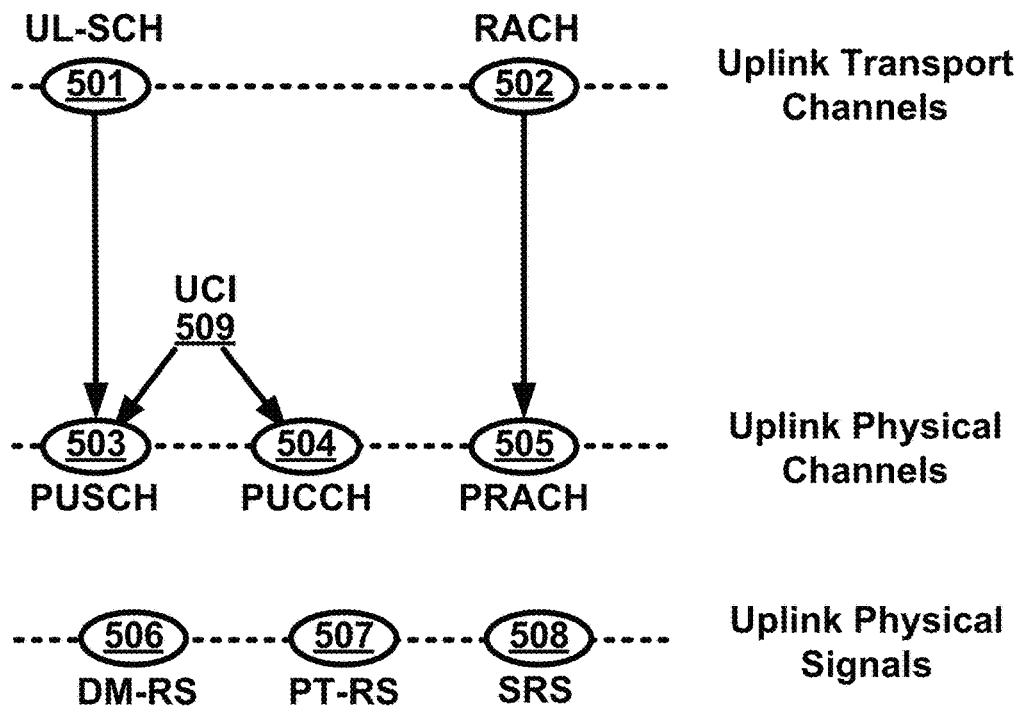
FIG. 5A shows an example uplink channel mapping and example uplink physical signals.

FIG. 5A shows example uplink channel mapping and example uplink physical signals. A physical layer may provide one or more information transfer services to a MAC and/or one or more higher layers. The physical layer may provide the one or more information transfer services to the MAC via one or more transport channels. An information transfer service may indicate how and/or with what characteristics data is transferred over the radio interface.

Uplink transport channels may comprise an Uplink-Shared CHannel (UL-SCH) 501 and/or a Random Access CHannel (RACH) 502. A wireless device may send (e.g., transmit) one or more uplink DM-RSs 506 to a base station for channel estimation, for example, for coherent demodulation of one or more uplink physical channels (e.g., PUSCH 503 and/or PUCCH 504). The wireless device may send (e.g., transmit) to a base station at least one uplink DM-RS 506 with PUSCH 503 and/or PUCCH 504, wherein the at least one uplink DM-RS 506 may be spanning a same frequency range as a corresponding physical channel. The base station may configure the wireless device with one or more uplink DM-RS configurations. At least one DM-RS configuration may support a front-loaded DM-RS pattern. A front-loaded DM-RS may be mapped over one or more OFDM symbols (e.g., 1 or 2 adjacent OFDM symbols). One or more additional uplink DM-RS may be configured to send (e.g., transmit) at one or more symbols of a PUSCH and/or PUCCH. The base station may semi-statically configure the wireless device with a maximum number of front-loaded DM-RS symbols for PUSCH and/or PUCCH. The wireless device may schedule a single-symbol DM-RS and/or double symbol DM-RS based on a maximum number of front-loaded DM-RS symbols, wherein the base station may configure the wireless device with one or more additional uplink DM-RS for PUSCH and/or PUCCH. A new radio network may support, for example, at least for CP-OFDM, a common DM-RS structure for DL and UL, wherein a DM-RS location, DM-RS pattern, and/or scrambling sequence may be same or different.

Whether or not an uplink PT-RS 507 is present may depend on an RRC configuration. A presence of the uplink PT-RS may be wireless device-specifically configured. A presence and/or a pattern of the uplink PT-RS 507 in a scheduled resource may be wireless device-specifically configured by a combination of RRC signaling and/or association with one or more parameters used for other purposes (e.g., Modulation and Coding Scheme (MCS)) which may be indicated by DCI. If configured, a dynamic presence of uplink PT-RS 507 may be associated with one or more DCI parameters comprising at least a MCS. A radio network may support a plurality of uplink PT-RS densities defined in time/frequency domain. If present, a frequency domain density may be associated with at least one configuration of a scheduled bandwidth. A wireless device may assume a same precoding for a DMRS port and a PT-RS port. A number of PT-RS ports may be less than a number of DM-RS ports in a scheduled resource. The uplink PT-RS 507 may be confined in the scheduled time/frequency duration for a wireless device.

A wireless device may send (e.g., transmit) an SRS 508 to a base station for channel state estimation, for example, to support uplink channel dependent scheduling and/or link adaptation. The SRS 508 sent (e.g., transmitted) by the wireless device may allow for the base station to estimate an uplink channel state at one or more different frequencies. A base station scheduler may use an uplink channel state to assign one or more resource blocks of a certain quality (e.g., above a quality threshold) for an uplink PUSCH transmission from the wireless device. The base station may semi-statically configure the wireless device with one or more SRS resource sets. For an SRS resource set, the base station may configure the wireless device with one or more SRS resources. An SRS resource set applicability may be configured by a higher layer (e.g., RRC) parameter. An SRS resource in each of one or more SRS resource sets may be sent (e.g., transmitted) at a time instant, for example, if a higher layer parameter indicates beam management. The wireless device may send (e.g., transmit) one or more SRS resources in different SRS resource sets simultaneously. A new radio network may support aperiodic, periodic, and/or semi-persistent SRS transmissions. The wireless device may send (e.g., transmit) SRS resources, for example, based on one or more trigger types. The one or more trigger types may comprise higher layer signaling (e.g., RRC) and/or one or more DCI formats (e.g., at least one DCI format may be used for a wireless device to select at least one of one or more configured SRS resource sets). An SRS trigger type 0 may refer to an SRS triggered based on a higher layer signaling. An SRS trigger type 1 may refer to an SRS triggered based on one or more DCI formats. The wireless device may be configured to send (e.g., transmit) the SRS 508 after a transmission of PUSCH 503 and corresponding uplink DM-RS 506, for example, if PUSCH 503 and the SRS 508 are transmitted in a same slot.

A base station may semi-statically configure a wireless device with one or more SRS configuration parameters indicating at least one of following: an SRS resource configuration identifier, a number of SRS ports, time domain behavior of SRS resource configuration (e.g., an indication of periodic, semi-persistent, or aperiodic SRS), slot (mini-slot, and/or subframe) level periodicity and/or offset for a periodic and/or aperiodic SRS resource, a number of OFDM symbols in a SRS resource, starting OFDM symbol of a SRS resource, an SRS bandwidth, a frequency hopping bandwidth, a cyclic shift, and/or an SRS sequence ID.

Figure 5B:
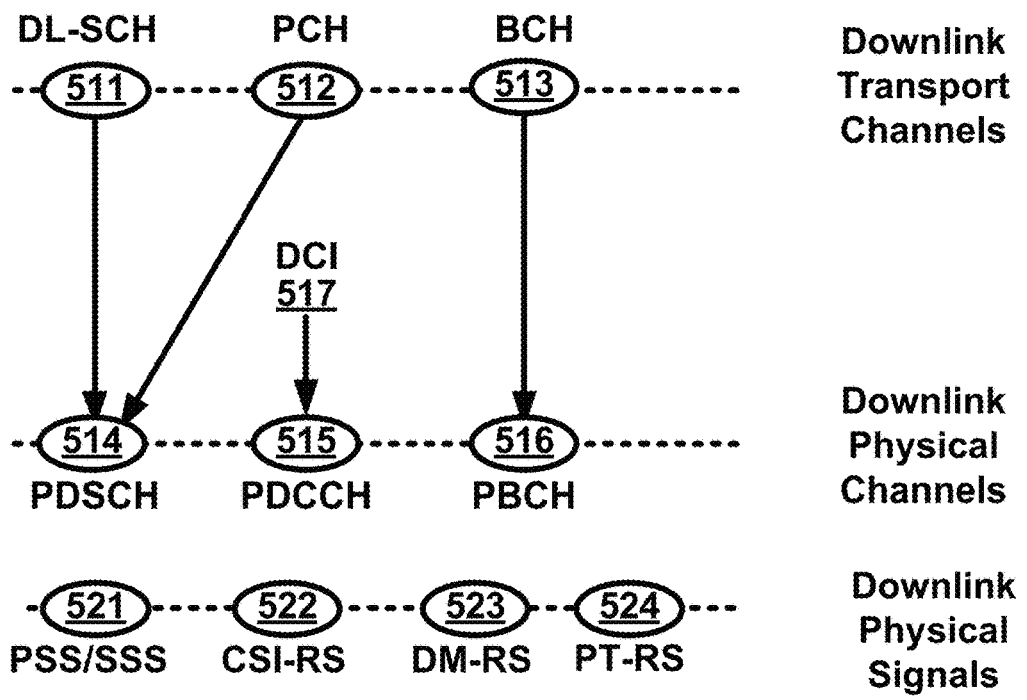
FIG. 5B shows an example downlink channel mapping and example downlink physical signals.

FIG. 5B shows an example downlink channel mapping and downlink physical signals. Downlink transport channels may comprise a Downlink-Shared CHannel (DL-SCH) 511, a Paging CHannel (PCH) 512, and/or a Broadcast CHannel (BCH) 513. A transport channel may be mapped to one or more corresponding physical channels. A UL-SCH 501 may be mapped to a Physical Uplink Shared CHannel (PUSCH) 503. A RACH 502 may be mapped to a PRACH 505. A DL-SCH 511 and a PCH 512 may be mapped to a Physical Downlink Shared CHannel (PDSCH) 514. A BCH 513 may be mapped to a Physical Broadcast CHannel (PBCH) 516.

A radio network may comprise one or more downlink and/or uplink transport channels. The radio network may comprise one or more physical channels without a corresponding transport channel. The one or more physical channels may be used for an Uplink Control Information (UCI) 509 and/or a Downlink Control Information (DCI) 517. A Physical Uplink Control CHannel (PUCCH) 504 may carry UCI 509 from a wireless device to a base station. A Physical Downlink Control CHannel (PDCCH) 515 may carry the DCI 517 from a base station to a wireless device. The radio network (e.g., NR) may support the UCI 509 multiplexing in the PUSCH 503, for example, if the UCI 509 and the PUSCH 503 transmissions may coincide in a slot (e.g., at least in part). The UCI 509 may comprise at least one of a CSI, an Acknowledgement (ACK)/Negative Acknowledgement (NACK), and/or a scheduling request. The DCI 517 via the PDCCH 515 may indicate at least one of following: one or more downlink assignments and/or one or more uplink scheduling grants.

In uplink, a wireless device may send (e.g., transmit) one or more Reference Signals (RSs) to a base station. The one or more RSs may comprise at least one of a Demodulation-RS (DM-RS) 506, a Phase Tracking-RS (PT-RS) 507, and/or a Sounding RS (SRS) 508. In downlink, a base station may send (e.g., transmit, unicast, multicast, and/or broadcast) one or more RSs to a wireless device. The one or more RSs may comprise at least one of a Primary Synchronization Signal (PSS)/Secondary Synchronization Signal (SSS) 521, a CSI-RS 522, a DM-RS 523, and/or a PT-RS 524.

In a time domain, an SS/PBCH block may comprise one or more OFDM symbols (e.g., 4 OFDM symbols numbered in increasing order from 0 to 3) within the SS/PBCH block. An SS/PBCH block may comprise the PSS/SSS 521 and/or the PBCH 516. In the frequency domain, an SS/PBCH block may comprise one or more contiguous subcarriers (e.g., 240 contiguous subcarriers with the subcarriers numbered in increasing order from 0 to 239) within the SS/PBCH block. The PSS/SSS 521 may occupy, for example, 1 OFDM symbol and 127 subcarriers. The PBCH 516 may span across, for example, 3 OFDM symbols and 240 subcarriers. A wireless device may assume that one or more SS/PBCH blocks transmitted with a same block index may be quasi co-located, for example, with respect to Doppler spread, Doppler shift, average gain, average delay, and/or spatial Rx parameters. A wireless device may not assume quasi co-location for other SS/PBCH block transmissions. A periodicity of an SS/PBCH block may be configured by a radio network (e.g., by an RRC signaling). One or more time locations in which the SS/PBCH block may be sent may be determined by sub-carrier spacing. A wireless device may assume a band-specific sub-carrier spacing for an SS/PBCH block, for example, unless a radio network has configured the wireless device to assume a different sub-carrier spacing.

The downlink CSI-RS 522 may be used for a wireless device to acquire channel state information. A radio network may support periodic, aperiodic, and/or semi-persistent transmission of the downlink CSI-RS 522. A base station may semi-statically configure and/or reconfigure a wireless device with periodic transmission of the downlink CSI-RS 522. A configured CSI-RS resources may be activated and/or deactivated. For semi-persistent transmission, an activation and/or deactivation of a CSI-RS resource may be triggered dynamically. A CSI-RS configuration may comprise one or more parameters indicating at least a number of antenna ports. A base station may configure a wireless device with 32 ports, or any other number of ports. A base station may semi-statically configure a wireless device with one or more CSI-RS resource sets. One or more CSI-RS resources may be allocated from one or more CSI-RS resource sets to one or more wireless devices. A base station may semi-statically configure one or more parameters indicating CSI RS resource mapping, for example, time-domain location of one or more CSI-RS resources, a bandwidth of a CSI-RS resource, and/or a periodicity. A wireless device may be configured to use the same OFDM symbols for the downlink CSI-RS 522 and the Control Resource Set (CORESET), for example, if the downlink CSI-RS 522 and the CORESET are spatially quasi co-located and resource elements associated with the downlink CSI-RS 522 are the outside of PRBs configured for the CORESET. A wireless device may be configured to use the same OFDM symbols for downlink CSI-RS 522 and SS/PBCH blocks, for example, if the downlink CSI-RS 522 and SS/PBCH blocks are spatially quasi co-located and resource elements associated with the downlink CSI-RS 522 are outside of the PRBs configured for the SS/PBCH blocks.

A wireless device may send (e.g., transmit) one or more downlink DM-RSs 523 to a base station for channel estimation, for example, for coherent demodulation of one or more downlink physical channels (e.g., PDSCH 514). A radio network may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., 1 or 2 adjacent OFDM symbols). A base station may semi-statically configure a wireless device with a maximum number of front-loaded DM-RS symbols for PDSCH 514. A DM-RS configuration may support one or more DM-RS ports. A DM-RS configuration may support at least 8 orthogonal downlink DM-RS ports, for example, for single user-MIMO. A DM-RS configuration may support 12 orthogonal downlink DM-RS ports, for example, for multiuser-MIMO. A radio network may support, for example, at least for CP-OFDM, a common DM-RS structure for DL and UL, wherein a DM-RS location, DM-RS pattern, and/or scrambling sequence may be the same or different.

Whether or not the downlink PT-RS 524 is present may depend on an RRC configuration. A presence of the downlink PT-RS 524 may be wireless device-specifically configured. A presence and/or a pattern of the downlink PT-RS 524 in a scheduled resource may be wireless device-specifically configured, for example, by a combination of RRC signaling and/or an association with one or more parameters used for other purposes (e.g., MCS) which may be indicated by the DCI. If configured, a dynamic presence of the downlink PT-RS 524 may be associated with one or more DCI parameters comprising at least MCS. A radio network may support a plurality of PT-RS densities in a time/frequency domain. If present, a frequency domain density may be associated with at least one configuration of a scheduled bandwidth. A wireless device may assume the same precoding for a DMRS port and a PT-RS port. A number of PT-RS ports may be less than a number of DM-RS ports in a scheduled resource. The downlink PT-RS 524 may be confined in the scheduled time/frequency duration for a wireless device.

Figure 6:
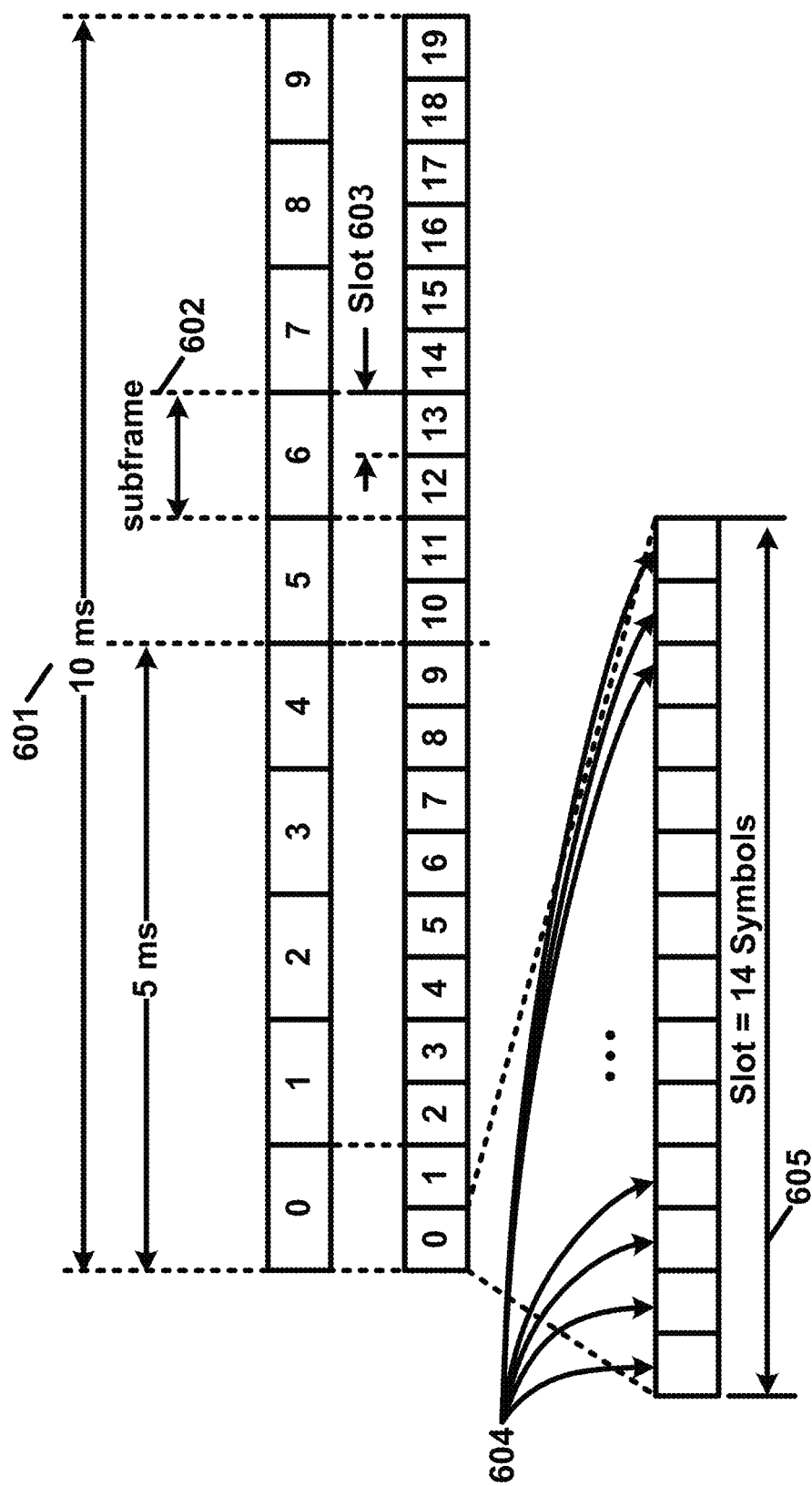
FIG. 6 shows an example transmission time and/or reception time for a carrier.

FIG. 6 shows an example transmission time and reception time, as well as an example frame structure, for a carrier. A multicarrier OFDM communication system may include one or more carriers, for example, ranging from 1 to 32 carriers (such as for carrier aggregation) or ranging from 1 to 64 carriers (such as for dual connectivity). Different radio frame structures may be supported (e.g., for FDD and/or for TDD duplex mechanisms). FIG. 6 shows an example frame timing. Downlink and uplink transmissions may be organized into radio frames 601. Radio frame duration may be 10 milliseconds (ms). A 10 ms radio frame 601 may be divided into ten equally sized subframes 602, each with a 1 ms duration. Subframe(s) may comprise one or more slots (e.g., slots 603 and 605) depending on subcarrier spacing and/or CP length. For example, a subframe with 15 kHz, 30 kHz, 60 kHz, 120 kHz, 240 kHz and 480 kHz subcarrier spacing may comprise one, two, four, eight, sixteen and thirty-two slots, respectively. In FIG. 6, a subframe may be divided into two equally sized slots 603 with 0.5 ms duration. For example, 10 subframes may be available for downlink transmission and 10 subframes may be available for uplink transmissions in a 10 ms interval. Other subframe durations such as, for example, 0.5 ms, 1 ms, 2 ms, and 5 ms may be supported. Uplink and downlink transmissions may be separated in the frequency domain. Slot(s) may include a plurality of OFDM symbols 604. The number of OFDM symbols 604 in a slot 605 may depend on the cyclic prefix length. A slot may be 14 OFDM symbols for the same subcarrier spacing of up to 480 kHz with normal CP. A slot may be 12 OFDM symbols for the same subcarrier spacing of 60 kHz with extended CP. A slot may comprise downlink, uplink, and/or a downlink part and an uplink part, and/or alike.

Figure 7A:
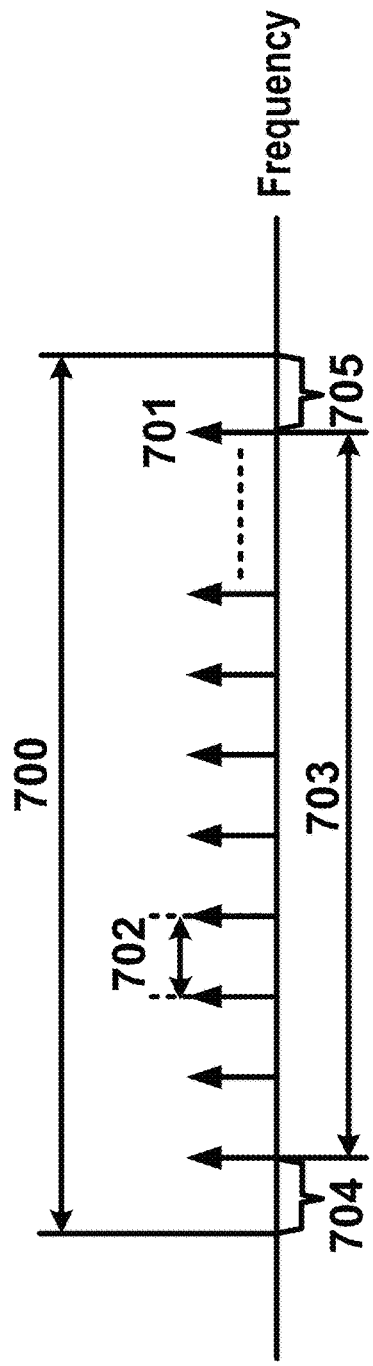
FIG. 7A and FIG. 7B show example sets of orthogonal frequency division multiplexing (OFDM) subcarriers.

FIG. 7A shows example sets of OFDM subcarriers. A base station may communicate with a wireless device using a carrier having an example channel bandwidth 700. Arrow(s) in the example may depict a subcarrier in a multicarrier OFDM system. The OFDM system may use technology such as OFDM technology, SC-FDMA technology, and/or the like. An arrow 701 shows a subcarrier transmitting information symbols. A subcarrier spacing 702, between two contiguous subcarriers in a carrier, may be any one of 15 kHz, 30 kHz, 60 kHz, 120 kHz, 240 kHz, or any other frequency. Different subcarrier spacing may correspond to different transmission numerologies. A transmission numerology may comprise at least: a numerology index; a value of subcarrier spacing; and/or a type of cyclic prefix (CP). A base station may send (e.g., transmit) to and/or receive from a wireless device via a number of subcarriers 703 in a carrier. A bandwidth occupied by a number of subcarriers 703 (e.g., transmission bandwidth) may be smaller than the channel bandwidth 700 of a carrier, for example, due to guard bands 704 and 705. Guard bands 704 and 705 may be used to reduce interference to and from one or more neighbor carriers. A number of subcarriers (e.g., transmission bandwidth) in a carrier may depend on the channel bandwidth of the carrier and/or the subcarrier spacing. A transmission bandwidth, for a carrier with a 20 MHz channel bandwidth and a 15 kHz subcarrier spacing, may be in number of 1024 subcarriers.

A base station and a wireless device may communicate with multiple component carriers (CCs), for example, if configured with CA. Different component carriers may have different bandwidth and/or different subcarrier spacing, for example, if CA is supported. A base station may send (e.g., transmit) a first type of service to a wireless device via a first component carrier. The base station may send (e.g., transmit) a second type of service to the wireless device via a second component carrier. Different types of services may have different service requirements (e.g., data rate, latency, reliability), which may be suitable for transmission via different component carriers having different subcarrier spacing and/or different bandwidth.

Figure 7B:
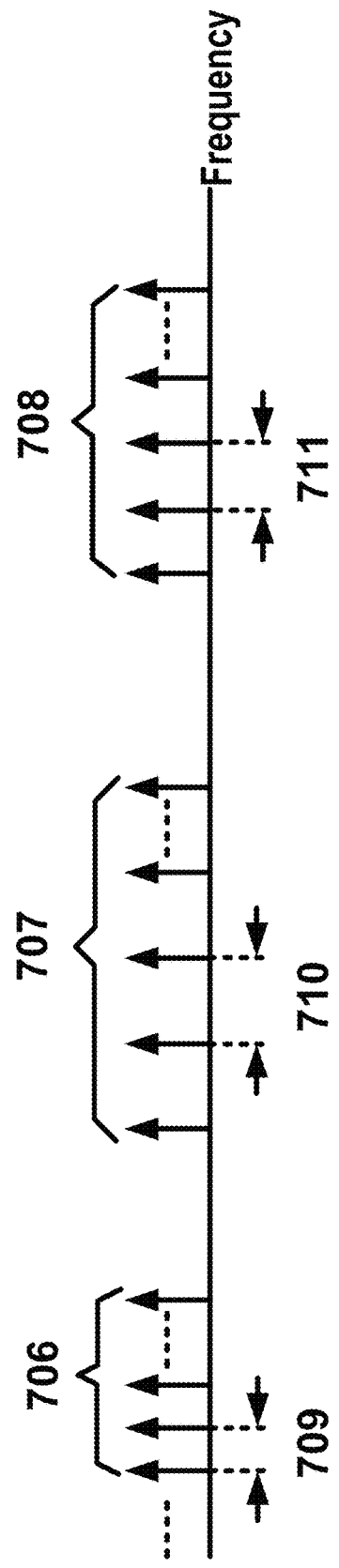

FIG. 7B shows examples of component carriers. A first component carrier may comprise a first number of subcarriers 706 having a first subcarrier spacing 709. A second component carrier may comprise a second number of subcarriers 707 having a second subcarrier spacing 710. A third component carrier may comprise a third number of subcarriers 708 having a third subcarrier spacing 711. Carriers in a multicarrier OFDM communication system may be contiguous carriers, non-contiguous carriers, or a combination of both contiguous and non-contiguous carriers.

Figure 8:
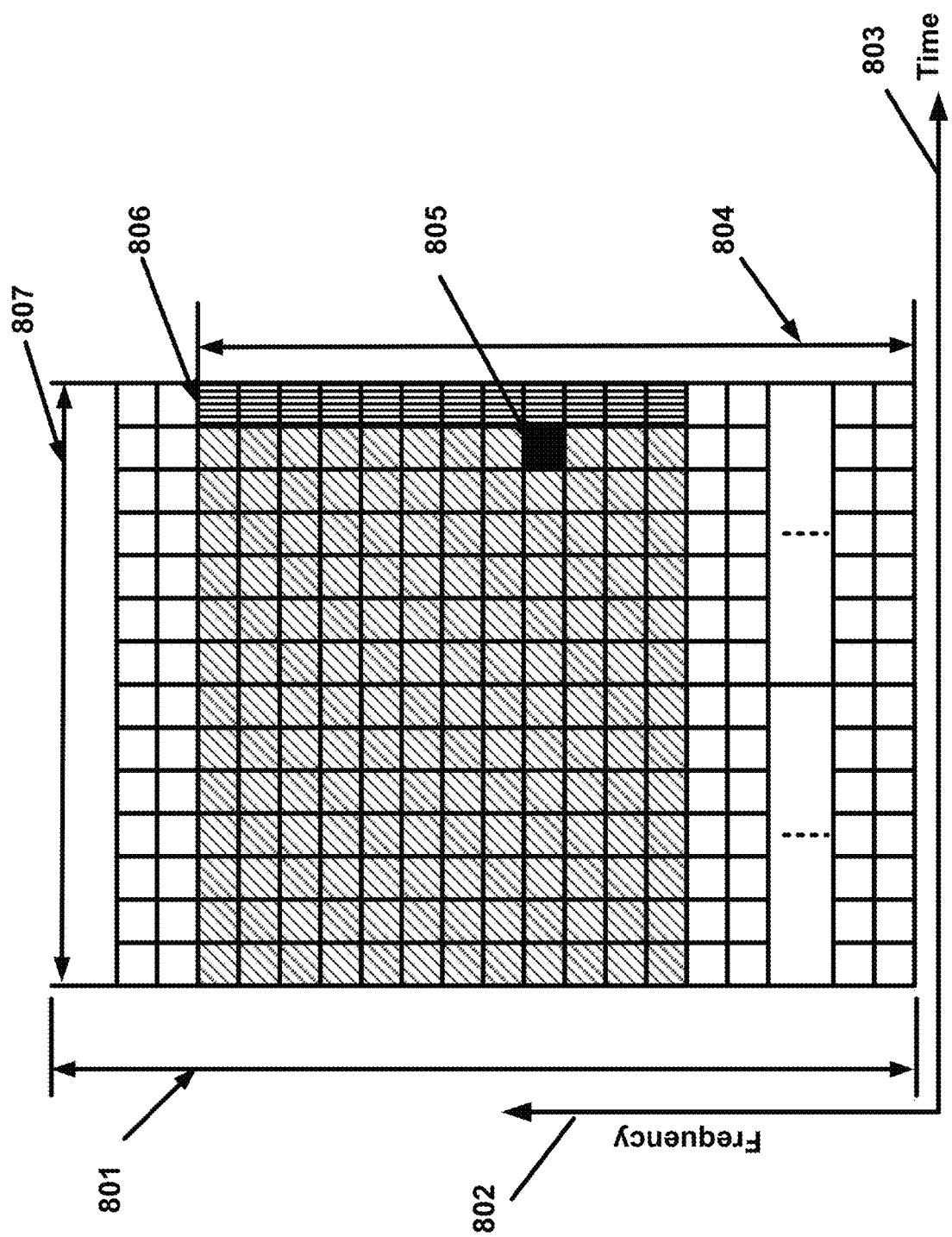
FIG. 8 shows example OFDM radio resources.

FIG. 8 shows an example of OFDM radio resources. A carrier may have a transmission bandwidth 801. A resource grid may be in a structure of frequency domain 802 and time domain 803. A resource grid may comprise a first number of OFDM symbols in a subframe and a second number of resource blocks, starting from a common resource block indicated by higher-layer signaling (e.g., RRC signaling), for a transmission numerology and a carrier. In a resource grid, a resource element 805 may comprise a resource unit that may be identified by a subcarrier index and a symbol index. A subframe may comprise a first number of OFDM symbols 807 that may depend on a numerology associated with a carrier. A subframe may have 14 OFDM symbols for a carrier, for example, if a subcarrier spacing of a numerology of a carrier is 15 kHz. A subframe may have 28 OFDM symbols, for example, if a subcarrier spacing of a numerology is 30 kHz. A subframe may have 56 OFDM symbols, for example, if a subcarrier spacing of a numerology is 60 kHz. A subcarrier spacing of a numerology may comprise any other frequency. A second number of resource blocks comprised in a resource grid of a carrier may depend on a bandwidth and a numerology of the carrier.

A resource block 806 may comprise 12 subcarriers. Multiple resource blocks may be grouped into a Resource Block Group (RBG) 804. A size of a RBG may depend on at least one of: a RRC message indicating a RBG size configuration; a size of a carrier bandwidth; and/or a size of a bandwidth part of a carrier. A carrier may comprise multiple bandwidth parts. A first bandwidth part of a carrier may have a different frequency location and/or a different bandwidth from a second bandwidth part of the carrier.

A base station may send (e.g., transmit), to a wireless device, a downlink control information comprising a downlink or uplink resource block assignment. A base station may send (e.g., transmit) to and/or receive from, a wireless device, data packets (e.g., transport blocks). The data packets may be scheduled on and transmitted via one or more resource blocks and one or more slots indicated by parameters in downlink control information and/or RRC message(s). A starting symbol relative to a first slot of the one or more slots may be indicated to the wireless device. A base station may send (e.g., transmit) to and/or receive from, a wireless device, data packets. The data packets may be scheduled for transmission on one or more RBGs and in one or more slots.

A base station may send (e.g., transmit), to a wireless device, downlink control information comprising a downlink assignment. The base station may send (e.g., transmit) the DCI via one or more PDCCHs. The downlink assignment may comprise parameters indicating at least one of a modulation and coding format; resource allocation; and/or HARQ information related to the DL-SCH. The resource allocation may comprise parameters of resource block allocation; and/or slot allocation. A base station may allocate (e.g., dynamically) resources to a wireless device, for example, via a Cell-Radio Network Temporary Identifier (C-RNTI) on one or more PDCCHs. The wireless device may monitor the one or more PDCCHs, for example, in order to find possible allocation if its downlink reception is enabled. The wireless device may receive one or more downlink data packets on one or more PDSCH scheduled by the one or more PDCCHs, for example, if the wireless device successfully detects the one or more PDCCHs.

A base station may allocate Configured Scheduling (CS) resources for down link transmission to a wireless device. The base station may send (e.g., transmit) one or more RRC messages indicating a periodicity of the CS grant. The base station may send (e.g., transmit) DCI via a PDCCH addressed to a Configured Scheduling-RNTI (CS-RNTI) activating the CS resources. The DCI may comprise parameters indicating that the downlink grant is a CS grant. The CS grant may be implicitly reused according to the periodicity defined by the one or more RRC messages. The CS grant may be implicitly reused, for example, until deactivated.

A base station may send (e.g., transmit), to a wireless device via one or more PDCCHs, downlink control information comprising an uplink grant. The uplink grant may comprise parameters indicating at least one of a modulation and coding format; a resource allocation; and/or HARQ information related to the UL-SCH. The resource allocation may comprise parameters of resource block allocation; and/or slot allocation. The base station may dynamically allocate resources to the wireless device via a C-RNTI on one or more PDCCHs. The wireless device may monitor the one or more PDCCHs, for example, in order to find possible resource allocation. The wireless device may send (e.g., transmit) one or more uplink data packets via one or more PUSCH scheduled by the one or more PDCCHs, for example, if the wireless device successfully detects the one or more PDCCHs.

The base station may allocate CS resources for uplink data transmission to a wireless device. The base station may transmit one or more RRC messages indicating a periodicity of the CS grant. The base station may send (e.g., transmit) DCI via a PDCCH addressed to a CS-RNTI to activate the CS resources. The DCI may comprise parameters indicating that the uplink grant is a CS grant. The CS grant may be implicitly reused according to the periodicity defined by the one or more RRC message, The CS grant may be implicitly reused, for example, until deactivated.

A base station may send (e.g., transmit) DCI and/or control signaling via a PDCCH. The DCI may comprise a format of a plurality of formats. The DCI may comprise downlink and/or uplink scheduling information (e.g., resource allocation information, HARQ related parameters, MCS), request(s) for CSI (e.g., aperiodic CQI reports), request(s) for an SRS, uplink power control commands for one or more cells, one or more timing information (e.g., TB transmission/reception timing, HARQ feedback timing, etc.), and/or the like. The DCI may indicate an uplink grant comprising transmission parameters for one or more transport blocks. The DCI may indicate a downlink assignment indicating parameters for receiving one or more transport blocks. The DCI may be used by the base station to initiate a contention-free random access at the wireless device. The base station may send (e.g., transmit) DCI comprising a slot format indicator (SFI) indicating a slot format. The base station may send (e.g., transmit) DCI comprising a preemption indication indicating the PRB(s) and/or OFDM symbol(s) in which a wireless device may assume no transmission is intended for the wireless device. The base station may send (e.g., transmit) DCI for group power control of the PUCCH, the PUSCH, and/or an SRS. DCI may correspond to an RNTI. The wireless device may obtain an RNTI after or in response to completing the initial access (e.g., C-RNTI). The base station may configure an RNTI for the wireless (e.g., CS-RNTI, TPC-CS-RNTI, TPC-PUCCH-RNTI, TPC-PUSCH-RNTI, TPC-SRS-RNTI, etc.). The wireless device may determine (e.g., compute) an RNTI (e.g., the wireless device may determine the RA-RNTI based on resources used for transmission of a preamble). An RNTI may have a pre-configured value (e.g., P-RNTI or SI-RNTI). The wireless device may monitor a group common search space which may be used by the base station for sending (e.g., transmitting) DCIs that are intended for a group of wireless devices. A group common DCI may correspond to an RNTI which is commonly configured for a group of wireless devices. The wireless device may monitor a wireless device-specific search space. A wireless device specific DCI may correspond to an RNTI configured for the wireless device.

A communications system (e.g., an NR system) may support a single beam operation and/or a multi-beam operation. In a multi-beam operation, a base station may perform a downlink beam sweeping to provide coverage for common control channels and/or downlink SS blocks, which may comprise at least a PSS, a SSS, and/or PBCH. A wireless device may measure quality of a beam pair link using one or more RSs. One or more SS blocks, or one or more CSI-RS resources (e.g., which may be associated with a CSI-RS resource index (CRI)), and/or one or more DM-RSs of a PBCH, may be used as an RS for measuring a quality of a beam pair link. The quality of a beam pair link may be based on a reference signal received power (RSRP) value, a reference signal received quality (RSRQ) value, and/or a CSI value measured on RS resources. The base station may indicate whether an RS resource, used for measuring a beam pair link quality, is quasi-co-located (QCLed) with DM-RSs of a control channel. An RS resource and DM-RSs of a control channel may be called QCLed, for example, if channel characteristics from a transmission on an RS to a wireless device, and that from a transmission on a control channel to a wireless device, are similar or the same under a configured criterion. In a multi-beam operation, a wireless device may perform an uplink beam sweeping to access a cell.

A wireless device may be configured to monitor a PDCCH on one or more beam pair links simultaneously, for example, depending on a capability of the wireless device. This monitoring may increase robustness against beam pair link blocking. A base station may send (e.g., transmit) one or more messages to configure the wireless device to monitor the PDCCH on one or more beam pair links in different PDCCH OFDM symbols. A base station may send (e.g., transmit) higher layer signaling (e.g., RRC signaling) and/or a MAC CE comprising parameters related to the Rx beam setting of the wireless device for monitoring the PDCCH on one or more beam pair links. The base station may send (e.g., transmit) an indication of a spatial QCL assumption between an DL RS antenna port(s) (e.g., a cell-specific CSI-RS, a wireless device-specific CSI-RS, an SS block, and/or a PBCH with or without DM-RSs of the PBCH) and/or DL RS antenna port(s) for demodulation of a DL control channel. Signaling for beam indication for a PDCCH may comprise MAC CE signaling, RRC signaling, DCI signaling, and/or specification-transparent and/or implicit method, and/or any combination of signaling methods.

A base station may indicate spatial QCL parameters between DL RS antenna port(s) and DM-RS antenna port(s) of a DL data channel, for example, for reception of a unicast DL data channel. The base station may send (e.g., transmit) DCI (e.g., downlink grants) comprising information indicating the RS antenna port(s). The information may indicate RS antenna port(s) that may be QCL-ed with the DM-RS antenna port(s). A different set of DM-RS antenna port(s) for a DL data channel may be indicated as QCL with a different set of the RS antenna port(s).

Figure 9A:
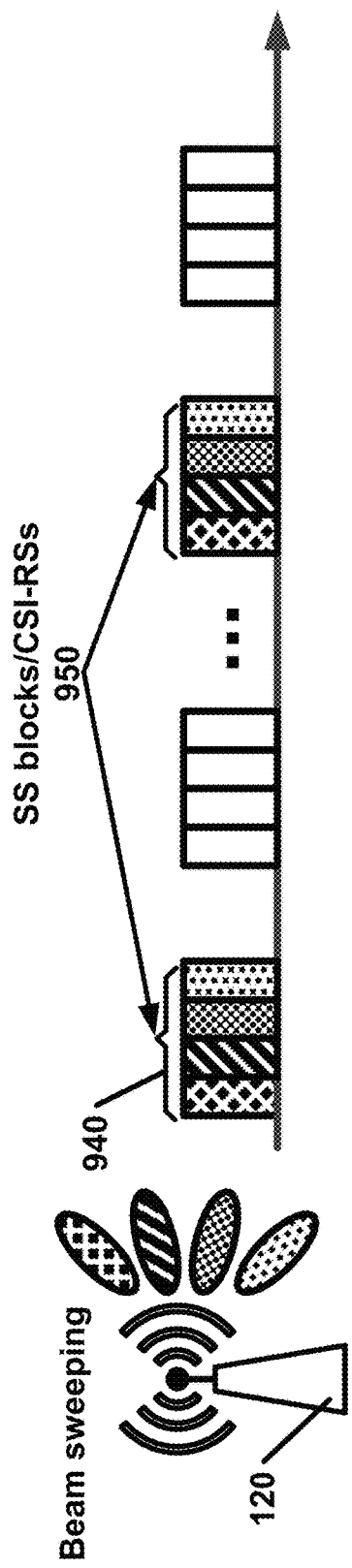
FIG. 9A shows an example channel state information reference signal (CSI-RS) and/or synchronization signal (SS) block transmission in a multi-beam system.

FIG. 9A shows an example of beam sweeping in a DL channel. In an RRC_INACTIVE state or RRC_IDLE state, a wireless device may assume that SS blocks form an SS burst 940, and an SS burst set 950. The SS burst set 950 may have a given periodicity. A base station 120 may send (e.g., transmit) SS blocks in multiple beams, together forming a SS burst 940, for example, in a multi-beam operation. One or more SS blocks may be sent (e.g., transmitted) on one beam. If multiple SS bursts 940 are transmitted with multiple beams, SS bursts together may form SS burst set 950.

A wireless device may use CSI-RS for estimating a beam quality of a link between a wireless device and a base station, for example, in the multi beam operation. A beam may be associated with a CSI-RS. A wireless device may (e.g., based on a RSRP measurement on CSI-RS) report a beam index, which may be indicated in a CRI for downlink beam selection and/or associated with an RSRP value of a beam. A CSI-RS may be sent (e.g., transmitted) on a CSI-RS resource, which may comprise at least one of: one or more antenna ports and/or one or more time and/or frequency radio resources. A CSI-RS resource may be configured in a cell-specific way such as by common RRC signaling, or in a wireless device-specific way such as by dedicated RRC signaling and/or L1/L2 signaling. Multiple wireless devices covered by a cell may measure a cell-specific CSI-RS resource. A dedicated subset of wireless devices covered by a cell may measure a wireless device-specific CSI-RS resource.

A CSI-RS resource may be sent (e.g., transmitted) periodically, using aperiodic transmission, or using a multi-shot or semi-persistent transmission. In a periodic transmission in FIG. 9A, a base station 120 may send (e.g., transmit) configured CSI-RS resources 940 periodically using a configured periodicity in a time domain. In an aperiodic transmission, a configured CSI-RS resource may be sent (e.g., transmitted) in a dedicated time slot. In a multi-shot and/or semi-persistent transmission, a configured CSI-RS resource may be sent (e.g., transmitted) within a configured period. Beams used for CSI-RS transmission may have a different beam width than beams used for SS-blocks transmission.

Figure 9B:
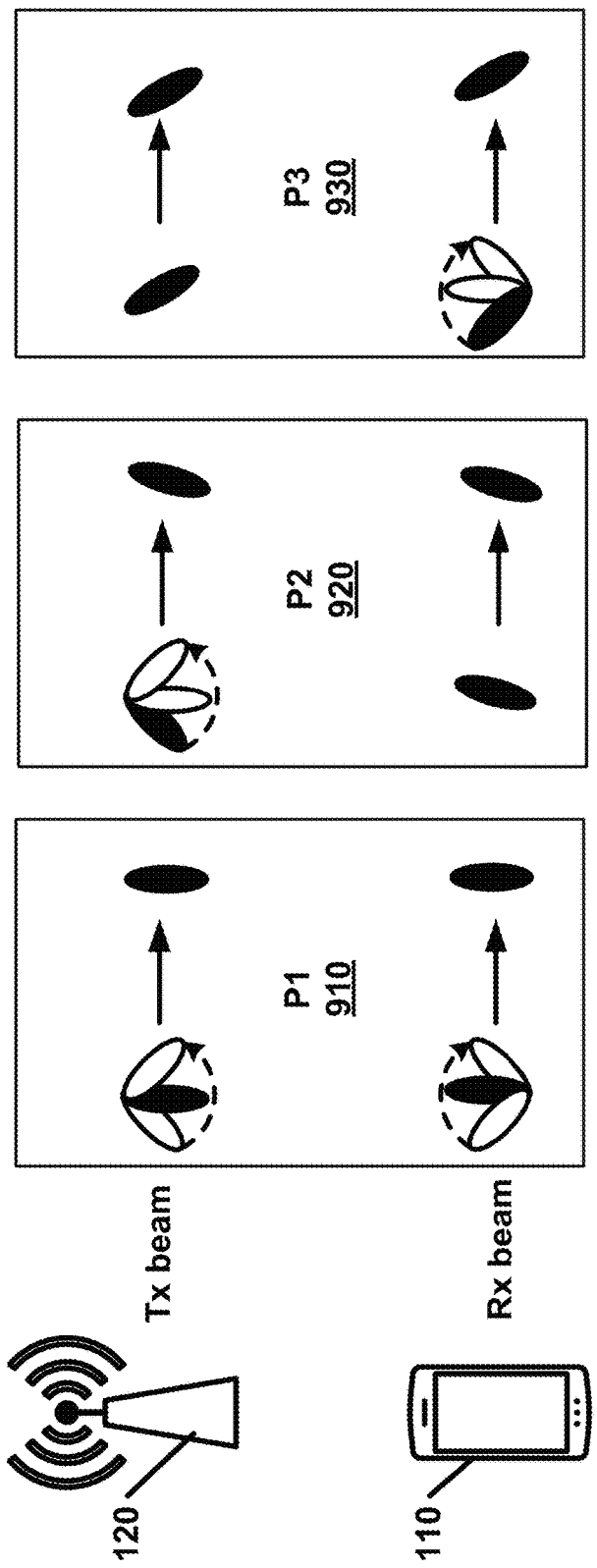
FIG. 9B shows an example downlink beam management procedure.

FIG. 9B shows an example of a beam management procedure, such as in an example new radio network. The base station 120 and/or the wireless device 110 may perform a downlink L1/L2 beam management procedure. One or more of the following downlink L1/L2 beam management procedures may be performed within one or more wireless devices 110 and one or more base stations 120. A P1 procedure 910 may be used to enable the wireless device 110 to measure one or more Transmission (Tx) beams associated with the base station 120, for example, to support a selection of a first set of Tx beams associated with the base station 120 and a first set of Rx beam(s) associated with the wireless device 110. A base station 120 may sweep a set of different Tx beams, for example, for beamforming at a base station 120 (such as shown in the top row, in a counter-clockwise direction). A wireless device 110 may sweep a set of different Rx beams, for example, for beamforming at a wireless device 110 (such as shown in the bottom row, in a clockwise direction). A P2 procedure 920 may be used to enable a wireless device 110 to measure one or more Tx beams associated with a base station 120, for example, to possibly change a first set of Tx beams associated with a base station 120. A P2 procedure 920 may be performed on a possibly smaller set of beams (e.g., for beam refinement) than in the P1 procedure 910. A P2 procedure 920 may be a special example of a P1 procedure 910. A P3 procedure 930 may be used to enable a wireless device 110 to measure at least one Tx beam associated with a base station 120, for example, to change a first set of Rx beams associated with a wireless device 110.

A wireless device 110 may send (e.g., transmit) one or more beam management reports to a base station 120. In one or more beam management reports, a wireless device 110 may indicate one or more beam pair quality parameters comprising one or more of: a beam identification; an RSRP; a Precoding Matrix Indicator (PMI), Channel Quality Indicator (CQI), and/or Rank Indicator (RI) of a subset of configured beams. Based on one or more beam management reports, the base station 120 may send (e.g., transmit) to a wireless device 110 a signal indicating that one or more beam pair links are one or more serving beams. The base station 120 may send (e.g., transmit) the PDCCH and the PDSCH for a wireless device 110 using one or more serving beams.

A communications network (e.g., a new radio network) may support a Bandwidth Adaptation (BA). Receive and/or transmit bandwidths that may be configured for a wireless device using a BA may not be large. Receive and/or transmit bandwidth may not be as large as a bandwidth of a cell. Receive and/or transmit bandwidths may be adjustable. A wireless device may change receive and/or transmit bandwidths, for example, to reduce (e.g., shrink) the bandwidth(s) at (e.g., during) a period of low activity such as to save power. A wireless device may change a location of receive and/or transmit bandwidths in a frequency domain, for example, to increase scheduling flexibility. A wireless device may change a subcarrier spacing, for example, to allow different services.

A Bandwidth Part (BWP) may comprise a subset of a total cell bandwidth of a cell. A base station may configure a wireless device with one or more BWPs, for example, to achieve a BA. A base station may indicate, to a wireless device, which of the one or more (configured) BWPs is an active BWP.

Figure 10:
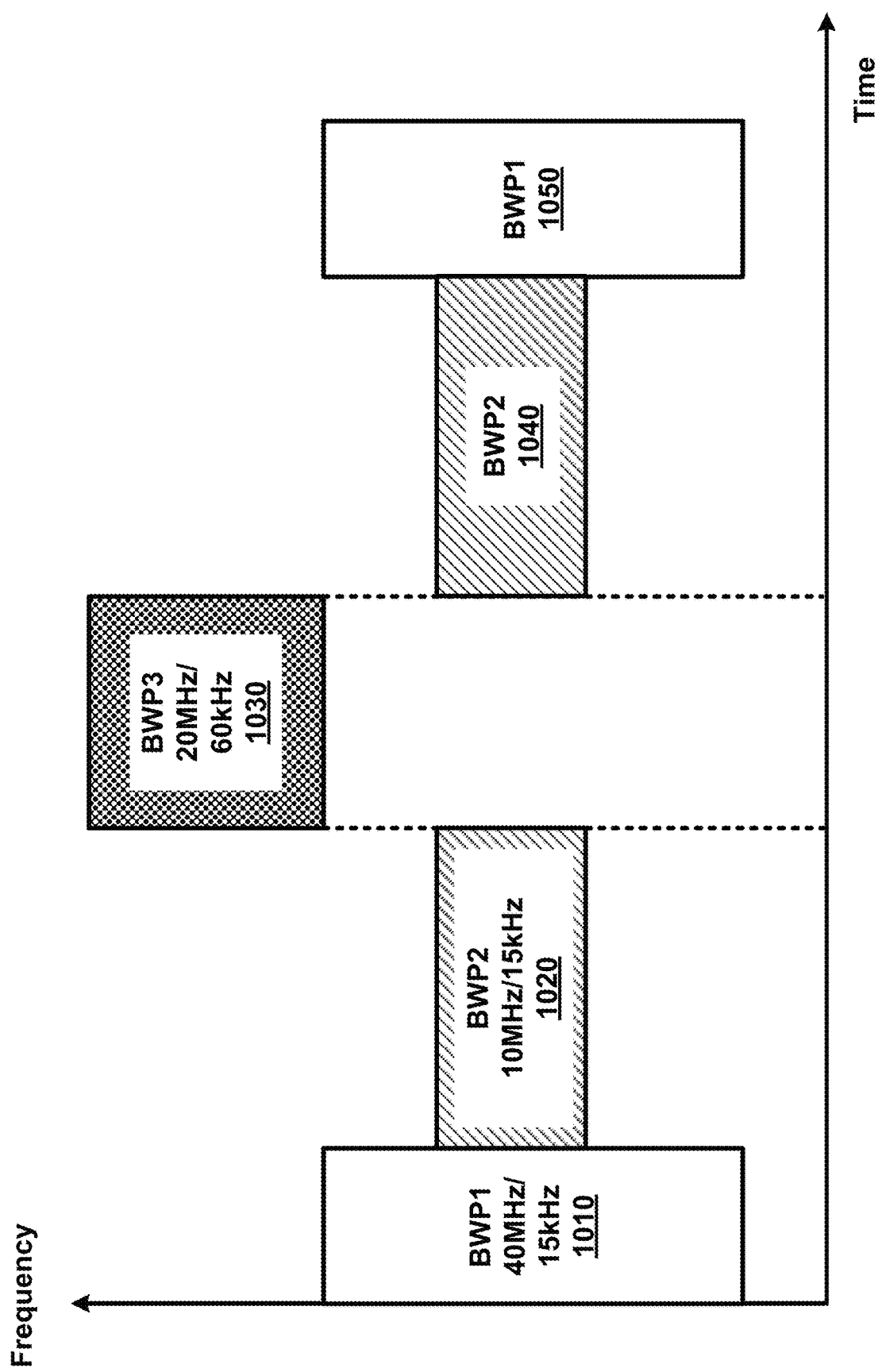
FIG. 10 shows an example of configured bandwidth parts (BWPs).

FIG. 10 shows an example of BWP configurations. BWPs may be configured as follows: BWP1 (1010 and 1050) with a width of 40 MHz and subcarrier spacing of 15 kHz; BWP2

(1020 and 1040) with a width of 10 MHz and subcarrier spacing of 15 kHz; BWP3 1030 with a width of 20 MHz and subcarrier spacing of 60 kHz. Any number of BWP configurations may comprise any other width and subcarrier spacing combination.

A wireless device, configured for operation in one or more BWPs of a cell, may be configured by one or more higher layers (e.g., RRC layer). The wireless device may be configured for a cell with: a set of one or more BWPs (e.g., at most four BWPs) for reception (e.g., a DL BWP set) in a DL bandwidth by at least one parameter DL-BWP; and a set of one or more BWPs (e.g., at most four BWPs) for transmissions (e.g., UL BWP set) in an UL bandwidth by at least one parameter UL-BWP.

A base station may configure a wireless device with one or more UL and DL BWP pairs, for example, to enable BA on the PCell. To enable BA on SCells (e.g., for CA), a base station may configure a wireless device at least with one or more DL BWPs (e.g., there may be none in an UL).

An initial active DL BWP may comprise at least one of a location and number of contiguous PRBs, a subcarrier spacing, or a cyclic prefix, for example, for a CORESETs for at least one common search space. For operation on the PCell, one or more higher layer parameters may indicate at least one initial UL BWP for a random access procedure. If a wireless device is configured with a secondary carrier on a primary cell, the wireless device may be configured with an initial BWP for random access procedure on a secondary carrier.

A wireless device may expect that a center frequency for a DL BWP may be same as a center frequency for a UL BWP, for example, for unpaired spectrum operation. A base station may semi-statically configure a wireless device for a cell with one or more parameters, for example, for a DL BWP or an UL BWP in a set of one or more DL BWPs or one or more UL BWPs, respectively. The one or more parameters may indicate one or more of following: a subcarrier spacing; a cyclic prefix; a number of contiguous PRBs; an index in the set of one or more DL BWPs and/or one or more UL BWPs; a link between a DL BWP and an UL BWP from a set of configured DL BWPs and UL BWPs; a DCI detection to a PDSCH reception timing; a PDSCH reception to a HARQ-ACK transmission timing value; a DCI detection to a PUSCH transmission timing value; and/or an offset of a first PRB of a DL bandwidth or an UL bandwidth, respectively, relative to a first PRB of a bandwidth.

For a DL BWP in a set of one or more DL BWPs on a PCell, a base station may configure a wireless device with one or more control resource sets for at least one type of common search space and/or one wireless device-specific search space. A base station may not configure a wireless device without a common search space on a PCell, or on a PSCell, in an active DL BWP. For an UL BWP in a set of one or more UL BWPs, a base station may configure a wireless device with one or more resource sets for one or more PUCCH transmissions.

DCI may comprise a BWP indicator field. The BWP indicator field value may indicate an active DL BWP, from a configured DL BWP set, for one or more DL receptions. The BWP indicator field value may indicate an active UL BWP, from a configured UL BWP set, for one or more UL transmissions.

For a PCell, a base station may semi-statically configure a wireless device with a default DL BWP among configured DL BWPs. If a wireless device is not provided a default DL BWP, a default BWP may be an initial active DL BWP.

A base station may configure a wireless device with a timer value for a PCell. A wireless device may start a timer (e.g., a BWP inactivity timer), for example, if a wireless device detects DCI indicating an active DL BWP, other than a default DL BWP, for a paired spectrum operation, and/or if a wireless device detects DCI indicating an active DL BWP or UL BWP, other than a default DL BWP or UL BWP, for an unpaired spectrum operation. The wireless device may increment the timer by an interval of a first value (e.g., the first value may be 1 millisecond, 0.5 milliseconds, or any other time duration), for example, if the wireless device does not detect DCI at (e.g., during) the interval for a paired spectrum operation or for an unpaired spectrum operation. The timer may expire at a time that the timer is equal to the timer value. A wireless device may switch to the default DL BWP from an active DL BWP, for example, if the timer expires.

A base station may semi-statically configure a wireless device with one or more BWPs. A wireless device may switch an active BWP from a first BWP to a second BWP, for example, after or in response to receiving DCI indicating the second BWP as an active BWP, and/or after or in response to an expiry of BWP inactivity timer (e.g., the second BWP may be a default BWP). FIG. 10 shows an example of three BWPs configured, BWP1 (1010 and 1050), BWP2 (1020 and 1040), and BWP3 (1030). BWP2 (1020 and 1040) may be a default BWP. BWP1 (1010) may be an initial active BWP. A wireless device may switch an active BWP from BWP1 1010 to BWP2 1020, for example, after or in response to an expiry of the BWP inactivity timer. A wireless device may switch an active BWP from BWP2 1020 to BWP3 1030, for example, after or in response to receiving DCI indicating BWP3 1030 as an active BWP. Switching an active BWP from BWP3 1030 to BWP2 1040 and/or from BWP2 1040 to BWP1 1050 may be after or in response to receiving DCI indicating an active BWP, and/or after or in response to an expiry of BWP inactivity timer.

Wireless device procedures on a secondary cell may be same as on a primary cell using the timer value for the secondary cell and the default DL BWP for the secondary cell, for example, if a wireless device is configured for a secondary cell with a default DL BWP among configured DL BWPs and a timer value. A wireless device may use an indicated DL BWP and an indicated UL BWP on a secondary cell as a respective first active DL BWP and first active UL BWP on a secondary cell or carrier, for example, if a base station configures a wireless device with a first active DL BWP and a first active UL BWP on a secondary cell or carrier.

Figure 11A:
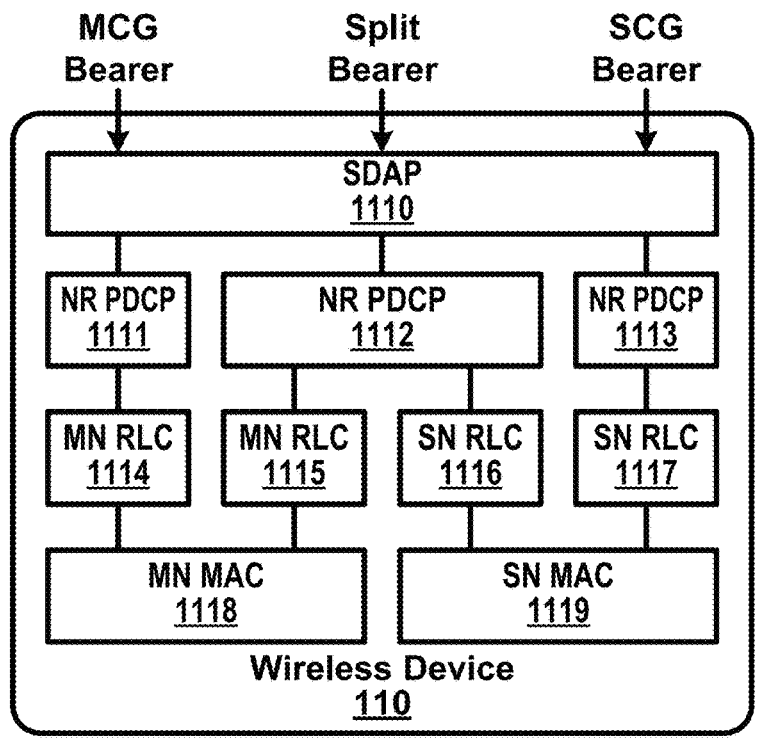
FIG. 11A and FIG. 11B show examples of multi connectivity.
Figure 11B:
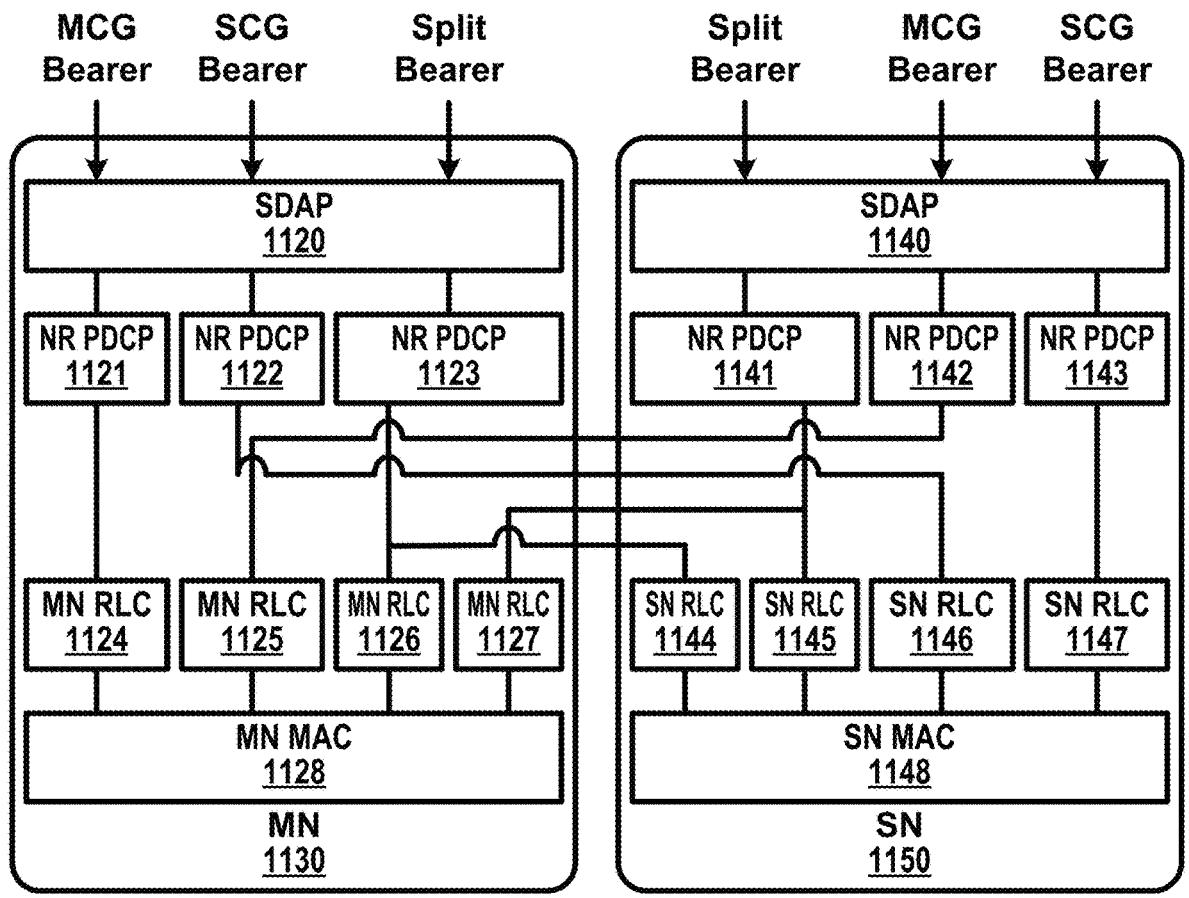

FIG. 11A and FIG. 11B show packet flows using a multi connectivity (e.g., dual connectivity, multi connectivity, tight interworking, and/or the like). FIG. 11A shows an example of a protocol structure of a wireless device 110 (e.g., UE) with CA and/or multi connectivity. FIG. 11B shows an example of a protocol structure of multiple base stations with CA and/or multi connectivity. The multiple base stations may comprise a master node, MN 1130 (e.g., a master node, a master base station, a master gNB, a master eNB, and/or the like) and a secondary node, SN 1150 (e.g., a secondary node, a secondary base station, a secondary gNB, a secondary eNB, and/or the like). A master node 1130 and a secondary node 1150 may co-work to communicate with a wireless device 110.

If multi connectivity is configured for a wireless device 110, the wireless device 110, which may support multiple reception and/or transmission functions in an RRC connected state, may be configured to utilize radio resources provided by multiple schedulers of a multiple base stations. Multiple base stations may be inter-connected via a non-ideal or ideal backhaul (e.g., Xn interface, X2 interface, and/or the like). A base station involved in multi connectivity for a certain wireless device may perform at least one of two different roles: a base station may act as a master base station or act as a secondary base station. In multi connectivity, a wireless device may be connected to one master base station and one or more secondary base stations. A master base station (e.g., the MN 1130) may provide a master cell group (MCG) comprising a primary cell and/or one or more secondary cells for a wireless device (e.g., the wireless device 110). A secondary base station (e.g., the SN 1150) may provide a secondary cell group (SCG) comprising a primary secondary cell (PSCell) and/or one or more secondary cells for a wireless device (e.g., the wireless device 110).

In multi connectivity, a radio protocol architecture that a bearer uses may depend on how a bearer is setup. Three different types of bearer setup options may be supported: an MCG bearer, an SCG bearer, and/or a split bearer. A wireless device may receive and/or send (e.g., transmit) packets of an MCG bearer via one or more cells of the MCG. A wireless device may receive and/or send (e.g., transmit) packets of an SCG bearer via one or more cells of an SCG. Multi-connectivity may indicate having at least one bearer configured to use radio resources provided by the secondary base station. Multi-connectivity may or may not be configured and/or implemented.

A wireless device (e.g., wireless device 110) may send (e.g., transmit) and/or receive: packets of an MCG bearer via an SDAP layer (e.g., SDAP 1110), a PDCP layer (e.g., NR PDCP 1111), an RLC layer (e.g., MN RLC 1114), and a MAC layer (e.g., MN MAC 1118); packets of a split bearer via an SDAP layer (e.g., SDAP 1110), a PDCP layer (e.g., NR PDCP 1112), one of a master or secondary RLC layer (e.g., MN RLC 1115, SN RLC 1116), and one of a master or secondary MAC layer (e.g., MN MAC 1118, SN MAC 1119); and/or packets of an SCG bearer via an SDAP layer (e.g., SDAP 1110), a PDCP layer (e.g., NR PDCP 1113), an RLC layer (e.g., SN RLC 1117), and a MAC layer (e.g., MN MAC 1119).

A master base station (e.g., MN 1130) and/or a secondary base station (e.g., SN 1150) may send (e.g., transmit) and/or receive: packets of an MCG bearer via a master or secondary node SDAP layer (e.g., SDAP 1120, SDAP 1140), a master or secondary node PDCP layer (e.g., NR PDCP 1121, NR PDCP 1142), a master node RLC layer (e.g., MN RLC 1124, MN RLC 1125), and a master node MAC layer (e.g., MN MAC 1128); packets of an SCG bearer via a master or secondary node SDAP layer (e.g., SDAP 1120, SDAP 1140), a master or secondary node PDCP layer (e.g., NR PDCP 1122, NR PDCP 1143), a secondary node RLC layer (e.g., SN RLC 1146, SN RLC 1147), and a secondary node MAC layer (e.g., SN MAC 1148); packets of a split bearer via a master or secondary node SDAP layer (e.g., SDAP 1120, SDAP 1140), a master or secondary node PDCP layer (e.g., NR PDCP 1123, NR PDCP 1141), a master or secondary node RLC layer (e.g., MN RLC 1126, SN RLC 1144, SN RLC 1145, MN RLC 1127), and a master or secondary node MAC layer (e.g., MN MAC 1128, SN MAC 1148).

In multi connectivity, a wireless device may configure multiple MAC entities, such as one MAC entity (e.g., MN MAC 1118) for a master base station, and other MAC entities (e.g., SN MAC 1119) for a secondary base station. In multi-connectivity, a configured set of serving cells for a wireless device may comprise two subsets: an MCG comprising serving cells of a master base station, and SCGs comprising serving cells of a secondary base station. For an SCG, one or more of following configurations may be used. At least one cell of an SCG may have a configured UL CC and at least one cell of a SCG, named as primary secondary cell (e.g., PSCell, PCell of SCG, PCell), and may be configured with PUCCH resources. If an SCG is configured, there may be at least one SCG bearer or one split bearer. After or upon detection of a physical layer problem or a random access problem on a PSCell, or a number of NR RLC retransmissions has been reached associated with the SCG, or after or upon detection of an access problem on a PSCell associated with (e.g., during) a SCG addition or an SCG change: an RRC connection re-establishment procedure may not be triggered, UL transmissions towards cells of an SCG may be stopped, a master base station may be informed by a wireless device of a SCG failure type, a DL data transfer over a master base station may be maintained (e.g., for a split bearer). An NR RLC acknowledged mode (AM) bearer may be configured for a split bearer. A PCell and/or a PSCell may not be de-activated. A PSCell may be changed with a SCG change procedure (e.g., with security key change and a RACH procedure). A bearer type change between a split bearer and a SCG bearer, and/or simultaneous configuration of a SCG and a split bearer, may or may not be supported.

With respect to interactions between a master base station and a secondary base stations for multi-connectivity, one or more of the following may be used. A master base station and/or a secondary base station may maintain RRM measurement configurations of a wireless device. A master base station may determine (e.g., based on received measurement reports, traffic conditions, and/or bearer types) to request a secondary base station to provide additional resources (e.g., serving cells) for a wireless device. After or upon receiving a request from a master base station, a secondary base station may create and/or modify a container that may result in a configuration of additional serving cells for a wireless device (or decide that the secondary base station has no resource available to do so). For a wireless device capability coordination, a master base station may provide (e.g., all or a part of) an AS configuration and wireless device capabilities to a secondary base station. A master base station and a secondary base station may exchange information about a wireless device configuration such as by using RRC containers (e.g., inter-node messages) carried via Xn messages. A secondary base station may initiate a reconfiguration of the secondary base station existing serving cells (e.g., PUCCH towards the secondary base station). A secondary base station may decide which cell is a PSCell within a SCG. A master base station may or may not change content of RRC configurations provided by a secondary base station. A master base station may provide recent (and/or the latest) measurement results for SCG cell(s), for example, if an SCG addition and/or an SCG SCell addition occurs. A master base station and secondary base stations may receive information of SFN and/or subframe offset of each other from an OAM and/or via an Xn interface (e.g., for a purpose of DRX alignment and/or identification of a measurement gap). Dedicated RRC signaling may be used for sending required system information of a cell as for CA, for example, if adding a new SCG SCell, except for an SFN acquired from an MIB of a PSCell of a SCG.

Figure 12:
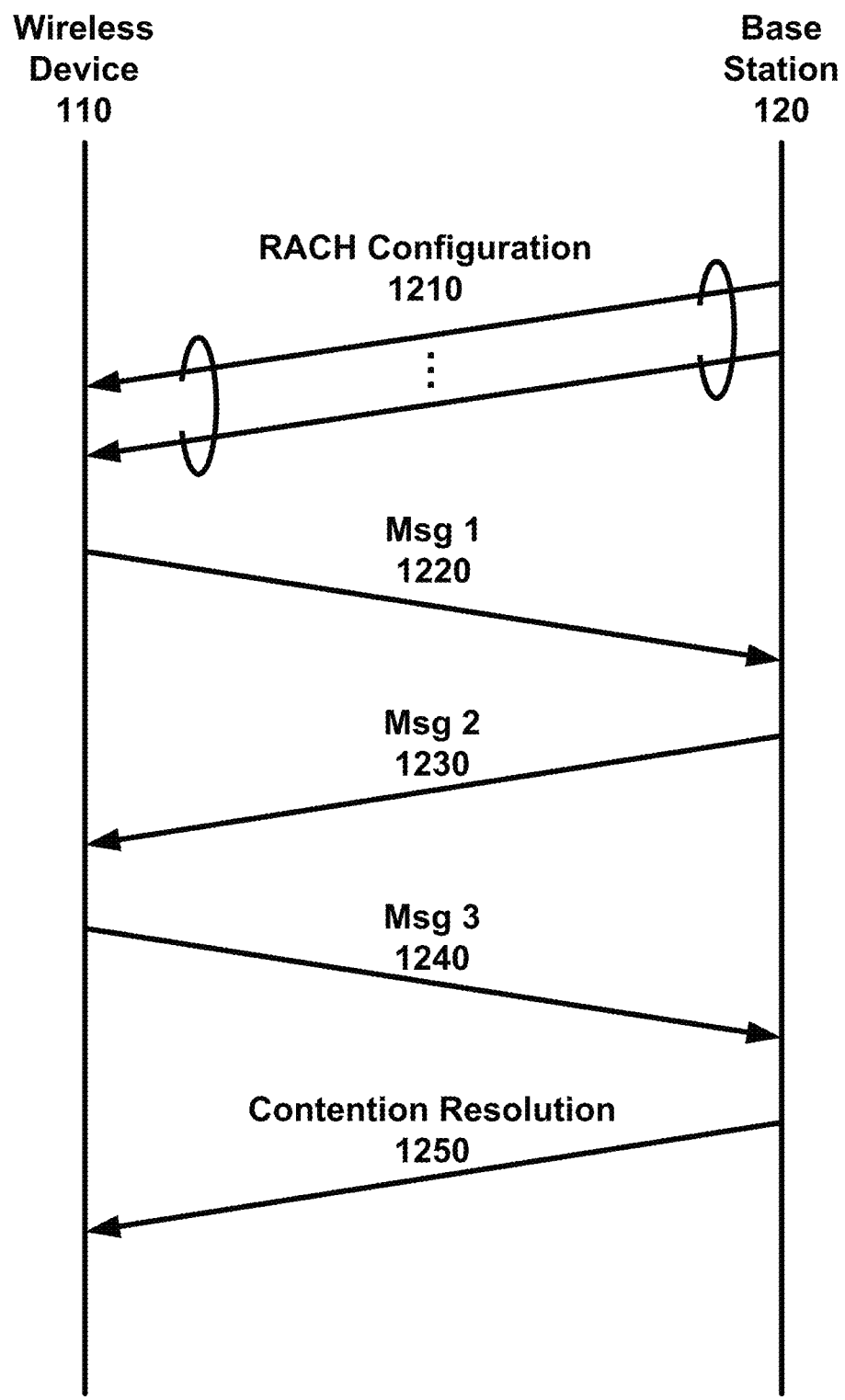
FIG. 12 shows an example of a random access procedure.

FIG. 12 shows an example of a random access procedure. One or more events may trigger a random access procedure. For example, one or more events may be at least one of following: initial access from RRC_IDLE, RRC connection re-establishment procedure, handover, DL or UL data arrival in (e.g., during) a state of RRC_CONNECTED (e.g., if UL synchronization status is non-synchronized), transition from RRC_Inactive, and/or request for other system information. A PDCCH order, a MAC entity, and/or a beam failure indication may initiate a random access procedure.

A random access procedure may comprise or be one of at least a contention based random access procedure and/or a contention free random access procedure. A contention based random access procedure may comprise one or more Msg 1 1220 transmissions, one or more Msg2 1230 transmissions, one or more Msg3 1240 transmissions, and contention resolution 1250. A contention free random access procedure may comprise one or more Msg 1 1220 transmissions and one or more Msg2 1230 transmissions. One or more of Msg 1 1220, Msg 2 1230, Msg 3 1240, and/or contention resolution 1250 may be transmitted in the same step. A two-step random access procedure, for example, may comprise a first transmission (e.g., Msg A) and a second transmission (e.g., Msg B). The first transmission (e.g., Msg A) may comprise transmitting, by a wireless device (e.g., wireless device 110) to a base station (e.g., base station 120), one or more messages indicating an equivalent and/or similar contents of Msg1 1220 and Msg3 1240 of a four-step random access procedure. The second transmission (e.g., Msg B) may comprise transmitting, by the base station (e.g., base station 120) to a wireless device (e.g., wireless device 110) after or in response to the first message, one or more messages indicating an equivalent and/or similar content of Msg2 1230 and contention resolution 1250 of a four-step random access procedure.

A base station may send (e.g., transmit, unicast, multicast, broadcast, etc.), to a wireless device, a RACH configuration 1210 via one or more beams. The RACH configuration 1210 may comprise one or more parameters indicating at least one of following: an available set of PRACH resources for a transmission of a random access preamble, initial preamble power (e.g., random access preamble initial received target power), an RSRP threshold for a selection of a SS block and corresponding PRACH resource, a power-ramping factor (e.g., random access preamble power ramping step), a random access preamble index, a maximum number of preamble transmissions, preamble group A and group B, a threshold (e.g., message size) to determine the groups of random access preambles, a set of one or more random access preambles for a system information request and corresponding PRACH resource(s) (e.g., if any), a set of one or more random access preambles for a beam failure recovery request and corresponding PRACH resource(s) (e.g., if any), a time window to monitor RA response(s), a time window to monitor response(s) on a beam failure recovery request, and/or a contention resolution timer.

The Msg1 1220 may comprise one or more transmissions of a random access preamble. For a contention based random access procedure, a wireless device may select an SS block with an RSRP above the RSRP threshold. If random access preambles group B exists, a wireless device may select one or more random access preambles from a group A or a group B, for example, depending on a potential Msg3 1240 size. If a random access preambles group B does not exist, a wireless device may select the one or more random access preambles from a group A. A wireless device may select a random access preamble index randomly (e.g., with equal probability or a normal distribution) from one or more random access preambles associated with a selected group. If a base station semi-statically configures a wireless device with an association between random access preambles and SS blocks, the wireless device may select a random access preamble index randomly with equal probability from one or more random access preambles associated with a selected SS block and a selected group.

A wireless device may initiate a contention free random access procedure, for example, based on a beam failure indication from a lower layer. A base station may semi-statically configure a wireless device with one or more contention free PRACH resources for a beam failure recovery request associated with at least one of SS blocks and/or CSI-RSs. A wireless device may select a random access preamble index corresponding to a selected SS block or a CSI-RS from a set of one or more random access preambles for a beam failure recovery request, for example, if at least one of the SS blocks with an RSRP above a first RSRP threshold amongst associated SS blocks is available, and/or if at least one of CSI-RSs with a RSRP above a second RSRP threshold amongst associated CSI-RSs is available.

A wireless device may receive, from a base station, a random access preamble index via PDCCH or RRC for a contention free random access procedure. The wireless device may select a random access preamble index, for example, if a base station does not configure a wireless device with at least one contention free PRACH resource associated with SS blocks or CSI-RS. The wireless device may select the at least one SS block and/or select a random access preamble corresponding to the at least one SS block, for example, if a base station configures the wireless device with one or more contention free PRACH resources associated with SS blocks and/or if at least one SS block with a RSRP above a first RSRP threshold amongst associated SS blocks is available. The wireless device may select the at least one CSI-RS and/or select a random access preamble corresponding to the at least one CSI-RS, for example, if a base station configures a wireless device with one or more contention free PRACH resources associated with CSI-RSs and/or if at least one CSI-RS with a RSRP above a second RSPR threshold amongst the associated CSI-RSs is available.

A wireless device may perform one or more Msg1 1220 transmissions, for example, by sending (e.g., transmitting) the selected random access preamble. The wireless device may determine a PRACH occasion from one or more PRACH occasions corresponding to a selected SS block, for example, if the wireless device selects an SS block and is configured with an association between one or more PRACH occasions and/or one or more SS blocks. The wireless device may determine a PRACH occasion from one or more PRACH occasions corresponding to a selected CSI-RS, for example, if the wireless device selects a CSI-RS and is configured with an association between one or more PRACH occasions and one or more CSI-RSs. The wireless device may send (e.g., transmit), to a base station, a selected random access preamble via a selected PRACH occasions. The wireless device may determine a transmit power for a transmission of a selected random access preamble at least based on an initial preamble power and a power-ramping factor. The wireless device may determine an RA-RNTI associated with a selected PRACH occasion in which a selected random access preamble is sent (e.g., transmitted). The wireless device may not determine an RA-RNTI for a beam failure recovery request. The wireless device may determine an RA-RNTI at least based on an index of a first OFDM symbol, an index of a first slot of a selected PRACH occasions, and/or an uplink carrier index for a transmission of Msg1 1220.

A wireless device may receive, from a base station, a random access response, Msg 2 1230. The wireless device may start a time window (e.g., ra-ResponseWindow) to monitor a random access response. For a beam failure recovery procedure, the base station may configure the wireless device with a different time window (e.g., bfr-ResponseWindow) to monitor response to on a beam failure recovery request. The wireless device may start a time window (e.g., ra-ResponseWindow or bfr-ResponseWindow) at a start of a first PDCCH occasion, for example, after a fixed duration of one or more symbols from an end of a preamble transmission. If the wireless device sends (e.g., transmits) multiple preambles, the wireless device may start a time window at a start of a first PDCCH occasion after a fixed duration of one or more symbols from an end of a first preamble transmission. The wireless device may monitor a PDCCH of a cell for at least one random access response identified by a RA-RNTI, or for at least one response to a beam failure recovery request identified by a C-RNTI, at a time that a timer for a time window is running.

A wireless device may determine that a reception of random access response is successful, for example, if at least one random access response comprises a random access preamble identifier corresponding to a random access preamble sent (e.g., transmitted) by the wireless device. The wireless device may determine that the contention free random access procedure is successfully completed, for example, if a reception of a random access response is successful. The wireless device may determine that a contention free random access procedure is successfully complete, for example, if a contention-free random access procedure is triggered for a beam failure recovery request and if a PDCCH transmission is addressed to a C-RNTI. The wireless device may determine that the random access procedure is successfully completed, and may indicate a reception of an acknowledgement for a system information request to upper layers, for example, if at least one random access response comprises a random access preamble identifier. The wireless device may stop sending (e.g., transmitting) remaining preambles (if any) after or in response to a successful reception of a corresponding random access response, for example, if the wireless device has signaled multiple preamble transmissions.

The wireless device may perform one or more Msg 3 1240 transmissions, for example, after or in response to a successful reception of random access response (e.g., for a contention based random access procedure). The wireless device may adjust an uplink transmission timing, for example, based on a timing advanced command indicated by a random access response. The wireless device may send (e.g., transmit) one or more transport blocks, for example, based on an uplink grant indicated by a random access response. Subcarrier spacing for PUSCH transmission for Msg3 1240 may be provided by at least one higher layer (e.g., RRC) parameter. The wireless device may send (e.g., transmit) a random access preamble via a PRACH, and Msg3 1240 via PUSCH, on the same cell. A base station may indicate an UL BWP for a PUSCH transmission of Msg3 1240 via system information block. The wireless device may use HARQ for a retransmission of Msg 3 1240.

Multiple wireless devices may perform Msg 1 1220, for example, by sending (e.g., transmitting) the same preamble to a base station. The multiple wireless devices may receive, from the base station, the same random access response comprising an identity (e.g., TC-RNTI). Contention resolution (e.g., comprising the wireless device 110 receiving contention resolution 1250) may be used to increase the likelihood that a wireless device does not incorrectly use an identity of another wireless device. The contention resolution 1250 may be based on, for example, a C-RNTI on a PDCCH, and/or a wireless device contention resolution identity on a DL-SCH. If a base station assigns a C-RNTI to a wireless device, the wireless device may perform contention resolution (e.g., comprising receiving contention resolution 1250), for example, based on a reception of a PDCCH transmission that is addressed to the C-RNTI. The wireless device may determine that contention resolution is successful, and/or that a random access procedure is successfully completed, for example, after or in response to detecting a C-RNTI on a PDCCH. If a wireless device has no valid C-RNTI, a contention resolution may be addressed by using a TC-RNTI. If a MAC PDU is successfully decoded and a MAC PDU comprises a wireless device contention resolution identity MAC CE that matches or otherwise corresponds with the CCCH SDU sent (e.g., transmitted) in Msg3 1250, the wireless device may determine that the contention resolution (e.g., comprising contention resolution 1250) is successful and/or the wireless device may determine that the random access procedure is successfully completed.

Figure 13:
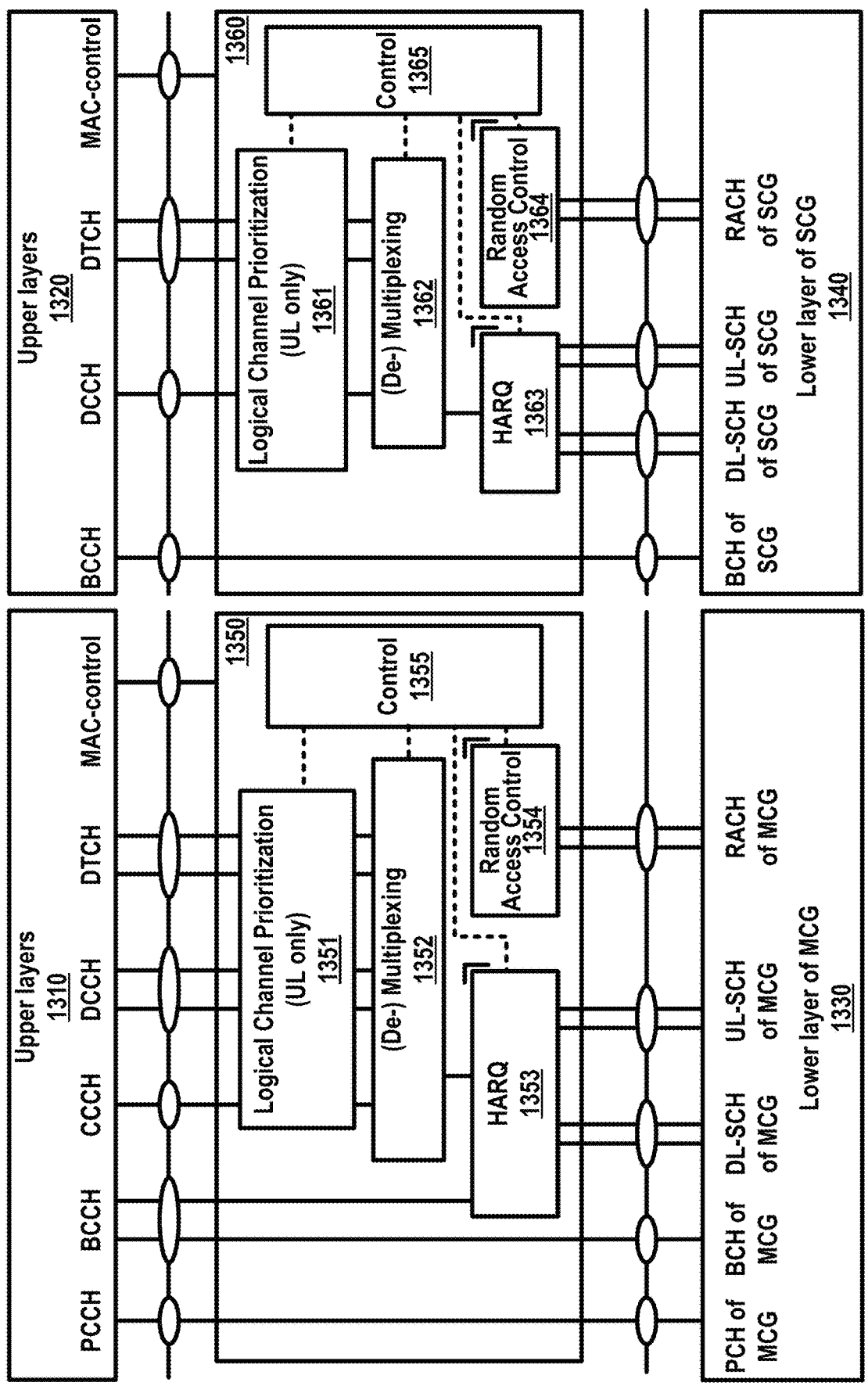
FIG. 13 shows example medium access control (MAC) entities.

FIG. 13 shows an example structure for MAC entities. A wireless device may be configured to operate in a multi-connectivity mode. A wireless device in RRC_CONNECTED with multiple Rx/Tx may be configured to utilize radio resources provided by multiple schedulers that may be located in a plurality of base stations. The plurality of base stations may be connected via a non-ideal or ideal backhaul over the Xn interface. A base station in a plurality of base stations may act as a master base station or as a secondary base station. A wireless device may be connected to and/or in communication with, for example, one master base station and one or more secondary base stations. A wireless device may be configured with multiple MAC entities, for example, one MAC entity for a master base station, and one or more other MAC entities for secondary base station(s). A configured set of serving cells for a wireless device may comprise two subsets: an MCG comprising serving cells of a master base station, and one or more SCGs comprising serving cells of a secondary base station(s). FIG. 13 shows an example structure for MAC entities in which a MCG and a SCG are configured for a wireless device.

At least one cell in a SCG may have a configured UL CC. A cell of the at least one cell may comprise a PSCell or a PCell of a SCG, or a PCell. A PSCell may be configured with PUCCH resources. There may be at least one SCG bearer, or one split bearer, for a SCG that is configured. After or upon detection of a physical layer problem or a random access problem on a PSCell, after or upon reaching a number of RLC retransmissions associated with the SCG, and/or after or upon detection of an access problem on a PSCell associated with (e.g., during) a SCG addition or a SCG change: an RRC connection re-establishment procedure may not be triggered, UL transmissions towards cells of a SCG may be stopped, and/or a master base station may be informed by a wireless device of a SCG failure type and DL data transfer over a master base station may be maintained.

A MAC sublayer may provide services such as data transfer and radio resource allocation to upper layers (e.g., 1310 or 1320). A MAC sublayer may comprise a plurality of MAC entities (e.g., 1350 and 1360). A MAC sublayer may provide data transfer services on logical channels. To accommodate different kinds of data transfer services, multiple types of logical channels may be defined. A logical channel may support transfer of a particular type of information. A logical channel type may be defined by what type of information (e.g., control or data) is transferred. BCCH, PCCH, CCCH and/or DCCH may be control channels, and DTCH may be a traffic channel. A first MAC entity (e.g., 1310) may provide services on PCCH, BCCH, CCCH, DCCH, DTCH, and/or MAC control elements. A second MAC entity (e.g., 1320) may provide services on BCCH, DCCH, DTCH, and/or MAC control elements.

A MAC sublayer may expect from a physical layer (e.g., 1330 or 1340) services such as data transfer services, signaling of HARQ feedback, and/or signaling of scheduling request or measurements (e.g., CQI). In dual connectivity, two MAC entities may be configured for a wireless device: one for a MCG and one for a SCG. A MAC entity of a wireless device may handle a plurality of transport channels. A first MAC entity may handle first transport channels comprising a PCCH of a MCG, a first BCH of the MCG, one or more first DL-SCHs of the MCG, one or more first UL-SCHs of the MCG, and/or one or more first RACHs of the MCG. A second MAC entity may handle second transport channels comprising a second BCH of a SCG, one or more second DL-SCHs of the SCG, one or more second UL-SCHs of the SCG, and/or one or more second RACHs of the SCG.

If a MAC entity is configured with one or more SCells, there may be multiple DL-SCHs, multiple UL-SCHs, and/or multiple RACHs per MAC entity. There may be one DL-SCH and/or one UL-SCH on an SpCell. There may be one DL-SCH, zero or one UL-SCH, and/or zero or one RACH for an SCell. A DL-SCH may support receptions using different numerologies and/or TTI duration within a MAC entity. A UL-SCH may support transmissions using different numerologies and/or TTI duration within the MAC entity.

A MAC sublayer may support different functions. The MAC sublayer may control these functions with a control (e.g., Control 1355 and/or Control 1365) element. Functions performed by a MAC entity may comprise one or more of: mapping between logical channels and transport channels (e.g., in uplink or downlink), multiplexing (e.g., (De-) Multiplexing 1352 and/or (De-) Multiplexing 1362) of MAC SDUs from one or different logical channels onto transport blocks (TBs) to be delivered to the physical layer on transport channels (e.g., in uplink), demultiplexing (e.g., (De-) Multiplexing 1352 and/or (De-) Multiplexing 1362) of MAC SDUs to one or different logical channels from transport blocks (TBs) delivered from the physical layer on transport channels (e.g., in downlink), scheduling information reporting (e.g., in uplink), error correction through HARQ in uplink and/or downlink (e.g., 1363), and logical channel prioritization in uplink (e.g., Logical Channel Prioritization 1351 and/or Logical Channel Prioritization 1361). A MAC entity may handle a random access process (e.g., Random Access Control 1354 and/or Random Access Control 1364).

Figure 14:
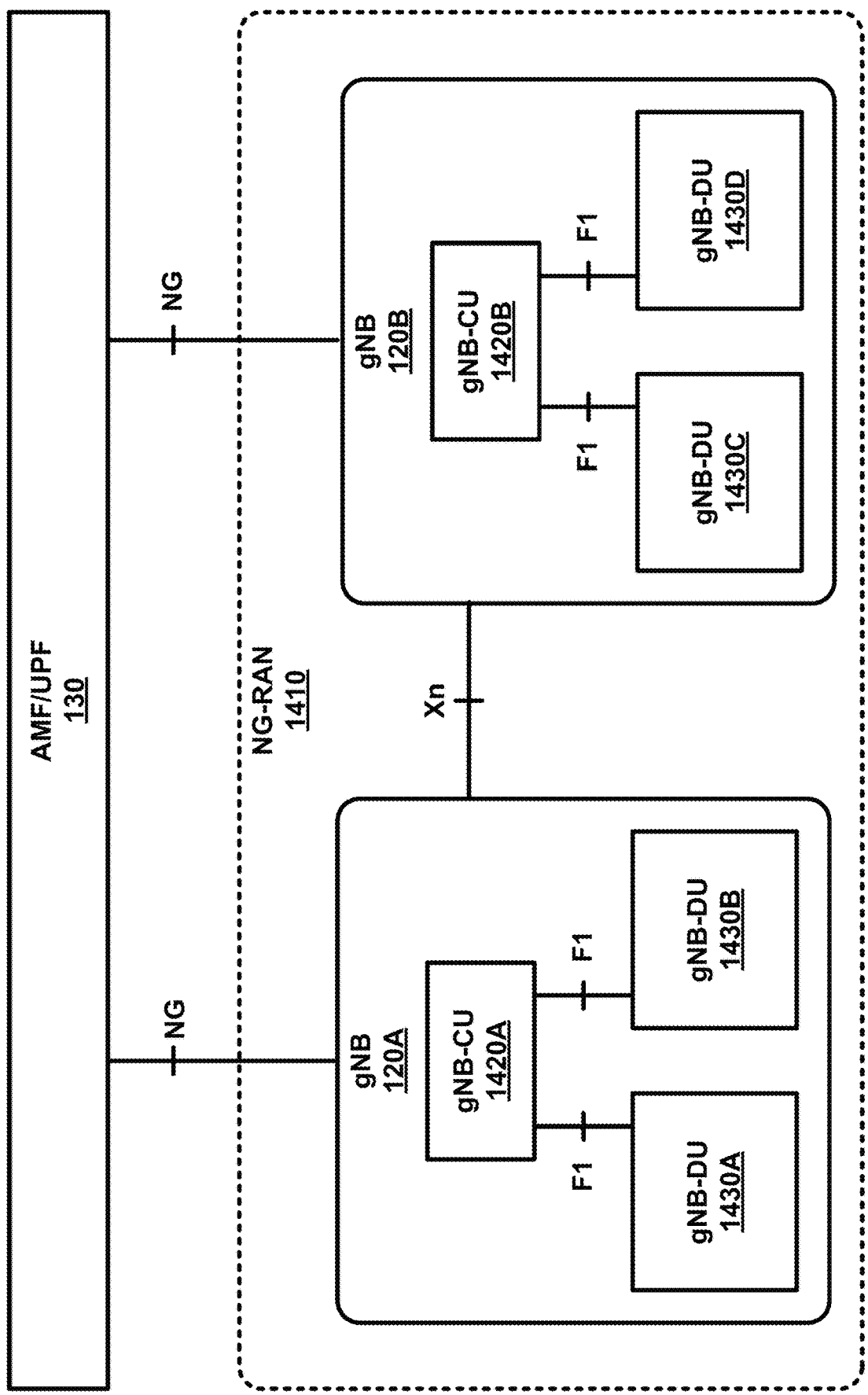
FIG. 14 shows an example RAN architecture.

FIG. 14 shows an example of a RAN architecture comprising one or more base stations. A protocol stack (e.g., RRC, SDAP, PDCP, RLC, MAC, and/or PHY) may be supported at a node. A base station (e.g., gNB 120A and/or 120B) may comprise a base station central unit (CU) (e.g., gNB-CU 1420A or 1420B) and at least one base station distributed unit (DU) (e.g., gNB-DU 1430A, 1430B, 1430C, and/or 1430D), for example, if a functional split is configured. Upper protocol layers of a base station may be located in a base station CU, and lower layers of the base station may be located in the base station DUs. An F1 interface (e.g., CU-DU interface) connecting a base station CU and base station DUs may be an ideal or non-ideal backhaul. F1-C may provide a control plane connection over an F1 interface, and F1-U may provide a user plane connection over the F1 interface. An Xn interface may be configured between base station CUs.

A base station CU may comprise an RRC function, an SDAP layer, and/or a PDCP layer. Base station DUs may comprise an RLC layer, a MAC layer, and/or a PHY layer. Various functional split options between a base station CU and base station DUs may be possible, for example, by locating different combinations of upper protocol layers (e.g., RAN functions) in a base station CU and different combinations of lower protocol layers (e.g., RAN functions) in base station DUs. A functional split may support flexibility to move protocol layers between a base station CU and base station DUs, for example, depending on service requirements and/or network environments.

Functional split options may be configured per base station, per base station CU, per base station DU, per wireless device, per bearer, per slice, and/or with other granularities. In a per base station CU split, a base station CU may have a fixed split option, and base station DUs may be configured to match a split option of a base station CU. In a per base station DU split, a base station DU may be configured with a different split option, and a base station CU may provide different split options for different base station DUs. In a per wireless device split, a base station (e.g., a base station CU and at least one base station DUs) may provide different split options for different wireless devices. In a per bearer split, different split options may be utilized for different bearers. In a per slice splice, different split options may be used for different slices.

Figure 15:
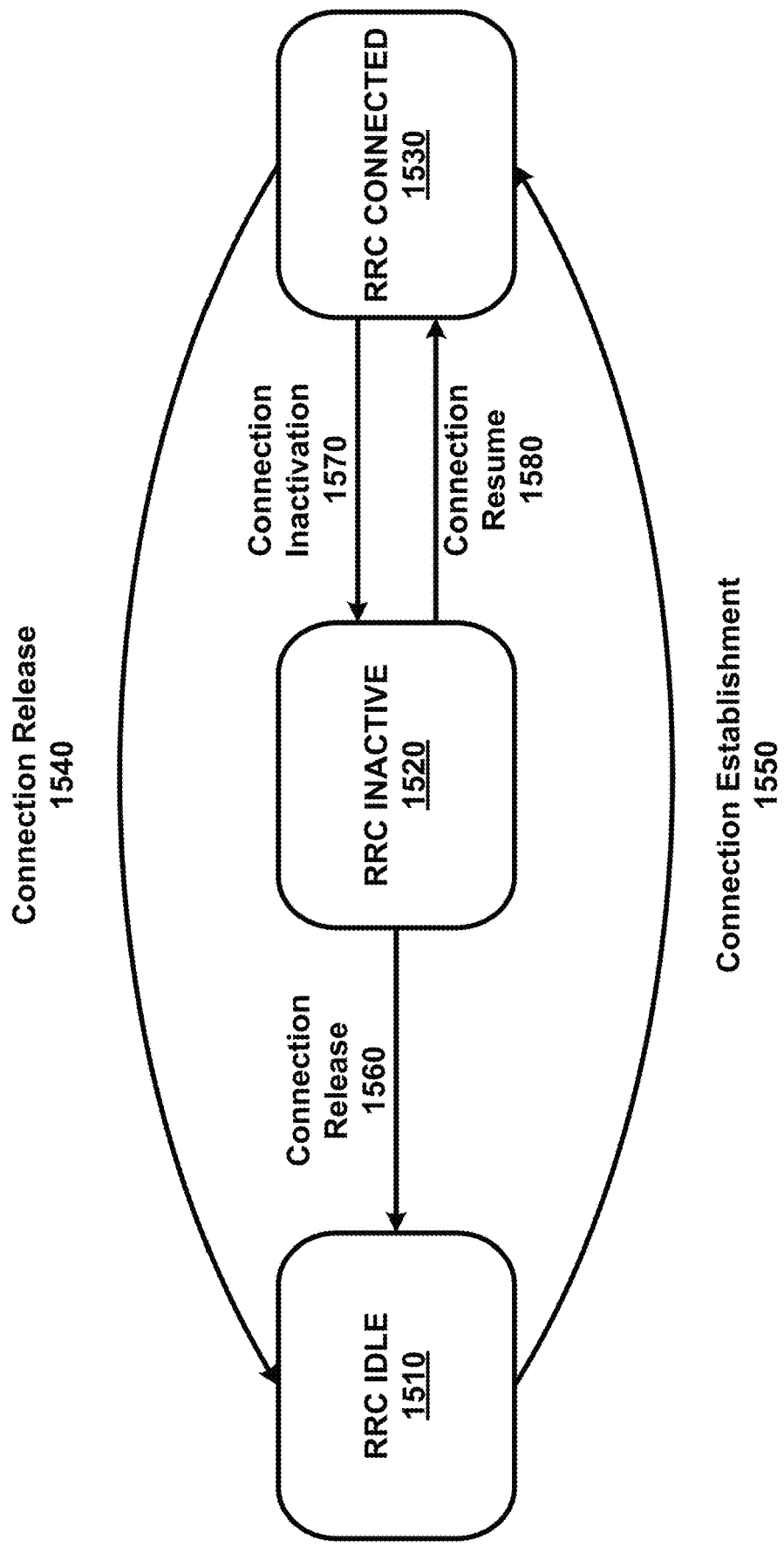
FIG. 15 shows example radio resource control (RRC) states.

FIG. 15 shows example RRC state transitions of a wireless device. A wireless device may be in at least one RRC state among an RRC connected state (e.g., RRC Connected 1530, RRC_Connected, etc.), an RRC idle state (e.g., RRC Idle 1510, RRC_Idle, etc.), and/or an RRC inactive state (e.g., RRC Inactive 1520, RRC_Inactive, etc.). In an RRC connected state, a wireless device may have at least one RRC connection with at least one base station (e.g., gNB and/or eNB), which may have a context of the wireless device (e.g., UE context). A wireless device context (e.g., UE context) may comprise at least one of an access stratum context, one or more radio link configuration parameters, bearer (e.g., data radio bearer (DRB), signaling radio bearer (SRB), logical channel, QoS flow, PDU session, and/or the like) configuration information, security information, PHY/MAC/RLC/PDCP/SDAP layer configuration information, and/or the like configuration information for a wireless device. In an RRC idle state, a wireless device may not have an RRC connection with a base station, and a context of the wireless device may not be stored in a base station. In an RRC inactive state, a wireless device may not have an RRC connection with a base station. A context of a wireless device may be stored in a base station, which may comprise an anchor base station (e.g., a last serving base station).

A wireless device may transition an RRC state (e.g., UE RRC state) between an RRC idle state and an RRC connected state in both ways (e.g., connection release 1540 or connection establishment 1550; and/or connection reestablishment) and/or between an RRC inactive state and an RRC connected state in both ways (e.g., connection inactivation 1570 or connection resume 1580). A wireless device may transition its RRC state from an RRC inactive state to an RRC idle state (e.g., connection release 1560).

An anchor base station may be a base station that may keep a context of a wireless device (e.g., UE context) at least at (e.g., during) a time period that the wireless device stays in a RAN notification area (RNA) of an anchor base station, and/or at (e.g., during) a time period that the wireless device stays in an RRC inactive state. An anchor base station may comprise a base station that a wireless device in an RRC inactive state was most recently connected to in a latest RRC connected state, and/or a base station in which a wireless device most recently performed an RNA update procedure. An RNA may comprise one or more cells operated by one or more base stations. A base station may belong to one or more RNAs. A cell may belong to one or more RNAs.

A wireless device may transition, in a base station, an RRC state (e.g., UE RRC state) from an RRC connected state to an RRC inactive state. The wireless device may receive RNA information from the base station. RNA information may comprise at least one of an RNA identifier, one or more cell identifiers of one or more cells of an RNA, a base station identifier, an IP address of the base station, an AS context identifier of the wireless device, a resume identifier, and/or the like.

An anchor base station may broadcast a message (e.g., RAN paging message) to base stations of an RNA to reach to a wireless device in an RRC inactive state. The base stations receiving the message from the anchor base station may broadcast and/or multicast another message (e.g., paging message) to wireless devices in their coverage area, cell coverage area, and/or beam coverage area associated with the RNA via an air interface.

A wireless device may perform an RNA update (RNAU) procedure, for example, if the wireless device is in an RRC inactive state and moves into a new RNA. The RNAU procedure may comprise a random access procedure by the wireless device and/or a context retrieve procedure (e.g., UE context retrieve). A context retrieve procedure may comprise: receiving, by a base station from a wireless device, a random access preamble; and requesting and/or receiving (e.g., fetching), by a base station, a context of the wireless device (e.g., UE context) from an old anchor base station. The requesting and/or receiving (e.g., fetching) may comprise: sending a retrieve context request message (e.g., UE context request message) comprising a resume identifier to the old anchor base station and receiving a retrieve context response message comprising the context of the wireless device from the old anchor base station.

A wireless device in an RRC inactive state may select a cell to camp on based on at least a measurement result for one or more cells, a cell in which a wireless device may monitor an RNA paging message, and/or a core network paging message from a base station. A wireless device in an RRC inactive state may select a cell to perform a random access procedure to resume an RRC connection and/or to send (e.g., transmit) one or more packets to a base station (e.g., to a network). The wireless device may initiate a random access procedure to perform an RNA update procedure, for example, if a cell selected belongs to a different RNA from an RNA for the wireless device in an RRC inactive state. The wireless device may initiate a random access procedure to send (e.g., transmit) one or more packets to a base station of a cell that the wireless device selects, for example, if the wireless device is in an RRC inactive state and has one or more packets (e.g., in a buffer) to send (e.g., transmit) to a network. A random access procedure may be performed with two messages (e.g., 2-stage or 2-step random access) and/or four messages (e.g., 4-stage or 4-step random access) between the wireless device and the base station.

A base station receiving one or more uplink packets from a wireless device in an RRC inactive state may request and/or receive (e.g., fetch) a context of a wireless device (e.g., UE context), for example, by sending (e.g., transmitting) a retrieve context request message for the wireless device to an anchor base station of the wireless device based on at least one of an AS context identifier, an RNA identifier, a base station identifier, a resume identifier, and/or a cell identifier received from the wireless device. A base station may send (e.g., transmit) a path switch request for a wireless device to a core network entity (e.g., AMF, MME, and/or the like), for example, after or in response to requesting and/or receiving (e.g., fetching) a context. A core network entity may update a downlink tunnel endpoint identifier for one or more bearers established for the wireless device between a user plane core network entity (e.g., UPF, S-GW, and/or the like) and a RAN node (e.g., the base station), such as by changing a downlink tunnel endpoint identifier from an address of the anchor base station to an address of the base station).

A base station may communicate with a wireless device via a wireless network using one or more technologies, such as new radio technologies (e.g., NR, 5G, etc.). The one or more radio technologies may comprise at least one of: multiple technologies related to physical layer; multiple technologies related to medium access control layer; and/or multiple technologies related to radio resource control layer Enhancing the one or more radio technologies may improve performance of a wireless network. System throughput, and/or data rate of transmission, may be increased. Battery consumption of a wireless device may be reduced. Latency of data transmission between a base station and a wireless device may be improved. Network coverage of a wireless network may be improved. Transmission efficiency of a wireless network may be improved.

A base station may send (e.g., transmit) DCI via a PDCCH for at least one of: a scheduling assignment and/or grant; a slot format notification; a preemption indication; and/or a power-control command. The DCI may comprise at least one of: an identifier of a DCI format; a downlink scheduling assignment(s); an uplink scheduling grant(s); a slot format indicator; a preemption indication; a power-control for PUCCH/PUSCH; and/or a power-control for SRS.

A downlink scheduling assignment DCI may comprise parameters indicating at least one of: an identifier of a DCI format; a PDSCH resource indication; a transport format; HARQ information; control information related to multiple antenna schemes; and/or a command for power control of the PUCCH. An uplink scheduling grant DCI may comprise parameters indicating at least one of: an identifier of a DCI format; a PUSCH resource indication; a transport format; HARQ related information; and/or a power control command of the PUSCH.

Different types of control information may correspond to different DCI message sizes. Supporting multiple beams, spatial multiplexing in the spatial domain, and/or noncontiguous allocation of RBs in the frequency domain, may require a larger scheduling message, in comparison with an uplink grant allowing for frequency-contiguous allocation. DCI may be categorized into different DCI formats. A DCI format may correspond to a certain message size and/or usage.

A wireless device may monitor (e.g., in common search space or wireless device-specific search space) one or more PDCCH for detecting one or more DCI with one or more DCI format. A wireless device may monitor a PDCCH with a limited set of DCI formats, for example, which may reduce power consumption. The more DCI formats that are to be detected, the more power may be consumed by the wireless device.

The information in the DCI formats for downlink scheduling may comprise at least one of: an identifier of a DCI format; a carrier indicator; a frequency domain resource assignment; a time domain resource assignment; a time resource allocation; a bandwidth part indicator; a HARQ process number; one or more MCS; one or more NDI; one or more RV; MIMO related information; a downlink assignment index (DAI); PUCCH resource indicator; PDSCH-to-HARQ feedback timing indicator; a TPC for PUCCH; an SRS request; and/or padding (e.g., if necessary). The MIMO related information may comprise at least one of: a PMI; precoding information; a transport block swap flag; a power offset between PDSCH and a reference signal; a reference-signal scrambling sequence; a number of layers; antenna ports for the transmission; and/or a transmission configuration indication (TCI).

The information in the DCI formats used for uplink scheduling may comprise at least one of: an identifier of a DCI format; a carrier indicator; a bandwidth part indication; a resource allocation type; a frequency domain resource assignment; a time domain resource assignment; a time resource allocation; an MCS; an NDI; a phase rotation of the uplink DMRS; precoding information; a CSI request; an SRS request; an uplink index/DAI; a TPC for PUSCH; and/or padding (e.g., if necessary).

A base station may perform CRC scrambling for DCI, for example, before transmitting the DCI via a PDCCH. The base station may perform CRC scrambling by binary addition of multiple bits of at least one wireless device identifier (e.g., C-RNTI, CS-RNTI, TPC-CS-RNTI, TPC-PUCCH-RNTI, TPC-PUSCH-RNTI, SP CSI C-RNTI, and/or TPC-SRS-RNTI) and the CRC bits of the DCI. The wireless device may check the CRC bits of the DCI, for example, if detecting the DCI. The wireless device may receive the DCI, for example, if the CRC is scrambled by a sequence of bits that is the same as the at least one wireless device identifier.

A base station may send (e.g., transmit) one or more PDCCH in different CORESETs, for example, to support a wide bandwidth operation. A base station may transmit one or more RRC messages comprising configuration parameters of one or more CORESETs. A CORESET may comprise at least one of: a first OFDM symbol; a number of consecutive OFDM symbols; a set of resource blocks; and/or a CCE-to-REG mapping. A base station may send (e.g., transmit) a PDCCH in a dedicated CORESET for particular purpose, for example, for beam failure recovery confirmation. A wireless device may monitor a PDCCH for detecting DCI in one or more configured CORESETs, for example, to reduce the power consumption.

A base station may send (e.g., transmit) one or more MAC PDUs to a wireless device. A MAC PDU may comprise a bit string that may be byte aligned (e.g., multiple of eight bits) in length. Bit strings may be represented by tables in which the most significant bit is the leftmost bit of the first line of the table, and the least significant bit is the rightmost bit on the last line of the table. The bit string may be read from the left to right, and then, in the reading order of the lines. The bit order of a parameter field within a MAC PDU may be represented with the first and most significant bit in the leftmost bit, and with the last and least significant bit in the rightmost bit.

A MAC SDU may comprise a bit string that is byte aligned (e.g., multiple of eight bits) in length. A MAC SDU may be included in a MAC PDU, for example, from the first bit onward. In an example, a MAC CE may be a bit string that is byte aligned (e.g., multiple of eight bits) in length. A MAC subheader may be a bit string that is byte aligned (e.g., multiple of eight bits) in length. A MAC subheader may be placed immediately in front of the corresponding MAC SDU, MAC CE, and/or padding. A MAC entity may ignore a value of reserved bits in a DL MAC PDU.

A MAC PDU may comprise one or more MAC subPDUs. A MAC subPDU of the one or more MAC subPDUs may comprise at least one of: a MAC subheader only (e.g., including padding); a MAC subheader and a MAC SDU; a MAC subheader and a MAC CE; and/or a MAC subheader and padding. The MAC SDU may be of variable size. A MAC subheader may correspond to a MAC SDU, a MAC CE, and/or padding.

A MAC subheader may comprise: an R field comprising one bit; an F field with one bit in length; an LCID field with multiple bits in length; an L field with multiple bits in length, for example, if the MAC subheader corresponds to a MAC SDU, a variable-sized MAC CE, and/or padding.

A MAC subheader may comprise an eight-bit L field. The LCID field may have six bits in length, and the L field may have eight bits in length. A MAC subheader may comprise a sixteen-bit L field. The LCID field may be six bits in length, and the L field may be sixteen bits in length.

A MAC subheader may comprise: an R field with two bits in length; and an LCID field with multiple bits in length, when the MAC subheader corresponds to a fixed sized MAC CE, or padding. The LCID field may have six bits in length, and the R field may have two bits in length.

DL MAC PDU, multiple MAC CEs may be placed together. A MAC subPDU comprising MAC CE may be placed before any MAC subPDU comprising a MAC SDU, or a MAC subPDU comprising padding.

UL MAC PDU, multiple MAC CEs may be placed together. A MAC subPDU comprising MAC CE may be placed after all MAC subPDU comprising a MAC SDU. The MAC subPDU may be placed before a MAC subPDU comprising padding.

A MAC entity of a base station may send (e.g., transmit) to a MAC entity of a wireless device one or more MAC CEs. The one or more MAC CEs may comprise at least one of: an SP ZP CSI-RS Resource Set Activation/Deactivation MAC CE; a PUCCH spatial relation Activation/Deactivation MAC CE; a SP SRS Activation/Deactivation MAC CE; a SP CSI reporting on PUCCH Activation/Deactivation MAC CE; a TCI State Indication for UE-specific PDCCH MAC CE; a TCI State Indication for UE-specific PDSCH MAC CE; an Aperiodic CSI Trigger State Subselection MAC CE; a SP CSI-RS/CSI-IM Resource Set Activation/Deactivation MAC CE; a wireless device (e.g., UE) contention resolution identity MAC CE; a timing advance command MAC CE; a DRX command MAC CE; a long DRX command MAC CE; an SCell activation and/or deactivation MAC CE (e.g., 1 Octet); an SCell activation and/or deactivation MAC CE (e.g., 4 Octet); and/or a duplication activation and/or deactivation MAC CE. A MAC CE may comprise an LCID in the corresponding MAC subheader. Different MAC CEs may have different LCID in the corresponding MAC subheader. An LCID with 111011 in a MAC subheader may indicate a MAC CE associated with the MAC subheader is a long DRX command MAC CE.

The MAC entity of the wireless device may send (e.g., transmit), to the MAC entity of the base station, one or more MAC CEs. The one or more MAC CEs may comprise at least one of: a short buffer status report (BSR) MAC CE; a long BSR MAC CE; a C-RNTI MAC CE; a configured grant confirmation MAC CE; a single entry power headroom report (PHR) MAC CE; a multiple entry PHR MAC CE; a short truncated BSR; and/or a long truncated BSR. A MAC CE may comprise an LCID in the corresponding MAC subheader. Different MAC CEs may have different LCIDs in the corresponding MAC subheader. The LCID with 111011 in a MAC subheader may indicate a MAC CE associated with the MAC subheader is a short-truncated command MAC CE.

Two or more component carriers (CCs) may be aggregated, for example, in a carrier aggregation (CA). A wireless device may simultaneously receive and/or transmit on one or more CCs, for example, depending on capabilities of the wireless device. The CA may be supported for contiguous CCs. The CA may be supported for non-contiguous CCs.

A wireless device may have one RRC connection with a network, for example, if configured with CA. At (e.g., during) an RRC connection establishment, re-establishment and/or handover, a cell providing a NAS mobility information may be a serving cell. At (e.g., during) an RRC connection re-establishment and/or handover procedure, a cell providing a security input may be a serving cell. The serving cell may be referred to as a primary cell (PCell). A base station may send (e.g., transmit), to a wireless device, one or more messages comprising configuration parameters of a plurality of one or more secondary cells (SCells), for example, depending on capabilities of the wireless device.

A base station and/or a wireless device may use an activation and/or deactivation mechanism of an SCell for an efficient battery consumption, for example, if the base station and/or the wireless device is configured with CA. A base station may activate or deactivate at least one of the one or more SCells, for example, if the wireless device is configured with one or more SCells. The SCell may be deactivated, for example, after or upon configuration of an SCell.

A wireless device may activate and/or deactivate an SCell, for example, after or in response to receiving an SCell activation and/or deactivation MAC CE. A base station may send (e.g., transmit), to a wireless device, one or more messages comprising an sCellDeactivationTimer timer. The wireless device may deactivate an SCell, for example, after or in response to an expiry of the sCellDeactivationTimer timer.

A wireless device may activate an SCell, for example, if the wireless device receives an SCell activation/deactivation MAC CE activating an SCell. The wireless device may perform operations (e.g., after or in response to the activating the SCell) that may comprise: SRS transmissions on the SCell; CQI, PMI, RI, and/or CRI reporting for the SCell on a PCell; PDCCH monitoring on the SCell; PDCCH monitoring for the SCell on the PCell; and/or PUCCH transmissions on the SCell.

The wireless device may start and/or restart a timer (e.g., an sCellDeactivationTimer timer) associated with the SCell, for example, after or in response to activating the SCell. The wireless device may start the timer (e.g., sCellDeactivationTimer timer) in the slot, for example, if the SCell activation/deactivation MAC CE has been received. The wireless device may initialize and/or re-initialize one or more suspended configured uplink grants of a configured grant Type 1 associated with the SCell according to a stored configuration, for example, after or in response to activating the SCell. The wireless device may trigger a PHR, for example, after or in response to activating the SCell.

The wireless device may deactivate the activated SCell, for example, if the wireless device receives an SCell activation/deactivation MAC CE deactivating an activated SCell. The wireless device may deactivate the activated SCell, for example, if a timer (e.g., an sCellDeactivationTimer timer) associated with an activated SCell expires. The wireless device may stop the timer (e.g., sCellDeactivationTimer timer) associated with the activated SCell, for example, after or in response to deactivating the activated SCell. The wireless device may stop a BWP inactivity timer associated with the activated SCell, for example, after or in response to deactivating the activated SCell. The wireless device may deactivate any active BWP associated with the activated SCell, for example, after or in response to deactivating the activated SCell. The wireless device may clear one or more configured downlink assignments and/or one or more configured uplink grant Type 2 associated with the activated SCell, for example, after or in response to the deactivating the activated SCell. The wireless device may suspend one or more configured uplink grant Type 1 associated with the activated SCell, for example, after or in response to deactivating the activated SCell. The wireless device may flush HARQ buffers associated with the activated SCell.

A wireless device may not perform certain operations, for example, if an SCell is deactivated. The wireless device may not perform one or more of the following operations if an SCell is deactivated: transmitting SRS on the SCell; reporting CQI, PMI, RI, and/or CRI for the SCell on a PCell; transmitting on UL-SCH on the SCell; transmitting on a RACH on the SCell; monitoring at least one first PDCCH on the SCell; monitoring at least one second PDCCH for the SCell on the PCell; and/or transmitting a PUCCH on the SCell.

A wireless device may restart a timer (e.g., an sCellDeactivationTimer timer) associated with the activated SCell, for example, if at least one first PDCCH on an activated SCell indicates an uplink grant or a downlink assignment. A wireless device may restart a timer (e.g., an sCellDeactivationTimer timer) associated with the activated SCell, for example, if at least one second PDCCH on a serving cell (e.g. a PCell or an SCell configured with PUCCH, such as a PUCCH SCell) scheduling the activated SCell indicates an uplink grant and/or a downlink assignment for the activated SCell. A wireless device may abort the ongoing random access procedure on the SCell, for example, if an SCell is deactivated and/or if there is an ongoing random access procedure on the SCell.

An SCell activation/deactivation MAC CE may comprise, for example, one octet. A first MAC PDU subheader comprising a first LCID may identify the SCell activation/deactivation MAC CE of one octet. An SCell activation/deactivation MAC CE of one octet may have a fixed size. The SCell activation/deactivation MAC CE of one octet may comprise a single octet. The single octet may comprise a first number of C-fields (e.g., seven) and a second number of R-fields (e.g., one).

An SCell Activation/Deactivation MAC CE may comprise, for example, any size such as any quantity of octets (e.g., four octets). A second MAC PDU subheader with a second LCID may identify the SCell Activation/Deactivation MAC CE of four octets. An SCell activation/deactivation MAC CE of four octets may have a fixed size. The SCell activation/deactivation MAC CE of four octets may comprise four octets. The four octets may comprise a third number of C-fields (e.g., 31) and a fourth number of R-fields (e.g., 1). A $C_i$ field may indicate an activation/deactivation status of an SCell with an SCell index i, for example, if an SCell with SCell index i is configured. An SCell with an SCell index i may be activated, for example, if the $C_i$ field is set to one. An SCell with an SCell index i may be deactivated, for example, if the $C_i$ field is set to zero. The wireless device may ignore the $C_i$ field, for example, if there is no SCell configured with SCell index i. An R field may indicate a reserved bit. The R field may be set to zero.

A base station may configure a wireless device with one or more TCI-States using and/or via a higher layer parameter, for example, PDSCH-Config for a serving cell. A number (e.g., quantity, plurality, etc.) of the one or more TCI-States may depend on a capability of the wireless device. The wireless device may use the one or more TCI-States to decode a PDSCH based on a detected PDCCH with a DCI. The DCI may be intended, for example, for the wireless device and/or the serving cell. Each of the one or more TCI-States state may contain one or more parameters. The one or more parameters may be used, for example, to configure a quasi-co-location relationship between one or more downlink reference signals (e.g., a first DL RS and/or a second DL RS) and the DM-RS ports of the PDSCH. The quasi-co-location relationship may be configured by a higher layer parameter QCL-Type1 for the first DL RS. The quasi-co-location relationship may be configured by a higher layer parameter QCL-Type2 for the second DL RS, for example, if the second DL RS is configured. Quasi co-location types (QCL-Types) associated with two DL RSs may not necessarily be the same, for example, if the one RS set contains a reference to the two DL RSs. The references of the two DL RSs may be, for example, to a same DL RS or to different DL RSs. The QCL-Types corresponding to each DL RS may be indicated to the wireless device by a higher layer parameter QCL-Type in parameter QCL-Info. The higher layer parameter QCL-Type may take at least one of the types: QCL-TypeA': {Doppler shift, Doppler spread, average delay, delay spread}, QCL-TypeB': {Doppler shift, Doppler spread}, QCL-TypeC': {average delay, Doppler shift} and QCL-TypeD': {Spatial Rx parameter}.

A wireless device may receive an activation command. The activation command may be used to map one or more TCI states (e.g., 8 states) to one or more codepoints of a TCI field in DCI. Mapping between one or more TCI states and one or more codepoints of the TCI field in DCI may be applied starting from slot $n+3N_{slot}^{subframe,\mu}+1$, for example, if a HARQ-ACK corresponding to a PDSCH carrying the activation command is sent (e.g., transmitted) in slot n. The wireless device may determine (e.g., assume) that one or more DM-RS ports of a PDSCH of a serving cell are quasi-co-located with an SSB/PBCH block, for example, (i) before the wireless device receives the activation command and/or (ii) after the wireless device receives a higher layer configuration of TCI-States. The SSB/PBCH block may be determined in an initial access procedure with respect to one or more of QCL-TypeA' and QCL-TypeD', for example, if applicable.

A wireless device may be configured by a base station, with a higher layer parameter TCI-PresentInDCI. The wireless device may determine (e.g., assume) that a TCI field is present in a DCI format (e.g., DCI format 1_1) of a PDCCH transmitted on the CORESET, for example, if the higher layer parameter TCI-PresentInDCI is set as 'Enabled' for a CORESET scheduling a PDSCH. The wireless device may determine (e.g., assume), for determining PDSCH antenna port quasi-co-location, that a first TCI state for the PDSCH is identical to a second TCI state applied for the CORESET used for the PDCCH transmission, for example, if the higher layer TCI-PresentInDCI is not configured for a CORESET scheduling a PDSCH or if the PDSCH is scheduled by a DCI format (e.g., DCI format 1_0).

A TCI field in a DCI in a scheduling component carrier may indicate (e.g., point to) one or more activated TCI-States in a scheduled component carrier or a DL BWP, for example, if the higher layer parameter TCI-PresentInDCI is set as "Enabled." The wireless device may use, for determining PDSCH antenna port quasi-co-location, a TCI-State according to a value of a TCI field in a detected PDCCH with DCI, for example, if the higher layer parameter TCI-PresentInDCI is set as "Enabled" and a PDSCH is scheduled by a DCI format (e.g., DCI format 1_1). The wireless device may determine (e.g., assume) that one or more DM-RS ports of a PDSCH of a serving cell are quasi-co-located with one or more RS(s) in the TCI-State with respect to QCL type parameter(s) given by the indicated TCI state if a time offset between the reception of the DL DCI and the corresponding PDSCH is equal to or greater than a threshold Threshold-Sched-Offset. The threshold (e.g., Threshold-Sched-Offset) may be based on, for example, wireless device capability. The indicated TCI state may be based on the activated TCI states in the slot with the scheduled PDSCH, for example, if the wireless device is configured with a single slot PDSCH. The wireless device may determine (e.g., assume) that one or more DM-RS ports of a PDSCH of a serving cell are quasi-co-located with one or more RS(s) in the TCI state with respect to QCL type parameter(s), for example, if (i) the offset between reception of the DL DCI and the corresponding PDSCH is less than the threshold Threshold-Sched-Offset and/or if (ii) the higher layer parameter TCI-PresentInDCI is set to "Enabled" and the higher layer parameter TCI-PresentInDCI is not configured in RRC connected mode. The QCL type parameter(s) may be used for PDCCH quasi-co-location indication of the lowest CORESET-ID in the latest slot. One or more CORESETs within an active BWP of the serving cell may be configured for the wireless device in the latest slot. The wireless device may obtain the other QCL assumptions from the indicated TCI states for its scheduled PDSCH, irrespective of a time offset between the reception of the DL DCI and the corresponding PDSCH, if none of the configured TCI states contains QCL-TypeD'.

A base station may send, to a wireless device, one or more configuration parameters. The one or more configuration parameters may indicate one or more control resource sets (e.g., CORESETs). The one or more configuration parameters may configure the one or more CORESETs. The wireless device may be provided with the one or more (e.g., 2, 3, 4, 5, or any other quantity) configuration parameters via a higher layer signaling, for example, for a DL BWP configured to and/or for the wireless device in a serving cell. The wireless device may be provided, for a first CORESET of the one or more CORESETs and/or by a higher layer parameter (e.g., ControlResourceSet), at least one of: a CORESET index (e.g., by higher layer parameter control-ResourceSetId), a DMRS scrambling sequence initialization value, a quantity (e.g., number, plurality, etc.) of consecutive symbols (e.g., by higher layer parameter duration), a set of resource blocks (e.g., by higher layer parameter frequencyDomainResources), CCE-to-REG mapping parameters (e.g., by higher layer parameter cce-REG-MappingType), an antenna port quasi-co-location parameter (e.g., by higher layer parameter TCI-States), or an indication of a presence or an absence of a TCI field (e.g., by higher layer parameter TCI-PresentInDCI). The antenna port quasi-co-location parameter may indicate, for example, quasi-co-location information of a DM-RS antenna port for PDCCH reception in the first CORESET.

The wireless device may determine (e.g., assume) that the DM-RS antenna port associated with PDCCH receptions is quasi-co-located with an SS/PBCH block, for example, if the wireless device has received initial configuration of a plurality of TCI states for the PDCCH receptions by a higher layer parameter (e.g., TCI-States) and/or has not received a MAC CE activation command for one of a plurality of TCI states. The SS/PBCH block may be indicated (e.g., identified) by the wireless device, for example, during an initial access procedure.

A wireless device may receive a parameter (e.g., a higher layer parameter such as, for example, TCI-States), for example, for PDCCH receptions. The higher layer parameter (e.g., TCI-States) may contain, for example, a single TCI state. The wireless device may determine (e.g., assume) that the DM-RS antenna port associated with PDCCH receptions is quasi-co-located with one or more DL RSs configured by the single TCI state, for example, based on the higher layer parameter TCI-States containing the single TCI state.

A base station may send, to a wireless device, one or more (e.g., 3, 5, 10, or any other quantity) search space sets. The wireless device may receive the one or more search space set, for example, for a DL BWP configured to the wireless device in a serving cell and/or by higher layers. The wireless device may be provided, for a first search space set of the one or more search space sets and/or by a higher layer parameter (e.g., SearchSpace), at least one of: a search space set index (e.g., by higher layer parameter searchSpaceId), an association between the search space set and a CORESET (e.g., by higher layer parameter controlResourceSetId), an indication that the search space set is either a common search space set or a wireless device-specific search space set (e.g., by higher layer parameter searchSpaceType).

A base station may indicate, to a wireless device, a TCI state for PDCCH reception for a CORESET of a serving cell by sending, for example, a TCI state indication for a wireless device-specific PDCCH MAC CE. A wireless device (e.g., a MAC entity of a wireless device) may indicate to lower layers (e.g., PHY) information regarding the TCI state indication for the wireless device-specific PDCCH MAC CE, for example, if the wireless device (e.g., MAC entity) receives a TCI state indication for the wireless device-specific PDCCH MAC CE on or for a serving cell.

A TCI state indication for the wireless device-specific PDCCH MAC CE may be indicated (e.g., identified), for example, by a MAC PDU subheader with LCID. The TCI state indication for the wireless device-specific PDCCH MAC CE may have a fixed size (e.g., 16 bits, or any other quantity of bits, bytes, etc.) and/or may comprise one or more fields. The one or more fields may comprise, for example, a serving cell ID, a CORESET ID, a TCI state ID, and/or a reserved bit.

The serving cell ID may indicate, for example, an identity of a serving cell for which the TCI state indication for the wireless device-specific PDCCH MAC CE may apply. The length of the serving cell ID may be n bits (e.g., n=5 bits, or any other quantity of bits, bytes, etc.).

The CORESET ID may indicate, for example, a CORESET. The CORESET may be indicated (e.g., identified) and/or associated with a CORESET ID (e.g., ControlResourceSetId). A length of the CORESET ID may be n bits (e.g., n=4 bits, or any other quantity of bits, bytes, etc.). Although CORESET ID is used as an example, one skilled in the relevant art recognizes that indications provided and/or from CORESET ID and/or information provided and/or from CORESET ID can be made and/or provided (e.g., indicated) by any field in any message.

The TCI state ID may indicate, for example, the TCI state indicated (e.g., identified) by TCI-StateId. The TCI state may be applicable to the CORESET indicated (e.g., identified) by the CORESET ID. A length of the TCI state ID may be n4 bits (e.g., n=6 bits, or any other quantity of bits, bytes, etc.).

An information element (e.g., ControlResourceSet) may be used to configure a time/frequency CORESET that may be searched for downlink control information. An information element (e.g., TCI-State) may associate one or more DL reference signals with a corresponding quasi-co-location (QCL) type. The information element (e.g., TCI-State) may comprise, for example, one or more fields, such as, for example, TCI-StateId and/or QCL-Info. The QCL-Info may comprise one or more fields. The one or more fields of QCL-Info may comprise, for example, one or more of: a serving cell index, BWP ID, a reference signal index (e.g., SSB-index, NZP-CSI-RS-ResourceID), and/or a QCL Type (e.g., QCL-typeA, QCL-typeB, QCL-typeC, QCL-typeD).

A reference signal associated with a reference signal index may be located in a carrier that may be indicated by, for example, the serving cell index. The information element (e.g., TCI-State) may apply to a serving cell in which the information element (e.g., TCI-State) is configured, for example, if the serving cell index is absent in an information element (e.g., TCI-State). The reference signal may be located in a second serving cell other than the serving cell in which the information element (e.g., TCI-State) is configured, for example, if the QCL-Type is configured as typeD.

An information element (e.g., SearchSpace) may indicate (e.g., define) how and/or where to search for PDCCH candidates in a search space. The search space may be indicated (e.g., identified) by a searchSpaceId field in the information element (e.g., SearchSpace). Each search space may be associated with a CORESET (e.g., ControlResourceSet). The CORESET may be indicated (e.g., identified) by a controlResourceSetId field in the information element (e.g., SearchSpace). The controlResourceSetId field may indicate the CORESET applicable for the SearchSpace.

A base station and/or a wireless device may have multiple antennas, for example, to support a transmission with high data rate (such as in an NR system). A wireless device may perform one or more beam management procedures, as shown in FIG. 9B, for example, if configured with multiple antennas.

A wireless device may perform a downlink beam management based on one or more CSI-RSs and/or one or more SS blocks. In a beam management procedure, a wireless device may measure a channel quality of a beam pair link. The beam pair link may comprise a transmitting beam from a base station and a receiving beam at the wireless device. A wireless device may measure the multiple beam pair links between the base station and the wireless device, for example, if the wireless device is configured with multiple beams associated with multiple CSI-RSs and/or SS blocks.

A wireless device may send (e.g., transmit) one or more beam management reports to a base station. The wireless device may indicate one or more beam pair quality parameters, for example, in a beam management report. The one or more beam pair quality parameters may comprise at least one or more beam identifications; RSRP; and/or PMI, CQI, and/or RI of at least a subset of configured multiple beams.

A base station and/or a wireless device may perform a downlink beam management procedure on one or multiple Transmission and Receiving Point (TRPs), such as shown in FIG. 9B. Based on a wireless device's beam management report, a base station may send (e.g., transmit), to the wireless device, a signal indicating that a new beam pair link is a serving beam. The base station may transmit PDCCH and/or PDSCH to the wireless device using the serving beam.

A wireless device and/or a base station may trigger a beam failure recovery mechanism. A wireless device may trigger a beam failure recovery (BFR) procedure, for example, if at least a beam failure occurs. A beam failure may occur if a quality of beam pair link(s) of at least one PDCCH falls below a threshold. The threshold comprise be an RSRP value (e.g., −140 dbm, −110 dbm, or any other value) and/or a SINR value (e.g., −3 dB, −1 dB, or any other value), which may be configured in a RRC message.

Figure 16A:
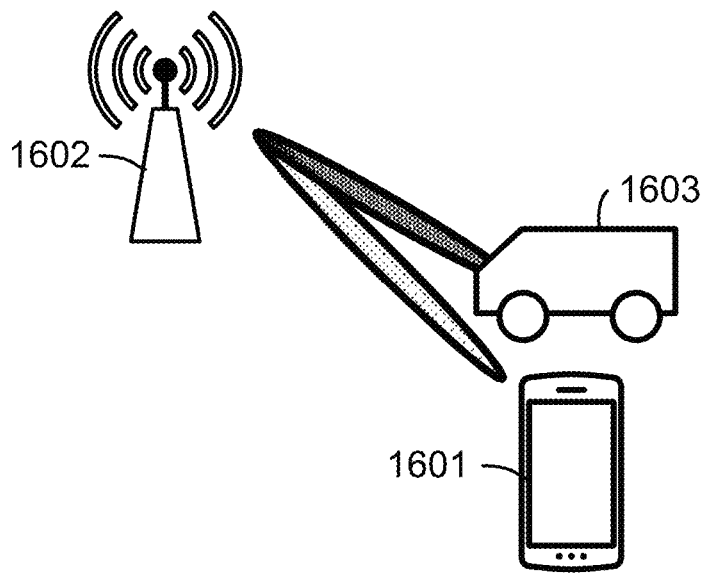
FIG. 16A and FIG. 16B show examples of beam failure scenarios.

FIG. 16A shows an example of a first beam failure event. A base station 1602 may send (e.g., transmit) a PDCCH from a transmission (Tx) beam to a receiving (Rx) beam of a wireless device 1601 from a TRP. The base station 1602 and the wireless device 1601 may start a beam failure recovery procedure on the TRP, for example, if the PDCCH on the beam pair link (e.g., between the Tx beam of the base station 1602 and the Rx beam of the wireless device 1601) have a lower-than-threshold RSRP and/or SINR value due to the beam pair link being blocked (e.g., by a moving vehicle 1603, a building, or any other obstruction).

Figure 16B:
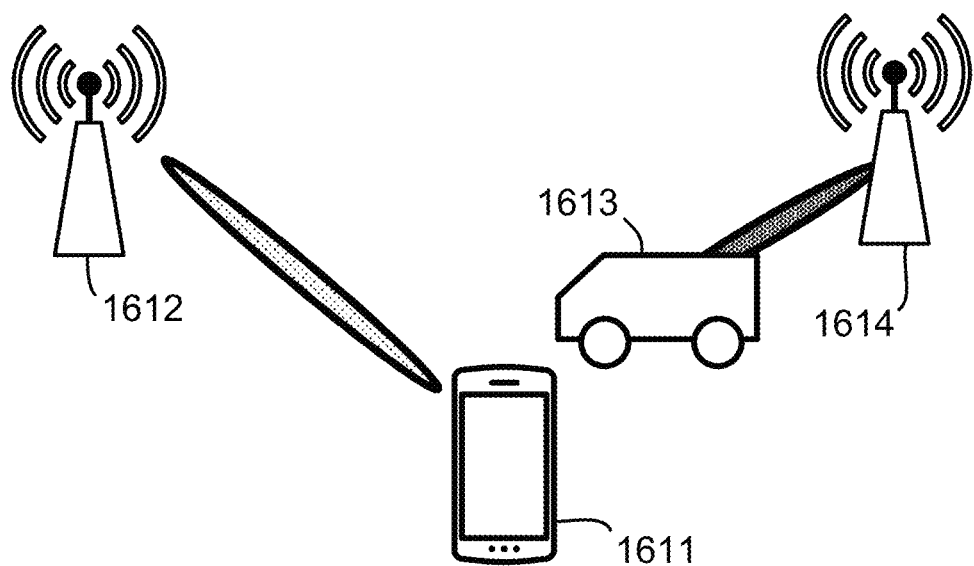

FIG. 16B shows an example of a second beam failure event. A base station may send (e.g., transmit) a PDCCH from a beam to a wireless device 1611 from a first TRP 1614. The base station and the wireless device 1611 may start a beam failure recovery procedure on a new beam on a second TRP 1612, for example, if the PDCCH on the beam is blocked (e.g., by a moving vehicle 1613, building, or any other obstruction).

A wireless device may measure a quality of beam pair links using one or more RSs. The one or more RSs may comprise one or more SS blocks and/or one or more CSI-RS resources. A CSI-RS resource may be determined by a CSI-RS resource index (CRI). A quality of beam pair links may be indicated by, for example, an RSRP value, a reference signal received quality (e.g., RSRQ) value, and/or a CSI (e.g., SINR) value measured on RS resources. A base station may indicate whether an RS resource, used for measuring beam pair link quality, is QCLed (Quasi-Co-Located) with DM-RSs of a PDCCH. The RS resource and the DM-RSs of the PDCCH may be QCLed, for example, if the channel characteristics from a transmission on an RS to a wireless device, and that from a transmission on a PDCCH to the wireless device, are similar or same under a configured criterion. The RS resource and the DM-RSs of the PDCCH may be QCLed, for example, if Doppler shift and/or Doppler shift of the channel from a transmission on an RS to a wireless device, and that from a transmission on a PDCCH to the wireless device, are the same.

A wireless device may monitor a PDCCH on M beams (e.g. 2, 4, 8) pair links simultaneously, where M≥1 and the value of M may depend at least on capability of the wireless device. Monitoring a PDCCH may comprise detecting DCI via the PDCCH transmitted on common search spaces and/or wireless device specific search spaces. Monitoring multiple beam pair links may increase robustness against beam pair link blocking. A base station may send (e.g., transmit) one or more messages comprising parameters indicating a wireless device to monitor PDCCH on different beam pair link(s) in different OFDM symbols.

A base station may send (e.g., transmit) one or more RRC messages and/or MAC CEs comprising parameters indicating Rx beam setting of a wireless device for monitoring PDCCH on multiple beam pair links. A base station may send (e.g., transmit) an indication of a spatial QCL between DL RS antenna port(s) and DL RS antenna port(s) for demodulation of DL control channel. The indication may comprise a parameter in a MAC CE, an RRC message, DCI, and/or any combinations of these signaling.

A base station may indicate spatial QCL parameters between DL RS antenna port(s) and DM-RS antenna port(s) of DL data channel, for example, for reception of data packet on a PDSCH. A base station may send (e.g., transmit) DCI comprising parameters indicating the RS antenna port(s) are QCLed with DM-RS antenna port(s).

A wireless device may measure a beam pair link quality based on CSI-RSs QCLed with DM-RS for PDCCH, for example, if a base station sends (e.g., transmits) a signal indicating QCL parameters between CSI-RS and DM-RS for PDCCH. The wireless device may start a BFR procedure, for example, if multiple contiguous beam failures occur.

A wireless device may send (e.g., transmit) a BFR signal on an uplink physical channel to a base station, for example, if starting a BFR procedure. The base station may send (e.g., transmit) DCI via a PDCCH in a CORESET, for example, after or in response to receiving the BFR signal on the uplink physical channel. The wireless may determine that the BFR procedure is successfully completed, for example, after or in response to receiving the DCI via the PDCCH in the CORESET.

A base station may send (e.g., transmit) one or more messages comprising configuration parameters of an uplink physical channel, or signal, for transmitting a beam failure recovery request. The uplink physical channel or signal may be based on one of: a contention-free PRACH (BFR-PRACH), which may be a resource orthogonal to resources of other PRACH transmissions; a PUCCH (e.g., BFR-PUCCH); and/or a contention-based PRACH resource (e.g., CF-PRACH). Combinations of these candidate signals and/or channels may be configured by the base station. A wireless device may autonomously select a first resource for transmitting the BFR signal, for example, if the wireless device is configured with multiple resources for a BFR signal. The wireless device may select a BFR-PRACH resource for transmitting a BFR signal, for example, if the wireless device is configured with the BFR-PRACH resource, a BFR-PUCCH resource, and/or a CF-PRACH resource. The base station may send (e.g., transmit) a message to the wireless device indicating a resource for transmitting the BFR signal, for example, if the wireless device is configured with a BFR-PRACH resource, a BFR-PUCCH resource, and/or a CF-PRACH resource.

A base station may send (e.g., transmit) a response to a wireless device, for example, after receiving one or more BFR signals. The response may comprise the CRI associated with the candidate beam that the wireless device may indicate in the one or multiple BFR signals.

A base station and/or a wireless device may perform one or more beam management procedures, for example, if the base station and/or the wireless device are configured with multiple beams (e.g., in system such as in an NR system). The wireless device may perform a BFR procedure (e.g., send one or more BFR signals), for example, if one or more beam pair links between the base station and the wireless device fail.

A wireless device may receive one or more RRC messages that comprise BFR parameters. The one or more RRC messages may comprise one or more of an RRC connection reconfiguration message, an RRC connection reestablishment message, and/or an RRC connection setup message. The wireless device may detect at least one beam failure according to at least one of BFR parameters and trigger a BFR procedure. The wireless device may start a first timer, if configured, in response to detecting the at least one beam failure. The wireless device may select a beam (e.g., a selected beam) in response to detecting the at least one beam failure. The selected beam may be a beam with good channel quality (e.g., determined based on RSRP, SINR, or BLER, etc.) from a set of candidate beams. The set of candidate beams may be identified by a set of reference signals (e.g., SSBs, or CSI-RSs). The wireless device may transmit at least a first BFR signal to a base station in response to selecting the selected beam. The at least first BFR signal may be associated with the selected beam. The at least first BFR signal may be, for example, a preamble transmitted on a PRACH resource, or a beam failure request (e.g., which may be similar to an SR) signal transmitted on a PUCCH resource, or a beam indication transmitted on a PUCCH/PUSCH resource. The wireless device may transmit the at least first BFR signal with a transmission beam corresponding to a receiving beam associated with the selected beam. The wireless device, may, for example, determine transmission beam by using the RF and/or digital beamforming parameters corresponding to the receiving beam. The wireless device may start a response window in response to transmitting the at least first BFR signal. The response window may be tracked using, for example, a timer with a value configured by the base station. The wireless device may monitor a PDCCH in a first CORESET while the response window is running. The first CORESET may be associated with the BFR procedure. The wireless device may monitor the PDCCH in the first CORESET in condition of transmitting the at least first BFR signal. The wireless device may receive a first DCI via the PDCCH in the first CORESET while the response window is running. The wireless device may consider the BFR procedure successfully completed if the wireless device receives the first DCI via the PDCCH in the first CORESET before the response window expires. The wireless device may stop the first timer, if configured, if the BFR procedure is successfully completed.

Figure 17:
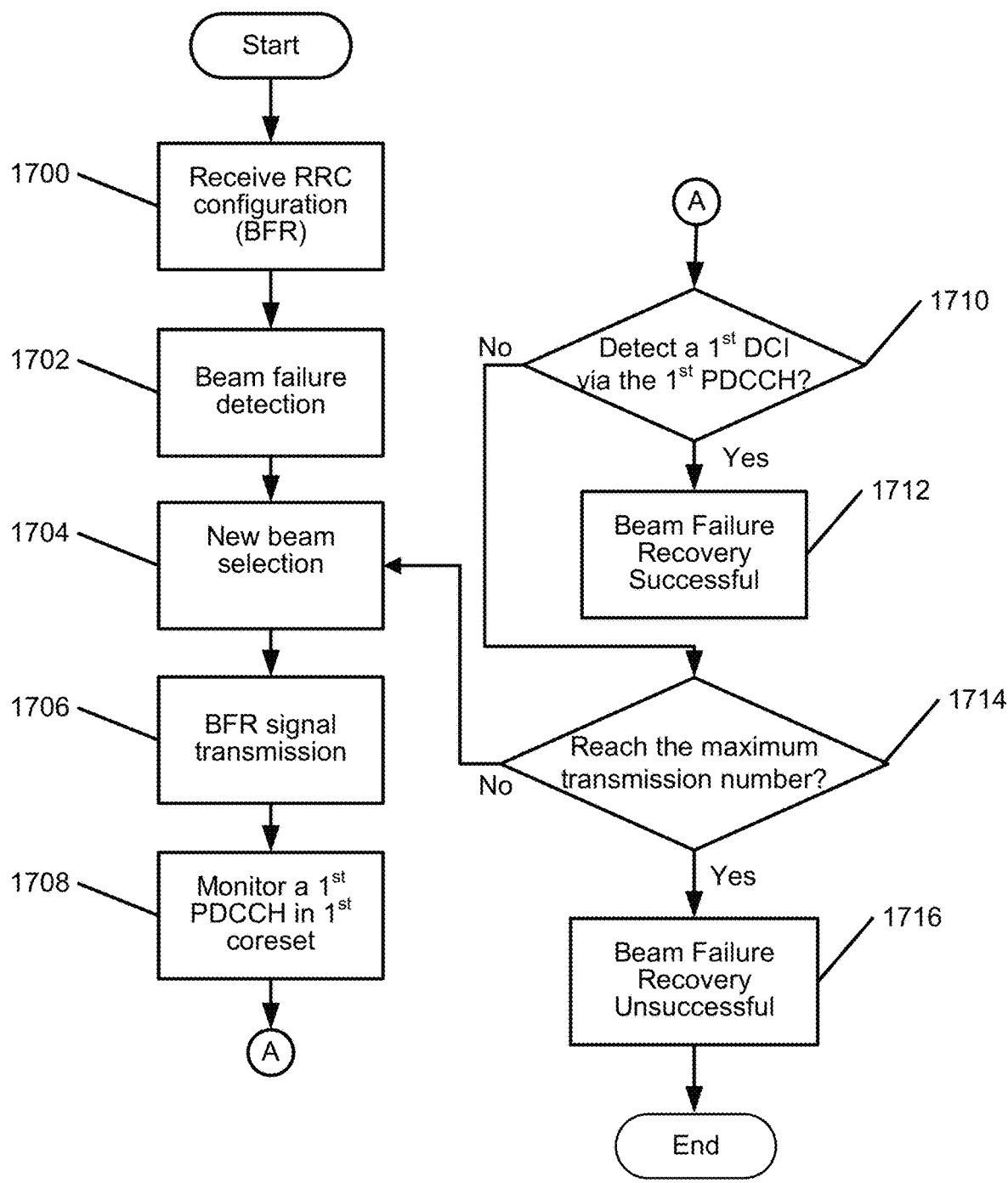
FIG. 17 shows an example of a beam failure recovery (BFR) procedure.

FIG. 17 shows an example of a BFR procedure. In some communication systems, a wireless device may stop a BWP inactivity timer if a random access procedure is initiated, and/or the wireless device may restart the BWP inactivity timer if the random access procedure is successfully completed (e.g., based on or in response to receiving DCI addressed to a C-RNTI of the wireless device). At step 1700, a wireless device may receive one or more RRC messages comprising BFR parameters. At step 1702, the wireless device may detect at least one beam failure according to at least one BFR parameter. The wireless device may start a first timer, if configured, based on detecting the at least one beam failure. At step 1704, the wireless device may select a beam (e.g., a selected beam) based on detecting the at least one beam failure. The selected beam may be a beam with good channel quality (e.g., based on RSRP, SINR, and/or BLER) that may be selected from a set of candidate beams. The candidate beams may be indicated by a set of reference signals (e.g., SSBs, or CSI-RSs). At step 1706, the wireless device may send (e.g., transmit) at least a first BFR signal to a base station, for example, based on selecting the beam (e.g., selected beam). The at least first BFR signal may be associated with the selected beam. The wireless device may send (e.g., transmit) the at least first BFR signal with a transmission beam corresponding to a receiving beam associated with the selected beam. The at least first BFR signal may be a preamble sent (e.g., transmitted) via a PRACH resource, an SR signal sent (e.g., transmitted) via a PUCCH resource, a beam failure recovery signal sent (e.g., transmitted) via a PUCCH resource, and/or a beam report sent (e.g., transmitted) via a PUCCH and/or PUSCH resource. At step 1708, the wireless device may start a response window, for example, based on sending (e.g., transmitting) the at least first BFR signal. The response window may be associated with a timer with a value configured by the base station. The wireless device may monitor a PDCCH in a first CORESET, for example, if the response window is running. The first CORESET may be configured by the BFR parameters (e.g., RRC). The first CORESET may be associated with the BFR procedure. The wireless device may monitor the PDCCH in the first CORESET in condition of transmitting the at least first BFR signal.

At step 1710, the wireless device may detect (e.g., receive) a first DCI via the PDCCH in the first CORESET, for example, if the response window is running. At step 1712, the wireless device may determine that the BFR procedure has successfully completed, for example, if the wireless device receives the first DCI via the PDCCH in the first CORESET before the response window expires. The wireless device may stop the first timer, if configured, based on the BFR procedure successfully being completed. The wireless device may stop the response window, for example, based on the BFR procedure successfully being completed. If the response window expires, and the wireless device does not receive the DCI (e.g., at step 1710), the wireless device may, at step 1714, increment a transmission number. The transmission number may be initialized to a first number (e.g., 0) before the BFR procedure is triggered. At step 1714, if the transmission number indicates a number less than the configured maximum transmission number, the wireless device may repeat one or more actions (e.g., at step 1704). The one or more actions to be repeated may comprise at least one of a BFR signal transmission, starting the response window, monitoring the PDCCH, and/or incrementing the transmission number, for example, if no response received during the response window is running. At step 1716, if the transmission number indicates a number equal or greater than the configured maximum transmission number, the wireless device may declare the BFR procedure is unsuccessfully completed.

A MAC entity of a wireless device may be configured by an RRC message, for example, for a beam failure recovery procedure. The beam failure recovery procedure may be used for indicating to a serving base station of a new (e.g., candidate) synchronization signal block (SSB) and/or CSI-RS, for example, if a beam failure is detected. The beam failure may be detected on one or more serving SSB(s) and/or CSI-RS(s) of the serving base station. The beam failure may be detected by counting a beam failure instance indication from a lower layer of the wireless device (e.g., PHY layer) to the MAC entity.

An RRC message may configure a wireless device with one or more parameters (e.g., in BeamFailureRecoveryConfig) for a beam failure detection and recovery procedure. The one or more parameters may comprise one or more of: beamFailureInstanceMaxCount for a beam failure detection, beamFailureDetectionTimer for the beam failure detection, beamFailureRecoveryTimer for a beam failure recovery procedure, rsrp-ThresholdSSB, an RSRP threshold for a beam failure recovery, PowerRampingStep for the beam failure recovery, preambleReceivedTargetPower for the beam failure recovery, preambleTxMax for the beam failure recovery, and/or ra-ResponseWindow. The ra-Response- Window may be a time window to monitor one or more responses for the beam failure recovery using a contention-free RA preamble.

Figure 18:
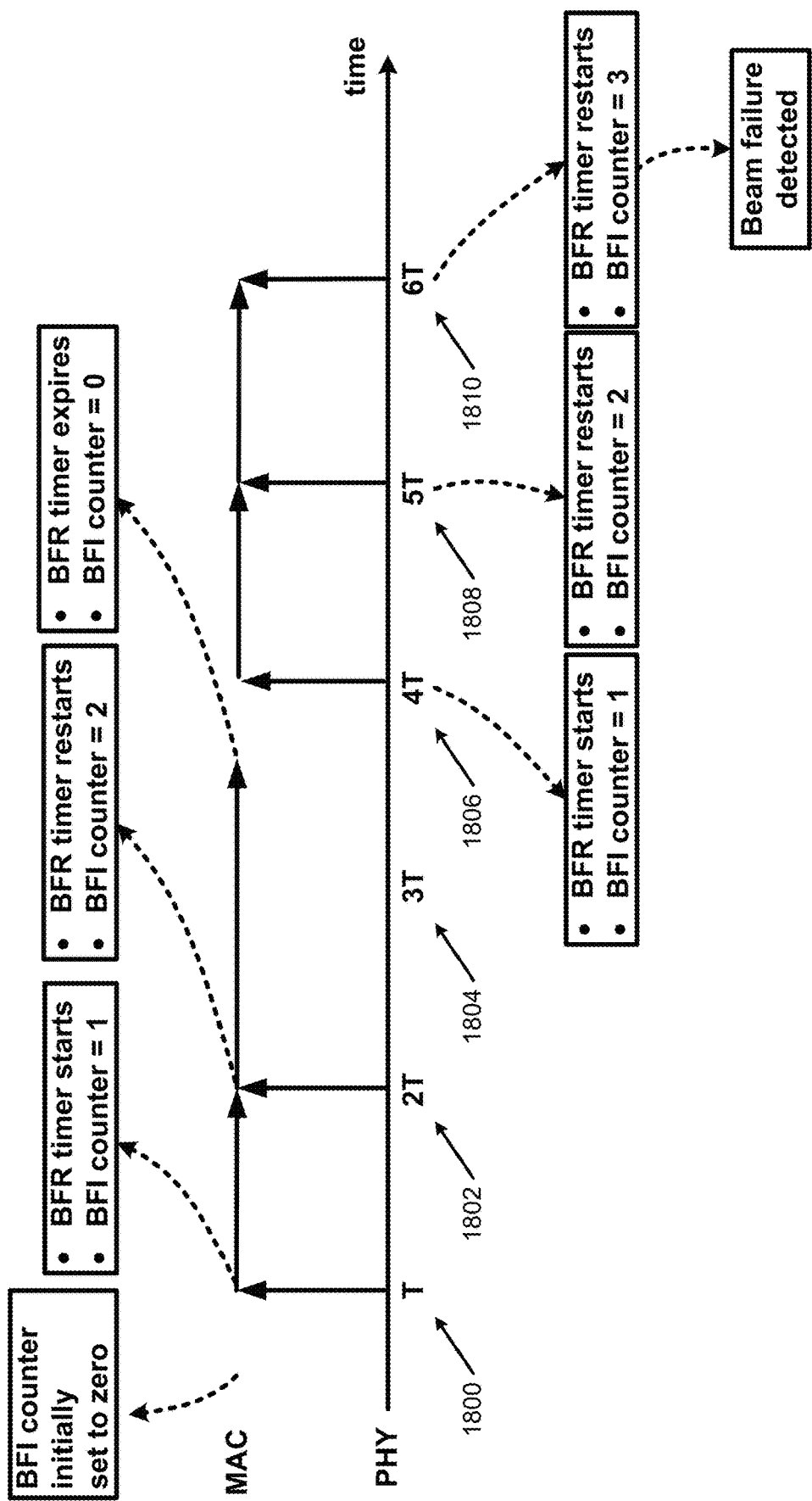
FIG. 18 shows an example of downlink beam failure instance indication.

FIG. 18 shows an example of beam failure instance (BFI) indication. A wireless device may use at least one wireless device variable for a beam failure detection. A BFI counter (e.g., BFI_COUNTER) may be one of the at least one wireless device variable. The BFI counter may be a counter for a beam failure instance indication. The BFI counter may be initially set to zero before time T 1800. The wireless device may start or restart a beam failure detection timer (e.g., beamFailureDetectionTimer) at time T 1800 and increment the BFI counter, for example, based on a MAC entity of a wireless device receiving a beam failure instance indication from a lower layer (e.g., PHY) of the wireless device. The wireless device may increment the BFI counter, for example, in addition to starting or restarting the beam failure detection timer (e.g., BFR timer in FIG. 18 at time T 1800, 2T 1802, 4T 1806, 5T 1808, 6T 1810, etc.). The wireless device may initiate a random access procedure such as for a beam failure recovery (e.g., on an SpCell) based on the BFI counter being greater than or equal to a value such as beamFailureInstanceMaxCount (e.g., at time T 1800, 2T 1802, 5T 1808 in FIG. 18), for example, if an active UL BWP is configured with BeamFailureRecoveryConfig. The wireless device may start a beam failure recovery timer (e.g., beamFailureRecoveryTimer, if configured), for example, based on the active UL BWP being configured with a beam failure recovery configuration (e.g., BeamFailureRecoveryConfig). The wireless device may start the beam failure recovery timer, for example, based on or in response to a BFI counter (e.g., BFI_COUNTER) being equal to or greater than a value such as beamFailureInstanceMaxCount. The wireless device may use the one or more parameters in the beam failure recover configuration (e.g., powerRampingStep, preambleReceivedTargetPower, and/or preambleTransMax), for example, based on or in response to the initiating the random access procedure. The wireless device may set the BFI counter to zero, for example, based on the beam failure detection timer expiring. The wireless device may determine that the beam failure recovery procedure has successfully completed, for example, based on the random access procedure being successfully completed. The random access procedure may be a contention-free random access procedure.

A wireless device may initiate a random access procedure (e.g., on an SpCell) for a beam failure recovery, for example, based on or in response to a BFI counter (e.g., BFI_COUNTER) being greater than or equal to a value such as beamFailureInstanceMaxCount and if the active UL BWP is not configured with BeamFailureRecoveryConfig. The random access procedure may be a contention-based random access procedure.

A wireless device may initiate a random access procedure at time 6T 1810, for example, if a first number (e.g., 3) is reached. The wireless device may set the BFI counter to zero (e.g., in FIG. 18, between time 3T 1804 and 4T 1806), for example, based on the beam failure detection timer (e.g., beamFailureDetectionTimer) expiring. The wireless device may set the BFI_COUNTER to zero, for example, based on the beamFailureDetectionTimer, the BFI_COUNTER, or any of the reference signals used for beam failure detection (e.g., RadioLinkMonitoring RS) being reconfigured by higher layers (e.g., RRC). The wireless device may determine that the beam failure recovery procedure has successfully completed, for example, based on the random access procedure (e.g., a contention-free random access or a contention-based random access) being successfully completed. The wireless device may stop the beam failure recovery timer (if configured), for example, based on the random access procedure (e.g., a contention-free random access) is successfully completed. The wireless device may reset the BFI_COUNTER to zero, for example, based on the random access procedure (e.g., contention-free random access) is successfully completed.

A MAC entity may start ra-ResponseWindow at a first PDCCH occasion from the end of the transmitting the contention-free random access preamble, for example, if a MAC entity of a wireless device sends (e.g., transmits) a contention-free random access preamble for a BFR procedure. The ra-ResponseWindow may be configured in BeamFailureRecoveryConfig. The wireless device may monitor at least one PDCCH (e.g., of an SpCell) for a response to the beam failure recovery request, for example, if the ra-ResponseWindow is running. The beam failure recovery request may be identified by a C-RNTI. The wireless device may determine that a random access procedure has successfully completed, for example, if a MAC entity of a wireless device receives, from a lower layer of the wireless device, a notification of a reception of at least one PDCCH transmission, and if the at least one PDCCH transmission is addressed to a C-RNTI, and/or if a contention-free random access preamble for a beam failure recovery request is transmitted by the MAC entity.

A wireless device may initiate a contention-based random access preamble for a beam failure recovery request. A MAC entity of the wireless device may start ra-ContentionResolutionTimer, for example, if the wireless device transmits Msg3. The ra-ContentionResolutionTimer may be configured by RRC. Based on the starting the ra-ContentionResolutionTimer, the wireless device may monitor at least one PDCCH if the ra-ContentionResolutionTimer is running. The wireless device may consider the random access procedure successfully completed, for example, if the MAC entity receives, from a lower layer of the wireless device, a notification of a reception of the at least one PDCCH transmission, if a C-RNTI MAC CE is included in the Msg3, if a random access procedure is initiated for a beam failure recovery, and/or the at least one PDCCH transmission is addressed to a C-RNTI of the wireless device. The wireless device may stop the ra-ContentionResolutionTimer, for example, based on the random access procedure being successfully completed. The wireless device may determine that the beam failure recovery has successfully completed, for example, if a random access procedure of a beam failure recovery is successfully completed.

A wireless device may be configured (e.g., for a serving cell) with a first set of periodic CSI-RS resource configuration indexes by a higher layer parameter (e.g., BeamFailure-Detection-RS-ResourceConfig, failureDetectionResources, etc.). The wireless device may be configured with a second set of CSI-RS resource configuration indexes and/or SS/PBCH block indexes by a higher layer parameter (e.g., Candidate-Beam-RS-List, candidateBeamRSList, etc.). The first set of CSI-RS resource configuration indexes and/or SS/PBCH block indexes and/or the second set of CSI-RS resource configuration indexes and/or SS/PBCH block indexes may be used for radio link quality measurements on the serving cell. The wireless device may determine a first set to include SS/PBCH block indexes and/or periodic CSI-RS resource configuration indexes, for example, if a wireless device is not provided with higher layer parameter Beam-Failure-Detection-RS-ResourceConfig. The SS/PBCH block indexes and the periodic CSI-RS resource configuration indexes may comprise the same values as one or more RS indexes in one or more RS sets. The one or more RS indexes in the one or more RS sets may be indicated by one or more TCI states (e.g., via a higher layer parameter TCI-States). The one or more TCI states may be used for respective CORESETs for which the wireless device may be configured to monitor a PDCCH. The wireless device may expect the first set to include up to two RS indexes. The first set may include one or more RS indexes with QCL-TypeD configuration for the TCI state, for example, if there are two RS indexes in a TCI state. The wireless device may expect a single port RS in the first set.

A first threshold (e.g., Qout,LR) may correspond to a first default value of a first higher layer parameter (e.g., RLM-IS-OOS-thresholdConfig, rlmInSyncOutOfSyncThreshold, etc.). A second threshold (e.g., Qin,LR) may correspond to a second default value of a higher layer parameter (e.g., Beam-failure-candidate-beam-threshold, rsrp-Threshold-SSB, etc.). A physical layer in the wireless device may determine (or assess) a first radio link quality based on the first threshold. The wireless device may determine (or assess) the first radio link quality based on periodic CSI-RS resource configurations or SS/PBCH blocks. The periodic CSI-RS resource configurations and/or the SS/PBCH blocks may be associated (e.g., quasi co-located) with at least one DM-RS of a PDCCH that may be monitored by the wireless device. The wireless device may apply the second threshold to a first L1-RSRP measurement that may be obtained from one or more SS/PBCH blocks. The wireless device may apply the second threshold to a second L1-RSRP measurement that may be obtained from one or more periodic CSI-RS resources, for example after scaling a respective CSI-RS reception power with a value provided by a higher layer parameter (e.g., Pc_SS, powerControlOffsetSS, etc.).

A wireless device may assess the first radio link quality of a first set (e.g., of resources). A physical layer in the wireless device may provide an indication to higher layers (e.g., MAC), for example, if the first radio link quality for all corresponding resource configurations in the first set is less than the first threshold. The physical layer may inform the higher layers (e.g., MAC, RRC), for example, if the first radio link quality is less than the first threshold with a first periodicity. The first periodicity may be determined by the maximum of the shortest periodicity of periodic CSI-RS configurations or SS/PBCH blocks in the first set and a time value (e.g., 2 ms or any other duration). The wireless device may access the periodic CSI-RS configurations or the SS/PBCH blocks for the first radio link quality. Based on a request from higher layers (e.g., MAC layer), a wireless device may provide to higher layers the periodic CSI-RS configuration indexes and/or the SS/PBCH block indexes from the second set. The wireless device may provide, to higher layers, corresponding L1-RSRP measurements that may be greater than or equal to the second threshold.

A wireless device may be configured with one CORESET, for example, by a higher layer parameter (e.g., Beam-failure-Recovery-Response-CORESET) and/or via a link to a search space set. The wireless device may be configured with an associated search space that may be provided by a higher layer parameter (e.g., search-space-config, recovery-SearchSpaceId, etc.). The search space may be used for monitoring a PDCCH in the control resource set. The wireless device may not expect to be provided with a second search space set for monitoring PDCCH in the CORESET, for example, if the wireless device is provided by a higher layer parameter (e.g., recoverySearchSpaceId). The CORESET may be associated with the search space set provided by a higher layer parameter (e.g., recoverySearchSpaceId). The wireless device may receive from higher layers (e.g., MAC layer), by a parameter (e.g., PRACH-ResourceDedicatedBFR), a configuration for a PRACH transmission. For the PRACH transmission in slot n and based on antenna port quasi co-location parameters associated with periodic CSI-RS resource configuration or with SS/PBCH block associated with a first RS index provided by higher layers, the wireless device may monitor the PDCCH in a search space set (e.g., which may be provided by a higher layer parameter such as recoverySearchSpaceId) for detection of a DCI format starting from a slot (e.g., slot n+4) within a window. The window may be configured by a higher layer parameter (e.g., Beam-failure-recovery-request-window, BeamFailureRecoveryConfig, etc.). The DCI format may be CRC scrambled by a C-RNTI or MCS-C-RNTI. The first RS index may be provided by the higher layers. For a PDCCH monitoring and for a corresponding PDSCH reception, the wireless device may use the same antenna port quasi-collocation parameters associated with the first RS index (e.g., as for monitoring the PDCCH) until the wireless device receives, by higher layers, an activation for a TCI state or a parameter (e.g., any of parameters TCI-StatesPDCCH-ToAddlist, TCI-StatesPDCCH-ToReleaseList).

A wireless device may monitor downlink and/or control channel resources (e.g., PDCCH) candidates in a search space set. The wireless device may monitor the downlink and/or control channel resources (e.g., PDCCH) candidates in the search space set, for example, at least until the wireless device receives a MAC CE activation command for a TCI state or a higher layer parameter (e.g., TCI-StatesPDCCH-ToAddlist and/or TCI-StatesPDCCH-ToReleaseList), for example, after the wireless device detects the DCI format with CRC scrambled by the C-RNTI or the MCS-C-RNTI in the search space set (e.g., which may be by the higher layer parameter recoverySearchSpaceId). The wireless device may not initiate and/or perform a contention free random access procedure for a beam failure recovery, for example, based on or in response to not being provided with the higher layer parameter (e.g., recoverySearchSpaceId). A wireless device may initiate and/or perform a contention-based random access procedure for a beam failure recovery, for example, based on or in response to not being provided with the higher layer parameter (e.g., recoverySearchSpaceId).

A wireless device may be configured for each DL BWP of an SpCell with a set of resource indexes for radio link monitoring by a higher layer parameter (e.g., failureDetectionResources), for example, based on a corresponding set of higher layer parameters (e.g., RadioLinkMonitoringRS). The wireless device may be provided with, for example, one or more of: a CSI-RS resource configuration index, a higher layer parameter csi-RS-Index, a SS/PBCH block index, and/or a higher layer parameter ssb-Index.

The wireless device may use a first RS provided by a higher layer parameter (e.g., TCI-States) for PDCCH receptions, for example, if the wireless device is not provided a higher layer parameter (e.g., RadioLinkMonitoringRS) and/or if the wireless device is provided a higher layer parameter (e.g., TCI-States) for PDCCH receptions that comprises only one RS (e.g., the first RS). The wireless device may use a first RS provided by the higher layer parameter (e.g., TCI-States) for PDCCH receptions, for example, if the wireless device is not provided a higher layer parameter (e.g., RadioLinkMonitoringRS) and/or if the wireless device is provided a higher layer parameter (e.g., TCI-States) for PDCCH receptions that comprises two RSs. The first RS may comprise and/or be associated with QCL-TypeD. The wireless device may use the first RS for radio link monitoring based on the first RS comprising and/or being associated with QCL-TypeD. The two RSs may not comprise and/or be associated with QCL-TypeD simultaneously. The wireless device may not use an aperiodic or semi-persistent RS for radio link monitoring, for example, if the wireless device is not provided a higher layer parameter (e.g., RadioLinkMonitoringRS) and/or if the wireless device is provided a higher layer parameter (e.g., TCI-States) for PDCCH receptions.

A base station may configure a wireless device with uplink (UL) bandwidth parts (BWPs) and downlink (DL) BWPs, for example, to enable bandwidth adaptation (BA) for a PCell. The base station may configure the wireless device with at least DL BWP(s) (e.g., an SCell may not have UL BWPS) to enable BA for an SCell, for example, if CA is configured. For the PCell, a first initial BWP may be a first BWP used for initial access. For the SCell, a second initial BWP may be a second BWP configured for the wireless device to first operate on the SCell if the SCell is activated.

A wireless device may switch a first (e.g., active) DL BWP and a first (e.g., active) UL BWP independently, for example, in paired spectrum (e.g., FDD). A wireless device may switch a second (e.g., active) DL BWP and a second (e.g., active) UL BWP simultaneously, for example, in unpaired spectrum (e.g., TDD). Switching between configured BWPs may be based on DCI and/or an inactivity timer. An expiry of the inactivity timer associated with a cell may switch an active BWP to a default BWP, for example, if the inactivity timer is configured for a serving cell. The default BWP may be configured by the network.

One UL BWP for each uplink carrier and one DL BWP may be active at a time in an active serving cell, for example, in FDD systems configured with BA. One DL/UL BWP pair may be active at a time in an active serving cell, for example, in TDD systems. Operating on the one UL BWP and the one DL BWP (and/or the one DL/UL pair) may enable a wireless device to use a reasonable amount of power (e.g., reasonable battery consumption). BWPs other than the one UL BWP and the one DL BWP that the wireless device may be configured with may be deactivated. The wireless device may refrain from monitoring a PDCCH, and/or may refrain from transmitting via a PUCCH, PRACH and/or UL-SCH, for example, on deactivated BWPs.

A serving cell may be configured with a first number (e.g., four) of BWPs. A wireless device and/or a base station may have one active BWP at any point in time, for example, for an activated serving cell (e.g., PCell, SCell). A BWP switching for a serving cell may be used to activate an inactive BWP and/or deactivate an active BWP. The BWP switching may be controlled by a PDCCH indicating a downlink assignment or an uplink grant. The BWP switching may be controlled by an inactivity timer (e.g., bwpInactivityTimer). The BWP switching may be controlled by an RRC signaling. The BWP switching may be controlled by a MAC entity, for example, based on initiating a random access procedure. A DL BWP (e.g., indicated by first ActiveDownlinkBWP-ID which may be included in RRC signaling) and/or an UL BWP (e.g., indicated by firstActiveDuplinkBWP-ID which may be included in RRC signaling) may be initially active without receiving a PDCCH indicating a downlink assignment or an uplink grant, for example, based on an addition of an SpCell or an activation of an SCell. The active BWP for a serving cell may be indicated by an RRC message and/or a PDCCH message (e.g., PDCCH order). A DL BWP may be paired with an UL BWP, and/or BWP switching may be common for both UL and DL, for example, for unpaired spectrum (e.g., TDD).

A MAC entity, for an activated serving cell (e.g., PCell, SCell), may be configured with one or more BWPs and/or may be configured based on the BWP being activated. The MAC entity may perform at least one of: transmitting via an UL-SCH using the one or more BWPs; transmitting via a RACH using the one or more BWPs based on PRACH occasions being configured; monitoring a PDCCH using the one or more BWPs; transmitting an SRS using the one or more BWPs based on SRS being configured; sending (e.g., transmitting) via a PUCCH using the one or more BWPs based on PUCCH being configured; reporting CSI for one or more BWPs; receiving via a DL-SCH using the one or more BWPs; initializing or reinitializing any suspended configured uplink grants of configured grant Type 1 using the one or more BWPs (e.g., based on a stored configuration, if any); and/or to start in a symbol (e.g., based on a procedure).

A wireless device (e.g., a MAC entity of a wireless device), for an activated serving cell (e.g., PCell, SCell) configured with one or more BWPs and/or based on the BWP being deactivated, may not transmit via a UL-SCH using the one or more BWPs; may not transmit via a RACH using the one or more BWPs; may not monitor a PDCCH using the one or more BWPs; may not report CSI for the one or more BWPs; may not transmit via a PUCCH using the one or more BWPs; may not transmit an SRS using the one or more BWPs, may not receive via a DL-SCH using the one or more BWPs; may clear any configured downlink assignment and configured uplink grant of configured grant Type 2 using the one or more BWPs; and/or may suspend any configured uplink grant of configured Type 1 using the one or more BWPs (e.g., inactive BWPs).

A base station and/or a wireless device (e.g., a MAC entity of a base station and/or a wireless device) may initiate a random access procedure (e.g., contention-based random access, contention-free random access) on a serving cell, for example, based on PRACH occasions being configured for an active UL BWP, of the serving cell, with an uplink BWP ID; the serving cell being an SpCell; and/or a downlink BWP ID of an active DL BWP of the serving cell not being the same as the uplink BWP ID. The base station and/or the wireless device (e.g., a MAC entity of a base station and/or a wireless device) may switch from the active DL BWP to a DL BWP with a second downlink BWP ID same as the uplink BWP ID, for example, based on the prior initiation. The base station and/or the wireless device (e.g., a MAC entity of a base station and/or a wireless device) may perform the random access procedure on the DL BWP of the serving cell (e.g., SpCell) and the active UL BWP of the serving cell, for example, based on or in response to the switching.

A base station and/or a wireless device (e.g., a MAC entity of a base station and/or a wireless device) may initiate a random access procedure (e.g., contention-based random access, contention-free random access) on a serving cell (e.g., SCell), for example, based on PRACH occasions being configured for an active UL BWP of the serving cell; and/or the serving cell not being an SpCell. The base station and/or the wireless device (e.g., a MAC entity of a base station and/or a wireless device) may perform the random access procedure on an active DL BWP of an SpCell and an active UL BWP of the serving cell, for example, based on the initiation.

A base station and/or a wireless device (e.g., a MAC entity of a base station and/or a wireless device) may initiate a random access procedure on a serving cell, for example, based on PRACH resources not being configured for an active UL BWP of the serving cell. The MAC entity may switch the active UL BWP to an uplink BWP (initial uplink BWP), for example, based on the initiation. The uplink BWP may be indicated by RRC signaling (e.g., initialULBWP). The base station and/or the wireless device (e.g., a MAC entity of a base station and/or a wireless device) may switch an active DL BWP to a downlink BWP (e.g., initial downlink BWP), for example, based on the serving cell being an SpCell. The downlink BWP may be indicated by RRC signaling (e.g., initialDLBWP). The base station and/or the wireless device (e.g., a MAC entity of a base station and/or a wireless device) may perform the random access procedure on the uplink BWP and the downlink BWP, for example, based on or in response to the switching.

A base station and/or a wireless device (e.g., a MAC entity of a base station and/or a wireless device) may initiate a random access procedure on a serving cell, for example, based on PRACH resources not being configured for an active UL BWP of the serving cell (e.g., SCell). The base station and/or the wireless device (e.g., a MAC entity of a base station and/or a wireless device) may switch the active UL BWP to an uplink BWP (initial uplink BWP), for example, based on the initiation. The uplink BWP may be indicated by RRC signaling (e.g., initialULBWP). The base station and/or the wireless device (e.g., a MAC entity of a base station and/or a wireless device) may perform the random access procedure on the uplink BWP and an active downlink BWP of an SpCell, for example, based on the serving cell is not an SpCell.

A wireless device may perform BWP switching to a BWP indicated by a PDCCH, for example, if a base station and/or a wireless device (e.g., a MAC entity of a base station and/or a wireless device) receives a PDCCH (e.g., a PDCCH order) for a BWP switching for a serving cell, for example, if a random access procedure associated with this serving cell is not ongoing. A wireless device may determine whether to switch a BWP or ignore the PDCCH for the BWP switching, for example, if a base station and/or a wireless device (e.g., a MAC entity of a base station and/or a wireless device) received a PDCCH for a BWP switching for a serving cell while a random access procedure is ongoing in the MAC entity. The wireless device may perform the BWP switching to a new BWP indicated by the PDCCH. The base station and/or the wireless device (e.g., a MAC entity of a base station and/or a wireless device) may stop the ongoing random access procedure and initiate a second random access procedure after or in response to switching to the new BWP, for example, if the MAC entity decides to perform BWP switching to the new BWP (e.g., which may be indicated by the PDCCH), for example, based on or in response to receiving a PDCCH (e.g., other than successful contention resolution) or an RRC configuration. The base station and/or the wireless device (e.g., a MAC entity of a base station and/or a wireless device) may continue with the ongoing random access procedure on the serving cell, for example if the MAC decides to ignore the PDCCH for the BWP switching.

The base station and/or the wireless device (e.g., a MAC entity of a base station and/or a wireless device) may start or restart a BWP inactivity timer associated with the active DL BWP for a variety of reasons. The MAC entity may start or restart a BWP inactivity timer (e.g., BWP-InactivityTimer) associated with the active DL BWP for an activated serving cell configured with the BWP inactivity timer, for example, if one or more of the following occur: if a Default-DL-BWP is configured (e.g., via RRC signaling including default-DownlinkBWP parameter) and an active DL BWP is not a BWP indicated by the Default-DL-BWP; if the Default-DL-BWP is not configured and the active DL BWP is not the initial DL BWP (e.g., via RRC signaling including initial-DownlinkBWPparameter); and/or if one or more of the following occur: if a PDCCH addressed to C-RNTI or CS-RNTI indicating downlink assignment or uplink grant is received on or for the active BWP, and/or if there is not an ongoing random access procedure associated with the activated serving cell.

The base station and/or the wireless device (e.g., a MAC entity of a base station and/or a wireless device) may start or restart the BWP inactivity timer (e.g., BWP-InactivityTimer) associated with the active DL BWP, for example, if one or more of the following occur: if a BWP-InactivityTimer is configured for an activated serving cell, if a Default-DL-BWP is configured and an active DL BWP is not a BWP indicated by the Default-DL-BWP, and/or if the Default-DL-BWP is not configured and an active DL BWP is not the initial DL BWP; and/or if one or more of the following occur: if a MAC-PDU is transmitted in a configured uplink grant or received in a configured downlink assignment, and/or if there is not an ongoing random access procedure associated with the activated serving cell.

The base station and/or the wireless device (e.g., a MAC entity of a base station and/or a wireless device) may start or restart the BWP inactivity timer (e.g., BWP-InactivityTimer) associated with the active DL BWP, for example, if one or more of the following occur: if a BWP-InactivityTimer is configured for an activated serving cell, if a Default-DL-BWP is configured and an active DL BWP is not a BWP indicated by the Default-DL-BWP, and/or if the Default-DL-BWP is not configured and the active DL BWP is not the initial DL BWP; and/or if one or more of the following occur: if a PDCCH addressed to C-RNTI or CS-RNTI indicating downlink assignment or uplink grant is received on or for the active BWP, if a MAC-PDU is transmitted in a configured uplink grant or received in a configured downlink assignment, and/or if an ongoing random access procedure associated with the activated Serving Cell is successfully completed in response to receiving a PDCCH addressed to a C-RNTI.

The base station and/or the wireless device (e.g., a MAC entity of a base station and/or a wireless device) may start or restart the BWP inactivity timer (e.g., BWP-InactivityTimer) associated with the active DL BWP based on switching the active BWP. For example, the MAC entity may start or restart the BWP-InactivityTimer associated with the active DL BWP if a PDCCH for BWP switching is received and the wireless device switches an active DL BWP to the DL BWP, and/or if one or more of the following occur: if a default downlink BWP is configured and the DL BWP is not the default downlink BWP, and/or if a default downlink BWP is not configured and the DL BWP is not the initial downlink BWP.

The base station and/or the wireless device (e.g., a MAC entity of a base station and/or a wireless device) may stop the BWP inactivity timer (e.g., BWP-InactivityTimer) associated with an active DL BWP of the activated serving cell, for example, if one or more of the following occur: if BWP-InactivityTimer is configured for an activated serving cell, if the Default-DL-BWP is configured and the active DL BWP is not the BWP indicated by the Default-DL-BWP, and/or if the Default-DL-BWP is not configured and the active DL BWP is not the initial BWP; and/or if a random access procedure is initiated on the activated serving cell.

The MAC entity may stop a second BWP inactivity timer (e.g., BWP-InactivityTimer) associated with a second active DL BWP of an SpCell, for example, if the activated Serving Cell is an SCell (other than a PSCell).

The base station and/or the wireless device (e.g., a MAC entity of a base station and/or a wireless device) may perform BWP switching to a BWP indicated by the Default-DL-BWP, for example, if one or more of the following occur: if a BWP inactivity timer (e.g., BWP-Inactivity-Timer) is configured for an activated serving cell, if the Default-DL-BWP is configured and the active DL BWP is not the BWP indicated by the Default-DL-BWP, if the Default-DL-BWP is not configured and the active DL BWP is not the initial BWP, if BWP-InactivityTimer associated with the active DL BWP expires, and/or if the Default-DL-BWP is configured. The MAC entity may perform BWP switching to the initial DL BWP, for example, if the MAC entity may refrain from performing BWP switching to a BWP indicated by the Default-DL-BWP.

A wireless device may be configured for operation in BWPs of a serving cell. The wireless device may be configured by higher layers for the serving cell for a set of (e.g., four) bandwidth parts (BWPs) for receptions by the wireless device (e.g., DL BWP set) in a DL bandwidth by a parameter (e.g., DL-BWP). The wireless device may be configured with a set of (e.g., four) BWPs for transmissions by the wireless device (e.g., UL BWP set) in an UL bandwidth by a parameter (e.g., UL-BWP). A wireless device may not be provided higher layer parameter initialDownlinkBWP. An initial active DL BWP may be determined based on the wireless device not being provided the higher layer parameter initialDownlinkBWP, for example, by: a location and number of contiguous PRBs; a subcarrier spacing; and/or a cyclic prefix (e.g., for PDCCH reception via the control resource set for a Type0-PDCCH common search space). The contiguous PRBs may start from a PRB with a lowest index and may end at a PRB with a highest index, for example, for the PRBs of a control resource set for Type0-PDCCH common search space. A wireless device may be provided higher layer parameter initialDownlinkBWP. An initial active DL BWP may be a BWP indicated by the higher layer parameter initialDownlinkBWP based on the wireless device being provided the higher layer parameter initialDownlinkBWP. A wireless device may be provided (e.g., by a higher layer) a parameter (e.g., initial-UL-BWP) for an initial active UL BWP for a random access procedure, for example, for operation on a primary cell or on a secondary cell. The wireless device may be provided with an initial active UL BWP (e.g., by a higher layer) parameter (e.g., Active-BWP-DL-Pcell, initialUplinkBWP, etc.) for first active DL BWP for receptions, for example, if a wireless device has a dedicated BWP configuration. The wireless device may be provided with an initial uplink BWP on a supplementary uplink carrier by a second higher layer parameter (e.g., initialUplinkBWP in a supplementary uplink), for example, if the wireless device is configured with a supplementary uplink carrier. The wireless device may be provided (e.g., by a higher layer) a parameter (e.g., Active-BWP-UL-Pcell, firstActiveDownlinkBWP-Id, etc.) for a first active UL BWP for transmissions on a primary cell, for example, if a wireless device has a dedicated BWP configuration. The higher layer parameter may indicate a first active DL BWP for receptions. The wireless device may be provided by a second higher layer parameter (e.g., firstActiveUplinkBWP-Id), for example, if the wireless device has a dedicated BWP configuration. The higher layer parameter may indicate a first active UL BWP for transmissions on the primary cell.

A wireless device may be provided with at least one of the following parameters for a serving cell, for example, for a DL BWP in a first set of DL BWPs or an UL BWP in a second set of UL BWPs: a subcarrier spacing by higher layer parameter subcarrierSpacing or UL-BWP-mu; a cyclic prefix by higher layer parameter cyclicPrefix; an index in the first set of DL BWPs or in the second set of UL BWPs by respective higher layer parameters bwp-Id (e.g., DL-BWP-ID, UL-BWP-ID); a third set of BWP-common and a fourth set of BWP-dedicated parameters by a higher layer parameter bwp-Common and a higher layer parameter bwp-Dedicated, respectively.

A DL BWP from a first set of configured DL BWPs (e.g., with a DL BWP index provided by higher layer parameter such as bwp-ID) may be paired and/or linked with an UL BWP from a second set of configured UL BWPs (e.g., with an UL BWP index provided by higher layer parameter such as bwp-ID). A DL BWP from a first set of configured DL BWPs may be paired with an UL BWP from a first set of configured UL BWPs, for example, if the DL BWP index and the UL BWP index are equal and/or the same (e.g., for unpaired spectrum operation). A wireless device may not expect to receive a configuration where the center frequency for a DL BWP is different from the center frequency for an UL BWP, for example, if the DL-BWP-index of the DL BWP is equal to and/or the same as the UL-BWP-index of the UL BWP (e.g., for unpaired spectrum operation).

A wireless device may be configured with CORESETs for every type of common search space and/or for wireless device-specific search space, for example, for a DL BWP in a first set of DL BWPs on a primary cell. The wireless device may not expect to be configured without a common search space on the PCell, or on the PSCell, of the MCG in the DL BWP (e.g., active DL BWP). The wireless device may be configured with CORESETs for PUCCH transmissions, for example, for an UL BWP in a second set of UL BWPs of the PCell or of a PUCCH-SCell. A wireless device may receive a PDCCH message and/or a PDSCH message in a DL BWP, for example, according to a configured subcarrier spacing and/or a CP length for the DL BWP. A wireless device may send (e.g., transmit) via a PUCCH and/or via a PUSCH in an UL BWP, for example, according to a configured subcarrier spacing and CP length for the UL BWP.

A BWP indicator field value may indicate an active DL BWP, from the first set of configured DL BWPs, for DL receptions, for example, if the BWP indicator field is configured in DCI format 1_1. The BWP indicator field value may indicate an active UL BWP, from the second set of configured UL BWPs, for UL transmissions.

The wireless device may set the active UL BWP to the UL BWP indicated by the bandwidth part indicator field in the DCI format 0_1, for example, based on a bandwidth part indicator field being configured in DCI format 0_1 and/or the bandwidth part indicator field value indicating an UL BWP different from an active UL BWP. The wireless device may set the active DL BWP to the DL BWP indicated by the bandwidth part indicator field in the DCI format 1_1, for example, based on a bandwidth part indicator field being configured in DCI format 1_1 and/or the bandwidth part indicator field value indicating a DL BWP different from an active DL BWP.

A wireless device may detect a DCI format 0_1 indicating active UL BWP change, or a DCI format 1_1 indicating active DL BWP change, for example, if a corresponding PDCCH is received within first three symbols of a slot. A wireless device may be provided (e.g., for the primary cell) with a higher layer parameter (e.g., defaultDownlinkBWP-Id). The higher layer parameter may indicate a default DL BWP among configured DL BWPs. The default BWP may be the initial active DL BWP, for example, if a wireless device is not provided a default DL BWP by a higher layer parameter (e.g., defaultDownlinkBWP-Id).

The wireless device procedures on the secondary cell may be same as on a primary cell. The wireless device procedures on the secondary cell may be the same as on a primary cell, for example, based on the wireless device being configured for a secondary cell with higher layer parameter (e.g., defaultDownlinkBWP-Id) indicating a default DL BWP among the configured DL BWPs and/or the wireless device being configured with higher layer parameter bwp-inactivitytimer indicating a timer value. An operation of the timer value for the secondary cell and the default DL BWP for the secondary cell may be similar to or the same as operations using a timer value for the primary cell and a default DL BWP for the primary cell.

A wireless device may be provided by a higher layer parameter (e.g., BWP-InactivityTimer). The higher layer parameter may indicate a timer with a timer value for a serving cell (e.g., primary cell, secondary cell). The wireless device may increment the timer every interval (e.g., every interval of 1 millisecond for frequency range 1, every 0.5 milliseconds for frequency range 2, or any other interval for any other frequency range), for example, based on the timer being configured, the timer running, and/or the wireless device not detecting a DCI format for PDSCH reception on the serving cell for paired spectrum operation. The wireless device may decrement the timer every interval (e.g., every interval of 1 millisecond for frequency range 1, every 0.5 milliseconds for frequency range 2, or any other interval for any other frequency range), for example, based on the timer being configured, the timer running, the wireless device not detecting a first DCI format for PDSCH reception and/or the wireless device not detecting a second DCI format for PUSCH transmission on the serving cell for unpaired spectrum operation during the interval.

A wireless device may change an active DL BWP and/or an active UL BWP for a cell, for example, based on expiration of a BWP inactivity timer. The wireless device may not be required to receive or send (e.g., transmit) in the cell during a time duration from a beginning of a subframe for frequency range 1, or of half of a subframe for frequency range 2, for example, to accommodate a delay in the changing the active DL BWP or the active UL BWP. The wireless device may not be required and/or expected to receive and/or send (e.g., transmit) in the cell until a beginning of a slot where the wireless device can receive or send (e.g., transmit), for example, after the BWP inactivity timer expires.

A wireless device may be configured by a higher layer (e.g., the configuration including parameter firstActive-DownlinkBWP-Id and/or parameter firstActiveUplinkBWP-Id). The higher layer parameter (e.g., firstActive-DownlinkBWP-Id) may indicate a first active DL BWP on a serving cell (e.g., secondary cell). The wireless device may use the first active DL BWP on the serving cell as the respective first active DL BWP. The higher layer parameter (e.g., firstActiveUplinkBWP-Id) may indicate a first active UL BWP on a serving cell (e.g., secondary cell) or on a supplementary uplink carrier. The wireless device may use the first active UL BWP on the serving cell or on the supplementary uplink carrier as the respective first active UL BWP.

A wireless device may not expect to send (e.g., transmit) a PUCCH with HARQ-ACK on a PUCCH resource indicated by a DCI format 1_0 or a DCI format 1_1, for example, based on paired spectrum operation, the wireless device changing its active UL BWP on a primary cell between a time of a detection of the DCI format 1_0 or the DCI format 1_1, and/or a time of a corresponding PUCCH transmission with HARQ-ACK transmission on the PUCCH. A wireless device may not monitor PDCCH when the wireless device performs RRM measurements over a bandwidth that is not within the active DL BWP for the wireless device.

A DL BWP index (ID) may be an identifier for a DL BWP. One or more parameters in an RRC configuration may use the DL BWP-ID to associate the one or more parameters with the DL BWP. The DL BWP ID of 0 (e.g., DL BWP ID=0) may be associated with the initial DL BWP. An UL BWP index (ID) may be an identifier for an UL BWP. One or more parameters in an RRC configuration may use the UL BWP-ID to associate the one or more parameters with the UL BWP. The UL BWP ID of 0 (e.g., UL BWP ID=0) may be associated with the initial UL BWP.

A higher layer parameter (e.g., firstActiveDownlinkBWP-Id) may indicate an ID of a DL BWP to be activated upon performing the reconfiguration, for example, based on a higher layer parameter (e.g., firstActiveDownlinkBWP-Id) is configured for an SpCell. A higher layer parameter (e.g., firstActiveDownlinkBWP-Id) may indicate an ID of a DL BWP to be used upon MAC-activation of the SCell, for example, based on the higher layer parameter (e.g., firstActiveDownlinkBWP-Id) being configured for an SCell. A higher layer parameter (e.g., firstActiveUplinkBWP-Id) may indicate an ID of an UL BWP to be activated if performing the reconfiguration, for example, based on the higher layer parameter (e.g., firstActiveUplinkBWP-Id) being configured for an SpCell. A higher layer parameter (e.g., firstActiveUplinkBWP-Id) may indicate an ID of an UL BWP to be used if MAC-activation of the SCell occurs, for example, based on a higher layer parameter (e.g., firstActiveUplinkBWP-Id) being configured for an SCell.

A wireless device, to execute a reconfiguration with sync, may assume (e.g., consider) an uplink BWP indicated in a higher layer parameter (e.g., firstActiveUplinkBWP-Id) to be an active uplink BWP. A wireless device, to execute a reconfiguration with sync, may assume (e.g., consider) a downlink BWP indicated in a higher layer parameter (e.g., firstActiveDownlinkBWP-Id) to be an active downlink BWP.

Figure 19:
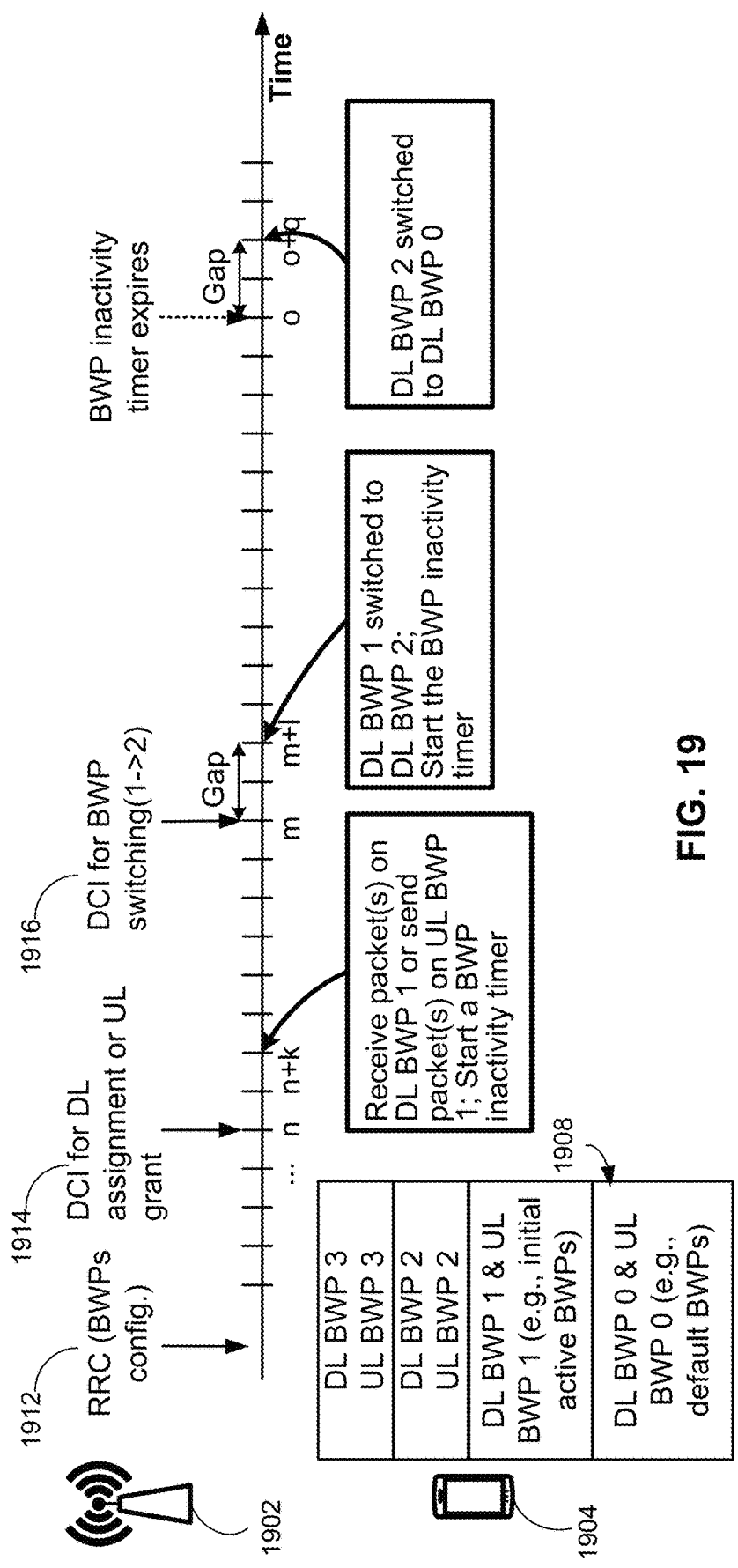
FIG. 19 shows an example of BWP operation.

FIG. 19 shows an example of BWP switching. The BWP switching may be on a PCell. A base station 1902 may send (e.g., transmit) one or more messages (e.g., one or more RRC messages) 1912 for configuring multiple BWPs (e.g., multiple BWPs comprising a DL BWP 0, a DL BWP 1, a DL BWP 2, a DL BWP 3, an UL BWP 0, an UL BWP 1, an UL BWP 2, and an UL BWP 3 shown in a table 1908). The DL (and/or UL) BWP 0 may be a default BWP. The DL (and/or UL) BWP 1 may be an initial active BWP (e.g., an initial DL BWP or an initial UL BWP). A wireless device 1904 may determine the multiple BWPs configured for the wireless device 1904, for example, based on the one or more messages 1912. The base station 1902 may send DCI 1914 for a DL assignment (e.g., at a time n). The DCI 1914 may be sent via the DL BWP 1 (e.g., an initial DL BWP). The wireless device 1904 may receive a packet via the DL BWP 1 or via another active DL BWP (e.g., at a time n+k), for example, based on the DL assignment. The wireless device 1904 may start a BWP inactivity timer (e.g., at the time n+k). The wireless device 1904 may start the BWP inactivity timer, for example, after receiving scheduled downlink packets. The base station 1902 may send DCI 1914 for an UL grant (e.g., at the time n). The DCI 1914 may be sent via the DL BWP 1 (e.g., a first DL BWP or an initial DL BWP). The wireless device 1904 may send a packet via an UL BWP 1 (e.g., via a first UL BWP or an initial UL BWP at a time n+k), for example, based on the UL grant. The wireless device 1904 may start a BWP inactivity timer (e.g., at the time n+k). The wireless device 1904 may start the BWP inactivity timer, for example, after sending scheduled uplink packets.

The base station 1902 may send DCI 1919 for BWP switching (e.g., a BWP switching from the DL BWP 1 to the DL BWP 2). The DCI 1919 may be sent via the active DL BWP 1 (e.g., at a time m). The wireless device 1904 may receive the DCI 1919, for example, by monitoring a PDCCH on the active DL BWP 1. The wireless device 1904 may switch the DL BWP 1 to the DL BWP 2 (e.g., at a time m+l), for example, based on the DCI 1916. There may be a delay (e.g., a gap) between the wireless device 1904 receiving the DCI 1916 and the wireless device 1904 switching to the DL BWP 2. The wireless device 1904 may start and/or re-start the BWP inactivity timer (e.g., at the time m+l), for example, after the BWP switching. The BWP inactivity timer may expire (e.g., at a time o), for example, if the wireless device 1904 does not perform reception or transmission for a period of time (e.g., a period from the time m+l to the time o). The wireless device 1904 may switch the DL BWP 2 to the DL BWP 0 (e.g., a default BWP). The fallback to the DL BWP 0 may occur (e.g., at a time o+q), for example, after the BWP inactivity timer expires. There may be a delay (e.g., a gap) between the BWP inactivity timer expiration (e.g., at a time o) and the wireless device 1904 switching to the DL BWP 0 (e.g., at a time o+q). BWPs are described as example resources, and any wireless resource may be applicable to one or more procedures described herein.

Figure 20:
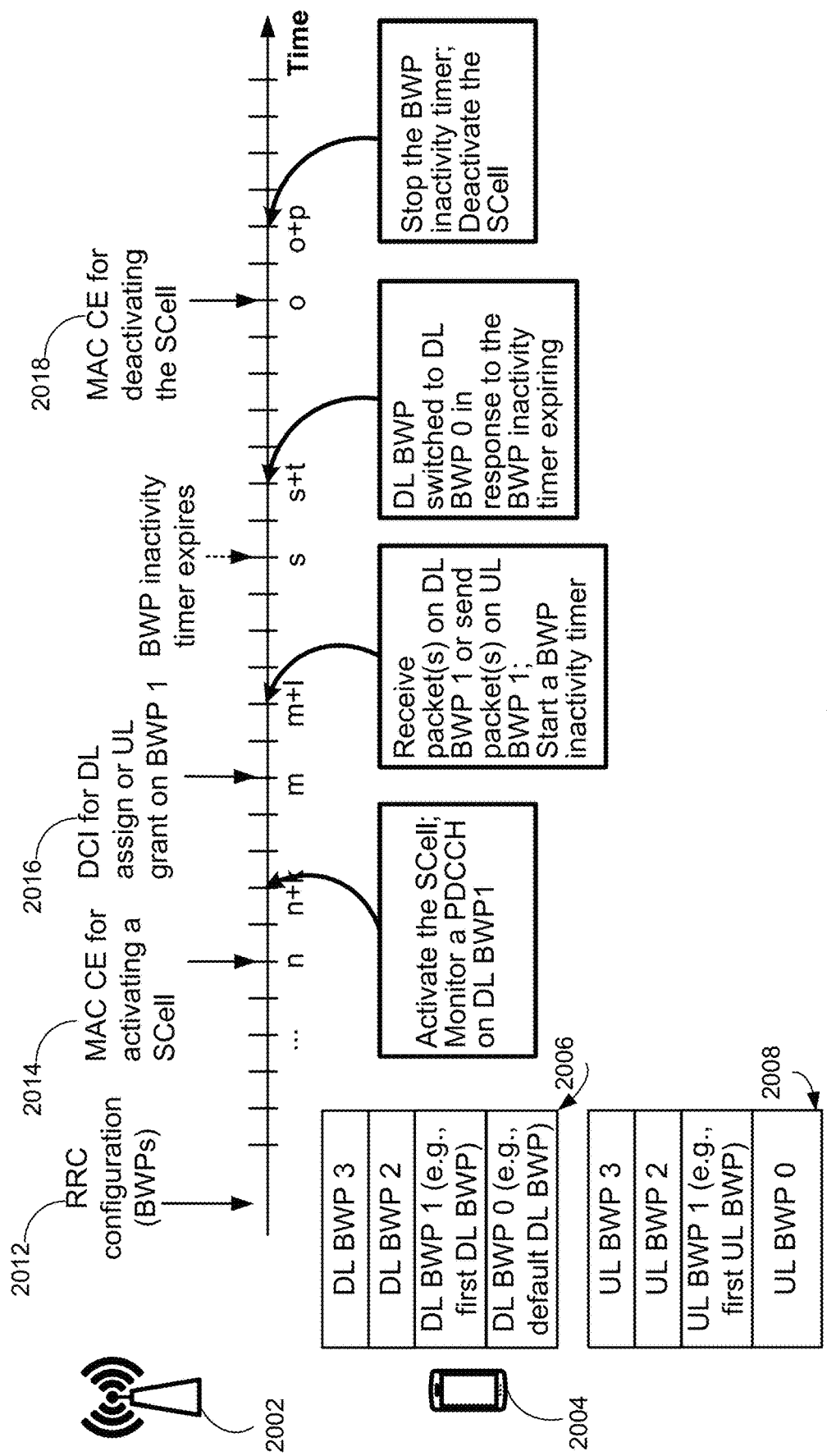
FIG. 20 shows an example of BWP operation in an SCell.

FIG. 20 shows an example of BWP switching. The BWP switching may be performed on an SCell. A base station 2002 may send (e.g., transmit) one or more messages (e.g., one or more RRC messages) 2012 for configuring multiple BWPs (e.g., multiple BWPs comprising a DL BWP 0, a DL BWP 1, a DL BWP 2, a DL BWP 3, an UL BWP 0, an UL BWP 1, an UL BWP 2, and an UL BWP 3 shown in tables 2006 and 2008, respectively). The multiple BWPs may be BWPs of an SCell. The DL (and/or UL) BWP 0 may be a default BWP. The DL (and/or UL) BWP 1 may be a first (or initial) active BWP (e.g., a first DL BWP or a first UL BWP). A wireless device 2004 may determine the multiple BWPs configured for the wireless device 2004, for example, based on the one or more messages 2012. The base station 2002 may send, to the wireless device 2004, a MAC CE 2014 for activating the SCell (e.g., at a time n). The wireless device 2004 may activate the SCell (e.g., at a time n+k). The wireless device 2004 may start to monitor a PDCCH on (e.g., sent via) the DL BWP 1. The base station 2002 may send DCI 2016 for a DL assignment (e.g., at a time m). The DCI 2016 may be sent via the DL BWP 1 (e.g., a first DL BWP). The wireless device 2004 may receive a packet via the DL BWP 1 or via another active DL BWP (e.g., at a time m+l), for example, based on the DL assignment. The wireless device 2004 may start a BWP inactivity timer (e.g., at the time m+l). The wireless device 2004 may start the BWP inactivity timer, for example, after receiving scheduled downlink packets. The base station 2002 may send DCI 2016 for an UL grant (e.g., at the time m). The DCI 2016 may be sent via the DL BWP 1 (e.g., a first DL BWP or an initial DL BWP). The wireless device 2004 may send a packet via an UL BWP 1 (e.g., via a first UL BWP or an initial UL BWP at a time m+l), for example, based on the UL grant. The wireless device 2004 may start a BWP inactivity timer (e.g., at the time m+l). The wireless device 2004 may start the BWP inactivity timer, for example, after sending scheduled uplink packets.

The BWP inactivity timer may expire (e.g., at a time s). The BWP inactivity may expire, for example, if the wireless device 2004 does not perform reception or transmission for a period of time (e.g., a period from the time m+l to the time s). The wireless device 2004 may switch the DL BWP 1 to the DL BWP 0 (e.g., a default BWP). The fallback to the DL BWP 0 may occur (e.g., at a time s+t), for example, after the BWP inactivity timer expires. The base station 2002 may send, to the wireless device 2004, a MAC CE 2018 for deactivating the SCell (e.g., at a time o). The wireless device 2004 may deactivate the SCell and/or stop the BWP inactivity timer (e.g., at a time o+p). The wireless device 2004 may deactivate the SCell and/or stop the BWP inactivity timer, for example, after receiving and/or checking an indication of the MAC CE 2018.

Figure 21A:
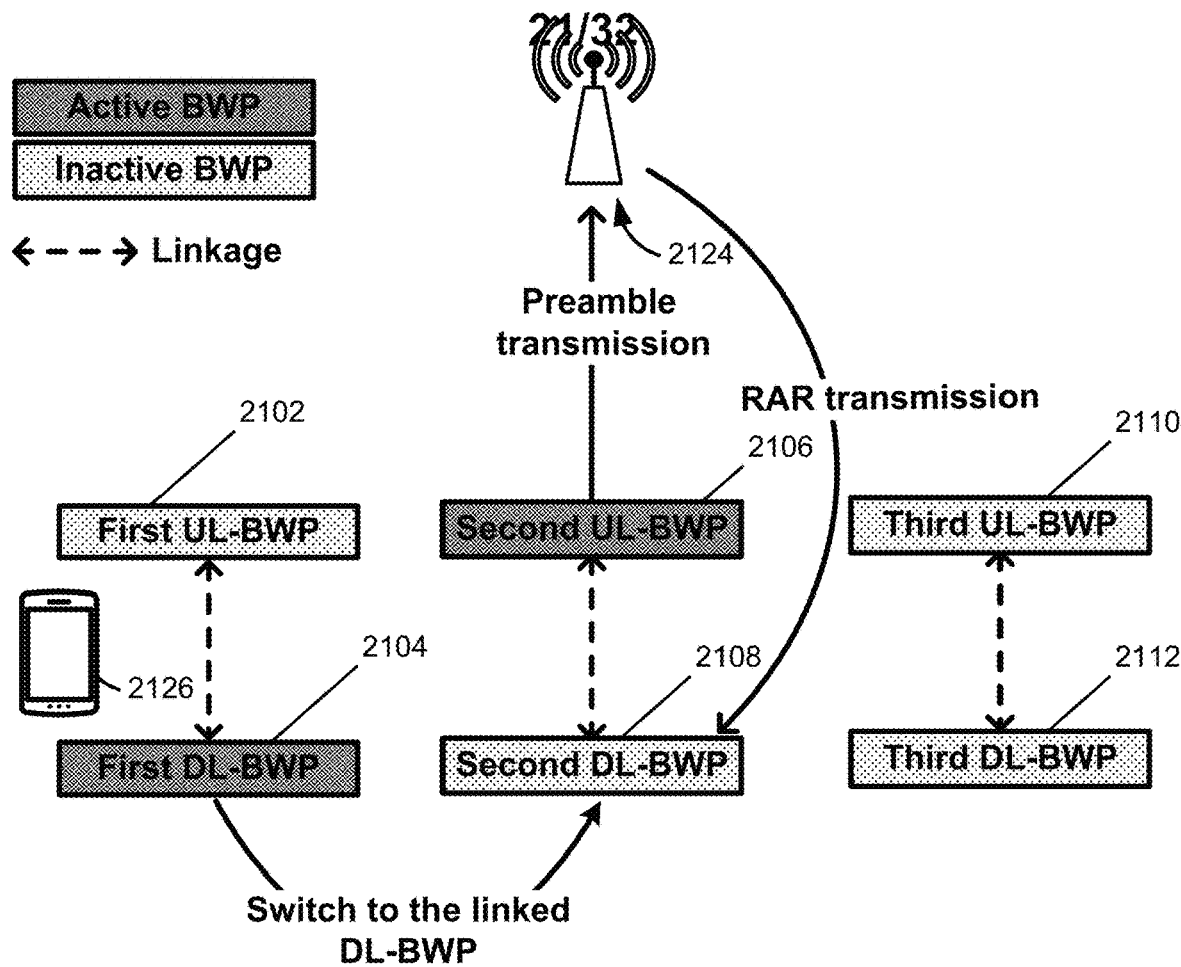
FIG. 21A and FIG. 21B show an example of a system for a random access procedure using BWP switching.
Figure 21B:
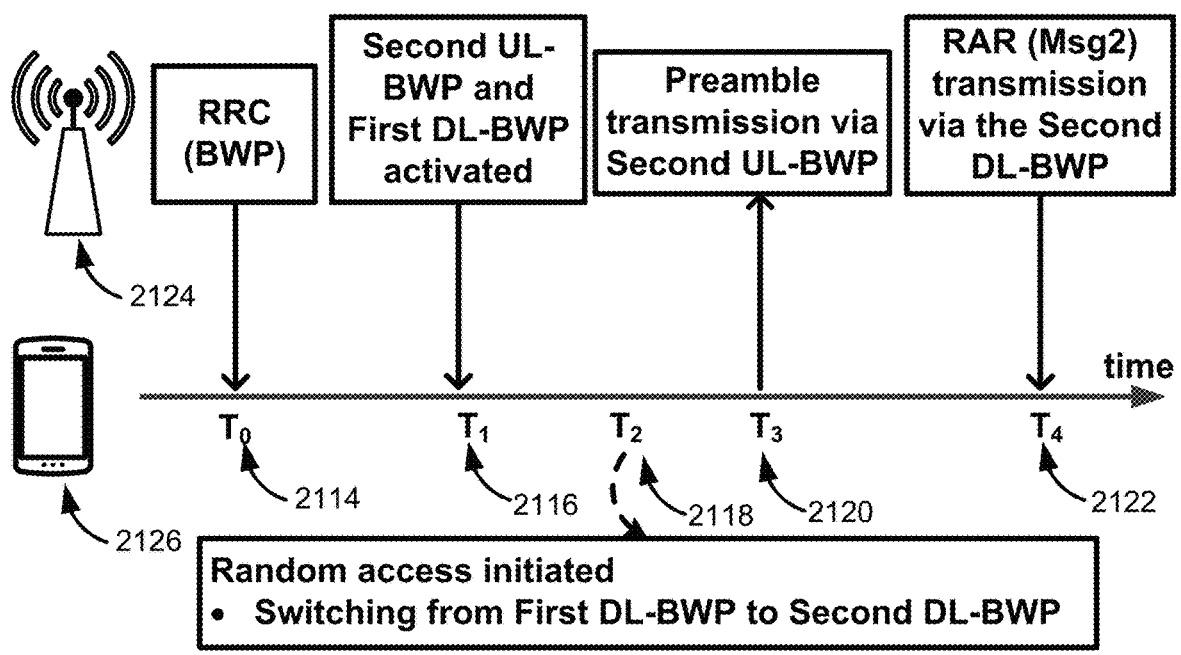

FIG. 21A and FIG. 21B show examples of a system for random access procedure with BWP switching. The wireless device 2126 may switch to a downlink BWP based on a linkage between the downlink BWP and an active uplink BWP, for example, based on starting a random access procedure. The wireless device 2126 and the base station 2124 may be configured to use a first uplink BWP 2102, a second uplink BWP 2106, a third uplink BWP 2110, a first downlink BWP 2104, a second downlink BWP 2108, and/or a third downlink BWP 2112. The wireless device 2126 may receive an RRC message from the base station 2114, for example, at time $T_0$ (2114), configuring the BWPs. The base station 2124 may cause the first downlink BWP 2104 and the second uplink BWP 2106 to become active between the base station 2124 and the wireless device 2126, for example, at time $T_1$ (2116). The wireless device 2126 may initiate a random access procedure, for example, at time $T_2$ (2118), and begin switching from the first downlink BWP 2104 to the second downlink BWP 2108, for example, based on a linkage between the second uplink BWP 2106 and the second downlink BWP 2108 (e.g., numerology, shared control channel, etc.). The wireless device 2126 may send a preamble transmission to the base station 2124 via the second uplink BWP 2106, for example, at time $T_3$ (2120). The base station 2124 may send a random access response (RAR) via the second downlink BWP 2108, for example, at time $T_4$.

A wireless device may operate (e.g., communicate, transmit and/or receive, send messages, etc.) via a first uplink BWP of a cell and a first downlink BWP of the cell. The wireless device may initiate and/or perform a random access procedure (e.g., contention based, contention-free, etc.) via the first uplink BWP. The wireless device may switch from the first downlink BWP to an initial downlink BWP and/or switch from the first uplink BWP to an initial uplink BWP, for example, based on one or more PRACH occasions not being configured, by a base station, for the first uplink BWP. The wireless device may perform the random access procedure via the initial uplink BWP and the initial downlink BWP.

A wireless device may operate via a first uplink BWP of a cell and a first downlink BWP of the cell. The first uplink BWP may be indicated (e.g., identified) by a first uplink BWP-specific index. The first downlink BWP may be indicated (e.g., identified) by a first downlink BWP-specific index. The wireless device may initiate a random access procedure (e.g., contention based, contention-free, etc.) via the first uplink BWP. The wireless device may perform the random access procedure via the first uplink BWP and the first downlink BWP, for example, based on one or more PRACH occasions being configured, by a base station, for the first uplink BWP, and/or based on the first uplink BWP-specific index being the same as the first downlink BWP-specific index.

A wireless device may operate via a first uplink BWP of a cell and a first downlink BWP of the cell. The first uplink BWP may be indicated (e.g., identified) by a first uplink BWP-specific index. The first downlink BWP may be indicated (e.g., identified) by a first downlink BWP-specific index. The wireless device may initiate a random access procedure (e.g., contention based, contention-free, etc.) via the first uplink BWP. The wireless device may switch from the first downlink BWP to a third downlink BWP of the cell associated with a third downlink BWP-specific index, for example, based on one or more PRACH occasions being configured, by a base station, for the first uplink BWP, and/or based on the first downlink BWP-specific index being different from the first uplink BWP-specific index. The third downlink BWP-specific index may be same as or different from the first uplink BWP-specific index. The wireless device may perform the random access procedure via the first uplink BWP and the third downlink BWP, for example, based on the switching. The random access procedure may be a contention-based random access procedure. The base station and the wireless device may operate in a paired spectrum (e.g., frequency division duplex (FDD)).

Figure 22:
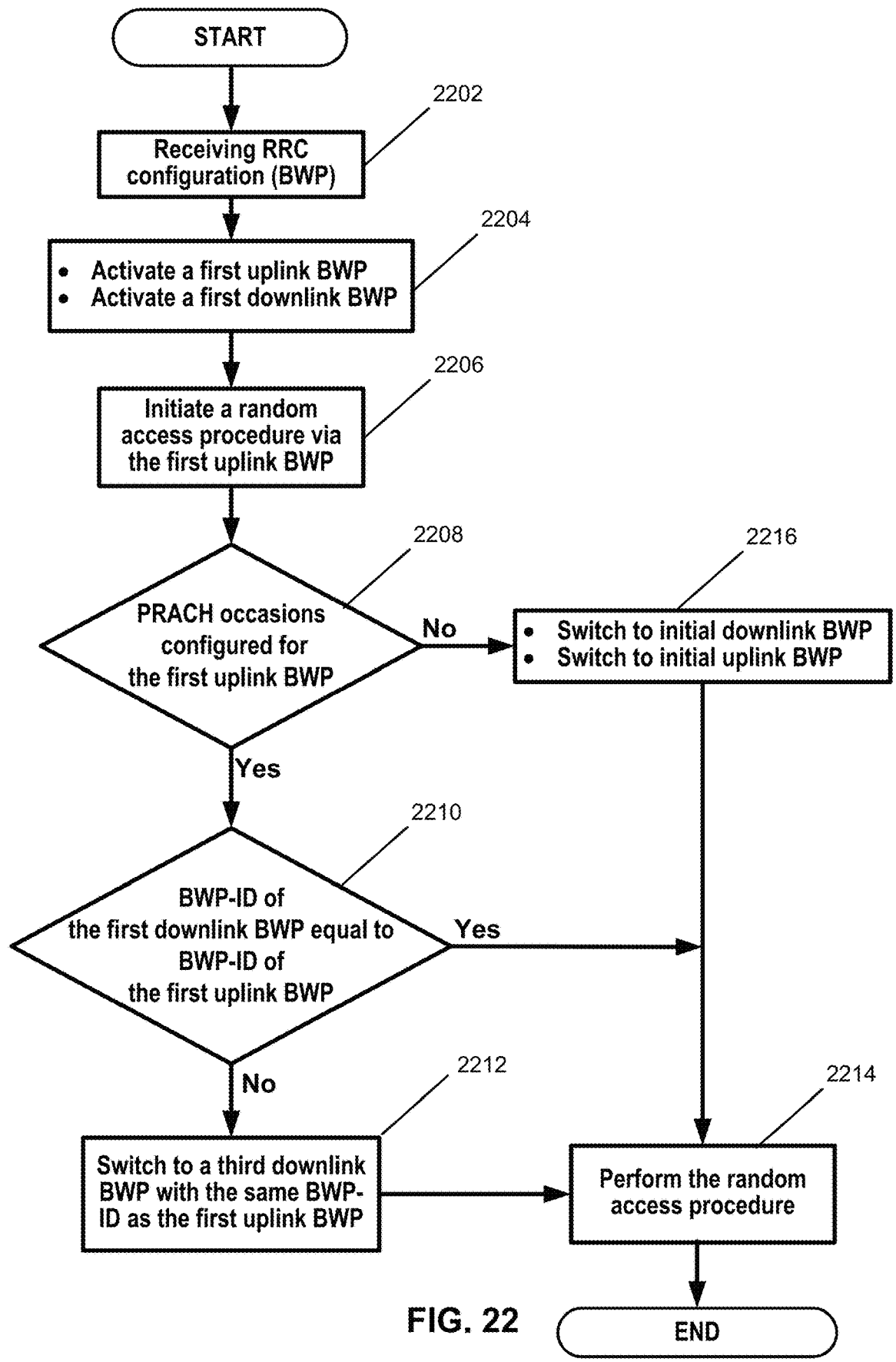
FIG. 22 shows an example method for BWP switching for a random access procedure.

FIG. 22 shows an example method for BWP switching for a random access procedure. A wireless device may determine to switch or to refrain from switching to a downlink BWP, based starting a random access procedure and based on a BWP-ID match between an active downlink BWP and an active uplink BWP. The method may be accomplished by systems and apparatuses described herein, for example, the base station 2124 and wireless device 2126 of FIGS. 21A and/or FIG. 21B. At step 2202, the wireless device may receive an RRC configuration regarding the BWPs. At step 2204, the wireless device may activate a first uplink BWP and a first downlink BWP. At step 2206, the wireless device may initiate a random access procedure via the first uplink BWP. At step 2208, the wireless device may determine that the PRACH occasions are configured for the first uplink BWP. At step 2210, the wireless device may determine that the BWP-ID of the first downlink BWP is not equal to the BWP-ID of the first uplink BWP. At step 2212, the wireless device may switch to a third downlink BWP with a same BWP-ID as the first uplink BWP. At step 2214, the wireless device may perform the random access procedure.

Alternate processes may also be possible using the method. At step 2210, the wireless device may determine that the BWP-ID of the first downlink BWP is equal to the BWP-ID of the first uplink BWP. At step 2214, the wireless device may perform the random access procedure. At step 2208, the wireless device may determine that the PRACH occasions are not configured for the first uplink BWP. At step 2216, the wireless device may switch to an initial downlink BWP and/or switch to an initial uplink BWP. At step 2214, the wireless device may perform the random access procedure.

A problem may arise in existing systems, for example, if an uplink BWP index (ID) and a downlink BWP ID do not match during beam failure recovery (BFR) or random access procedures (e.g., as part of cell addition, handover, reconfigured with sync, etc.). The wireless device may trigger a downlink BWP switching to a linked downlink BWP with the BWP ID that is the same as a first active uplink BWP index (e.g., firstActiveUplinkBWP-ID), for example, based on a first active downlink BWP index (e.g., firstActiveDownlink BWP-ID) and the first active uplink BWP index (e.g., firstActiveUplink BWP-ID) being different if (e.g., at a time that) the wireless device initiates a random access procedure for a BFR of the downlink BWP. The downlink BWP switching may delay the random access procedure.

As described herein, a base station may send (e.g., transmit) a reconfiguration message (e.g., RRC reconfiguration message) to a wireless device. The base station may send the reconfiguration message, for example, before the BFR procedure and/or before the random access procedure. The base station may set an active uplink BWP index (e.g., firstActiveUplinkBWP-ID) and an active downlink BWP index (e.g., firstActiveDownlink BWP-ID) to the same value. The base station may send the reconfiguration message, for example, based on a determination that the wireless device may perform the BFR procedure and/or the random access procedure (e.g., within a determined amount of time). The base station may send the reconfiguration message, for example, based on a threshold value comparison with an attribute of the wireless device or base station, a measurement of signal at the wireless device (e.g., error rate, signal strength, etc.), and/or a measurement of signal (e.g., error rate, signal strength, etc.) at the base station. For example, a millimeter base station may have a small radius of coverage. The base station may send a reconfiguration message to a wireless device that sets an active uplink BWP index (e.g., firstActiveUplinkBWP-ID) and an active downlink BWP index (e.g., firstActiveDownlink BWP-ID) to the same value, for example, based on a detected mobility of the wireless device (e.g., a threshold comparison with a signal strength, signal quality, change in position). This setting of the active uplink BWP index (e.g., firstActiveUplinkBWP-ID) and the active downlink BWP index (e.g., firstActiveDownlink BWP-ID) to the same value may reduce delay caused by BWP switching before a random access procedure.

Figure 23:
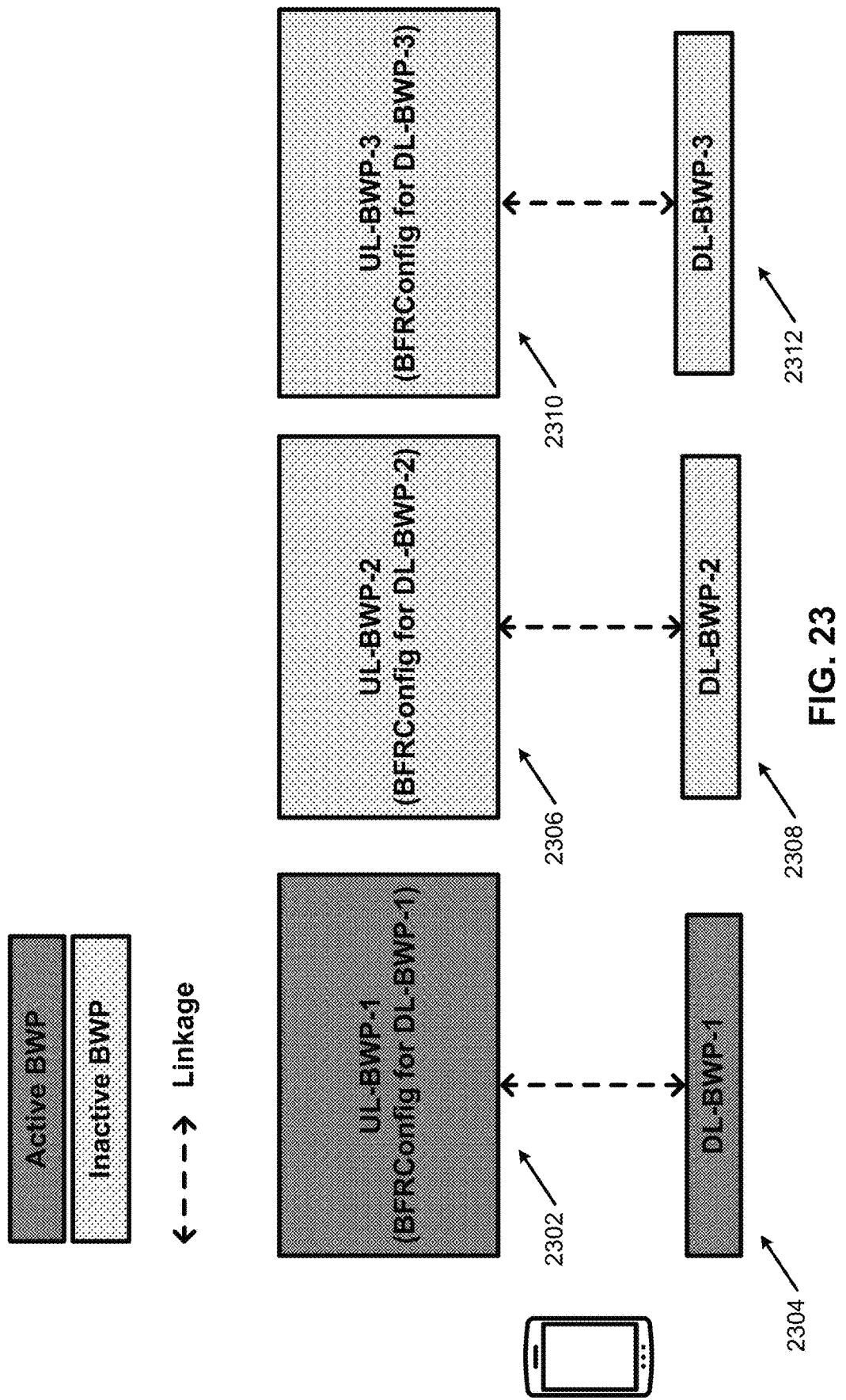
FIG. 23 shows an example of a BWP linkage in beam failure recovery procedure.

FIG. 23 shows an example of a BWP linkage in a paired spectrum (e.g., FDD) for a beam failure recovery (BFR) procedure. The base station may configure the wireless device to use or make active an UL BWP (e.g., UL-BWP-1 2302) linked with a DL BWP (e.g., DL-BWP-1 2304). The wireless device may avoid a delay from BWP switching, for example, if the wireless device determines to perform a BFR procedure and/or a random access procedure.

A wireless device may receive one or more messages comprising configuration parameters of a cell from a base station. The configuration parameters may comprise BWP configuration parameters for a plurality of DL BWPs, for example, comprising DL-BWP-1 2304, DL-BWP-2 2308 and DL-BWP-3 2312 and for a plurality of UL BWPs comprising UL-BWP-1 2302, UL-BWP-2 2306 and UL-BWP-3 2310. UL-BWP-1 2302 and DL-BWP-1 2304 may be linked. UL-BWP-2 2306 and DL-BWP-2 2308 may be linked. UL-BWP-3 2310 and DL-BWP-3 2312 may be linked. The BWP configuration parameters may include an index of an uplink BWP and an index of a downlink BWP, which may or may not be linked and may or may not have different indexes.

The DL-BWP-1 2304, the DL-BWP-2 2308, and the DL-BWP-3 23012 may be indicated by a DL-BWP-1 index, DL-BWP-2 index, and DL-BWP-3 index (e.g., provided by a higher layer parameter BWP-ID), respectively. The UL-BWP-1 2302, the UL-BWP-2 2308, and the UL-BWP-3 2312 may be indicated by a UL-BWP-1 index, UL-BWP-2 index, and UL-BWP-3 index (e.g., provided by a higher layer parameter BWP-ID), respectively. The DL-BWP-1 index and the UL-BWP-1 index may be the same. The DL-BWP-2 index and the UL-BWP-2 index may be the same. The DL-BWP-3 index and the UL-BWP-3 index may be the same. The DL-BWP-1 index and the UL-BWP-1 index being the same may be an indicator of linked uplink and downlink BWPs.

The configuration parameters may comprise DL-BWP-specific BFR configuration parameters (e.g., RadioLinkMonitoringConfig) for at least one of the plurality of DL BWPs (e.g., DL-BWP-1 2304, DL-BWP-2 2308, DL-BWP-3 2312). The DL-BWP-specific BFR configuration parameters may be BWP specific. The DL-BWP-specific BFR configuration parameters may be BWP dedicated.

First DL-BWP-specific BFR configuration parameters for the DL-BWP-1 2304 may comprise one or more first RSs (e.g., RadioLinkMonitoringRS) of the DL-BWP-1 2304 and a first beam failure instance (BFI) counter (e.g., beamFailureInstanceMaxCount). The wireless device may assess the one or more first RSs (e.g., SSBs, CSI-RSs) to detect a beam failure of the DL-BWP-1 2304.

Second DL-BWP-specific BFR configuration parameters for the DL-BWP-2 2308 may comprise one or more second RSs (e.g., RadioLinkMonitoringRS) of the DL-BWP-2 2308 and a second BFI counter (e.g., beamFailureInstanceMaxCount). The wireless device may assess the one or more second RSs (e.g., SSBs, CSI-RSs) to detect a beam failure of the DL-BWP-2 2308.

Third DL-BWP-specific BFR configuration parameters for the DL-BWP-3 2312 may comprise one or more third RSs (e.g., RadioLinkMonitoringRS) of the DL-BWP-3 2312 and a second BFI counter (e.g., beamFailureInstanceMaxCount). The wireless device may assess the one or more third RSs (e.g., SSBs, CSI-RSs) to detect a beam failure of the DL-BWP-3 2312.

The configuration parameters may comprise UL-BWP-specific BFR configuration parameters (e.g., BeamFailureRecoveryConfig) for at least one of the plurality of UL BWPs (e.g., UL-BWP-1 2302, UL-BWP-2 2306, UL-BWP-3 2310). The UL-BWP-specific BFR configuration parameters may be BWP specific. The UL-BWP-specific BFR configuration parameters may be BWP dedicated.

First UL-BWP-specific BFR configuration parameters for the UL-BWP-1 2302 may comprise one or more first candidate RSs (e.g., candidateBeamRSList) of the DL-BWP-1 2302 and a first search space set (e.g., recoverySearchSpaceID) on the DL-BWP-1 2302 in response to the DL-BWP-1 index and the UL-BWP-1 index being the same. A second UL-BWP-specific BFR configuration parameters for the UL-BWP-2 2306 may comprise one or more second candidate RSs (e.g., candidateBeamRSList) of the DL-BWP-2 2306 and a second search space set on the DL-BWP-2 2306 in response to the DL-BWP-2 index and the UL-BWP-2 index being the same. A third UL-BWP-specific BFR configuration parameters for the UL-BWP-3 2310 may comprise one or more third candidate RSs (e.g., candidateBeamRSList) of the DL-BWP-3 2310 and a second search space set on the DL-BWP-3 2310 in response to the DL-BWP-3 index and the UL-BWP-3 index being the same.

The UL-BWP-1 2302 and the DL-BWP-1 2304 may be linked/paired, for example, in a paired spectrum (e.g., FDD) and in response to the UL-BWP-1 2302 being configured with BFR parameters (e.g., the one or more first candidate RSs, the first search space set) of the DL-BWP-1 2304. The DL-BWP-1 index and the UL-BWP-1 index may be the same, for example, based on the DL-BWP-1 2304 and the UL-BWP-1 2302 being linked.

BWP switching may be common for the DL-BWP-1 and the UL-BWP-1, for example, based on the DL-BWP-1 and the UL-BWP-1 being linked. The wireless device may switch the DL-BWP-1 and the UL-BWP-1 simultaneously, in succession, in response to or based on the DL-BWP-1 2304 being linked/paired with the UL-BWP-1 2302. In FIG. 23, the DL-BWP-2 2308 and the UL-BWP-2 2306 may be linked/paired and the DL-BWP-3 2312 and the UL-BWP-3 2310 may be linked/paired.

One or more linked BWPs may comprise a first pair of the DL-BWP-1 2304 and the UL-BWP-1 2302; a second pair of the DL-BWP-2 2308 and the UL-BWP-2 2306; and a third pair of the DL-BWP-3 2312 and the UL-BWP-3 2310. The wireless device may operate on at least one of the one or more linked BWPs (e.g., DL-BWP-1 2304 and UL-BWP-1 2302, DL-BWP-2 2308 and UL-BWP-2 2306, or DL-BWP-3 2312 and UL-BWP-3 2310 in FIG. 23) simultaneously. The DL-BWP-1 2304 and the UL-BWP-1 2302 may be active, for example, at a first time (e.g., slot, subframe, frame) based on the DL-BWP-1 2304 being linked/paired with the UL-BWP-1 2302. The DL-BWP-2 2308 and the UL-BWP-2 2306 may be active, for example, at a second time based on the DL-BWP-2 2308 being linked/paired with the UL-BWP-2 2306. The DL-BWP-3 2312 and the UL-BWP-3 2310 may be active, for example, at a third time based on the DL-BWP-3 2312 being linked/paired with the UL-BWP-3 2310.

The DL-BWP-1 2304 and the UL-BWP-2 2306 may not be active, for example, at a first time (e.g., slot) based on the DL-BWP-1 2304 not being linked/paired with the UL-BWP-2 2306. The DL-BWP-2 2308 and the UL-BWP-1 2302 may not be active, for example, at a first time (e.g., slot) based on the DL-BWP-2 2308 not being linked/paired with the UL-BWP-1 2302.

The wireless device may operate on the DL-BWP-1 2304 and the UL-BWP-1 2302 simultaneously. The DL-BWP-1 2304 and the UL-BWP-1 2302 may be an active DL BWP and an active UL BWP, respectively, in response to the operating. The wireless device may switch the active UL BWP from the UL-BWP-1 2302 to the UL-BWP-2 2306, for example, in response to the DL-BWP-2 2308 being linked to the UL-BWP-2 2306 (e.g., based on the wireless device switching the active DL BWP from the DL-BWP-1 2304 to the DL-BWP-2 2308). The switching may be triggered, for example, in response to receiving a DCI indicating an index for the DL-BWP-2 2308, an expiry of BWP inactivity timer associated with the DL-BWP-1 2304, or receiving an RRC message indicating the index for DL-BWP-2 2308.

The wireless device may operate on the DL-BWP-1 2304 and the UL-BWP-1 2302 simultaneously. The DL-BWP-1 2304 and the UL-BWP-1 2302 may be an active DL BWP and an active UL BWP, respectively, in response to the operating. The wireless device may switch the active DL BWP from the DL-BWP-1 2304 to the DL-BWP-2 2308, for example, in response to the DL-BWP-2 2308 being linked to the UL-BWP-2 2306 (e.g., based on the wireless device switching the active UL BWP from the UL-BWP-1 2302 to the UL-BWP-2 2306). The switching may be triggered, for example, in response to receiving a DCI indicating an index for UL-BWP-2 2306 or receiving an RRC message indicating the index for UL-BWP-2 2306.

A wireless device may receive, from a base station, one or more messages comprising configuration parameters for a plurality of cells. Each cell in the plurality of cells may be a secondary cell. The plurality of cells may comprise a cell group. The plurality of cells may support multiple beam (e.g., multi-beam) operation. The plurality of cells may share serving beams. The plurality of cells of the cell group may share serving beams, for example, at high frequencies. The wireless device may use a first serving beam for reception via a downlink control channel (e.g., a PDCCH) in each cell of the plurality of cells, for example, based on the one or more configuration parameters received from the base station. The wireless device may use a first serving beam for reception via a downlink shared channel (e.g., a PDSCH) in each cell of the plurality of cells, for example, based on the one or more configuration parameters received from the base station. The base station may serve a first cell and a second cell of the cell group, for example, with the first serving beam for PDCCH and/or PDSCH channels. The wireless device may use the first serving beam for sending (e.g., transmitting) via an uplink control channel (e.g., a PUCCH) in each cell of the plurality of cells, for example, based on the one or more configuration parameters received from the base station. The wireless device may use the first serving beam for sending (e.g., transmitting) via an uplink shared channel (e.g., a PUSCH) in each cell of the plurality of cells, for example, based on the one or more configuration parameters received from the base station. The base station may send (e.g., transmit) a separate reconfiguration message (e.g., RRC, MAC CE, DCI, etc.) for each cell in the group of secondary cells to change the first serving beam to a second serving beam (e.g., after a beam failure recovery procedure is completed). The wireless device may receive a reconfiguration message for each cell in the plurality of cells to change from the first serving beam to a second serving beam, for example, if the first serving beam fails. Receiving a reconfiguration message for each cell in the plurality of cells may increase a signaling overhead related to switching from the first serving beam to the second serving beam for each cell in the plurality of cells (e.g., increased configuration message transmission). Receiving a reconfiguration message for each cell in the plurality of cells may increase a delay in establishing operation for each cell of the plurality of cells. Receiving a reconfiguration message for each cell in the plurality of cells may increase a consumption of a power source (e.g., a battery) of the wireless device.

A PDCCH reconfiguration (e.g., the same PDCCH reconfiguration) may be applied to all cells in the cell group, for example, based on a PDCCH of a cell in the cell group being reconfigured (e.g., via RRC, MAC, and/or DCI) with the PDCCH reconfiguration. A PDSCH reconfiguration (e.g., the same PDSCH reconfiguration) may be applied to all cells in the cell group, for example, based on a PDSCH of a cell in the cell group being reconfigured (e.g., via RRC, MAC, and/or DCI) with the PDSCH reconfiguration. A uplink channel (e.g., PUCCH and/or PUSCH) reconfiguration may be applied to all cells in the cell group, for example, based on an uplink channel (e.g., PUCCH and/or PUSCH) in the cell group being reconfigured (e.g., via RRC, MAC, and/or DCI) with the reconfiguration. A wireless device may receive, from the base station, a first reconfiguration message for a first cell in the plurality of cells to change from the first serving beam to the second serving beam, for example, if the first serving beam fails. The wireless device may use (e.g., apply) the first reconfiguration message to reconfigure each cell in the plurality of cells (e.g., to reconfigure all cells in a cell group). The wireless device may use (e.g., apply) the first reconfiguration message to change from the first serving beam to the second serving beam in each cell in the plurality of cells. The first reconfiguration message may comprise one or more of: a MAC CE activation command, an RRC message, and/or DCI. The first reconfiguration message may indicate a TCI state for the first cell. The wireless device may use the TCI state for each cell in the plurality of cells. The TCI state may comprise a cell group parameter. The cell group parameter may comprise a cell-specific index for each cell in the plurality of cells. The wireless device may change from the first serving beam to the second serving beam, for example, based on the TCI state including the cell group parameter comprising the cell-specific index for each cell in the plurality of cells.

The wireless device may receive, from the base station, one or more BFR configuration parameters for the first cell in the plurality of cells. The one or more BFR configuration parameters may comprise the cell group parameter comprising the cell-specific index for each cell in the plurality of cells. The wireless device may change from the first serving beam to the second serving beam based on a reconfiguration message for the first cell if the one or more BFR configuration parameters include the cell group parameter comprising the cell-specific index for each cell in the plurality of cells. The reconfiguration message may comprise one or more of: a MAC CE activation command, an RRC message, and/or DCI. The reconfiguration message may indicate a TCI state for the first cell. The wireless device may use the TCI state for each cell in the plurality of cells. The wireless device may use the TCI state to change from the first serving beam to the second serving beam for each cell in the plurality of cells.

Based on the wireless device using the TCI state for a first cell to reconfigure operation related to each cell in the plurality of cells (e.g., a cell group comprising the first cell), various advantages may be achieved, including, for example, reduced latency, reduced power consumption, and reduced signaling overhead. Signaling overhead related to switching from the first serving beam to the second serving beam for each cell in the plurality of cells may be reduced, for example, based on the wireless device using the TCI state for the first cell to reconfigure operation related to each cell in the plurality of cells. Signaling overhead may be reduced by using one reconfiguration message (e.g., a MAC CE activation command, an RRC message, and/or DCI) to reconfigure operation related to each cell in the plurality of cells in comparison to using a separate reconfiguration message (e.g., separate MAC CE activation command(s) and/or two or more MAC CE activation commands, RRC, and/or DCI) for each cell in the plurality of cells. Interference (e.g., to and/or experienced by one or more wireless devices) may be reduced by reducing signaling overhead. Communication between the wireless device and each cell of the plurality of cells may resume more expeditiously based on the wireless device using the TCI state for the first cell to reconfigure operation of each cell in the plurality of cells. Latency related to beam management for each cell in the plurality of cells may be reduced by using one reconfiguration message (e.g., an MAC CE activation command, RRC message, and/or DCI) to reconfigure operation related to each cell in the plurality of cells in comparison to using a separate reconfiguration message (e.g., separate MAC CE activation command(s) and/or two or more MAC CE activation commands, RRC message, and/or DCI) for each cell in the plurality of cells. Consumption of the power source (e.g., the battery) of the wireless device may be reduced based on the wireless device using the TCI state for the first cell to reconfigure operation of each cell in the plurality of cells. Consumption of the power source may be reduced by obviating power consumption related to receiving, processing, and/or decoding any reconfiguration message other than the one reconfiguration message used to reconfigure operation related to each cell in the plurality of cells.

A wireless device may perform a BFR procedure on an SpCell (e.g., PCell or PSCell). A base station may send (e.g., transmit), to a wireless device, one or more messages comprising configuration parameters of one or more cells. The one or more cells may comprise at least one PCell/PSCell and/or one or more SCells. An SpCell (e.g., PCell or PSCell) and one or more SCells may operate on different frequencies and/or different bands.

An SCell of the one or more SCells may support a multi-beam operation. A wireless device may perform one or more beam management procedures (e.g., a BFR procedure) on or for the SCell, for example, based on the SCell supporting multi-beam operation. The wireless device may perform a BFR procedure for the SCell, for example, if at least one of one or more beam pair links between the SCell and the wireless device fails. Certain BFR procedures may result in inefficiencies based on a beam failure for the SCell. Certain BFR procedures may be inefficient, take a long time, and/or increase battery power consumption.

Downlink radio efficiency may be improved and/or uplink signaling overhead may be reduced, for example, if a beam failure occurs for one or more SCells based on one or more BFR procedures described herein. Random access resources of a first cell may be used, for example, if a beam failure occurs for an SCell of one or more SCells. Downlink signaling processes may be enhanced for recovery of a beam failure for an SCell. Uplink signaling may be enhanced for a BFR procedure of the SCell.

A BFR procedure for an SCell may be provided based on the one or more BFR procedures described herein. A duration of the BFR procedure may be reduced and/or battery power consumption may be reduced based on the one or more BFR procedures described herein.

A wireless device may be configured, by a base station, with an SCell. The SCell may not have uplink resources. The SCell may comprise downlink resources. The wireless device may not transmit an uplink signal (e.g., preamble) for a BFR procedure of the SCell on the SCell, for example, based on not having uplink resources and/or if the wireless device detects a beam failure on the SCell. The wireless device may not perform a BFR procedure on the SCell. The base station may not be aware of the beam failure on the SCell based on the wireless device not performing the BFR procedure. A BFR procedure may be provided, for example, if an SCell comprises downlink-only resources based on the one or more BFR procedures described herein.

An SCell may operate in a high frequency (e.g., 23 GHz, 60 GHz, 70 GHz, or any other frequency such as a frequency greater than a low frequency). An SpCell may operate in a low frequency (e.g., 2.4 GHz, 5 GHz, or any other frequency such as a frequency less than a high frequency). A channel condition of the SCell may be different from a channel condition of the SpCell. The wireless device may use uplink resources of the SpCell to send (e.g., transmit) a preamble for a BFR request for the SCell, for example, to improve robustness of transmission of the preamble. A BFR procedure may be provided, for example, if an SCell operates in a different frequency than a PCell. A BFR procedure may be provided, for example, if an SCell used uplink resources (e.g., random access resources, uplink BWPs of the PCell) of the PCell for a BFR procedure of the SCell.

Figure 24:
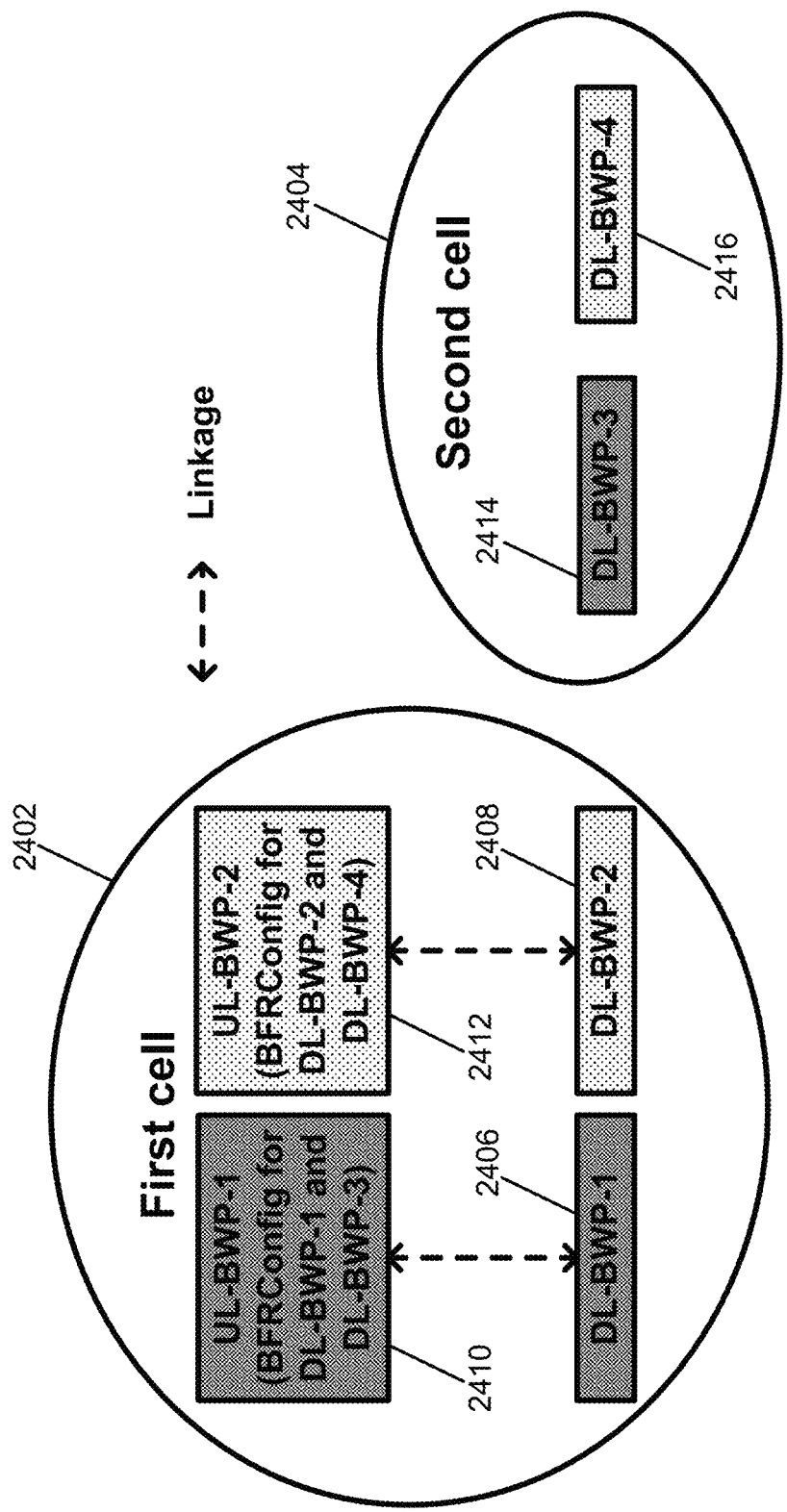
FIG. 24 shows an example of a BWP linkage in a BFR procedure.

FIG. 24 shows an example of a downlink beam failure recovery configuration of a secondary cell. A wireless device may receive, from a base station, one or more messages comprising configuration parameters for a first cell 2402 (e.g., PCell, SCell) and/or one or more secondary cells. The one or more secondary cells may comprise a second cell 2404 (e.g., SCell). The one or more messages may comprise one or more RRC messages (e.g., RRC connection reconfiguration message, RRC connection reestablishment message, and/or RRC connection setup message).

The configuration parameters may comprise cell-specific indexes for the first cell 2402 and/or the one or more secondary cells (e.g., the second cell 2404). The first cell 2402 may be indicated (e.g., identified) by a first cell index (e.g., provided by a higher layer parameter servCellIndex in the configuration parameters). The second cell 2404 may be indicated (e.g., identified) by a second cell index (e.g., provided by the higher layer parameter servCellIndex).

The configuration parameters may comprise BWP configuration parameters for a plurality of BWPs. The plurality of BWPs may comprise a first plurality of DL BWPs of the first cell 2402 and/or a first plurality of UL BWPs of the first cell 2402. The first plurality of DL BWPs may comprise DL-BWP-1 2406 and/or DL-BWP-2 2408. The first plurality of UL BWPs may comprise UL-BWP-1 2410 and/or UL-BWP-2 2412. The plurality of BWPs may comprise a second plurality of DL BWPs of the second cell 2404. The second plurality of DL BWPs may comprise DL-BWP-3 2414 and/or DL-BWP-4 2416.

The configuration parameters may comprise BWP specific indexes for the plurality of BWPs. The DL-BWP-1 2406, the DL-BWP-2 2408, the DL-BWP-3 2414, and/or the DL-BWP-4 2416 may be indicated (e.g., identified), for example, with a DL-BWP-1 index, a DL-BWP-2 index, a DL-BWP-3 index, and/or a DL-BWP-4 index (e.g., provided by a higher layer parameter bwp-ID in the configuration parameters), respectively. The UL-BWP-1 2410 and/or the UL-BWP-2 2412 may be indicated (e.g., identified), for example, with an UL-BWP-1 index and/or an UL-BWP-2 index (e.g., provided by the higher layer parameter bwp-ID), respectively.

The configuration parameters may comprise DL-BWP-specific BFR configuration parameters (e.g., RadioLinkMonitoringConfig) for at least one DL BWP of the second plurality of DL BWPs of the second cell 2404 (e.g., for the DL-BWP-3 2414 and/or the DL-BWP-4 2416). Third DL-BWP-specific BFR configuration parameters for the DL-BWP-3 2414 of the second cell 2404 may comprise, for example, one or more third RSs (e.g., RadioLinkMonitoringRS) of the DL-BWP-3 2414 and/or a third BFI counter (e.g., beamFailureInstanceMaxCount). The wireless device may assess the one or more third RSs (e.g., SSBs, CSI-RSs), for example, to detect a beam failure of the DL-BWP-3 2414. The wireless device may assess the one or more third RSs, for example, by determining a BLER of each of the one or more RSs and comparing the determined BLERs against a threshold. The wireless device may determine, for example, a first BLER of a first RS of a cell and a second BLER of a second RS of the cell. The wireless device may compare the determined first BLER and the determined second BLER against a threshold. The wireless device may increment a BFI counter (e.g., by one or any other value), for example, if the determined first BLER and/or the determined second BLER are greater than the threshold. The wireless device may determine (e.g., detect) a beam failure for the cell, for example, if the BFI counter reaches a threshold (e.g., a maximum value).

Fourth DL-BWP-specific BFR configuration parameters for the DL-BWP-4 2416 of the second cell 2404 may comprise, for example, one or more fourth RSs (e.g., RadioLinkMonitoringRS) of the DL-BWP-4 2416 and/or a fourth BFI counter (e.g., beamFailureInstanceMaxCount). The wireless device may assess the one or more fourth RSs (e.g., SSBs, CSI-RSs), for example, to detect a beam failure of the DL-BWP-4 2416. The wireless device may assess the one or more fourth RSs, for example, by determining a BLER of each of the one or more RSs and comparing the determined BLERs against a threshold.

The configuration parameters may comprise UL-BWP-specific BFR configuration parameters (e.g., BeamFailureRecoveryConfig) for at least one UL BWP of the first plurality of UL BWPs of the first cell 2402 (e.g., the UL-BWP-1 2410 and/or the UL-BWP-2 2412). First UL-BWP-specific BFR configuration parameters for the UL-BWP-1 2410 may comprise, for example, one or more first candidate RSs (e.g., candidateBeamRSList) of the DL-BWP-1 2406 of the first cell 2402 and/or a first search space set (e.g., recoverySearchSpaceID) on the DL-BWP-1 2406. Second UL-BWP-specific BFR configuration parameters for the UL-BWP-2 2412 may comprise, for example, one or more second candidate RSs (e.g., candidateBeamRSList) of the DL-BWP-2 2408 of the first cell 2402 and/or a second search space set (e.g., recoverySearchSpaceID) on the DL-BWP-2 2408.

The first UL-BWP-specific BFR configuration parameters for the UL-BWP-1 2410 may comprise, for example, one or more third candidate RSs (e.g., candidateBeamRSList) of the DL-BWP-3 2414 of the second cell 2404 and/or a third search space set on the DL-BWP-3 2414. The second UL-BWP-specific BFR configuration parameters for the UL-BWP-2 2412 may comprise, for example, one or more fourth candidate RSs (e.g., candidateBeamRSList) of the DL-BWP-4 2416 of the second cell 2404 and/or a fourth search space set (e.g., recoverySearchSpaceID) on the DL-BWP-4 2416.

The first UL-BWP-specific BFR configuration parameters for the UL-BWP-1 2410 may comprise, for example, one or more first BFR configuration parameters for the DL-BWP-1 2406 of the first cell 2402 and/or one or more third BFR configuration parameters for the DL-BWP-3 2414 of the second cell 2404. The one or more first BFR configuration parameters may comprise, for example, the one or more first candidate RSs (e.g., candidateBeamRSList) of the DL-BWP-1 2406 and/or the first search space on the DL-BWP-1 2406. The one or more third BFR configuration parameters may comprise, for example, the one or more third candidate RSs (e.g., candidateBeamRSList) of the DL-BWP-3 2414 and/or the third search space set on the DL-BWP-3 2414.

The wireless device may receive, from the base station, one or more second messages. The one or more second messages may comprise at least one of the first UL-BWP-specific BFR configuration parameters (e.g., recoverySearchSpaceID, candidateBeamRSList) for the UL-BWP-1 2410. The wireless may not determine whether the at least one of the first UL-BWP-specific BFR configuration parameters indicates the DL-BWP-1 2406 of the first cell 2402 or the DL-BWP-3 2414 of the second cell 2404, for example, if the first UL-BWP-specific BFR configuration parameters comprise the one or more first BFR configuration parameters for the DL-BWP-1 2406 of the first cell 2402 and/or the one or more third BFR configuration parameters for the DL-BWP-3 2414 of the second cell 2404. The wireless may not determine, for example, whether the at least one of the first UL-BWP-specific BFR configuration parameters reconfigure at least one of the one or more first BFR configuration parameters of the DL-BWP-1 2406 or at least one of the one or more third BFR configuration parameters of the DL-BWP-3 2414. The one or more first BFR configuration parameters may comprise the first cell index of the first cell 2402 and/or the one or more third BFR configuration parameters may comprise the second cell index of the second cell 2404, for example, if the first UL-BWP-specific BFR configuration parameters comprise the one or more first BFR configuration parameters for the DL-BWP-1 2406 of the first cell 2402 and/or the one or more third BFR configuration parameters for the DL-BWP-3 2414 of the second cell 2404.

A base station may configure at least one UL BWP of the first plurality of UL BWPs of the first cell 2402 with UL-BWP-specific BFR configuration parameters (e.g., BeamFailureRecoveryConfig). The UL-BWP-specific BFR configuration parameters may be associated with at least one DL BWP of the first plurality of DL BWPs of the first cell 2402 and/or at least one DL BWP of the second plurality of DL BWPs of the second cell 2404.

The UL-BWP-specific BFR configuration parameters may comprise one or more second BFR parameters. The one or more second BFR parameters may comprise, for example, one or more second candidate RSs (e.g., candidateBeamRSList) of at least one DL BWP of the second plurality of DL BWPs of the second cell 2404 and/or a second search space set (e.g., recoverySearchSpaceID) on the at least one DL BWP of the second plurality of DL BWPs. The UL-BWP-specific BFR configuration parameters may comprise one or more first BFR parameters. The one or more first BFR parameters may comprise, for example, one or more first candidate RSs (e.g., candidateBeamRSList) of at least one DL BWP of the first plurality of DL BWPs of the first cell 2402 and/or a first search space set (e.g., recoverySearchSpaceID) on the at least one DL BWP of the first plurality of DL BWPs. The one or more first BFR parameters may comprise a first parameter indicating the first cell index of the first cell 2402 and/or the one or more second BFR parameters may comprise a second parameter indicating the second cell index of the second cell 2404, for example, if the UL-BWP-specific BFR configuration parameters comprise the one or more first BFR parameters of the at least one DL BWP of the first plurality of DL BWPs of the first cell 2402 and/or the one or more second BFR parameters of the at least one DL BWP of the second plurality of DL BWPs of the second cell 2404.

The one or more first BFR parameters, for example, may not comprise a first parameter indicating the first cell index of the first cell 2402. The one or more second BFR parameters, for example, may not comprise a second parameter indicating the second cell index of the second cell 2404. The base station may not configure the one or more first BFR parameters associated with the first cell 2402 and/or the one or more second BFR parameters associated with the second cell 2404 on the at least one UL BWP of the first plurality of UL BWPs of the first cell 2402, for example, if the one or more first BFR parameters do not comprise the first parameter indicating the first cell index of the first cell 2402 and/or the one or more second BFR parameters do not comprise the second parameter indicating the second cell index of the second cell 2404.

The base station may not configure the one or more first BFR parameters associated with the first cell 2402 and/or the one or more second BFR parameters associated with the second cell 2404 on the same UL BWP of a cell, for example, if the one or more first BFR parameters do not comprise the first parameter indicating the first cell index of the first cell 2402 and/or the one or more second BFR parameters do not comprise the second parameter indicating the second cell index of the second cell 2404. The cell, for example, may be the first cell 2402. The cell, for example, may be the second cell 2404.

The base station may configure the one or more first BFR parameters associated with the first cell 2402 on a first UL BWP of the first plurality of UL BWPs and/or the one or more second BFR parameters associated with the second cell 2404 on a second UL BWP of the first plurality of UL BWPs, for example, if the one or more first BFR parameters do not comprise the first parameter indicating the first cell index of the first cell 2402 and/or the one or more second BFR parameters do not comprise the second parameter indicating the second cell index of the second cell 2404. The first UL BWP and the second UL BWP, for example, may be different.

Figure 25:
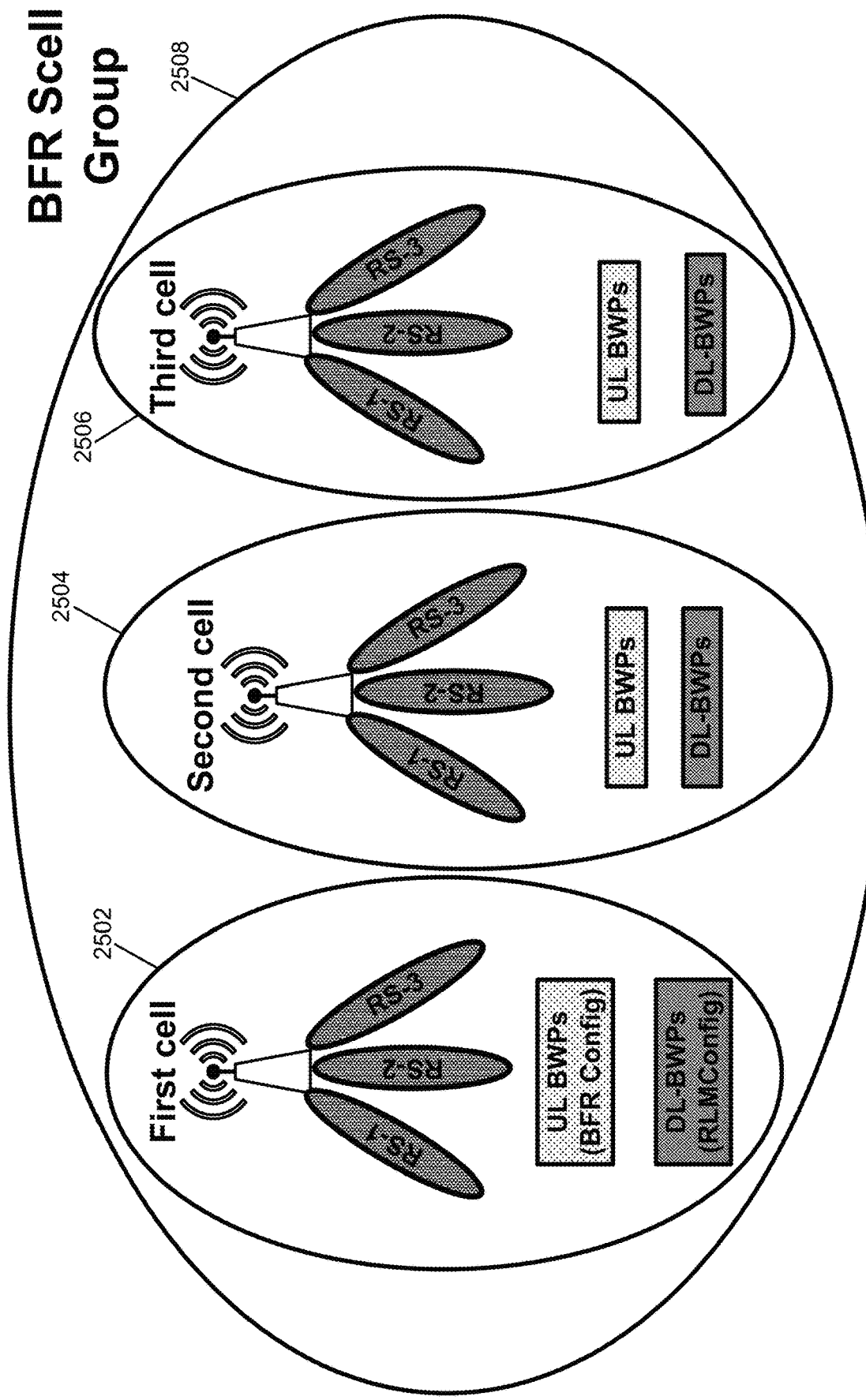
FIG. 25 shows an example of a downlink BFR procedure in multiple cells.

FIG. 25 shows an example of a downlink beam failure recovery procedure. A wireless device may receive, from a base station, one or more messages comprising configuration parameters for one or more secondary cells. The one or more secondary cells may comprise a first cell 2502, a second cell 2504, and/or a third cell 2506. The one or more secondary cells (e.g., the first cell 2502, the second cell 2504, and/or the third cell 2506) may share serving beams (e.g., serving beams RS-1, RS-2, RS-3). The same serving beams may be used, for example, for a downlink reception (e.g., PDCCH reception, PDSCH reception) and/or for an uplink transmission (e.g., PUSCH transmission, PUCCH transmission).

The configuration parameters may comprise one or more cell-specific CORESETs for the one or more secondary cells. The wireless device may receive, from a base station, a CORESET index (e.g., by higher layer parameter ControlResourceSetID in the configuration parameters) and/or a TCI state (e.g., by higher layer parameter TCI-States in the configuration parameters), for example, for a first CORESET of the one or more cell-specific CORESETs. The TCI state may be used, for example, for at least one PDCCH reception in the first CORESET of the one or more cell-specific CORESETs. The TCI state may indicate quasi-co-location information of a DM-RS antenna port, for example, for the at least one PDCCH reception in the first CORESET of the one or more cell-specific CORESETs. The TCI state may indicate that the DM-RS antenna port for the at least one PDCCH reception in the first CORESET of the one or more cell-specific CORESET is quasi-co-located (e.g., QCL-TypeD), for example, with one or more downlink RSs indicated by the TCI state.

The base station may send, to the wireless device, one or more first cell-specific CORESETs and/or a first TCI state. The base station may send the one or more first cell-specific CORESETs and/or the first TCI state, for example, based on the configuration parameters and/or for the first cell 2502. The base station may send, to the wireless device, one or more second cell-specific CORESETs. The base station may send the one or more second cell-specific CORESETs, for example, based on the configuration parameters and/or for the second cell 2504. The base station may send, to the wireless device, one or more third cell-specific CORESETs. The base station may send the one or more third cell-specific CORESETs, for example, based on the configuration parameters and/or for the third cell 2506.

The one or more secondary cells (e.g., the first cell 2502, the second cell 2504, and/or the third cell 2506) may be QCL-ed (e.g., QCL-TypeD). The one or more secondary cells may share a same set of RSs (e.g., RS-1, RS-2, RS-3) for a downlink reception and/or an uplink transmission, for example, if the one or more secondary cells are QCL-ed.

A first DM-RS antenna port for at least one first PDCCH reception in the one or more first cell-specific CORESETs may be, for example, quasi-co-located (e.g., QCL-TypeD) with one or more downlink RSs. The one or more downlink RSs may be indicated by the first TCI state (e.g., provided by higher layer parameter TCI-States). A second DM-RS antenna port for at least one second PDCCH reception in the one or more second cell-specific CORESETs may be quasi-co-located (e.g., QCL-TypeD) with the one or more downlink RSs indicated by the first TCI state, for example, based on the one or more secondary cells sharing the same set of RSs. A third DM-RS antenna port for at least one third PDCCH reception in the one or more third cell-specific CORESETs may be quasi-co-located (e.g., QCL-TypeD) with the one or more downlink RSs indicated by the first TCI state, for example, based on the one or more secondary cells sharing the same set of RSs.

A wireless device (e.g., a physical layer of a wireless device) may assess a first radio link quality of the one or more downlink RSs associated with the one or more first cell-specific CORESETs of the first cell 2502 against a first threshold (e.g., rlmInSyncOutOfSyncThreshold). A base station may send, to the wireless device, the first threshold. The first threshold (e.g., hypothetical BLER, SINR, L1-RSRP) may be a first value (e.g., quantity, number). A higher layer signaling (e.g., RRC, MAC) may indicate, comprise, and/or may provide the first threshold. A second radio link quality of the one or more second cell-specific CORESETs of the second cell (e.g., the second cell 2504) and/or a third radio link quality of the one or more third cell-specific CORESETs of the third cell (e.g., the third cell 2506) may fail to satisfy the first threshold (e.g., radio link quality may be greater than the hypothetical BLER, less than the hypothetical SINR, or less than the hypothetical L1-RSRP), for example, if the one or more secondary cells share the same set of RSs and/or the first radio link quality of the one or more first cell-specific CORESETs fails to satisfy the first threshold (e.g., first radio link quality greater than the hypothetical BLER, less than the hypothetical SINR, or less than the hypothetical L1-RSRP).

Some or all of the one or more secondary cells may have a beam failure, for example, if the wireless device detects a beam failure for the first cell 2502 and/or the one or more secondary cells share the same set of RSs. The wireless device may determine a beam failure for the second cell 2504 and/or a beam failure for the third cell 2506, for example, based on detecting the beam failure for the first cell 2502. The one or more secondary cells may share the same beam failure recovery procedure, for example, based on the one or more secondary cells sharing the same set of RSs. The base station may configure one cell (e.g., the first cell 2502) of the one or more secondary cells with BFR configuration parameters (e.g., DL-BWP-specific BFR configuration parameters, UL-BWP-specific BFR configuration parameters), based on the one or more secondary cells sharing the same beam failure recovery procedure. The wireless device may use the BFR configuration parameters for beam failure detection and/or a BFR procedure for the one or more secondary cells.

The base station may configure the first cell 2502 of the one or more secondary cells with BFR configuration parameters (e.g., DL-BWP-specific BFR configuration parameters, UL-BWP-specific BFR configuration parameters) based on the one or more secondary cells sharing the same beam failure recovery procedure. The wireless device may use the BFR configuration parameters for beam failure detection and/or a BFR procedure for the one or more secondary cells.

A BFR SCell group 2508 may comprise the one or more secondary cells based on the one or more secondary cells sharing the same set of RSs. The first cell 2502, the second cell 2504, and/or the third cell 2506 may form, for example, the BFR SCell group 2508.

Beam failure detection signals and/or properties (e.g., RadioLinkMonitoringRS) of the one or more secondary cells in the BFR SCell group 2508 may be the same. The beam failure detection signals and/or properties of the one or more secondary cells (e.g., forming the BFR SCell group 2508) may be, for example, RS-1, RS-2, and/or RS-3. A beam failure for each cell of the BFR SCell group 2508 may be determined based on a beam failure of one cell of the BFR SCell group 2508 (e.g., the first cell 2502), for example, based on the beam failure detection signals and/or properties of the one or more secondary cells in the BFR SCell 2508 group being the same.

A base station may configure a first cell of the BFR SCell group 2508 to detect a beam failure for the BFR SCell group 2508, for example, based on the beam failure detection signals and/or properties of the one or more secondary cells in the BFR SCell group 2508 being the same. A beam failure for the BFR SCell group 2508 may be determined, for example, based on a beam failure of the first cell. Determining the beam failure for the BFR SCell group 2508 in this manner may provide a low complexity implementation for detecting beam failure and/or may conserve BFR configuration resources.

A base station may configure a first cell of the BFR SCell group 2508 (e.g., the first cell 2502) with BFR configuration parameters (e.g., DL-BWP-specific BFR configuration parameters, UL-BWP-specific BFR configuration parameters). The base station may not configure any additional cells of the BFR SCell group 2508 with BFR configuration parameters (e.g., the base station may not configure the second cell 2504 with BFR configuration parameters and/or the base station may not configure the third cell 2506 with BFR configuration parameters). The BFR configuration parameters may comprise DL-BWP-specific BFR configuration parameters (e.g., RadioLinkMonitoringConfig) for at least one DL BWP of a plurality of DL BWPs of the first cell 2502. The BFR configuration parameters may comprise UL-BWP-specific BFR configuration parameters (e.g., BeamFailureRecoveryConfig) for at least one UL BWP of a plurality of UL BWPs of the first cell 2502.

Figure 26:
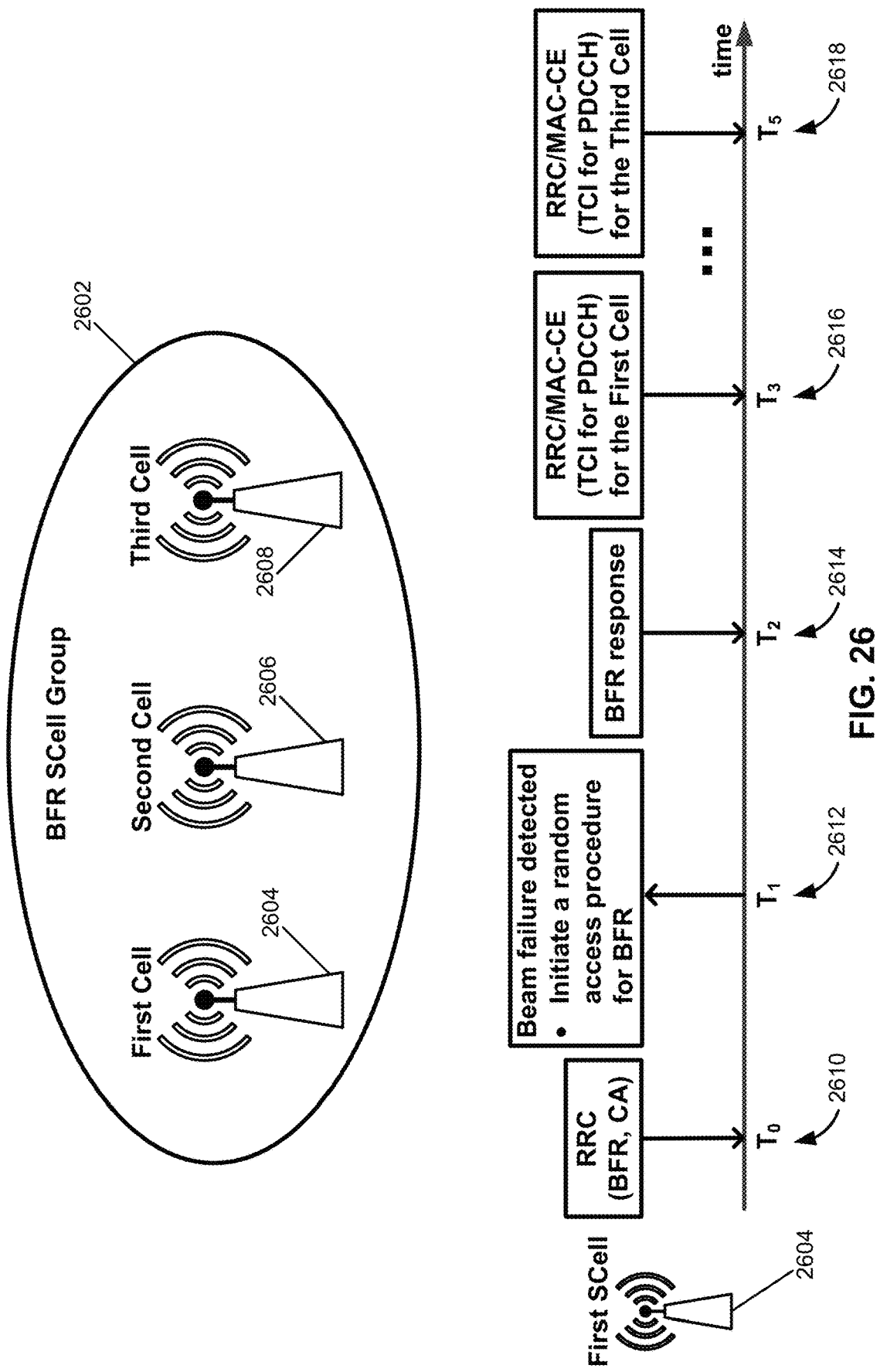
FIG. 26 shows an example of a downlink BFR procedure in multiple cells.

FIG. 26 shows an example of a downlink beam failure recovery procedure. A wireless device may receive, from a base station, one or more messages for a BFR SCell group 2602. The BFR SCell group 2602 may comprise one or more secondary cells, for example, a first cell 2604, a second cell 2606, and/or a third cell 2608. The one or more messages for the BFR SCell group 2602 may comprise, for example, configuration parameters. The one or more messages for the BFR SCell group 2602 may be received by the wireless device at a time T0 2610.

The configuration parameters may comprise one or more BFR configuration parameters for the first cell 2604 (e.g., PCell, PSCell, SCell). The wireless device may use the one or more BFR configuration parameters for a beam failure recovery of the BFR SCell group 2602. The one or more BFR configuration parameters may comprise a set of RS resource configurations for a configured downlink BWP of the first cell 2604. The set of RS resource configurations may comprise one or more first RSs (e.g., periodic CSI-RS or SS blocks) of the configured downlink BWP. The wireless device may measure radio link quality of the one or more first RSs (e.g., provided by RadioLinkMonitoringRS in failureDetectionResources) for a beam failure detection of the configured downlink BWP of the first cell 2604.

The configuration parameters may comprise one or more cell-specific CORESETs for the one or more secondary cells in the BFR SCell group 2602. A base station may send, to the wireless device, a CORESET index (e.g., by higher layer parameter ControlResourceSetID in the configuration parameters) and/or a TCI state (e.g., by higher layer parameter TCI-States in the configuration parameters), for example, for a first CORESET of the one or more cell-specific CORESETs. The TCI state may be used, for example, for at least one PDCCH reception in the first CORESET of the one or more cell-specific CORESETs. The TCI state may indicate, for example, quasi-co-location information of a DM-RS antenna port for the at least one PDCCH reception in the first CORESET of the one or more cell-specific CORESETs. The TCI state may indicate, for example, that the DM-RS antenna port for the at least one PDCCH reception in the first CORESET of the one or more cell-specific CORESETs is quasi-co-located (e.g., QCL-TypeD) with one or more downlink RSs indicated by the TCI state.

A base station may send, to the wireless device, one or more first cell-specific CORESETs for the first cell 2604 of the one or more secondary cells in the BFR SCell group 2602. The base station may send the one or more first cell-specific CORESETs for the first cell 2604, for example, based on the configuration parameters. The base station may send, to the wireless device, one or more second cell-specific CORESETs for the second cell 2606 of the one or more secondary cells in the BFR SCell group 2602. The base station may send the one or more second cell-specific CORESETs for the second cell 2606, for example, based on the configuration parameters. The base station may send, to the wireless device, one or more third cell-specific CORESETs for the third cell 2608 of the one or more secondary cells in the BFR SCell group 2602. The base station may send the one or more third cell-specific CORESETs for the third cell 2608, for example, based on the configuration parameters.

A base station may send, to a wireless device, one or more first cell-specific CORESETs, for example, for a configured downlink BWP of the first cell 2604. The base station may send the one or more first cell-specific CORESETs for the configured downlink BWP of the first cell 2604, for example, based on the configuration parameters. The base station may send, to the wireless device, a CORESET index (e.g., by higher layer parameter ControlResourceSetID) and/or a TCI state (e.g., by higher layer parameter TCI-States), for example, for at least one cell-specific CORESET of the one or more first cell-specific CORESETs. The TCI state may be used for at least one PDCCH reception in the at least one of the one or more first cell-specific CORESETs. The TCI state may indicate quasi-co-location information of a DM-RS antenna port for the at least one PDCCH reception in the at least one of the one or more first cell-specific CORESETs. The TCI state may indicate that the DM-RS antenna port for the at least one PDCCH reception in the at least one of the one or more first cell-specific CORESETs is quasi-co-located (e.g., QCL-TypeD), for example, with one or more downlink RSs indicated by the TCI state.

The one or more BFR configuration parameters of the first cell 2604 may not comprise a set of RS resource configurations (e.g., RadioLinkMonitoringRS in failureDetectionResources), for example, for a configured downlink BWP of the first cell 2604. The wireless device may determine one or more first RSs to comprise, for example, one or more downlink RSs. The wireless device may determine the one or more first RSs, for example, based on the one or more BFR configuration parameters not comprising the set of RS resource configurations. The one or more first RSs may be indicated by the TCI state associated with at least one of the one or more CORESETs.

The one or more BFR configuration parameters may comprise a second set of RS resource configurations of a configured uplink BWP of the first cell 2604. The second set of RS resource configurations may comprise one or more second RSs (e.g., periodic CSI-RS or SS blocks). The one or more second RSs (e.g., candidateBeamRSList) may be associated with the configured downlink BWP. The wireless device may measure radio link quality of the one or more second RSs for a beam failure recovery (e.g., of the configured downlink BWP of the first cell 2604, or equivalently of the BFR SCell group 2602). The one or more BFR configuration parameters may comprise one or more beam failure recovery request (BFRQ) resources (e.g., PRACH-ResourceDedicatedBFR of the candidateBeamRSList) on the configured uplink BWP. The one or more BFR configuration parameters may comprise, for example, an association between each of the one or more second RSs and each of the one or more BFRQ resources (e.g., the association may be one-to-one).

A wireless device (e.g., a physical layer of a wireless device) may assess a radio link quality of the one or more first RSs against a first threshold (e.g., rlmInSyncOutOfSyncThreshold). The first threshold (e.g., hypothetical BLER, SINR, L1-RSRP) may be, for example, a first value (e.g., number, quantity) provided by the configuration parameters (e.g., the configuration parameters may comprise and/or may indicate the first threshold).

The wireless device (e.g., the physical layer of the wireless device) may provide a BFI indication to a higher layer (e.g., MAC layer) of the wireless device, for example, if the radio link quality (e.g., BLER, SINR, L1-RSRP) of the one or more first RSs fails to satisfy (e.g., radio link quality greater than the hypothetical BLER, less than the hypothetical SINR, or less than the hypothetical L1-RSRP) the first threshold. The wireless device may provide the BFI indication to the higher layer with a periodicity. The periodicity may be determined by a maximum of: a shortest periodicity among one or more periodicities associated (e.g., one-to-one) with the one or more first RSs, and a time value (e.g., 2 ms or any other duration). The time value may be configured by the configuration parameters. The time value, for example, may be fixed (and/or predefined).

The wireless device (e.g., the physical layer of the wireless device) may not send a non-beam failure instance indication to the higher layers of the wireless device, for example, if the radio link quality (e.g., BLER, SINR, L1-RSRP) for the one or more first RSs (e.g., periodic CSI-RS, SSB) satisfies (e.g., radio link quality less than the hypothetical BLER, greater than the hypothetical SINR, or greater than the hypothetical L1-RSRP) the first threshold. The one or more BFR configuration parameters may comprise a first beam failure detection timer (e.g., provided by beamFailureDetectionTimer in RadioLinkMonitoringConfig) and/or a first quantity (e.g., number, plurality, etc.) (e.g., provided by beamFailureInstanceMaxCount in RadioLinkMonitoringConfig), for example, for the configured downlink BWP of the first cell 2604.

The wireless device may start or restart the first beam failure detection timer (e.g., beamFailureDetectionTimer) associated with the configured downlink BWP, for example, if the higher layer (e.g., MAC) of the wireless device receives a BFI indication from the physical layer of the wireless device. The wireless device may, for example, increment a first beam failure counter (e.g., BFI_COUNTER) of the configured downlink BWP by one and/or may start or restart the first beam failure detection timer.

The wireless device may set the first beam failure counter to zero, for example, if the first beam failure detection timer expires. The wireless device may detect a beam failure of the configured downlink BWP, for example, based on the first beam failure counter being equal to or greater than the first quantity (e.g., beamFailureInstanceMaxCount) at a time T1 2612. The wireless device may initiate a random access procedure (e.g., contention-free random access, contention-based random access) for a beam failure recovery of the BFR SCell group 2602, for example, based on the first beam failure counter being equal to or greater than the first quantity (e.g., at the time T1 2612).

The one or more BFR configuration parameters may comprise a beam failure recovery timer (e.g., beamFailureRecoveryTimer provided by BeamFailureRecoveryConfig) in the configured uplink BWP. The wireless device may start the beam failure recovery timer (e.g., if configured), for example, based on initiation of the random access procedure for the beam failure recovery.

The random access procedure may comprise a candidate beam identification procedure. The wireless device, for the candidate beam identification procedure, may indicate (e.g., identify) a first RS in the one or more second RSs configured in the configured uplink BWP. The first RS may be associated with a BFRQ resource of the one or more BFRQ resources. The BFRQ resource may comprise at least one preamble and/or at least one PRACH (e.g., time and/or frequency) resource on the configured uplink BWP. A second radio link quality (e.g., BLER, SINR, L1-RSRP) of the first RS may satisfy (e.g., lower BLER, higher L1-RSRP, or higher SINR) a second threshold (e.g., rsrp-ThresholdSSB). The second threshold may be, for example, a second value (e.g., number, quantity) provided by the configuration parameters (e.g., the configuration parameters may comprise and/or indicate the second threshold).

The wireless device may transmit, in a first slot, the at least one preamble via the at least one PRACH resource of the configured uplink BWP for the random access procedure, for example, based on indicating (e.g., identifying) the first RS. The one or more BFR configuration parameters may comprise a higher layer parameter (e.g., recoverySearchSpaceId in BeamFailureRecoveryConfig) on the configured uplink BWP. The wireless device may be provided with a search space set by the higher layer parameter. The higher layer parameter may comprise and/or indicate the search space set. The search space set may be associated with a BFR CORESET on the configured downlink BWP. The wireless device may be provided with the BFR CORESETs, for example, through a link to the search space set. The wireless device may not be provided with a TCI state (e.g., by higher layer parameter TCI-States), for example, for the BFR CORESETs.

The wireless device may start, from a second slot (e.g., 4 slots or any other quantity of slots after the first slot), monitoring for a detection of a BFR response of a base station, for example, based on transmitting the at least one preamble in the first slot. The monitoring for the detection of the BFR response may comprise monitoring, for a DCI (e.g., a downlink assignment or an uplink grant), at least one second PDCCH in the BFR CORESETs (e.g., linked to the search space set) within a configured response window (e.g., ra-responseWindow). The DCI may be with CRC scrambled by a C-RNTI and/or an MCS-C-RNTI of the wireless device. The configured response window may be configured by the one or more BFR configuration parameters (e.g., BeamFailureRecoveryConfig in the configured uplink BWP).

The first RS indicated (e.g., identified) in the candidate beam identification procedure may be associated (e.g., quasi-co-located) with at least one DM-RS of the at least one second PDCCH in the BFR CORESETs monitored by the wireless device. The random access procedure for the beam failure recovery of the BFR SCell group 2602 may be successfully completed at a time T2 2614. The random access procedure for the beam failure recovery of the BFR SCell group 2602 may be successfully completed, for example, based on receiving a DCI (e.g., in a BFR CORESET). The random access procedure for the beam failure recovery of the BFR SCell group 2602 may be successfully completed, for example, based on receiving the DCI on the at least one second PDCCH in the BFR CORESETs of the first cell 2604, within the configured response window.

The wireless device may continue monitoring at least one third PDCCH in the BFR CORESETs (and/or in the search space set), for example, based on completing the random access procedure successfully and/or until the wireless device receives a higher layer parameter (e.g., TCI-StatesPDCCH-ToAddlist and/or TCI-StatesPDCCH-ToReleaseList) at a time T3 2616. The higher layer parameter may comprise one or more TCI states including, for example, a second TCI state. The wireless device may receive a MAC CE activation command (e.g., UE-specific PDCCH MAC CE) indicating, for example, a second TCI state of the one or more TCI states. The wireless device may continue monitoring the at least one third PDCCH in the BFR CORESETs (and/or in the search space set), for example, based on the completing the random access procedure successfully and/or until the wireless device receives a MAC CE activation command (e.g., UE-specific PDCCH MAC CE) indicating a second TCI state (e.g., at the time T3 2616).

The first RS indicated (e.g., identified) in the candidate beam identification procedure may be associated (e.g., quasi-co-located) with at least one DM-RS of the at least one third PDCCH in the BFR CORESETs monitored by the wireless device. The second TCI state may comprise one or more fields. The one or more fields may comprise a QCL-information field (e.g., QCL-Info). The QCL-information field may comprise a first serving cell index (e.g., the first cell index of the first cell 2604) and/or a reference signal index (e.g., SSB-index, NZP-CSI-RS-ResourceID) indicating an RS.

The second TCI state may be used for at least one first PDCCH reception in one or more first cell-specific CORESETs of the first cell 2604. The second TCI state may indicate that the DM-RS antenna port for the at least one first PDCCH reception in the one or more first cell-specific CORESETs is quasi-co-located (e.g., QCL-TypeD) with the RS indicated by the second TCI state.

The base station may send (e.g., transmit), to the wireless device, a second MAC CE activation command (e.g., UE-specific PDCCH MAC CE) indicating a third TCI state of the one or more TCI states. The second MAC CE activation command may indicate the second cell 2606. The third TCI state may indicate the RS. The third TCI state may be the same as the second TCI state. The third TCI state may be different from the second TCI state.

The third TCI state may be used for at least one second PDCCH reception in one or more second cell-specific CORESETs of the second cell 2606. The third TCI state may indicate that the DM-RS antenna port for the at least one second PDCCH reception in the one or more second cell-specific CORESETs is quasi-co-located (e.g., QCL-TypeD) with the RS indicated by the third TCI state.

The base station may send (e.g., transmit), to the wireless device and at a time T5 2618, a third message (e.g., a third MAC CE activation command (e.g., UE-specific PDCCH MAC CE), an RRC message, and/or DCI) indicating a fourth TCI state of the one or more TCI states. The third message may indicate the third cell 2608. The fourth TCI state may indicate the RS. The fourth TCI state may be the same as the second TCI state. The fourth TCI state may be different from the second TCI state.

The fourth TCI state may be used for at least one third PDCCH reception in one or more third cell-specific CORESETs of the third cell 2608. The fourth TCI state may indicate that the DM-RS antenna port for the at least one third PDCCH reception in the one or more third cell-specific CORESETs is quasi-co-located (e.g., QCL-TypeD) with the RS indicated by the fourth TCI state.

The base station may send (e.g., transmit), to the wireless device, one or more messages (e.g., one or more cell-specific MAC CE activation commands (e.g., UE-specific PDCCH MAC CE), one or more RRC messages, and/or one or more DCI messages) for the one or more secondary cells (e.g., the BFR SCell group 2602). The base station may send the one or more messages, for example, at the time T3 2616 and/or the time T5 2618 and/or based on the completing the random access procedure successfully. The one or more messages may comprise the MAC CE activation command for the first cell 2604 (e.g., received at the time T3 2616), the second MAC CE activation command for the second cell 2606, and/or the third MAC CE activation command for the third cell 2608 (e.g., received at the time T5 2618).

Sending (e.g., transmitting) the one or more cell-specific MAC CE activation commands for the one or more secondary cells (e.g., the BFR SCell group 2602) may consume high power. Sending (e.g., transmitting) the one or more cell-specific MAC CE activation commands for the one or more secondary cells (e.g., the BFR SCell group 2602) may delay communication between the wireless device and the base station. Sending (e.g., transmitting) one or more cell-specific MAC CE activation commands (e.g., UE-specific PDCCH MAC CE) for the one or more secondary cells (e.g., the BFR SCell group 2602) may delay reconfiguring PDCCH reception of the BFR SCell group 2602.

Figure 27:
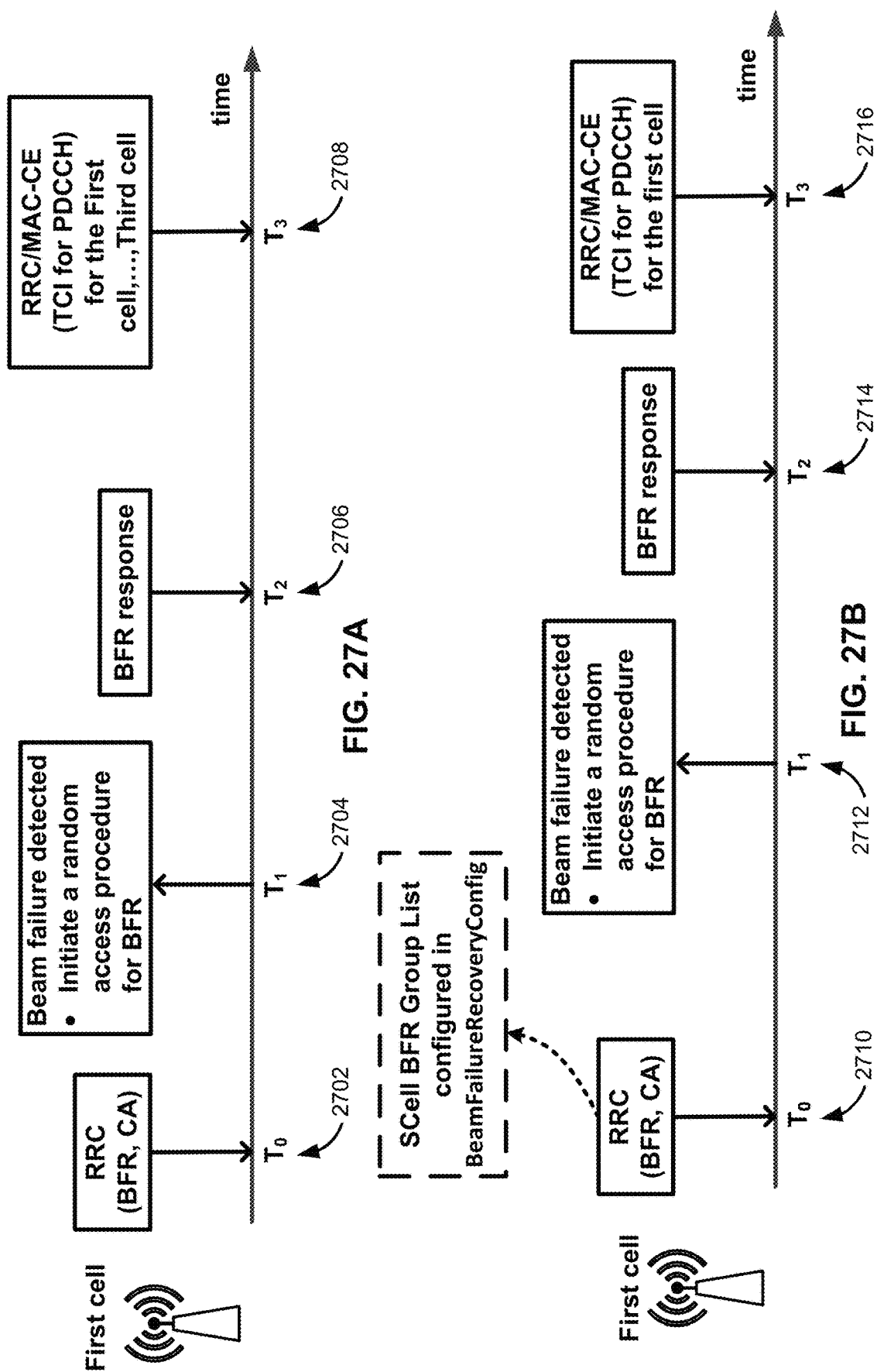
FIG. 27A and FIG. 27B show examples of downlink BFR procedures in multiple cells.

FIG. 27A shows an example of a downlink beam failure recovery procedure. A procedure at a time T0 2702 may be the same or may be different from a procedure at the time T0 2610 of FIG. 26. A procedure at a time T1 2704 may be the same or may be different from a procedure at the time T1 2612 of FIG. 26. A procedure at a time T2 2706 may be the same or may be different from a procedure at the time T2 2614 of FIG. 26.

A second TCI state of one or more TCI states may be received at a time T3 2708 and/or may comprise one or more fields. The one or more fields may comprise a QCL-information field (e.g., QCL-Info). The QCL-information field may comprise a cell group parameter (e.g., SCell BFR group, BFR cell group, and/or the like), for example, for a beam failure recovery of a BFR SCell group. The cell group parameter may comprise one or more serving cell-specific indexes (e.g., a first cell index of a first cell, a second cell index of a second cell, a third cell index of a third cell) of one or more secondary cells in a BFR SCell group and/or a reference signal index (e.g., SSB-index, NZP-CSI-RS-ResourceID) indicating an RS. Some or all of the one or more serving cell-specific indexes may be a serving cell index of a cell in the BFR SCell group (e.g., the first cell index of the first cell, the second cell index of the second cell, the third cell index of the third cell). The cell group parameter may comprise, for example, one or more serving cell-specific indexes of the one or more secondary cells in the BFR SCell group except the first cell (e.g., the second cell index of the second cell, the third cell index of the third cell).

The second TCI state may be used for at least one first PDCCH reception in one or more first cell-specific CORESETs of the first cell, at least one second PDCCH reception in one or more second cell-specific CORESETs of the second cell, and/or at least one third PDCCH reception in one or more third cell-specific CORESETs of the third cell, for example, if the second TCI state is indicated to the wireless device (e.g., by a MAC CE activation command) The second TCI state may indicate that a first DM-RS antenna port for the at least one first PDCCH reception in the one or more first cell-specific CORESETs is quasi-co-located (e.g., QCL-TypeD) with the RS indicated by the second TCI state. The second TCI state may indicate that a second DM-RS antenna port for the at least one second PDCCH reception in the one or more second cell-specific CORESETs is quasi-co-located (e.g., QCL-TypeD) with the RS indicated by the second TCI state. The second TCI state may indicate that a third DM-RS antenna port for the at least one third PDCCH reception in the one or more third cell-specific CORESETs is quasi-co-located (e.g., QCL-TypeD) with the RS indicated by the second TCI state.

The base station may transmit one MAC CE activation command for PDCCH receptions in the one or more secondary cells in the BFR SCell group, for example, based on the cell group parameter comprising the one or more serving cell-specific indexes of the one or more secondary cells in the BFR SCell group. The one MAC CE activation command may indicate an RS shared by the one or more secondary cells. The wireless device may apply the RS indicated by the one MAC CE activation command to PDCCH receptions of the one or more secondary cells in the BFR SCell group. The second TCI state may be used for at least one first PUCCH transmission of the first cell, at least one second PUCCH transmission of the second cell, and/or at least one third PUCCH transmission of the third cell, for example, if the second TCI state is indicated to the wireless device (e.g., by a MAC CE activation command) The second TCI state may be used for at least one first PDSCH reception of the first cell, at least one second PDSCH reception of the second cell, and/or at least one third PDSCH reception of the third cell, for example, if the second TCI state is indicated to the wireless device (e.g., by a MAC CE activation command).

FIG. 27B shows an example of a downlink beam failure recovery procedure A procedure at a time T0 2710 may be the same or may be different from the procedure at the time T0 2610 of FIG. 26. A procedure at a time T1 2712 may be the same or may be different from the procedure at the time T1 2612 of FIG. 26. A procedure at a time T2 2714 may be the same or may be different from the procedure at the time T2 2614 of FIG. 26.

One or more BFR configuration parameters of a first cell (e.g., received at the time T0 2710) may comprise a cell group parameter (e.g., provided by BeamFailureRecoveryConfig) in a configured uplink BWP. The cell group parameter may comprise one or more serving cell-specific indexes (e.g., a first cell index of the first cell, a second cell index of a second cell, a third cell index of a third cell) of one or more secondary cells in a BFR SCell group. Some or all of the one or more serving cell-specific indexes may be a serving cell index of a cell in the BFR SCell group (e.g., the first cell index of the first cell, the second cell index of the second cell, the third cell index of the third cell). The cell group parameter may comprise one or more serving cell-specific indexes of the one or more secondary cells in the BFR SCell group except, for example, the first cell (e.g., the second cell index of the second cell, the third cell index of the third cell).

A wireless device may monitor at least one third PDCCH in a BFR CORESET (and/or in a search space set), for example, based on completing a random access procedure successfully (e.g., at the time T2 2714) and until the wireless device receives a higher layer parameter (e.g., TCI-StatesPDCCH-ToAddlist and/or TCI-StatesPDCCH-ToReleaseList). The wireless device may determine that the random access procedure successfully completed, for example, based on receiving a DCI (e.g., in a BFR CORESET). The higher layer parameter may comprise one or more TCI states including a second TCI state. The wireless device may receive a MAC CE activation command (e.g., UE-specific PDCCH MAC CE) indicating, for example, a second TCI state of the one or more TCI states (e.g., at a time T3 2716). The wireless device may continue monitoring at least one third PDCCH in the BFR CORESET (or in the search space set), for example, based on the completing the random access procedure successfully and/or until the wireless device receives a MAC CE activation command (e.g., UE-specific PDCCH MAC CE) indicating a second TCI state (e.g., at the time T3 2716). The wireless device may determine that the random access procedure successfully completed, for example, based on receiving a DCI (e.g., in a BFR CORESET). A wireless device may perform the above operations for one or more downlink channels (e.g., PDCCH, PDSCH, etc.).

The second TCI state may be used for at least one first PDCCH reception in one or more first cell-specific CORESETs of the first cell, for example, if the second TCI state is indicated to the wireless device (e.g., by the MAC CE activation command) The second TCI state may indicate that a first DM-RS antenna port for the at least one first PDCCH reception in one or more first cell-specific CORESETs is quasi-co-located (e.g., QCL-TypeD) with an RS indicated by the second TCI state. A wireless device may perform the above operations for one or more downlink channels (e.g., PDCCH, PDSCH, etc.).

The second TCI state may be used for at least one second PDCCH reception in one or more second cell-specific CORESETs of the second cell, for example, if the second TCI state is indicated to the wireless device (e.g., by the MAC CE activation command) and/or based on the one or more BFR configuration parameters comprising the cell group parameter. The second TCI state may indicate that a second DM-RS antenna port for the at least one second PDCCH reception in one or more second cell-specific CORESETs is quasi-co-located (e.g., QCL-TypeD) with the RS indicated by the second TCI state. The second TCI state may be used for at least one third PDCCH reception in one or more third cell-specific CORESETs of the third cell, for example, if the second TCI state is indicated to the wireless device (e.g., by the MAC CE activation command) and/or based on the one or more BFR configuration parameters comprising the cell group parameter. The second TCI state may indicate that a third DM-RS antenna port for the at least one third PDCCH reception in one or more third cell-specific CORESETs is quasi-co-located (e.g., QCL-TypeD) with the RS indicated by the second TCI state. A wireless device may perform the above operations for one or more downlink channels (e.g., PDCCH, PDSCH, etc.).

The second TCI state may be used for at least one first uplink (e.g., PUCCH, PUSCH, etc.) transmission of the first cell, for example, if the second TCI state is indicated to the wireless device (e.g., by the MAC CE activation command) and/or based on the one or more BFR configuration parameters comprising the cell group parameter. The second TCI state may be used for at least one second uplink (e.g., PUCCH, PUSCH, etc.) transmission of the second cell, for example, if the second TCI state is indicated to the wireless device (e.g., by the MAC CE activation command) and/or based on the one or more BFR configuration parameters comprising the cell group parameter. The second TCI state may be used for at least one third uplink (e.g., PUCCH, PUSCH, etc.) transmission, for example, if the second TCI state is indicated to the wireless device (e.g., by the MAC CE activation command) and/or based on the one or more BFR configuration parameters comprising the cell group parameter. The second TCI state may be used for at least one first downlink (e.g., PDCCH, PDSCH, etc.) reception of the first cell, for example, if the second TCI state is indicated to the wireless device (e.g., by the MAC CE activation command) and/or based on the one or more BFR configuration parameters comprising the cell group parameter. The second TCI state may be used for at least one second downlink (e.g., PDCCH, PDSCH, etc.) reception of the second cell, for example, if the second TCI state is indicated to the wireless device (e.g., by the MAC CE activation command) and/or based on the one or more BFR configuration parameters comprising the cell group parameter. The second TCI state may be used for at least one third downlink (e.g., PDCCH, PDSCH, etc.) reception of the third cell, for example, if the second TCI state is indicated to the wireless device (e.g., by the MAC CE activation command) and/or based on the one or more BFR configuration parameters comprising the cell group parameter.

The cell group parameter may comprise the one or more serving cell-specific indexes of the one or more secondary cells in the BFR SCell group. The base station may send (e.g., transmit) one MAC CE activation command for a PDCCH reception in the first cell. The one MAC CE activation command may indicate an RS. The wireless device may use the RS indicated by the MAC CE activation command to PDCCH receptions of the one or more secondary cells in the BFR SCell group, for example, based on the one or more BFR configuration parameters of the first cell comprising the cell group parameter.

Figure 28:
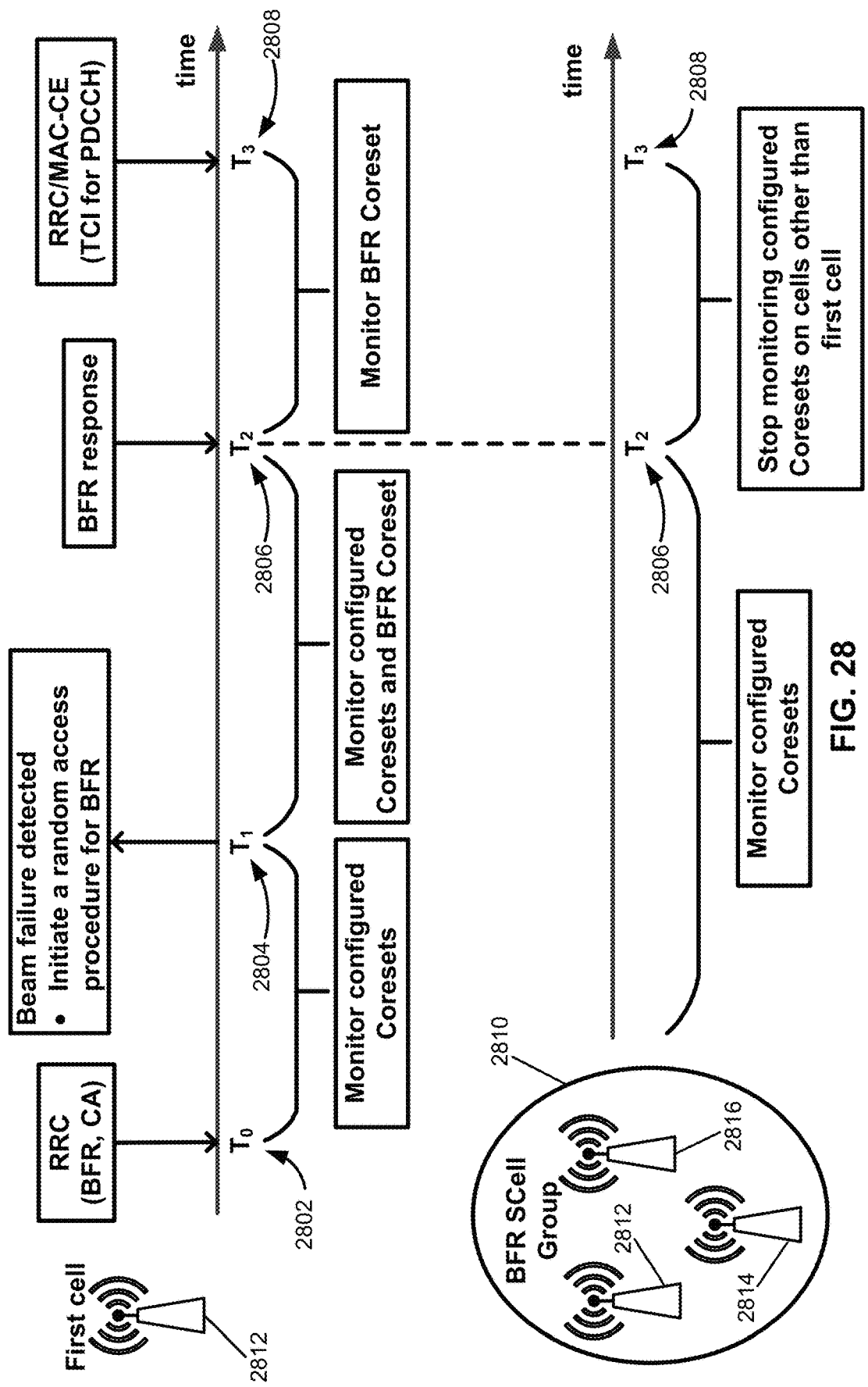
FIG. 28 shows an example of a downlink BFR procedure in multiple cells.

FIG. 28 shows an example of a downlink beam failure recovery procedure. A procedure at a time T0 2802 may be the same or may be different from the procedure at the time T0 2610 of FIG. 26. A procedure at a time T1 2804 may be the same or may be different from the procedure at the time T1 2612 of FIG. 26. A procedure at a time T2 2806 may be the same or may be different from the procedure at the time T2 2614 of FIG. 26. A procedure at a time T3 2808 may be the same or may be different from the procedure at the time T3 2616 of FIG. 26. A BFR SCell group 2810 may include one or more secondary cells. The one or more secondary cells of the BFR SCell group 2810 may include a first cell 2812, a second cell 2814, and/or a third cell 2816.

A wireless device may monitor, for example, at least one of one or more cell-specific CORESETs for the one or more secondary cells in the BFR SCell group 2810 during a random access procedure for a beam failure recovery of the BFR SCell group 2810 (e.g., during and/or between the time T1 2804 and the time T2 2806). The wireless device may monitor, for example, at least one of one or more first cell-specific CORESETs associated with the first cell 2812, at least one of one or more second cell-specific CORESETs associated with the second cell 2814, and/or at least one of one or more third cell-specific CORESETs associated with the third cell 2816 during the random access procedure for the beam failure recovery of the BFR SCell group 2810 (e.g., between the time T1 2804 and the time T2 2806). The wireless device may monitor, for example, at least one of the one or more cell-specific CORESETs for the one or more secondary cells in the BFR SCell group 2810 and/or a BFR CORESET of the first cell 2812 during the random access procedure for the beam failure recovery of the BFR SCell group 2810 (e.g., between the time T1 2804 and the time T2 2806). The wireless device may monitor, for example, at least one of the one or more first cell-specific CORESETs associated with the first cell 2812, at least one of the one or more second cell-specific CORESETs associated with the second cell 2814, at least one of the one or more third cell-specific CORESETs associated with the third cell 2816, and/or the BFR CORESET during the random access procedure (e.g., within the configured response window) for the beam failure recovery of the BFR SCell group 2810 (e.g., between the time T1 2804 and the time T2 2806).

The wireless device may stop monitoring, for example, the at least one of the one or more cell-specific CORESETs for the one or more secondary cells in the BFR SCell group 2810 based on receiving a DCI on at least one second PDCCH in the BFR CORESET of the first cell 2812 (e.g., at the time T2 2806). The wireless device may stop monitoring, for example, the at least one of the one or more first cell-specific CORESETs associated with the first cell 2812 based on receiving a DCI on at least one second PDCCH in the BFR CORESET of the first cell 2812 (e.g., at the time T2 2806). The wireless device may keep monitoring, for example, the BFR CORESET of the first cell 2812 based on receiving the DCI. The wireless device may stop monitoring, for example, the at least one of the one or more second cell-specific CORESETs associated with the second cell 2814 and/or at least one of the one or more third cell-specific CORESETs associated with the third cell 2816, for example, based on receiving the DCI on the at least one second PDCCH in the BFR CORESET of the first cell 2812 (e.g., at the time T2 2806). The wireless device may save battery consumption power, for example, based on stopping monitoring the at least one of the one or more second cell-specific CORESETs associated with the second cell 2814 and/or at least one of the one or more third cell-specific CORESETs associated with the third cell 2816.

Figure 29:
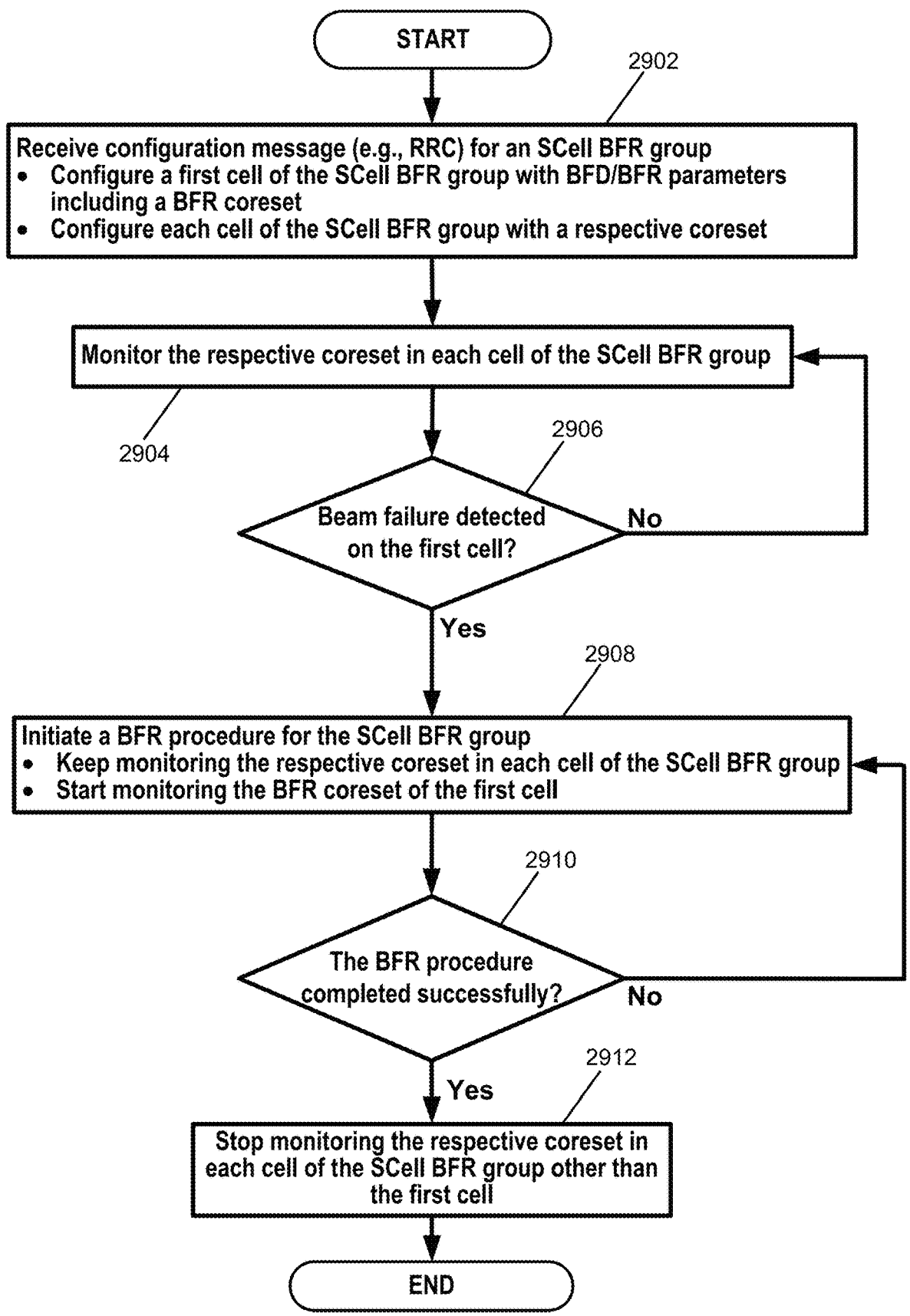
FIG. 29 shows an example method for a downlink BFR procedure in multiple cells.

FIG. 29 shows an example method for a downlink beam failure recovery procedure. The method may be accomplished by systems and/or apparatuses described herein. At step 2902, a wireless device may receive a configuration message (e.g., an RRC configuration message) for an SCell BFR group. The configuration message may be used by the wireless device to configure a first cell of the SCell BFR group with beam failure detection (BFD) and/or BFR parameters. The configuration message may be used by the wireless device to configure the first cell of the SCell BFR group with a BFR CORESET. The configuration message may be used by the wireless device to configure each cell of the SCell BFR group with a respective CORESET. The wireless device may receive the configuration message for the SCell BFR group, for example, at the time T0 2802 shown in FIG. 28.

At 2904, the wireless device may monitor the respective CORESET in each cell of the SCell BFR group. The wireless device may monitor the respective CORESET in each cell of the SCell BFR group, for example, between and/or during the time T0 2802 and the time T1 2804 shown in FIG. 28.

At 2906, the wireless device may determine if a beam failure is detected on the first cell. The wireless device may determine if a beam failure is detected on the first cell, for example, at the time T1 2804 shown in FIG. 28.

At 2908, the wireless device may initiate a BFR procedure for the SCell BFR group based on detection of a beam failure. The wireless device may initiate a BFR procedure for the SCell BFR group based on detection of a beam failure, for example, at the time T1 2804 shown in FIG. 28. The wireless device may continue monitoring the respective CORESETs in each cell of the SCell BFR group. The wireless device may continue monitoring the respective CORESETs in each cell of the SCell BFR group, for example, between the time T1 2804 and the time T2 2806 shown in FIG. 28. The wireless device may begin monitoring the BFR CORESET of the first cell. The wireless device may begin monitoring the BFR CORESET of the first cell, for example, between the time T1 2804 and the time T2 2806 shown in FIG. 28.

At step 2910, the wireless device may determine that the BFR procedure completed successfully. The wireless device may determine that the BFR procedure completed successfully, for example, based on: the wireless device receiving a random access response (e.g., in a random access procedure of the BFR procedure), the wireless device receiving DCI in a BFR CORESET (e.g., the DCI may schedule a PDSCH comprising a random access response). The wireless device may determine that the BFR procedure completed successfully, for example, based on receiving a DCI (e.g., in a BFR CORESET). The DCI, for example, may schedule a PDSCH comprising a random access response. The wireless device may determine that the BFR procedure completed successfully, for example, at the time T2 2806 shown in FIG. 28.

At step 2912, the wireless device may stop monitoring the respective CORESET in each cell of the SCell BFR group, other than for the first cell. The wireless device may stop monitoring the respective CORESET in each cell of the SCell BFR group, for example, between the time T2 2806 and the time T3 2808 shown in FIG. 28.

One or more BFR configuration parameters (e.g., third DL-BWP-specific BFR configuration parameters in FIG. 24) for a DL BWP (e.g., the DL-BWP-1 2406, the DL-BWP-3 2414) of a cell may comprise, for example, one or more RSs (e.g., one or more third RSs (e.g., RadioLinkMonitoringRS)) of the DL BWP. The cell may be, for example, a primary cell (e.g., PCell). The one or more BFR configuration parameters for the DL BWP of the cell may comprise a purpose field (e.g., purpose), for example, based on the cell being the primary cell.

The purpose field may indicate a purpose (e.g., "beam failure," "rlf," and/or "both"). A wireless device may assess the one or more RSs (e.g., SSBs, CSI-RSs) to detect a beam failure of the DL BWP, for example, based on the purpose field indicating a beam failure. The wireless device may assess the one or more RSs (e.g., SSBs, CSI-RSs) to detect a radio link failure (RLF) of the DL BWP, for example, based on the purpose field indicating an RLF. The wireless device may assess the one or more RSs (e.g., SSBs, CSI-RSs) to detect a RLF and/or a beam failure of the DL BWP, for example, based on the purpose field indicating both (e.g., indicating an RLF and a beam failure).

One or more BFR configuration parameters for a DL BWP of a cell may comprise one or more RSs of the DL BWP and/or a purpose field indicating a beam failure. A wireless device may assess the one or more RSs to detect a beam failure of the DL BWP, for example, if the cell is a primary cell and/or based on the one or more BFR configuration parameters comprising the one or more RSs and/or the purpose field indicating a beam failure.

One or more BFR configuration parameters for a DL BWP of a cell may comprise one or more RSs of the DL BWP. The one or more BFR configuration parameters may not comprise a purpose field. The wireless device may not assess the one or more RSs (e.g., SSBs, CSI-RSs) to detect a beam failure of the DL BWP, for example, if the cell is a primary cell and/or based on the one or more BFR configuration parameters not comprising the purpose field.

A purpose field may be absent in one or more BFR configuration parameters for a DL BWP of a cell. The wireless device may not take any action, for example, if the cell is a primary cell and/or based on the purpose field being absent in the one or more BFR configuration parameters. The not taking any action may comprise not assessing one or more RSs (e.g., SSBs, CSI-RSs) to detect a beam failure and/or an RLF of the DL BWP, for example, if the one or more RSs are configured by the one or more BFR configuration parameters.

A length of the purpose field may be 2 bits (or any other quantity of bits, bytes, etc.). A wireless device may not detect a RLF for a secondary cell (e.g., SCell). The wireless device may not support a RLF for a secondary cell. The wireless device may support a beam failure for a secondary cell. The wireless device may detect a beam failure for a secondary cell. A purpose field in one or more BFR configuration parameters of a downlink BWP of a secondary cell may not be necessary.

A base station may reduce a message size of one or more BFR configuration parameters of a secondary cell, for example, by removing a purpose field in the one or more BFR configuration parameters. One or more BFR configuration parameters (e.g., third DL-BWP-specific BFR configuration parameters in FIG. 24) for a DL BWP (e.g., the DL-BWP-1 2406, the DL-BWP-3 2414) of a cell may comprise, for example, one or more RSs (e.g., one or more third RSs (e.g., RadioLinkMonitoringRS)) of the DL BWP. The cell may be a secondary cell (e.g., SCell). The one or more BFR configuration parameters for the DL BWP of the cell may not comprise a purpose field (e.g., purpose), for example, based on the cell being a secondary cell.

One or more BFR configuration parameters for a DL BWP of a cell may comprise one or more RSs of the DL BWP. The one or more BFR configuration parameters may not comprise a purpose field. The wireless device may assess the one or more RSs (e.g., SSBs, CSI-RSs) to detect a beam failure of the DL BWP, for example, if the cell is a secondary cell and/or based on the one or more BFR configuration parameters comprising the one or more RSs.

A purpose field may be absent in one or more BFR configuration parameters for a DL BWP of a cell. The wireless device may assess one or more RSs (e.g., SSBs, CSI-RSs) to detect a beam failure of the DL BWP of the cell, for example, if the cell is a secondary cell and/or the one or more RSs are configured by the one or more BFR configuration parameters.

One or more BFR configuration parameters for a DL BWP of a cell may comprise one or more RSs of the DL BWP. The cell may be a secondary cell (e.g., SCell). The one or more BFR configuration parameters for the DL BWP of the cell may comprise a purpose field (e.g., purpose), for example, based on the cell being a secondary cell. The purpose field may indicate a purpose (e.g., "beam failure," "non-beam failure"). The wireless device may assess the one or more RSs (e.g., SSBs, CSI-RSs) to detect a beam failure of the DL BWP, for example, based on the purpose field indicating a beam failure. The wireless device may not assess the one or more RSs (e.g., SSBs, CSI-RSs) to detect a beam failure of the DL BWP, for example, based on the purpose field indicating a non-beam failure. The wireless device may not perform a beam failure recovery procedure for the DL BWP, for example, based on the purpose field indicating a non-beam failure.

A purpose field may be absent in one or more BFR configuration parameters for a DL BWP of a cell. The wireless device may not assess one or more RSs (e.g., SSBs, CSI-RSs) to detect a beam failure of the DL BWP of the cell, for example, if the cell is a secondary cell and/or the one or more RSs are configured by the one or more BFR configuration parameters. The purpose field may be "non-beam failure" by default.

A length of the purpose field may be 1 bit (or any other quantity of bits, bytes, etc.). A purpose field with "1" may indicate a beam failure. A purpose field with "0" may indicate a non-beam failure. The purpose field may be ENUMERATED {beam failure, non-beam failure}.

Figure 30:
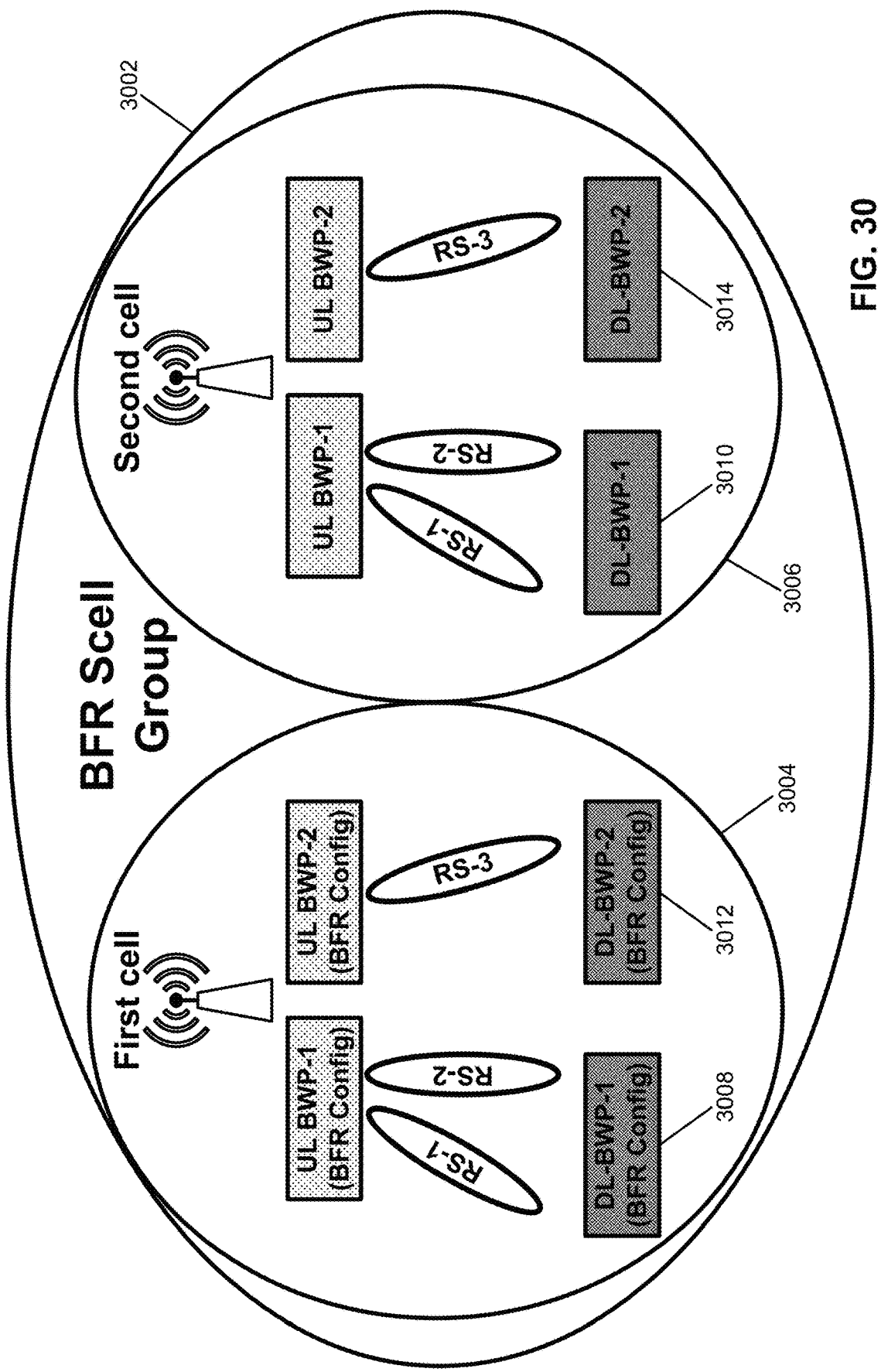
FIG. 30 shows an example of a downlink BFR procedure in multiple cells.

FIG. 30 shows an example of a downlink beam failure recovery procedure. A BFR SCell group 3002 may comprise one or more secondary cells. The one or more secondary cells of the BFR SCell group 3002 may comprise a first cell 3004 and/or a second cell 3006. The one or more secondary cells in the BFR SCell group 3002 (e.g., the first cell 3004 and/or the second cell 3006) may share a same set of RSs for a downlink reception and/or an uplink transmission. The first cell 3004 may be configured with one or more BFR configuration parameters. The second cell 3006 may not be configured with one or more BFR configuration parameters.

A wireless device may use a first receiving beam for a first reception (e.g., PDCCH, PDSCH), for example, on the first cell 3004 in a downlink reception. The wireless device may use a second receiving beam for a second reception, for example, on the second cell 3006. The first receiving beam may be different from the second receiving beam. The wireless device may not use different receiving beams (e.g., the first receiving beam and the second receiving beam) simultaneously. The wireless device may not simultaneously monitor the first reception on the first cell 3004 and the second reception on the second cell 3006, for example, based on the first receiving beam being different from the second receiving beam.

The wireless device may use, for example, the same transmitting beam(s) (or RSs) for a simultaneous uplink transmission via the one or more secondary cells in the BFR SCell group 3002. The wireless device may use, for example, the same receiving beam(s) for a simultaneous downlink reception from the one or more secondary cells in the BFR SCell group 3002.

The wireless device may use one or more first RSs (e.g., RS-1 and/or RS-2 as depicted in FIG. 30) of DL-BWP-1 3008 of the first cell 3004, for example, for a first uplink transmission or a first downlink reception in the first cell 3004. The wireless device may use the one or more first RSs (e.g., RS-1 and/or RS-2) of DL-BWP-1 3010 of the second cell 3006 for a second uplink transmission or a second downlink reception in the second cell 3006, for example, based on the using the same transmitting beam(s) or the same receiving beam(s) in the BFR SCell group 3002.

The wireless device may use one or more second RSs (e.g., RS-3 as depicted in FIG. 30) of DL-BWP-2 3012 of the first cell 3004, for example, for a first uplink transmission or a first downlink reception in the first cell 3004. The wireless device may employ the one or more second RSs (e.g., RS-3) of DL-BWP-2 3014 of the second cell 3006 for a second uplink transmission or a second downlink reception in the second cell 3006, for example, based on the using the same transmitting beam(s) or the same receiving beam(s) in the BFR SCell group 3002.

The wireless device may be active on the DL-BWP-1 3008 of the first cell 3004. The wireless device may switch from the DL-BWP-1 3008 of the first cell 3004 to the DL-BWP-2 3012 of the first cell 3004, for example, if a first BWP inactivity timer, associated with the DL-BWP-1 3008 of the first cell 3004, expires. The DL-BWP-2 3012 of the first cell 3004 may be a default DL BWP of the first cell 3004.

The wireless device may be active on the DL-BWP-1 3010 of the second cell 3006. A second BWP inactivity timer, associated with the DL-BWP-1 3010 of the second cell 3006, may be running, for example, if the first BWP inactivity timer, associated with the DL-BWP-1 3008 of the first cell 3004, expires. The wireless device may be active on the DL-BWP-2 3012 of the first cell 3004 and on the DL-BWP-1 3010 of the second cell 3016, for example, based on the switching from the DL-BWP-1 3008 of the first cell 3004.

The DL-BWP-2 3012 of the first cell 3004 may be associated with the one or more second RSs (e.g., RS-3). The DL-BWP-1 3010 of the second cell 3006 may be associated with the one or more first RSs (e.g., RS-1 and/or RS-2). The wireless device may not simultaneously use, for example, the one or more second RSs for the first cell 3004 and the one or more first RSs for the second cell 3006.

The wireless device may use the one or more second RSs for the first cell 3004 and/or the second cell 3006. An uplink transmission via the second cell 3006 or a downlink reception on the second cell 3006 may result in a failure, for example, based on the using the one or more second RSs for the second cell 3006. The wireless device may use the one or more first RSs for the first cell 3004 and/or the second cell 3006. An uplink transmission via the first cell 3004 or a downlink reception on the first cell 3004 may result in a failure, for example, based on the using the one or more first RSs for the first cell 3004. A base station may not configure a BWP inactivity timer for the one or more secondary cells except the first cell 3004, for example, based on the first cell 3004 being configured with the one or more BFR configuration parameters.

The base station may not configure a second BWP inactivity timer associated with one or more second DL BWPs of the second cell 3006 (e.g., the DL-BWP-1 3010 and/or the DL-BWP-2 3014), for example, based on the second cell 3006 not being configured with the one or more BFR configuration parameters. The base station may configure a first BWP inactivity timer associated with one or more first DL BWPs of the first cell 3004 (e.g., the DL-BWP-1 3008 and/or the DL-BWP-2 3012), for example, based on the first cell 3004 being configured with the one or more BFR configuration parameters.

The base station may configure a second BWP inactivity timer associated with the second cell 3006 (e.g., the DL-BWP-1 3010 and/or the DL-BWP-2 3014 of the second cell 3006). The second BWP inactivity timer associated with the second cell 3006 may expire. A first BWP inactivity timer associated with the first cell 3004 may be running, for example, if the second BWP inactivity timer, associated with the second cell 3006, expires. A new DL BWP (e.g., a default DL BWP) of the second cell 3006 may not be QCL-ed with a first active DL BWP of the first cell 3004. The new DL BWP of the second cell 3006 and the first active DL BWP of the first cell 3004 may not share the same transmitting/receiving beam(s) or RSs. The wireless device may not switch a second active DL BWP of the second cell 3006 to the new DL BWP, for example, based on the first cell 3004 being configured with the one or more BFR configuration parameters and/or the first BWP inactivity timer, associated with the first cell 3004, running.

Figure 31:
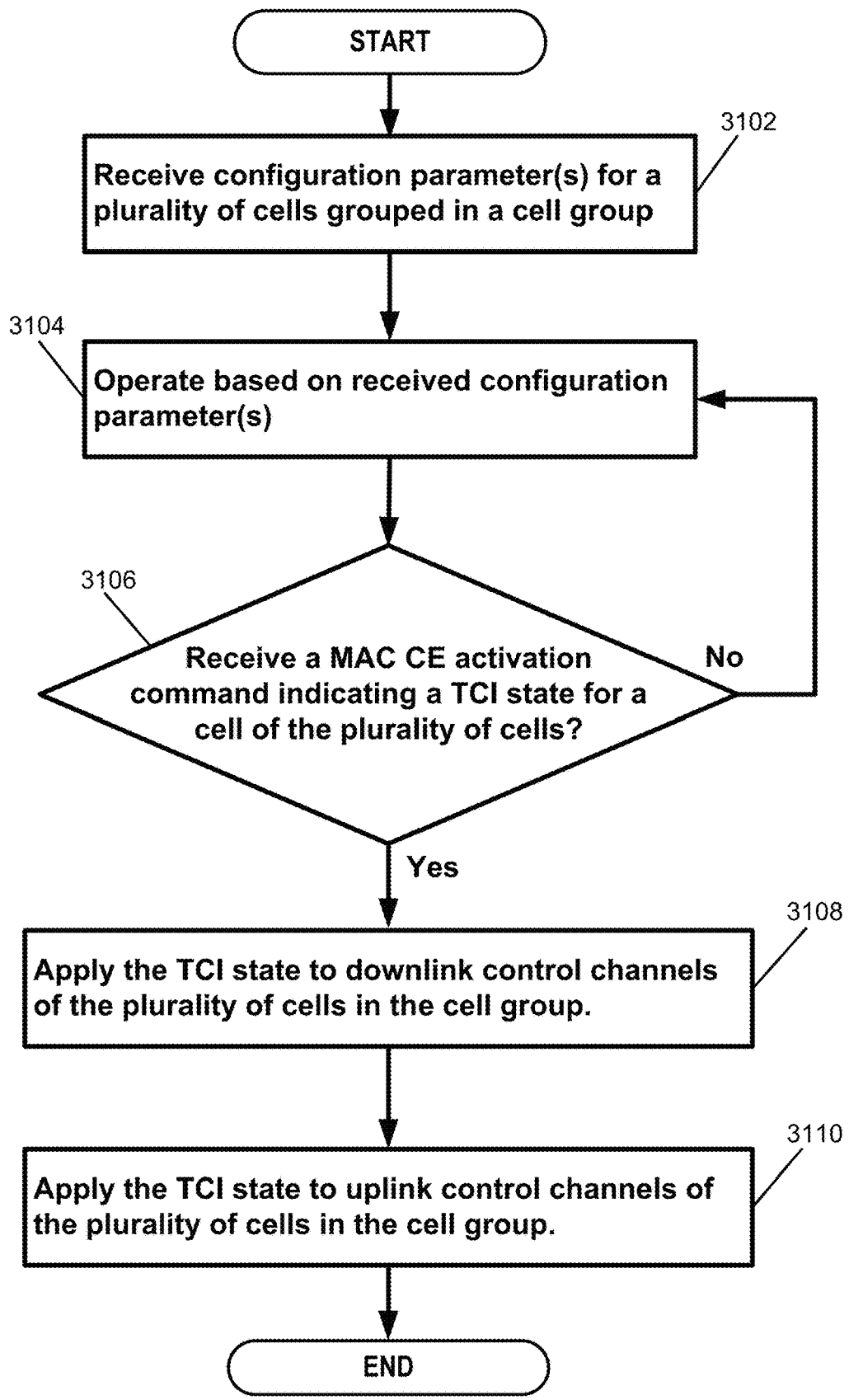
FIG. 31 shows an example method for management of cells in a cell group.

FIG. 31 shows an example method for management of cells in a cell group. The method may be accomplished by systems and/or apparatuses described herein. At step 3102, a wireless device may receive, from a base station, one or more configuration parameters for a plurality of cells. The plurality of cells may be grouped in a cell group. At 3104, the wireless device may operate based on the received one or more configuration parameters. At 3106, the wireless device may determine if a MAC CE activation command indicating a TCI state for a first cell of the plurality of cells in the cell group is received. The wireless device may continue to operate based on the received one or more configuration parameters, for example, if the wireless device determines a MAC CE activation command indicating a TCI state for a first cell of the plurality of cells in the cell group is not received. At 3108, the wireless device may apply the TCI state to downlink control channels of the plurality of cells in the cell group. The wireless device may also apply the TCI state to one or more PDSCHs of the plurality of cells in the cell group. The wireless device may apply the TCI state to downlink control channels of the plurality of cells in the cell group, for example, if the wireless device determines a MAC CE activation command indicating a TCI state for a first cell of the plurality of cells in the cell group is received. At 3110, the wireless device may apply the TCI state to uplink control channels of the plurality of cells in the cell group.

A wireless device may receive, from a base station, one or more messages. The one or more messages may comprise one or more configuration parameters for a plurality of cells. The plurality of cells may be grouped in a cell group comprising a first cell. The first cell may be configured with one or more BFR configuration parameters (e.g., of the one or more configuration parameters), for example, for a BFR of the cell group. The one or more BFR configuration parameters may indicate the cell group. The one or more BFR configuration parameters may comprise a cell group parameter. The cell group parameter may comprise, for example, a respective cell index of each cell in the cell group. The one or more BFR configuration parameters may indicate a CORESET, for example, of the first cell for the BFR of the cell group.

The one or more BFR configuration parameters of the first cell may indicate a BFI counter (e.g., beamFailureInstanceMaxCount), a configured response window, and/or one or more BFRQ resources for the BFR. The one or more BFR configuration parameters may indicate one or more first RSs of the first cell and/or one or more second RSs of the first cell. The one or more first RSs may comprise one or more first CSI-RSs and/or one or more first SSB/PBCHs. The one or more second RSs may comprise one or more second CSI-RSs and/or one or more second SSB/PBCHs.

The one or more configuration parameters may indicate an association between each of the one or more second RSs and each of the one or more BFRQ resources. The wireless device may determine a quantity (e.g., a number) of BFIs, associated with the first cell, equal to the BFI counter. The BFI indication may comprise determining (e.g., assessing) the one or more first RSs of the cell with radio quality that fails to satisfy a first threshold. The first threshold may be based on a hypothetical BLER, an RSRP, an RSRQ, and/or an SINR. The first threshold may be configured by the one or more configuration parameters.

The wireless device may initiate a random access procedure for a BFR procedure of the cell group. The wireless device may initiate the random access procedure, for example, based on determining the quantity (e.g., number) of BFI indications, associated with the first cell, equal to the BFI counter. The wireless device may select a RS, for example, in the one or more second RSs. The wireless device may select the RS in the one or more second RSs, for example, based on initiating the random access procedure. The random access procedure may be initiated, for example, by sending at least one message associated with a random access procedure such as, for example, a random access preamble. The selected RS may be associated with a BFRQ resource. The BFRQ resource may comprise one of the one or more BFRQ resources. The BFRQ resource may comprise at least one preamble and/or at least one channel resource. The at least one channel resource may comprise, for example, one or more time resources and/or one or more frequency resources.

The selected RS may have a radio quality that satisfies a second threshold. The second threshold may be based on an L1-RSRP, an RSRQ, a hypothetical BLER, and/or an SINR. The second threshold may be configured by the one or more configuration parameters.

The wireless device may send (e.g., transmit) the at least one preamble via the at least one channel resource, for example, based on selecting the selected RS. The wireless device may monitor a first PDCCH in the CORESET, for example, based on the selected RS and/or for a first DCI. The wireless device may monitor the first PDCCH, for example, based on transmitting the preamble (e.g., in the configured window). A DM-RS antenna port for the first PDCCH in the CORESET, for example, may be quasi-co-located (e.g., QCL-TypeD) with the selected RS.

The first DCI may be with a CRC scrambled by a C-RNTI and/or an MCS-C-RNTI of the wireless device. The random access procedure for the BFR of the cell group may be successfully completed, for example, based on receiving the first DCI on the first PDCCH in the CORESET (e.g., within the configured response window).

The wireless device may monitor the CORESET, for example, based on receiving the first DCI. The wireless device may monitor the CORESET, for example, until the wireless device receives a MAC CE activation command. The MAC CE activation command may comprise a cell index (e.g., provided by a higher layer parameter servCellIndex) of the first cell.

The one or more configuration parameters may comprise one or more TCI states of the first cell. The wireless device may receive the MAC CE activation command. The MAC CE activation command may indicate a TCI state of the one or more TCI states of the first cell.

The wireless device may apply the TCI state of the first cell to physical downlink control channels (e.g., one or more PDCCHs) of the cell group. The wireless device may apply the TCI state of the first cell, for example, based on the MAC CE activation command comprising the cell index of the first cell (e.g., the first cell configured with the one or more BFR configuration parameters). The wireless device may apply the TCI state of the first cell to physical downlink control channels (e.g., one or more PDCCHs) of the cell group, for example, based on the one or more BFR configuration parameters indicating the cell group.

The cell group may comprise the first cell and/or at least a second cell. The cell group may comprise at least a second cell. The cell group may not comprise the first cell.

The cell group may comprise a second cell. The second cell may be different from the first cell. The one or more configuration parameters may indicate a second CORESET, for example, on and/or for the second cell.

The wireless device may monitor a third PDCCH in the second CORESET. The random access procedure for the BFR of the cell group may be successfully completed, for example, based on receiving the first DCI on the first PDCCH in the CORESET (e.g., within the configured response window). The wireless device may stop monitoring the third PDCCH in the second CORESET of the second cell. The wireless device may stop monitoring the third PDCCH, for example, based on the random access procedure for the BFR of the cell group being successfully completed and/or the cell group comprising the second cell.

A wireless device may receive one or more configuration parameters for a plurality of cells of a cell group, may receive a MAC CE activation command that indicates a TCI state for a first cell of the plurality of cells of the cell group, and may apply the TCI state to one or more downlink control channels of the cell group. The wireless device may determine, based on the one or more configuration parameters, a cell group parameter comprising one or more cell-specific indexes of the plurality of cells of the cell group. The wireless device may apply the TCI state to the one or more downlink control channels of the cell group based on the cell group parameter. The wireless device may determine, based on the TCI state, an uplink control channel for each cell of the plurality of cells of the cell group and may apply the TCI state to the uplink control channel for each cell of the plurality of cells of the cell group. The applying the TCI state to the one or more downlink control channels of the cell group may comprise determining each cell of the plurality of cells of the cell group is quasi-co-located using a same serving beam for a PDCCH reception. The wireless device may apply the TCI state to one or more PDSCHs of the cell group. The applying the TCI state to the one or more downlink control channels of the cell group may comprise determining each cell of the plurality of cells of the cell group is quasi-co-located using a same serving beam for a PUCCH transmission. The TCI state may comprise a cell group parameter comprising one or more cell-specific indexes of the plurality of cells of the cell group. The TCI state may comprise a reference signal. The applying the TCI state to the one or more downlink control channels of the cell group may comprise determining DM-RS antenna ports, of the one or more downlink control channels in CORESETs of the plurality of cells of the cell group, are quasi-co-located with the reference signal. The one or more configuration parameters may comprise one or more BFR configuration parameters. The wireless device may initiate a BFR procedure, may monitor the one or more downlink control channels for an indication of a completion of the BFR procedure, and, based on the one or more BFR configuration parameters and the indication of the completion of the BFR procedure, may stop monitoring of downlink control channels for each cell of the plurality of cells of the cell group other than the first cell.

A wireless device may receive one or more BFR configuration parameters for a first cell of a plurality of cells of a cell group, may receive a MAC CE activation command that indicates a TCI state for the first cell of the plurality of cells of the cell group, and may apply the TCI state to the one or more downlink control channels of the cell group. The wireless device may determine, based on the one or more BFR configuration parameters, a cell group parameter comprising one or more cell-specific indexes of the plurality of cells of the cell group. The applying, by the wireless device, may be based on the cell group parameter. The wireless device may determine, based on the TCI state, an uplink control channel for each cell of the plurality of cells of the cell group and may apply the TCI state to the uplink control channel for each cell of the plurality of cells of the cell group. The TCI state may comprise a cell group parameter comprising one or more cell-specific indexes of the plurality of cells of the cell group. The TCI state may comprise a reference signal. The applying, by the wireless device, may comprise determining DM-RS antenna ports, of the one or more downlink control channels in CORESETs of the plurality of cells of the cell group, are quasi-co-located with the reference signal. The wireless device may initiate a BFR procedure, may monitor the one or more downlink control channels for an indication of a completion of the BFR procedure, and, based on the one or more BFR configuration parameters and the indication of the completion of the BFR procedure, may stop monitoring of downlink control channels for each cell of the plurality of cells of the cell group other than the first cell.

A wireless device may receive one or more configuration parameters for a plurality of cells of a cell group, may initiate a random access procedure for a beam failure recovery, may receive a MAC CE activation command that indicates a TCI state for a first cell of the plurality of cells of the cell group, and may apply the TCI state to one or more control channels of the cell group, wherein the one or more control channels comprise at least one of a downlink control channel or an uplink control channel. The one or more control channels may comprise the downlink control channel for each cell of the plurality of cells of the cell group. The wireless device may determine, based on the TCI state, an uplink control channel for each cell of the plurality of cells of the cell group and may apply the TCI state to the uplink control channel for each cell of the plurality of cells of the cell group. The wireless device may determine, based on the one or more configuration parameters, a cell group parameter comprising one or more cell-specific indexes of the plurality of cells of the cell group. The wireless device may apply the TCI state to the one or more control channels of the cell group based on the cell group parameter. The wireless device may determine, based on the TCI state, a cell group parameter comprising one or more cell-specific indexes of the plurality of cells of the cell group. The TCI state may comprise a reference signal. The wireless device applying the TCI state to the one or more control channels of the cell group may comprise determining DM-RS antenna ports, of the one or more control channels in CORESETs of the plurality of cells of the cell group, are quasi-co-located with the reference signal. The one or more configuration parameters may comprise one or more BFR configuration parameters. The wireless device may monitor one or more downlink control channels for an indication of a completion of the random access procedure, and, based on the one or more BFR configuration parameters and the indication of the completion of the BFR procedure, may stop monitoring of downlink control channels for each cell of the plurality of cells of the cell group other than the first cell.

A wireless device may receive one or more messages comprising one or more configuration parameters of a plurality of cells grouped in a cell group comprising a cell, receiving a MAC CE activation command indicating a TCI state for the cell, and may apply the TCI state to downlink control channels of the cell group. The plurality of cells may be grouped in the cell group based on the plurality of cells being quasi-co-located. The plurality of cells being quasi-co-located may comprise a DM-RS antenna port of a PDCCH of each of the plurality of cells being quasi-co-located. The plurality of cells being quasi-co-located may comprise using the same serving beam for a PDCCH reception of each of the plurality of cells. A PUCCH of each of the plurality of cells may be quasi-co-located. The plurality of cells being quasi-co-located may comprise using the same serving beam for a PUCCH transmission of each of the plurality of cells. The TCI state may comprise a cell group parameter indicating a plurality of serving cell-specific indexes of the plurality of cells. The plurality of cells may be grouped in the cell group based on the cell group parameter indicating the plurality of serving cell-specific indexes of the plurality of cells. The TCI state may comprise a reference signal. The wireless device applying the TCI state to downlink control channels of the cell group may comprise that DM-RS antenna ports of the downlink control channels in CORESETs of the plurality of cells are quasi-co-located with the reference signal. The one or more configuration parameters may comprise a cell group parameter indicating a plurality of serving cell-specific indexes of the plurality of cells. The plurality of cells may be grouped in the cell group based on the cell group parameter indicating the plurality of serving cell-specific indexes of the plurality of cells. The cell group may comprise the cell configured with one or more BFR parameters and one or more second cells, of the plurality of cells, configured to use the cell for a BFR procedure of the cell group. The wireless device may initiate the BFR procedure for the cell based on assessing one or more reference signals, of the cell, indicated by the one or more BFR parameters. The wireless device may transmit a BFR request based on the initiating the BFR procedure. The one or more BFR parameters may indicate a CORESET for the cell. The wireless device may complete the BFR procedure for the cell group based on receiving a downlink control information in the CORESET via a PDCCH of the cell. The wireless device may stop monitoring downlink control channels on and/or for any secondary cell, other than the cell, in the cell group based on the completing the BFR procedure. The wireless device may monitor the CORESET until receiving the MAC CE activation command indicating the TCI state. The plurality of cells being quasi-co-located may comprise the plurality of cells being quasi-co-located with type-D (QCL Type-D).

Figure 32:
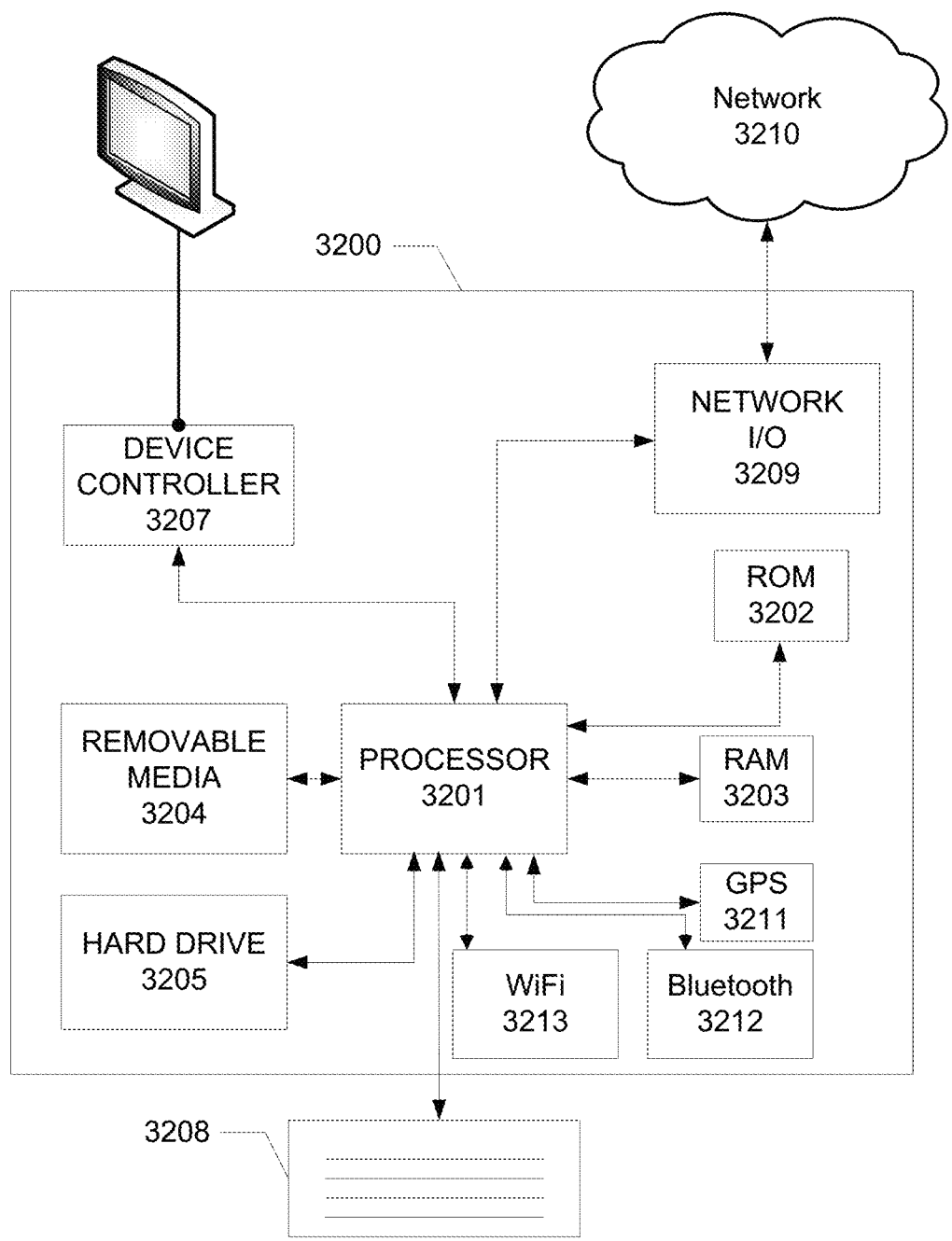
FIG. 32 shows example elements of a computing device that may be used to implement any of the various devices described herein.

FIG. 32 shows example elements of a computing device that may be used to implement any of the various devices described herein, including, e.g., the base station 122A and/or 122B, the wireless device 110 (e.g., 110A and/or 110B), or any other base station, wireless device, or computing device described herein. The computing device 3200 may include one or more processors 3201, which may execute instructions stored in the random access memory (RAM) 3203, the removable media 3204 (such as a Universal Serial Bus (USB) drive, compact disk (CD) or digital versatile disk (DVD), or floppy disk drive), or any other desired storage medium. Instructions may also be stored in an attached (or internal) hard drive 3205. The computing device 3200 may also include a security processor (not shown), which may execute instructions of one or more computer programs to monitor the processes executing on the processor 3201 and any process that requests access to any hardware and/or software components of the computing device 3200 (e.g., ROM 3202, RAM 3203, the removable media 3204, the hard drive 3205, the device controller 3207, a network interface 3209, a GPS 3211, a Bluetooth interface 3212, a WiFi interface 3213, etc.). The computing device 3200 may include one or more output devices, such as the display 3206 (e.g., a screen, a display device, a monitor, a television, etc.), and may include one or more output device controllers 3207, such as a video processor. There may also be one or more user input devices 3208, such as a remote control, keyboard, mouse, touch screen, microphone, etc. The computing device 3200 may also include one or more network interfaces, such as a network interface 3209, which may be a wired interface, a wireless interface, or a combination of the two. The network interface 3209 may provide an interface for the computing device 3200 to communicate with a network 3210 (e.g., a RAN, or any other network). The network interface 3209 may include a modem (e.g., a cable modem), and the external network 3210 may include communication links, an external network, an in-home network, a provider's wireless, coaxial, fiber, or hybrid fiber/coaxial distribution system (e.g., a DOCSIS network), or any other desired network. Additionally, the computing device 3200 may include a location-detecting device, such as a global positioning system (GPS) microprocessor 3211, which may be configured to receive and process global positioning signals and determine, with possible assistance from an external server and antenna, a geographic position of the computing device 3200.

The example in FIG. 32 may be a hardware configuration, although the components shown may be implemented as software as well. Modifications may be made to add, remove, combine, divide, etc. components of the computing device 3200 as desired. Additionally, the components may be implemented using basic computing devices and components, and the same components (e.g., processor 3201, ROM storage 3202, display 3206, etc.) may be used to implement any of the other computing devices and components described herein. For example, the various components described herein may be implemented using computing devices having components such as a processor executing computer-executable instructions stored on a computer-readable medium, as shown in FIG. 32. Some or all of the entities described herein may be software based, and may co-exist in a common physical platform (e.g., a requesting entity may be a separate software process and program from a dependent entity, both of which may be executed as software on a common computing device).

The disclosed mechanisms herein may be performed if certain criteria are met, for example, in a wireless device, a base station, a radio environment, a network, a combination of the above, and/or the like. Example criteria may be based on, for example, wireless device and/or network node configurations, traffic load, initial system set up, packet sizes, traffic characteristics, a combination of the above, and/or the like. If the one or more criteria are met, various examples may be used. It may be possible to implement examples that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). A base station may comprise multiple sectors. A base station communicating with a plurality of wireless devices may refer to a base station communicating with a subset of the total wireless devices in a coverage area. Wireless devices referred to herein may correspond to a plurality of wireless devices of a particular LTE or 5G release with a given capability and in a given sector of a base station. A plurality of wireless devices may refer to a selected plurality of wireless devices, and/or a subset of total wireless devices in a coverage area. Such devices may operate, function, and/or perform based on or according to drawings and/or descriptions herein, and/or the like. There may be a plurality of base stations or a plurality of wireless devices in a coverage area that may not comply with the disclosed methods, for example, because those wireless devices and/or base stations perform based on older releases of LTE or 5G technology.

One or more features described herein may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features described herein, and such data structures are contemplated within the scope of computer executable instructions and computer-usable data described herein.

Many of the elements in examples may be implemented as modules. A module may be an isolatable element that performs a defined function and has a defined interface to other elements. The modules may be implemented in hardware, software in combination with hardware, firmware, wetware (i.e., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or Lab VIEWMathScript. Additionally, or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and complex programmable logic devices (CPLDs). Computers, microcontrollers, and microprocessors may be programmed using languages such as assembly, C, C++ or the like. FPGAs, ASICs, and CPLDs may be programmed using hardware description languages (HDL), such as VHSIC hardware description language (VHDL) or Verilog, which may configure connections between internal hardware modules with lesser functionality on a programmable device. The above-mentioned technologies may be used in combination to achieve the result of a functional module.

A non-transitory tangible computer readable media may comprise instructions executable by one or more processors configured to cause operations of multi-carrier communications described herein. An article of manufacture may comprise a non-transitory tangible computer readable machine-accessible medium having instructions encoded thereon for enabling programmable hardware to cause a device (e.g., a wireless device, wireless communicator, a wireless device, a base station, and the like) to allow operation of multi-carrier communications described herein. The device, or one or more devices such as in a system, may include one or more processors, memory, interfaces, and/or the like. Other examples may comprise communication networks comprising devices such as base stations, wireless devices or user equipment (wireless device), servers, switches, antennas, and/or the like. A network may comprise any wireless technology, including but not limited to, cellular, wireless, WiFi, 4G, 5G, any generation of 3GPP or other cellular standard or recommendation, wireless local area networks, wireless personal area networks, wireless ad hoc networks, wireless metropolitan area networks, wireless wide area networks, global area networks, space networks, and any other network using wireless communications. Any device (e.g., a wireless device, a base station, or any other device) or combination of devices may be used to perform any combination of one or more of steps described herein, including, for example, any complementary step or steps of one or more of the above steps.

Although examples are described above, features and/or steps of those examples may be combined, divided, omitted, rearranged, revised, and/or augmented in any desired manner Various alterations, modifications, and improvements will readily occur to those skilled in the art. Such alterations, modifications, and improvements are intended to be part of this description, though not expressly stated herein, and are intended to be within the spirit and scope of the descriptions herein. Accordingly, the foregoing description is by way of example only, and is not limiting.

What is claimed is:

1. A method comprising:
receiving, by a wireless device, one or more configuration parameters indicating a plurality of cells to be updated with a same transmission configuration indication (TCI) state;
receiving a control command indicating:
a cell index for a first cell of the plurality of cells; and
a TCI state for the first cell; and
performing, via each cell of the plurality of cells and using one or more parameters associated with the TCI state, at least one of reception or transmission.

2. The method of claim 1, further comprising:
determining, based on the one or more configuration parameters, a cell group parameter indicating one or more cell indexes of the plurality of cells; and
applying, based on the cell group parameter, the TCI state to one or more channels of each cell of the plurality of cells.

3. The method of claim 1, further comprising:
sending, based on the TCI state and via one or more uplink control channels of each cell of the plurality of cells, uplink control information; and
receiving, based on the TCI state and via one or more downlink control channels of each cell of the plurality of cells, downlink control information.

4. The method of claim 1, wherein each cell of the plurality of cells is quasi-co-located using a same serving beam for physical downlink control channel (PDCCH) reception; and
wherein the performing the reception comprises applying the TCI state to one or more downlink control channels of each cell of the plurality of cells.

5. The method of claim 1, wherein each cell of the plurality of cells is quasi-co-located using a same serving beam for physical uplink control channel (PUCCH) transmission; and
wherein the performing the transmission comprises applying the TCI state to one or more uplink control channels of each cell of the plurality of cells.

6. The method of claim 1, wherein the TCI state indicated by the control command is associated with a cell group parameter indicating one or more cell indexes of the plurality of cells, and wherein the one or more cell indexes comprises the cell index for the first cell.

7. The method of claim 1, wherein the TCI state indicated by the control command is associated with a reference signal, and
wherein demodulation reference signal (DM-RS) antenna ports, of one or more channels associated with control resource sets (CORESETs) of each cell of the plurality of cells, are quasi-co-located with the reference signal.

8. The method of claim 1, wherein the one or more configuration parameters comprise one or more beam failure recovery (BFR) configuration parameters; and
wherein the method further comprises:
sending an uplink signal for a BFR procedure;
receiving, via one or more downlink control channels, an indication of a completion of the BFR procedure; and
based on the one or more BFR configuration parameters and the indication of the completion of the BFR procedure, stopping monitoring of downlink control channels of each cell, of the plurality of cells, other than the first cell.

9. The method of claim 1, wherein the control command is a medium access control (MAC) control element (CE) activation command.

10. The method of claim 1, further comprising applying the TCI state to one or more channels of each cell of the plurality of cells based on:
the control command indicating the TCI state for the first cell; and
the plurality of cells comprising the first cell.

11. A method comprising:
sending, by a base station, one or more configuration parameters indicating a plurality of cells to be updated with a same transmission configuration indication (TCI) state;
sending a control command indicating:
a cell index for a first cell of the plurality of cells; and
a TCI state for the first cell; and
performing, via each cell of the plurality of cells and using one or more parameters associated with the TCI state, at least one of transmission or reception.

12. The method of claim 11, further comprising:
configuring, for the one or more configuration parameters, a cell group parameter indicating one or more cell indexes of the plurality of cells; and
applying, based on the cell group parameter, the TCI state to one or more channels of each cell of the plurality of cells.

13. The method of claim 11, further comprising:
receiving, based on the TCI state and via one or more uplink control channels of each cell of the plurality of cells, uplink control information; and
sending, based on the TCI state and via one or more downlink control channels of each cell of the plurality of cells, downlink control information.

14. The method of claim 11, wherein each cell of the plurality of cells is quasi-co-located using a same serving beam for physical downlink control channel (PDCCH) transmission; and
wherein the performing the transmission comprises applying the TCI state to one or more downlink control channels of each cell of the plurality of cells.

15. The method of claim 11, wherein each cell of the plurality of cells is quasi-co-located using a same serving beam for physical uplink control channel (PUCCH) reception; and
wherein the performing the reception comprises applying the TCI state to one or more uplink control channels of each cell of the plurality of cells.

16. The method of claim 11, wherein the TCI state indicated by the control command is associated with a cell group parameter indicating one or more cell indexes of the plurality of cells, and wherein the one or more cell indexes comprises the cell index for the first cell.

17. The method of claim 11, wherein the TCI state indicated by the control command is associated with a reference signal, and
wherein demodulation reference signal (DM-RS) antenna ports, of one or more channels associated with control resource sets (CORESETs) of each cell of the plurality of cells, are quasi-co-located with the reference signal.

18. The method of claim 11, wherein the one or more configuration parameters comprise one or more beam failure recovery (BFR) configuration parameters; and
wherein the method further comprises:
receiving an uplink signal for a BFR procedure; and
sending, via one or more downlink control channels, an indication of a completion of the BFR procedure.

19. The method of claim 11, wherein the control command is a medium access control (MAC) control element (CE) activation command.

20. The method of claim 11, further comprising applying the TCI state to one or more channels of each cell of the plurality of cells based on:
the control command indicating the TCI state for the first cell; and
the plurality of cells comprising the first cell.

21. A wireless device comprising:
one or more processors; and
memory storing instructions that, when executed by the one or more processors, cause the wireless device to:
receive one or more configuration parameters indicating a plurality of cells to be updated with a same transmission configuration indication (TCI) state;

receive a control command indicating:
- a cell index for a first cell of the plurality of cells; and
- a TCI state for the first cell; and perform, via each cell of the plurality of cells and using one or more parameters associated with the TCI state, at least one of reception or transmission.

22. The wireless device of claim 21, wherein the instructions, when executed by the one or more processors, cause the wireless device to:
- determine, based on the one or more configuration parameters, a cell group parameter indicating one or more cell indexes of the plurality of cells; and
- apply, based on the cell group parameter, the TCI state to one or more channels of each cell of the plurality of cells.

23. The wireless device of claim 21, wherein the instructions, when executed by the one or more processors, cause the wireless device to:
- send, based on the TCI state and via one or more uplink control channels of each cell of the plurality of cells, uplink control information; and
- receive, based on the TCI state and via one or more downlink control channels of each cell of the plurality of cells, downlink control information.

24. The wireless device of claim 21, wherein each cell of the plurality of cells is quasi-co-located using a same serving beam for physical downlink control channel (PDCCH) reception; and
- wherein the instructions, when executed by the one or more processors, cause the wireless device to apply the TCI state to one or more downlink control channels of each cell of the plurality of cells.

25. The wireless device of claim 21, wherein each cell of the plurality of cells is quasi-co-located using a same serving beam for physical uplink control channel (PUCCH) transmission; and
- wherein the instructions, when executed by the one or more processors, cause the wireless device to apply the TCI state to one or more uplink control channels of each cell of the plurality of cells.

26. The wireless device of claim 21, wherein the TCI state indicated by the control command is associated with a cell group parameter indicating one or more cell indexes of the plurality of cells, and wherein the one or more cell indexes comprises the cell index for the first cell.

27. The wireless device of claim 21, wherein the TCI state indicated by the control command is associated with a reference signal, and
- wherein demodulation reference signal (DM-RS) antenna ports, of one or more channels associated with control resource sets (CORESETs) of each cell of the plurality of cells, are quasi-co-located with the reference signal.

28. The wireless device of claim 21, wherein the one or more configuration parameters comprise one or more beam failure recovery (BFR) configuration parameters; and
- wherein the instructions, when executed by the one or more processors, cause the wireless device to:
  - send an uplink signal for a BFR procedure;
  - receive, via one or more downlink control channels, an indication of a completion of the BFR procedure; and
  - based on the one or more BFR configuration parameters and the indication of the completion of the BFR procedure, stop monitoring of downlink control channels of each cell, of the plurality of cells, other than the first cell.

29. The wireless device of claim 21, wherein the control command is a medium access control (MAC) control element (CE) activation command.

30. The wireless device of claim 21, wherein the instructions, when executed by the one or more processors, cause the wireless device to apply the TCI state to one or more channels of each cell of the plurality of cells based on:
- the control command indicating the TCI state for the first cell; and
- the plurality of cells comprising the first cell.

31. A base station comprising:
- one or more processors; and
- memory storing instructions that, when executed by the one or more processors, cause the base station to:
  - send one or more configuration parameters indicating a plurality of cells to be updated with a same transmission configuration indication (TCI) state;
  - send a control command indicating:
    - a cell index for a first cell of the plurality of cells; and
    - a TCI state for the first cell; and
  - perform, via each cell of the plurality of cells and using one or more parameters associated with the TCI state, at least one of transmission or reception.

32. The base station of claim 31, wherein the instructions, when executed by the one or more processors, cause the base station to:
- configure, for the one or more configuration parameters, a cell group parameter indicating one or more cell indexes of the plurality of cells; and
- apply, based on the cell group parameter, the TCI state to one or more channels of each cell of the plurality of cells.

33. The base station of claim 31, wherein the instructions, when executed by the one or more processors, cause the base station to:
- receive, based on the TCI state and via one or more uplink control channels of each cell of the plurality of cells, uplink control information; and
- send, based on the TCI state and via one or more downlink control channels of each cell of the plurality of cells, downlink control information.

34. The base station of claim 31, wherein each cell of the plurality of cells is quasi-co-located using a same serving beam for physical downlink control channel (PDCCH) transmission; and
- wherein the instructions, when executed by the one or more processors, cause the base station to apply the TCI state to one or more downlink control channels of each cell of the plurality of cells.

35. The base station of claim 31, wherein each cell of the plurality of cells is quasi-co-located using a same serving beam for physical uplink control channel (PUCCH) reception; and
- wherein the instructions, when executed by the one or more processors, cause the base station to apply the TCI state to one or more uplink control channels of each cell of the plurality of cells.

36. The base station of claim 31, wherein the TCI state indicated by the control command is associated with a cell group parameter indicating one or more cell indexes of the plurality of cells, and wherein the one or more cell indexes comprises the cell index for the first cell.

37. The base station of claim 31, wherein the TCI state indicated by the control command is associated with a reference signal, and
- wherein demodulation reference signal (DM-RS) antenna ports, of one or more channels associated with control resource sets (CORESETs) of each cell of the plurality of cells, are quasi-co-located with the reference signal.

38. The base station of claim 31, wherein the one or more configuration parameters comprise one or more beam failure recovery (BFR) configuration parameters; and
wherein the instructions, when executed by the one or more processors, cause the base station to:
receive an uplink signal for a BFR procedure; and
send, via one or more downlink control channels, an indication of a completion of the BFR procedure.

39. The base station of claim 31, wherein the control command is a medium access control (MAC) control element (CE) activation command.

40. The base station of claim 31, wherein the instructions, when executed by the one or more processors, cause the base station to apply the TCI state to one or more channels of each cell of the plurality of cells based on:
the control command indicating the TCI state for the first cell; and
the plurality of cells comprising the first cell.

41. A system comprising:
a wireless device; and
a base station;
wherein the base station is configured to:
send one or more configuration parameters indicating a plurality of cells to be updated with a same transmission configuration indication (TCI) state; and
send a control command indicating:
a cell index for a first cell of the plurality of cells; and
a TCI state for the first cell; and
wherein the wireless device is configured to:
perform, via each cell of the plurality of cells and using one or more parameters associated with the TCI state, at least one of reception or transmission.

42. The system of claim 41, wherein the wireless device is further configured to:
determine, based on the one or more configuration parameters, a cell group parameter indicating one or more cell indexes of the plurality of cells; and
apply, based on the cell group parameter, the TCI state to one or more channels of each cell of the plurality of cells.

43. The system of claim 41, wherein the wireless device is further configured to:
send, based on the TCI state and via one or more uplink control channels of each cell of the plurality of cells, uplink control information; and
wherein the base station is further configured to:
send, based on the TCI state and via one or more downlink control channels of each cell of the plurality of cells, downlink control information.

44. The system of claim 41, wherein each cell of the plurality of cells is quasi-co-located using a same serving beam for physical downlink control channel (PDCCH) reception; and
wherein the wireless device is further configured to apply the TCI state to one or more downlink control channels of each cell of the plurality of cells.

45. The system of claim 41, wherein each cell of the plurality of cells is quasi-co-located using a same serving beam for physical uplink control channel (PUCCH) transmission; and
wherein the wireless device is further configured to apply the TCI state to one or more uplink control channels of each cell of the plurality of cells.

46. The system of claim 41, wherein the TCI state indicated by the control command is associated with a cell group parameter indicating one or more cell indexes of the plurality of cells, and wherein the one or more cell indexes comprises the cell index for the first cell.

47. The system of claim 41, wherein the TCI state indicated by the control command is associated with a reference signal, and
wherein demodulation reference signal (DM-RS) antenna ports, of one or more channels associated with control resource sets (CORESETs) of each cell of the plurality of cells, are quasi-co-located with the reference signal.

48. The system of claim 41, wherein the one or more configuration parameters comprise one or more beam failure recovery (BFR) configuration parameters; and
wherein the wireless device is further configured to:
send an uplink signal for a BFR procedure;
receive, via one or more downlink control channels, an indication of a completion of the BFR procedure; and
based on the one or more BFR configuration parameters and the indication of the completion of the BFR procedure, stop monitoring of downlink control channels of each cell, of the plurality of cells, other than the first cell.

49. The system of claim 41, wherein the control command is a medium access control (MAC) control element (CE) activation command.

50. The system of claim 41, wherein the wireless device is further configured to apply the TCI state to one or more channels of each cell of the plurality of cells based on:
the control command indicating the TCI state for the first cell; and
the plurality of cells comprising the first cell.

* * * * *